United States Patent
Crawforth et al.

(10) Patent No.: US 11,055,384 B1
(45) Date of Patent: Jul. 6, 2021

(54) AUTHENTICATING MEDIA DATA BASED ON STEGANOGRAPHIC AND BLOCKCHAIN TECHNIQUES

(71) Applicant: DeepTruth, LLC, Boise, ID (US)

(72) Inventors: Jason Lealand Crawforth, Boise, ID (US); Michael Robert Blood, Boise, ID (US)

(73) Assignee: DeepTruth, LLC, Boise, ID (US)

( * ) Notice: Subject to any disclaimer, the term of this patent is extended or adjusted under 35 U.S.C. 154(b) by 0 days.

(21) Appl. No.: 17/078,761

(22) Filed: Oct. 23, 2020

Related U.S. Application Data

(62) Division of application No. 16/420,645, filed on May 23, 2019, now Pat. No. 10,853,456.

(60) Provisional application No. 62/676,129, filed on May 24, 2018.

(51) Int. Cl.
| | | |
|---|---|---|
| *G06F 21/10* | (2013.01) | |
| *H04L 29/06* | (2006.01) | |
| *G06F 21/60* | (2013.01) | |
| *H04L 9/06* | (2006.01) | |
| *H04L 29/08* | (2006.01) | |

(52) U.S. Cl.
CPC ............ *G06F 21/10* (2013.01); *G06F 21/602* (2013.01); *H04L 9/0643* (2013.01); *H04L 65/601* (2013.01); *G06F 2221/0748* (2013.01); *H04L 67/10* (2013.01); *H04L 2209/16* (2013.01); *H04L 2209/38* (2013.01)

(58) Field of Classification Search
CPC ... H04L 9/0637; H04L 9/0656; H04L 9/0841; H04L 9/14; H04L 9/312; H04L 9/3236; H04L 9/3239; H04L 9/3247; H04L 2209/125; H04L 2209/26; H04L 2209/38; H04L 2209/56; G06F 21/602
USPC ........................................ 713/155, 164, 168
See application file for complete search history.

(56) References Cited

U.S. PATENT DOCUMENTS

| | | | |
|---|---|---|---|
| 6,691,229 B1 | 2/2004 | Nelson | |
| 7,313,248 B2 * | 12/2007 | Tonisson | G06T 1/0028 382/100 |
| 8,429,205 B2 * | 4/2013 | Rhoads | G06F 16/48 707/809 |
| 8,977,860 B2 | 3/2015 | Barrus et al. | |
| 9,300,678 B1 * | 3/2016 | Stack | H04W 12/104 |
| 9,317,471 B2 * | 4/2016 | Wiseman | G06F 16/783 |
| 9,621,565 B2 | 4/2017 | Stack et al. | |
| 9,881,176 B2 | 1/2018 | Goldfarb et al. | |
| 10,042,782 B2 * | 8/2018 | Struttmann | H04L 9/3297 |

(Continued)

*Primary Examiner* — Samson B Lemma
(74) *Attorney, Agent, or Firm* — Holland & Hart LLP

(57) ABSTRACT

Methods, systems, and devices that support determining whether media data has been altered are described. Captured media data may be segmented into one or more subsets, and cryptographic representations (e.g., hashes) based on the subsets may be written to an immutable ledger, possibly along with metadata and other related data. A block of a blockchain may be created for each entry in the immutable ledger. A set of media data may be validated, if a corresponding immutable ledger exists, based on segmenting the set of media data into one or more subsets in accordance with the segmenting upon capture, creating candidate cryptographic representations (e.g., hashes) based on the subsets, and comparing the candidate cryptographic representations with contents of the corresponding immutable ledger.

30 Claims, 32 Drawing Sheets

(56) References Cited

U.S. PATENT DOCUMENTS

| | | |
|---|---|---|
| 10,075,298 B2 * | 9/2018 | Struttmann .......... G06F 21/6218 |
| 10,095,877 B2 | 10/2018 | Stack et al. |
| 10,097,356 B2 | 10/2018 | Zinder |
| 10,129,032 B2 | 11/2018 | Vandervort |
| 10,136,098 B2 * | 11/2018 | Altenburger ............ H04N 5/913 |
| 10,193,696 B2 * | 1/2019 | Struttmann .............. G06F 21/64 |
| 10,360,668 B1 | 7/2019 | McGregor et al. |
| 10,361,866 B1 | 7/2019 | McGregor et al. |
| 10,375,050 B2 | 8/2019 | Lyons et al. |
| 10,594,689 B1 * | 3/2020 | Weaver ................. H04L 9/3247 |
| 10,726,533 B2 | 7/2020 | McGregor et al. |
| 10,733,315 B2 | 8/2020 | Stack et al. |
| 2003/0133591 A1 | 7/2003 | Watanabe et al. |
| 2005/0125684 A1 | 6/2005 | Schmidt |
| 2005/0132195 A1 | 6/2005 | Dietl |
| 2005/0248813 A1 | 11/2005 | Zolla et al. |
| 2006/0047967 A1 | 3/2006 | Akhan et al. |
| 2006/0056402 A1 | 3/2006 | Gariador et al. |
| 2006/0126891 A1 | 6/2006 | Seroussi et al. |
| 2007/0283078 A1 | 12/2007 | Li et al. |
| 2008/0243898 A1 | 10/2008 | Gormish et al. |
| 2010/0088522 A1 | 4/2010 | Barrus et al. |
| 2013/0269007 A1 | 10/2013 | Yoshigaki et al. |
| 2014/0129669 A1 * | 5/2014 | Wiseman ............ G06F 16/9558 709/217 |
| 2014/0181236 A1 * | 6/2014 | Venkatesh ............. G06F 3/0641 709/214 |
| 2014/0250450 A1 * | 9/2014 | Yu ...................... H04N 21/4331 725/19 |
| 2014/0259166 A1 * | 9/2014 | Ghaskadvi ......... G06Q 30/0277 726/23 |
| 2015/0254458 A1 | 9/2015 | Hong et al. |
| 2015/0372988 A1 | 12/2015 | Tredoux et al. |
| 2016/0028552 A1 | 1/2016 | Spanos et al. |
| 2016/0098723 A1 | 4/2016 | Feeney |
| 2016/0191243 A1 | 6/2016 | Manning |
| 2016/0267558 A1 | 9/2016 | Bonnell et al. |
| 2016/0277793 A1 | 9/2016 | Eyer et al. |
| 2016/0328713 A1 | 11/2016 | Ebrahimi |
| 2016/0379330 A1 * | 12/2016 | Powers .................. G06F 21/64 382/100 |
| 2017/0005804 A1 | 1/2017 | Zinder |
| 2017/0061565 A1 | 3/2017 | Tanaka |
| 2017/0134162 A1 | 5/2017 | Code et al. |
| 2017/0249482 A1 | 8/2017 | Takaai et al. |
| 2017/0353311 A1 * | 12/2017 | Schukai ................ H04L 9/0618 |
| 2018/0068091 A1 * | 3/2018 | Gaidar ..................... G06F 21/16 |
| 2018/0082024 A1 | 3/2018 | Curbera et al. |
| 2018/0096163 A1 | 4/2018 | Jacques de Kadt et al. |
| 2018/0121635 A1 * | 5/2018 | Tormasov ............. H04L 9/3297 |
| 2018/0205552 A1 | 7/2018 | Struttmann et al. |
| 2018/0293363 A1 | 10/2018 | Asati et al. |
| 2018/0323980 A1 | 11/2018 | Ahn et al. |
| 2019/0258999 A1 | 8/2019 | Leonard et al. |
| 2020/0372184 A1 * | 11/2020 | Meirosu ............... H04N 21/854 |

* cited by examiner

AUTHENTICATING MEDIA DATA BASED ON STEGANOGRAPHIC AND BLOCKCHAIN TECHNIQUES

CROSS REFERENCES

The present Application for Patent is a divisional of U.S. patent application Ser. No. 16/420,645 by Crawforth et al., entitled "AUTHENTICATING MEDIA DATA BASED ON STEGANOGRAPHIC AND BLOCKCHAIN TECHNIQUES" and filed May 23, 2019, which claims priority to U.S. Provisional Patent Application No. 62/676,129 by Crawforth et al., entitled "SYSTEMS AND TECHNIQUES FOR IDENTIFYING ALTERED MEDIA DATA" and filed May 24, 2018, each of which is assigned to the assignee hereof and is expressly incorporated by reference herein in its entirety.

BACKGROUND

The following relates generally to systems and techniques for identifying altered media data, and more specifically to determining whether media data has been altered based on an immutable ledger.

Examples of media data include video, image, and audio data (which may in some cases include telephonic conversation data). Technology continues to develop for altering media data in ways that are imperceptible to a human consumer (e.g., a human viewer or listener). For example, technology continues to develop for altering image data—even at the pixel level—such that a human viewer of an altered image cannot determine that the image has been altered. Like technology continues to develop for altering other types of media data, such as video and audio data. In general, technologies for altering all types of media data continue to evolve and improve in sophistication, proliferation, ease of use, and lack of detectability.

Improvements in technologies for altering media data give rise, however, to technological problems related to identifying altered media data. Absent technological solutions to such problems, altered media data may be passed off as unaltered media data, or unaltered media data may be plausibly disparaged as altered media data. Thus, technological solutions are desired for identifying altered media data.

SUMMARY

A media data capture system may segment media data into one or more subsets, and cryptographic representations (e.g., hashes) based on the subsets may be written to an immutable ledger, possibly along with metadata and other related data. The immutable ledger may be hosted by a remote system, which may be referred to as a certification system. The certification system may create a block of a blockchain for each entry in the immutable ledger. For example, each entry in the immutable ledger may include a block of the blockchain.

A set of media data may be validated, if a corresponding immutable ledger exists, by a media data validation system. The validation system may segment the set of media data into one or more subsets in accordance with the segmenting by the capture system and create candidate cryptographic representations (e.g., hashes) based on the subsets. Either the validation system or a remote system, such as the certification system, may compare the candidate cryptographic representations with contents of the corresponding immutable ledger. If the media data has been altered, the candidate cryptographic representations and the corresponding contents of the immutable ledger will not match, and thus altered media data may be identified.

A method is described. The method may include identifying, at a first computer system, a set of subsets of a set of media data, creating, at the first computer system, a set of cryptographic representations, each cryptographic representation in the set of cryptographic representations based on a respective subset in the set of subsets, and transmitting, from the first computer system to a second computer system via a communications link, the set of cryptographic representations, where the second computer system is configured to write the set of cryptographic representations to an immutable ledger that is remote from the first computer system, each cryptographic representation corresponding to a respective entry in the immutable ledger.

An apparatus is described. The apparatus may include a processor, memory in electronic communication with the processor, and instructions stored in the memory. The instructions may be executable by the processor to cause the apparatus to identify, at a first computer system, a set of subsets of a set of media data, create, at the first computer system, a set of cryptographic representations, each cryptographic representation in the set of cryptographic representations based on a respective subset in the set of subsets, and transmit, from the first computer system to a second computer system via a communications link, the set of cryptographic representations, where the second computer system is configured to write the set of cryptographic representations to an immutable ledger that is remote from the first computer system, each cryptographic representation corresponding to a respective entry in the immutable ledger.

Another apparatus is described. The apparatus may include means for identifying, at a first computer system, a set of subsets of a set of media data, creating, at the first computer system, a set of cryptographic representations, each cryptographic representation in the set of cryptographic representations based on a respective subset in the set of subsets, and transmitting, from the first computer system to a second computer system via a communications link, the set of cryptographic representations, where the second computer system is configured to write the set of cryptographic representations to an immutable ledger that is remote from the first computer system, each cryptographic representation corresponding to a respective entry in the immutable ledger.

A non-transitory computer-readable medium storing code is described. The code may include instructions executable by a processor to identify, at a first computer system, a set of subsets of a set of media data, create, at the first computer system, a set of cryptographic representations, each cryptographic representation in the set of cryptographic representations based on a respective subset in the set of subsets, and transmit, from the first computer system to a second computer system via a communications link, the set of cryptographic representations, where the second computer system is configured to write the set of cryptographic representations to an immutable ledger that is remote from the first computer system, each cryptographic representation corresponding to a respective entry in the immutable ledger.

Some examples of the method, apparatuses, and non-transitory computer-readable medium described herein may further include operations, features, means, or instructions for identifying, at the first computer system, a set of portions of metadata for the set of media data, each portion of metadata for a subset in the set of subsets and transmitting, from the first computer system to the second computer system via the communications link, the set of portions of metadata, where the second computer system may be configured to write the set of portions of metadata to the immutable ledger.

Some examples of the method, apparatuses, and non-transitory computer-readable medium described herein may further include operations, features, means, or instructions for creating a second set of cryptographic representations, each cryptographic representation in the second set of cryptographic representations based on a respective portion of metadata in the set of portions of metadata and transmitting, from the first computer system to the second computer system via the communications link, the second set of cryptographic representations, where the second computer system may be configured to write the second set of cryptographic representations to the immutable ledger.

Some examples of the method, apparatuses, and non-transitory computer-readable medium described herein may further include operations, features, means, or instructions for combining corresponding portions of metadata in the set of portions of metadata and subsets in the set of subsets to create a set of combined data sets, creating a third set of cryptographic representations, each cryptographic representation in the third set of cryptographic representations based on a respective combined data set and transmitting, from the first computer system to the second computer system via the communications link, the third set of cryptographic representations, where the second computer system may be configured to write the third set of cryptographic representations to the immutable ledger.

In some examples of the method, apparatuses, and non-transitory computer-readable medium described herein, the immutable ledger includes a blockchain and the respective entry in the immutable ledger includes a respective block of the blockchain.

In some examples of the method, apparatuses, and non-transitory computer-readable medium described herein, creating the set of cryptographic representations may include operations, features, means, or instructions for generating a cryptographic hash of each subset.

Some examples of the method, apparatuses, and non-transitory computer-readable medium described herein may further include operations, features, means, or instructions for transmitting, from the first computer system to the second computer system via the communications link, an indication of the set of media data and receiving, from the second computer system to the first computer system via the communications link, an indication of a primary cryptographic algorithm, where the set of cryptographic representations may be based on the primary cryptographic algorithm.

In some examples of the method, apparatuses, and non-transitory computer-readable medium described herein, the primary cryptographic algorithm may be one of a set of cryptographic algorithms supported by the first computer system.

Some examples of the method, apparatuses, and non-transitory computer-readable medium described herein may further include operations, features, means, or instructions for creating, at the first computer system, an alternative cryptographic representation based on a respective subset in the set of subsets and an alternative cryptographic algorithm, where the set of cryptographic representations may be based on a primary cryptographic algorithm that may be different than the alternative cryptographic algorithm and transmitting, from the first computer system to a second computer system via the communications link, the alternative cryptographic representation, where the alternative cryptographic representation includes an identifier of a corresponding entry in the immutable ledger.

Some examples of the method, apparatuses, and non-transitory computer-readable medium described herein may further include operations, features, means, or instructions for creating an additional cryptographic representation based on an initiation event for the set of media data and transmitting, from the first computer system to the second computer system via the communications link, the additional cryptographic representation, where the second computer system may be configured to write the additional cryptographic representation to the immutable ledger as a corresponding additional entry in the immutable ledger.

Some examples of the method, apparatuses, and non-transitory computer-readable medium described herein may further include operations, features, means, or instructions for creating an additional cryptographic representation based on an entirety of the set of media data and transmitting, from the first computer system to the second computer system via the communications link, the additional cryptographic representation, where the second computer system may be configured to write the additional cryptographic representation to the immutable ledger as a corresponding additional entry in the immutable ledger.

Some examples of the method, apparatuses, and non-transitory computer-readable medium described herein may further include operations, features, means, or instructions for capturing the set of media data using a microphone included in the first computer system, a camera included in the first computer system, or a combination thereof.

Some examples of the method, apparatuses, and non-transitory computer-readable medium described herein may further include operations, features, means, or instructions for transmitting the set of cryptographic representations occurs within a threshold amount of time after capturing the set of subsets.

Some examples of the method, apparatuses, and non-transitory computer-readable medium described herein may further include operations, features, means, or instructions for transmitting at least one cryptographic representation in the set of cryptographic representations occurs prior to capturing at least one subset in the set of subsets.

Some examples of the method, apparatuses, and non-transitory computer-readable medium described herein may further include operations, features, means, or instructions for receiving the set of media data at the first computer system, where identifying the set of subsets includes segmenting the set of media data to create the plurality of subsets.

Some examples of the method, apparatuses, and non-transitory computer-readable medium described herein may further include operations, features, means, or instructions for storing the set of cryptographic representations at the first computer system and establishing the communications link subsequent to storing the set of cryptographic representations at the first computer system.

Some examples of the method, apparatuses, and non-transitory computer-readable medium described herein may further include operations, features, means, or instructions for identifying, at the first computer system, a private cryptographic key corresponding to the set of media data, generating a signature for the set of media data based on the private cryptographic key and transmitting, from the first computer system to a third computer system via a second communications link, the set of media data, the signature, and a public cryptographic key corresponding to the private cryptographic key.

Some examples of the method, apparatuses, and non-transitory computer-readable medium described herein may further include operations, features, means, or instructions for compressing, prior to creating the set of cryptographic representations, the set of media data.

Some examples of the method, apparatuses, and non-transitory computer-readable medium described herein may further include operations, features, means, or instructions for identifying metadata for the set of media data and transmitting, from the first computer system to the second computer system via the communications link, a representation of the metadata, where the second computer system may be configured to write the representation of the metadata to the immutable ledger.

In some examples of the method, apparatuses, and non-transitory computer-readable medium described herein, identifying the metadata for the set of media data may include operations, features, means, or instructions for identifying an initiation event for the set of media data and identifying metadata for the initiation event.

In some examples of the method, apparatuses, and non-transitory computer-readable medium described herein, identifying the metadata for the set of media data may include operations, features, means, or instructions for identifying a latency between capturing a subset in the set of subsets and transmitting a corresponding cryptographic representation in the set of cryptographic representations to the second computer system.

In some examples of the method, apparatuses, and non-transitory computer-readable medium described herein, identifying the metadata for the set of media data may include operations, features, means, or instructions for identifying one or more additional computer systems within a threshold distance of the first computer system at a time associated with capturing the set of media data.

In some examples of the method, apparatuses, and non-transitory computer-readable medium described herein, identifying the metadata for the set of media data may include operations, features, means, or instructions for identifying user profile data for a user of the first computer system.

In some examples of the method, apparatuses, and non-transitory computer-readable medium described herein, identifying the metadata for the set of media data may include operations, features, means, or instructions for identifying location data associated with the first computer system.

In some examples of the method, apparatuses, and non-transitory computer-readable medium described herein, identifying the metadata for the set of media data may include operations, features, means, or instructions for identifying temporal data associated with the set of media data, calendar data associated with the set of media data, or any combination thereof.

In some examples of the method, apparatuses, and non-transitory computer-readable medium described herein, identifying the metadata for the set of media data may include operations, features, means, or instructions for identifying an application used for capturing the set of media data.

In some examples of the method, apparatuses, and non-transitory computer-readable medium described herein, identifying the metadata for the set of media data may include operations, features, means, or instructions for identifying biometric data for a user of the first computer system.

In some examples of the method, apparatuses, and non-transitory computer-readable medium described herein, identifying the metadata for the set of media data may include operations, features, means, or instructions for identifying sensor data associated with the first computer system.

In some examples of the method, apparatuses, and non-transitory computer-readable medium described herein, identifying the metadata for the set of media data may include operations, features, means, or instructions for identifying metadata for the communications link.

Some examples of the method, apparatuses, and non-transitory computer-readable medium described herein may further include operations, features, means, or instructions for creating a header file for the set of media data, the header file including an identifier of the immutable ledger.

In some examples of the method, apparatuses, and non-transitory computer-readable medium described herein, the header file further includes a mapping between subsets in the set of subsets and respective entries in the immutable ledger.

In some examples of the method, apparatuses, and non-transitory computer-readable medium described herein, the set of media data includes audio data, image data, video data, or a combination thereof.

In some examples of the method, apparatuses, and non-transitory computer-readable medium described herein, the audio data includes telephonic conversation data.

In some examples of the method, apparatuses, and non-transitory computer-readable medium described herein, the first computer system includes an application specific to capturing one or more of audio data, image data, video data, or telephonic conversation data.

In some examples of the method, apparatuses, and non-transitory computer-readable medium described herein, the immutable ledger may be replicated at each of a set of host devices, each host device in the set of host devices remote from the first computer system.

A method is described. The method may include receiving, at a second computer system from a first computer system via a first communications link, a set of cryptographic representations, where each cryptographic representation in the set of cryptographic representations is based on a respective subset of a set of media data, writing the set of cryptographic representations to an immutable ledger that is remote from the first computer system, where each cryptographic representation in the set of cryptographic representations corresponds to a respective entry in the immutable ledger, receiving, at the second computer system from a third computer system via a second communications link, a validation request for the set of media data, and transmitting, from the second computer system to the third computer system via the second communications link, a validation response for the set of media data based on the immutable ledger.

An apparatus is described. The apparatus may include a processor, memory in electronic communication with the processor, and instructions stored in the memory. The instructions may be executable by the processor to cause the apparatus to receive, at a second computer system from a first computer system via a first communications link, a set of cryptographic representations, where each cryptographic representation in the set of cryptographic representations is based on a respective subset of a set of media data, write the set of cryptographic representations to an immutable ledger that is remote from the first computer system, where each cryptographic representation in the set of cryptographic representations corresponds to a respective entry in the immutable ledger, receive, at the second computer system from a third computer system via a second communications link, a validation request for the set of media data, and transmit, from the second computer system to the third computer system via the second communications link, a validation response for the set of media data based on the immutable ledger.

Another apparatus is described. The apparatus may include means for receiving, at a second computer system from a first computer system via a first communications link, a set of cryptographic representations, where each cryptographic representation in the set of cryptographic representations is based on a respective subset of a set of media data, writing the set of cryptographic representations to an immutable ledger that is remote from the first computer system, where each cryptographic representation in the set of cryptographic representations corresponds to a respective entry in the immutable ledger, receiving, at the second computer system from a third computer system via a second communications link, a validation request for the set of media data, and transmitting, from the second computer system to the third computer system via the second communications link, a validation response for the set of media data based on the immutable ledger.

A non-transitory computer-readable medium storing code is described. The code may include instructions executable by a processor to receive, at a second computer system from a first computer system via a first communications link, a set of cryptographic representations, where each cryptographic representation in the set of cryptographic representations is based on a respective subset of a set of media data, write the set of cryptographic representations to an immutable ledger that is remote from the first computer system, where each cryptographic representation in the set of cryptographic representations corresponds to a respective entry in the immutable ledger, receive, at the second computer system from a third computer system via a second communications link, a validation request for the set of media data, and transmit, from the second computer system to the third computer system via the second communications link, a validation response for the set of media data based on the immutable ledger.

Some examples of the method, apparatuses, and non-transitory computer-readable medium described herein may further include operations, features, means, or instructions for receiving, at the second computer system from the first computer system via the first communications link, a set of portions of metadata for the set of media data, where each portion of metadata in the set of portions of metadata corresponds to a subset of the set of media data and writing the set of portions of metadata to the immutable ledger.

Some examples of the method, apparatuses, and non-transitory computer-readable medium described herein may further include operations, features, means, or instructions for receiving, at the second computer system from the first computer system via the first communications link, a second set of cryptographic representations, where each cryptographic representation in the second set of cryptographic representations may be based on a respective portion of the metadata in the set of portions of metadata and writing the second set of cryptographic representations to the immutable ledger.

Some examples of the method, apparatuses, and non-transitory computer-readable medium described herein may further include operations, features, means, or instructions for receiving, at the second computer system from the first computer system via the first communications link, a third set of cryptographic representations, where each cryptographic representation in the third set of cryptographic representations may be based on a respective combined data set, the respective combined data set including a corresponding subset of the set of media data and a corresponding portion of the metadata in the set of portions of metadata and writing the third set of cryptographic representations to the immutable ledger.

Some examples of the method, apparatuses, and non-transitory computer-readable medium described herein may further include operations, features, means, or instructions for creating, at the second computer system, a fourth set of cryptographic representations, where each cryptographic representation in the fourth set of cryptographic representations may be based on a respective cryptographic representation in the set of cryptographic representations.

In some examples of the method, apparatuses, and non-transitory computer-readable medium described herein, each cryptographic representation in the set of cryptographic representations may be based on a first cryptographic algorithm and each cryptographic representation in the fourth set of cryptographic representations may be based on a second cryptographic algorithm.

In some examples of the method, apparatuses, and non-transitory computer-readable medium described herein, a cryptographic representation in the fourth set of cryptographic representations may be based on an additional cryptographic representation in the fourth set of cryptographic representations.

In some examples of the method, apparatuses, and non-transitory computer-readable medium described herein, the fourth set of cryptographic representations includes blocks of a blockchain.

In some examples of the method, apparatuses, and non-transitory computer-readable medium described herein, creating the fourth set of cryptographic representations may include operations, features, means, or instructions for creating at least one of the fourth set of cryptographic representations based on a cryptographic representation associated with a prior set of media data.

In some examples of the method, apparatuses, and non-transitory computer-readable medium described herein, the set of media data and the prior set of media data may be associated with a common private cryptographic key.

In some examples of the method, apparatuses, and non-transitory computer-readable medium described herein, the cryptographic representation associated with the prior set of media data may be a final entry in a second immutable ledger that corresponds to the prior set of media data.

In some examples of the method, apparatuses, and non-transitory computer-readable medium described herein, the cryptographic representation associated with the prior set of media data may be based on user profile data common to the set of media data and the prior set of media data.

In some examples of the method, apparatuses, and non-transitory computer-readable medium described herein, the immutable ledger includes a blockchain and the respective entry in the immutable ledger includes a block of the blockchain.

Some examples of the method, apparatuses, and non-transitory computer-readable medium described herein may further include operations, features, means, or instructions for creating a set of copies of the immutable ledger and storing a copy of the immutable ledger at each of a set of host devices included in the second computer system.

Some examples of the method, apparatuses, and non-transitory computer-readable medium described herein may further include operations, features, means, or instructions for receiving, at the second computer system from the first computer system via the first communications link, an indication of the set of media data and transmitting, from the second computer system to the first computer system via the first communications link, an indication of a primary cryptographic algorithm, where the set of cryptographic representations may be based on the primary cryptographic algorithm.

Some examples of the method, apparatuses, and non-transitory computer-readable medium described herein may further include operations, features, means, or instructions for selecting the primary cryptographic algorithm from a set of cryptographic algorithms supported by the first computer system.

Some examples of the method, apparatuses, and non-transitory computer-readable medium described herein may further include operations, features, means, or instructions for receiving, at the second computer system from the first computer system via the first communications link, an additional cryptographic representation based on an entirety of the set of media data and writing the additional cryptographic representation to the immutable ledger as a corresponding additional entry in the immutable ledger.

Some examples of the method, apparatuses, and non-transitory computer-readable medium described herein may further include operations, features, means, or instructions for writing to the immutable ledger, for each cryptographic representation in the set of cryptographic representations, metadata based on a clock for the second computer system.

Some examples of the method, apparatuses, and non-transitory computer-readable medium described herein may further include operations, features, means, or instructions for receiving, at the second computer system from the first computer system via the first communications link, a timestamp for a subset of the set of media data and determining a latency between the timestamp and a time of receipt of the subset at the second computer system, where the metadata based on the clock for the second computer system includes an indication of the latency.

Some examples of the method, apparatuses, and non-transitory computer-readable medium described herein may further include operations, features, means, or instructions for transmitting, from the second computer system to the first computer system via the first communications link, an identifier of the immutable ledger.

Some examples of the method, apparatuses, and non-transitory computer-readable medium described herein may further include operations, features, means, or instructions for transmitting, from the second computer system to the first computer system via the first communications link, for each respective entry in the immutable ledger, an identifier of the respective entry.

In some examples of the method, apparatuses, and non-transitory computer-readable medium described herein, receiving the validation request for the set of media data may include operations, features, means, or instructions for receiving an identifier of an entry in the immutable ledger and identifying the immutable ledger based on the identifier of the entry.

In some examples of the method, apparatuses, and non-transitory computer-readable medium described herein, the identifier of the entry in the immutable ledger may be an alternative cryptographic representation corresponding to a respective subset in the set of subsets, where the alternative cryptographic representation may be based on the respective subset and an alternative cryptographic algorithm and the set of cryptographic representations may be based on a primary cryptographic algorithm that may be different than the alternative cryptographic algorithm.

Some examples of the method, apparatuses, and non-transitory computer-readable medium described herein may further include operations, features, means, or instructions for identifying an entry in the immutable ledger based on the validation request and determining whether a second cryptographic representation included in the entry may be valid, where the second cryptographic representation may be based on an additional entry in the immutable ledger.

In some examples of the method, apparatuses, and non-transitory computer-readable medium described herein, each cryptographic representation in the set of cryptographic representations may be based on a first cryptographic algorithm and the second cryptographic representation may be based on a second cryptographic algorithm.

In some examples of the method, apparatuses, and non-transitory computer-readable medium described herein, the second cryptographic representation includes a block of a blockchain.

In some examples of the method, apparatuses, and non-transitory computer-readable medium described herein, determining whether the second cryptographic representation included in the entry may be valid may include operations, features, means, or instructions for.

In some examples of the method, apparatuses, and non-transitory computer-readable medium described herein, determining whether the second cryptographic representation included in the entry may be valid may include operations, features, means, or instructions for creating a candidate second cryptographic representation based on content of the entry and based on content of the additional entry and determining whether the candidate second cryptographic representation matches the second cryptographic representation.

In some examples of the method, apparatuses, and non-transitory computer-readable medium described herein, transmitting the validation response may include operations, features, means, or instructions for transmitting an indication of whether content of the immutable ledger may be valid.

In some examples of the method, apparatuses, and non-transitory computer-readable medium described herein, transmitting the validation response may include operations, features, means, or instructions for transmitting an indication of a primary cryptographic algorithm, where the set of cryptographic representations may be based on the primary cryptographic algorithm.

In some examples of the method, apparatuses, and non-transitory computer-readable medium described herein, transmitting the validation response may include operations, features, means, or instructions for transmitting a portion of metadata for the set of media data, where the portion of metadata corresponds to a subset of the set of media data.

In some examples of the method, apparatuses, and non-transitory computer-readable medium described herein, transmitting the validation response may include operations, features, means, or instructions for transmitting a trusted cryptographic representation that corresponds to a cryptographic representation in the set of cryptographic representations.

Some examples of the method, apparatuses, and non-transitory computer-readable medium described herein may further include operations, features, means, or instructions for determining, at the second computer system, the trusted cryptographic representation based on polling a set of host devices each configured to host a copy of the immutable ledger.

In some examples of the method, apparatuses, and non-transitory computer-readable medium described herein, transmitting the validation response may include operations, features, means, or instructions for transmitting a second trusted cryptographic representation, where the second trusted cryptographic representation may be based on a portion of metadata for the set of media data.

In some examples of the method, apparatuses, and non-transitory computer-readable medium described herein, transmitting the validation response may include operations, features, means, or instructions for transmitting a third trusted cryptographic representation, where the third trusted cryptographic representation may be based on a portion of metadata for the set of media data and a corresponding subset of the set of media data.

Some examples of the method, apparatuses, and non-transitory computer-readable medium described herein may further include operations, features, means, or instructions for receiving, at the second computer system from the third computer system via the second communications link, a candidate cryptographic representation that corresponds to a cryptographic representation in the set of cryptographic representations, identifying a trusted cryptographic representation that corresponds to the cryptographic representation, determining whether the candidate cryptographic representation matches the trusted cryptographic representation and transmitting, from the second computer system to the third computer system via the second communications link, an indication of whether the candidate cryptographic representation matches the trusted cryptographic representation.

Some examples of the method, apparatuses, and non-transitory computer-readable medium described herein may further include operations, features, means, or instructions for receiving, at the second computer system from the third computer system via the second communications link, a second candidate cryptographic representation that corresponds to a portion of metadata for the set of media data, identifying a second trusted cryptographic representation that corresponds to the second cryptographic representation, determining whether the second candidate cryptographic representation matches the second trusted cryptographic representation and transmitting, from the second computer system to the third computer system via the second communications link, an indication of whether the candidate cryptographic representation matches the trusted cryptographic representation.

A method is described. The method may include receiving, at a first computer system, a set of media data, identifying, by the first computer system, a set of subsets of the set of media data, creating, by the first computer system, a set of cryptographic representations, each cryptographic representation in the set of cryptographic representations based on a respective subset in the set of subsets, determining a level of validity for the set of media data based on the set of cryptographic representations and corresponding entries in an immutable ledger that is remote from the first computer system, and presenting, by the first computer system, an indication of the level of validity for the set of media data.

An apparatus is described. The apparatus may include a processor, memory in electronic communication with the processor, and instructions stored in the memory. The instructions may be executable by the processor to cause the apparatus to receive, at a first computer system, a set of media data, identify, by the first computer system, a set of subsets of the set of media data, create, by the first computer system, a set of cryptographic representations, each cryptographic representation in the set of cryptographic representations based on a respective subset in the set of subsets, determine a level of validity for the set of media data based on the set of cryptographic representations and corresponding entries in an immutable ledger that is remote from the first computer system, and present, by the first computer system, an indication of the level of validity for the set of media data.

Another apparatus is described. The apparatus may include means for receiving, at a first computer system, a set of media data, identifying, by the first computer system, a set of subsets of the set of media data, creating, by the first computer system, a set of cryptographic representations, each cryptographic representation in the set of cryptographic representations based on a respective subset in the set of subsets, determining a level of validity for the set of media data based on the set of cryptographic representations and corresponding entries in an immutable ledger that is remote from the first computer system, and presenting, by the first computer system, an indication of the level of validity for the set of media data.

A non-transitory computer-readable medium storing code is described. The code may include instructions executable by a processor to receive, at a first computer system, a set of media data, identify, by the first computer system, a set of subsets of the set of media data, create, by the first computer system, a set of cryptographic representations, each cryptographic representation in the set of cryptographic representations based on a respective subset in the set of subsets, determine a level of validity for the set of media data based on the set of cryptographic representations and corresponding entries in an immutable ledger that is remote from the first computer system, and present, by the first computer system, an indication of the level of validity for the set of media data.

Some examples of the method, apparatuses, and non-transitory computer-readable medium described herein may further include operations, features, means, or instructions for creating, by the first computer system, an alternative cryptographic representation based on a subset in the set of subsets and an alternative cryptographic algorithm, where the set of cryptographic representations may be based on a primary cryptographic algorithm that may be different than the alternative cryptographic algorithm and transmitting, from the first computer system to a second computer system via a communications link, the alternative cryptographic representation, where the alternative cryptographic representation includes an identifier of a corresponding entry in the immutable ledger.

Some examples of the method, apparatuses, and non-transitory computer-readable medium described herein may further include operations, features, means, or instructions for receiving, at the first computer system from the second computer system via the communications link, an indication of the primary cryptographic algorithm.

In some examples of the method, apparatuses, and non-transitory computer-readable medium described herein, the cryptographic algorithm may be one of a set of cryptographic algorithms supported by the first computer system.

In some examples of the method, apparatuses, and non-transitory computer-readable medium described herein, determining the level of validity for the set of media data may include operations, features, means, or instructions for receiving, at the first computer system from the second computer system via a communications link, a portion of metadata for the set of media data, where the portion of metadata corresponds to a subset in the set of subsets.

In some examples of the method, apparatuses, and non-transitory computer-readable medium described herein, determining the level of validity for the set of media data further may include operations, features, means, or instructions for creating a second cryptographic representation, the second cryptographic representation based on the portion of the metadata, receiving, at the first computer system from the second computer system via the communications link, a trusted version of the second trusted cryptographic representation, the trusted version included in the immutable ledger and determining whether the second cryptographic representation matches the trusted version.

In some examples of the method, apparatuses, and non-transitory computer-readable medium described herein, determining the level of validity for the set of media data may include operations, features, means, or instructions for creating a second cryptographic representation, the second cryptographic representation based on the portion of the metadata, transmitting, from the first computer system to a second computer system via the communications link, the second cryptographic representation and receiving, at the first computer system from the second computer system via the communications link, an indication of whether the second cryptographic representation matches a trusted version of the second cryptographic representation, the trusted version included in the immutable ledger.

In some examples of the method, apparatuses, and non-transitory computer-readable medium described herein, determining the level of validity for the set of media data may include operations, features, means, or instructions for receiving, at the first computer system from a second computer system via a communications link, a trusted version of the cryptographic representation, the trusted version included in the immutable ledger and determining whether a cryptographic representation in the set of cryptographic representations matches the trusted version.

In some examples of the method, apparatuses, and non-transitory computer-readable medium described herein, determining the level of validity for the set of media data may include operations, features, means, or instructions for transmitting, from the first computer system to a second computer system via a communications link, a cryptographic representation in the set of cryptographic representations and receiving, at the first computer system from the second computer system via the communications link, an indication of whether the cryptographic representation matches a trusted version of the cryptographic representation, the trusted version included in the immutable ledger.

In some examples of the method, apparatuses, and non-transitory computer-readable medium described herein, determining the level of validity for the set of media data further may include operations, features, means, or instructions for combining a subset in the set of subsets and metadata for the subset to create a combined data set, creating a third cryptographic representation, the third cryptographic representation based on the combined data set, receiving, at the first computer system from the second computer system via the communications link, a third trusted cryptographic representation included in the immutable ledger and determining whether the third cryptographic representation matches the third trusted cryptographic representation.

In some examples of the method, apparatuses, and non-transitory computer-readable medium described herein, determining the level of validity for the set of media data further may include operations, features, means, or instructions for transmitting, from the first computer system to the second computer system via the communications link, the third cryptographic representation and receiving, at the first computer system from the second computer system via the communications link, an indication of whether the third cryptographic representation matches a trusted version of the third cryptographic representation, the trusted version included in the immutable ledger.

In some examples of the method, apparatuses, and non-transitory computer-readable medium described herein, the immutable ledger includes a blockchain and the corresponding entries in the immutable ledger include blocks of the blockchain.

Some examples of the method, apparatuses, and non-transitory computer-readable medium described herein may further include operations, features, means, or instructions for receiving, at the first computer system, a public cryptographic key and a cryptographic signature associated with the set of media data and verifying, based on the public cryptographic key and the cryptographic signature, an origin of the set of media data.

In some examples of the method, apparatuses, and non-transitory computer-readable medium described herein, creating the set of cryptographic representations may include operations, features, means, or instructions for generating a cryptographic hash of each subset.

Some examples of the method, apparatuses, and non-transitory computer-readable medium described herein may further include operations, features, means, or instructions for creating an additional cryptographic representation based on an entirety of the set of media data and determining the level of validity for the set of media data based on the additional cryptographic representation and a corresponding additional entry in the immutable ledger.

Some examples of the method, apparatuses, and non-transitory computer-readable medium described herein may further include operations, features, means, or instructions for receiving, at the first computer system, an identifier of the immutable ledger and transmitting, from the first computer system to a second computer system via a communications link, the identifier of the immutable ledger.

Some examples of the method, apparatuses, and non-transitory computer-readable medium described herein may further include operations, features, means, or instructions for receiving, at the first computer system, a mapping between the set of subsets of the set of media data and the corresponding entries in the immutable ledger and transmitting, from the first computer system to the second computer system via the communications link, an indication of the corresponding entries in the immutable ledger based on the mapping.

In some examples of the method, apparatuses, and non-transitory computer-readable medium described herein, the level of validity for the set of media data may be binary.

In some examples of the method, apparatuses, and non-transitory computer-readable medium described herein, the level of validity for the set of media data may be non-binary.

Some examples of the method, apparatuses, and non-transitory computer-readable medium described herein may further include operations, features, means, or instructions for presenting, to the user, concurrently with presenting the indication of the level of validity for the set of media data, media data included in the set of media data.

Some examples of the method, apparatuses, and non-transitory computer-readable medium described herein may further include operations, features, means, or instructions for presenting, to the user, an indication of one or more factors used in determining the level of validity for the set of media data.

Some examples of the method, apparatuses, and non-transitory computer-readable medium described herein may further include operations, features, means, or instructions for determining, for a subset in the set of subsets of the set of media data, a respective level of validity and presenting, to the user, the respective level of validity.

Some examples of the method, apparatuses, and non-transitory computer-readable medium described herein may further include operations, features, means, or instructions for presenting, to the user, concurrently with presenting the respective level of validity, media data included in the subset.

Some examples of the method, apparatuses, and non-transitory computer-readable medium described herein may further include operations, features, means, or instructions for presenting, to the user, concurrently with presenting the indication of the level of validity for the set of media data and media data included in the set of media data, metadata associated with the set of media data.

Some examples of the method, apparatuses, and non-transitory computer-readable medium described herein may further include operations, features, means, or instructions for determining the level of validity for the set of media data based on corresponding metadata.

In some examples of the method, apparatuses, and non-transitory computer-readable medium described herein, determining the level of validity based on corresponding metadata may include operations, features, means, or instructions for determining the level of validity based on an existence or an absence of a type of metadata for the set of media data, a level of metadata variation across the set of subsets of the set of media data, user profile data associated with a cryptographic key for the set of media data, biometric data associated with the set of media data, sensor data associated with the set of media data, location data associated with the set of media data, or any combination thereof.

In some examples of the method, apparatuses, and non-transitory computer-readable medium described herein, determining the level of validity based on corresponding metadata may include operations, features, means, or instructions for determining the level of validity based on a latency between capturing the set of media data and creation of the corresponding entries in the immutable ledger.

In some examples of the method, apparatuses, and non-transitory computer-readable medium described herein, determining the level of validity based on corresponding metadata may include operations, features, means, or instructions for determining the level of validity based on a number or identity of additional computer systems within a threshold distance of a capturing computer system for the set of media data at a time associated with capturing the set of media data.

In some examples of the method, apparatuses, and non-transitory computer-readable medium described herein, the set of media data includes one or more of audio data, image data, or video data.

In some examples of the method, apparatuses, and non-transitory computer-readable medium described herein, the audio data includes telephonic conversation data.

In some examples of the method, apparatuses, and non-transitory computer-readable medium described herein, the first computer system includes an application specific to validating one of audio data, image data, video data, or telephonic conversation data.

In some examples of the method, apparatuses, and non-transitory computer-readable medium described herein, the immutable ledger may be replicated at each of a set of host devices, each host device in the set of host devices remote from the first computer system.

A method is described. The method may include identifying, at a first computer system, a set of media data and metadata for the set of media data, altering the set of media data based on the metadata and according to an alteration pattern to create an altered set of media data, where altering the set of media data according to the alteration pattern encodes the metadata into the altered set of media data, creating a cryptographic representation based on the altered set of media data, and outputting the cryptographic representation to an immutable ledger, where the cryptographic representation corresponds to an entry in the immutable ledger.

An apparatus is described. The apparatus may include a processor, memory coupled with the processor, and instructions stored in the memory. The instructions may be executable by the processor to cause the apparatus to identify, at a first computer system, a set of media data and metadata for the set of media data, alter the set of media data based on the metadata and according to an alteration pattern to create an altered set of media data, where altering the set of media data according to the alteration pattern encodes the metadata into the altered set of media data, create a cryptographic representation based on the altered set of media data, and output the cryptographic representation to an immutable ledger, where the cryptographic representation corresponds to an entry in the immutable ledger.

Another apparatus is described. The apparatus may include means for identifying, at a first computer system, a set of media data and metadata for the set of media data, altering the set of media data based on the metadata and according to an alteration pattern to create an altered set of media data, where altering the set of media data according to the alteration pattern encodes the metadata into the altered set of media data, creating a cryptographic representation based on the altered set of media data, and outputting the cryptographic representation to an immutable ledger, where the cryptographic representation corresponds to an entry in the immutable ledger.

A non-transitory computer-readable medium storing code is described. The code may include instructions executable by a processor to identify, at a first computer system, a set of media data and metadata for the set of media data, alter the set of media data based on the metadata and according to an alteration pattern to create an altered set of media data, where altering the set of media data according to the alteration pattern encodes the metadata into the altered set of media data, create a cryptographic representation based on the altered set of media data, and output the cryptographic representation to an immutable ledger, where the cryptographic representation corresponds to an entry in the immutable ledger.

In some examples of the method, apparatuses, and non-transitory computer-readable medium described herein, outputting the cryptographic representation to the immutable ledger may include operations, features, means, or instructions for transmitting the cryptographic representation from the first computer system to a second computer system, where the second computer system may be configured to generate the entry in the immutable ledger based on the cryptographic representation.

In some examples of the method, apparatuses, and non-transitory computer-readable medium described herein, identifying the set of media data may include operations, features, means, or instructions for identifying a set of subsets of the set of media data, and altering the set of media data to create the altered set of media data may include operations, features, means, or instructions for altering subsets in the set of subsets according to the alteration pattern to create a set of altered subsets, where the altering according to the alteration pattern at least a portion of the metadata into each altered subset in the set of altered subsets.

In some examples of the method, apparatuses, and non-transitory computer-readable medium described herein, creating the cryptographic representation may include operations, features, means, or instructions for creating, at the first computer system, a set of cryptographic representations, each cryptographic representation in the set of cryptographic representations based on a respective altered subset in the set of altered subsets, and outputting the cryptographic representation to the immutable ledger may include operations, features, means, or instructions for outputting the set of cryptographic representations to the immutable ledger, each of the set of cryptographic representations corresponding to a respective entry in the immutable ledger.

In some examples of the method, apparatuses, and non-transitory computer-readable medium described herein, the set of media data may include a plurality of pixel or audio sample values, and altering the set of media data according to the alteration pattern may include operations, features, means, or instructions for incrementing or decrementing one or more of the set of pixel or audio sample values according the alteration pattern to create one or more altered pixel or audio sample values, where the one or more altered pixel or audio sample values indicate the metadata based on an encoding scheme.

In some examples of the method, apparatuses, and non-transitory computer-readable medium described herein, the encoding scheme may be a character encoding scheme, and a subset of digit values included in the one or more altered pixel or audio sample values may correspond to textual information that represents the metadata.

Some examples of the method, apparatuses, and non-transitory computer-readable medium described herein may further include operations, features, means, or instructions for applying a watermark to the set of media data to create a set of watermark pixel values, where altering the set of media data according to the alteration pattern includes operations, features, means, or instructions for incrementing or decrementing one or more of the plurality of watermark pixel values according the alteration pattern to create one or more altered watermark pixel values, wherein the one or more altered watermark pixel values indicate the metadata based at least in part on an encoding scheme.

In some examples of the method, apparatuses, and non-transitory computer-readable medium described herein, the alteration pattern may be based on a steganographic algorithm.

In some examples of the method, apparatuses, and non-transitory computer-readable medium described herein, creating the cryptographic representation may include operations, features, means, or instructions for hashing the altered set of media data based on a cryptographic algorithm.

In some examples of the method, apparatuses, and non-transitory computer-readable medium described herein, the immutable ledger includes a blockchain, and the entry in the immutable ledger includes a block of the blockchain.

A method is described. The method may include receiving, at a first computer system, an altered set of media data that includes a set of media data altered according to an alteration pattern, where metadata for the set of media data is encoded into the altered set of media data based on the alteration pattern, creating a candidate cryptographic representation based on the altered set of media data, receiving, at the first computer system from a second computer system, a trusted cryptographic representation corresponding to the altered set of media data, where the trusted cryptographic representation corresponds to an entry in an immutable ledger that is remote from the first computer system, comparing the trusted cryptographic representation to the candidate cryptographic representation, decoding the altered set of media data based on the alteration pattern to obtain the metadata, presenting, by the first computer system, an indication of a level of validity for the altered set of media data based on least in part on the comparing, and presenting, by the first computer system, an indication of the metadata obtained by the decoding.

An apparatus is described. The apparatus may include a processor, memory coupled with the processor, and instructions stored in the memory. The instructions may be executable by the processor to cause the apparatus to receive, at a first computer system, an altered set of media data that includes a set of media data altered according to an alteration pattern, where metadata for the set of media data is encoded into the altered set of media data based on the alteration pattern, create a candidate cryptographic representation based on the altered set of media data, receive, at the first computer system from a second computer system, a trusted cryptographic representation corresponding to the altered set of media data, where the trusted cryptographic representation corresponds to an entry in an immutable ledger that is remote from the first computer system, compare the trusted cryptographic representation to the candidate cryptographic representation, decode the altered set of media data based on the alteration pattern to obtain the metadata, present, by the first computer system, an indication of a level of validity for the altered set of media data based on least in part on the comparing, and present, by the first computer system, an indication of the metadata obtained by the decoding.

Another apparatus is described. The apparatus may include means for receiving, at a first computer system, an altered set of media data that includes a set of media data altered according to an alteration pattern, where metadata for the set of media data is encoded into the altered set of media data based on the alteration pattern, creating a candidate cryptographic representation based on the altered set of media data, receiving, at the first computer system from a second computer system, a trusted cryptographic representation corresponding to the altered set of media data, where the trusted cryptographic representation corresponds to an entry in an immutable ledger that is remote from the first computer system, comparing the trusted cryptographic representation to the candidate cryptographic representation, decoding the altered set of media data based on the alteration pattern to obtain the metadata, presenting, by the first computer system, an indication of a level of validity for the altered set of media data based on least in part on the comparing, and presenting, by the first computer system, an indication of the metadata obtained by the decoding.

A non-transitory computer-readable medium storing code is described. The code may include instructions executable by a processor to receive, at a first computer system, an altered set of media data that includes a set of media data altered according to an alteration pattern, where metadata for the set of media data is encoded into the altered set of media data based on the alteration pattern, create a candidate cryptographic representation based on the altered set of media data, receive, at the first computer system from a second computer system, a trusted cryptographic representation corresponding to the altered set of media data, where the trusted cryptographic representation corresponds to an entry in an immutable ledger that is remote from the first computer system, compare the trusted cryptographic representation to the candidate cryptographic representation, decode the altered set of media data based on the alteration pattern to obtain the metadata, present, by the first computer system, an indication of a level of validity for the altered set of media data based on least in part on the comparing, and present, by the first computer system, an indication of the metadata obtained by the decoding.

Some examples of the method, apparatuses, and non-transitory computer-readable medium described herein may further include operations, features, means, or instructions for determining the level of validity for the altered set of media data based on the metadata, where the indication of the level of validity may be based on the metadata.

Some examples of the method, apparatuses, and non-transitory computer-readable medium described herein may further include operations, features, means, or instructions for identifying a set of altered subsets of the altered set of media data, where decoding the altered set of media data includes operations, features, means, or instructions for decoding each of the plurality of altered subsets based at least in part on the alteration pattern and an encoding scheme to obtain at least a portion of the metadata.

Some examples of the method, apparatuses, and non-transitory computer-readable medium described herein may further include operations, features, means, or instructions for creating, at the first computer system, a set of candidate cryptographic representations that includes the candidate cryptographic representation, each candidate cryptographic representation in the set of candidate cryptographic representations based on a respective altered subset in the set of altered subsets, receiving, at the first computer system from the second computer system, a set of trusted cryptographic representations that includes the trusted cryptographic representation, the set of trusted cryptographic representations corresponding to the set of altered subsets, and comparing the set of trusted cryptographic representations to the set of candidate cryptographic representations.

In some examples of the method, apparatuses, and non-transitory computer-readable medium described herein, the altered set of media data may include a plurality of pixel or audio sample values, and decoding the altered set of media data may include operations, features, means, or instructions for identifying, for the set of pixel or audio sample values, a corresponding set of digit values, and determining the metadata based on a subset of the corresponding set of digit values and a character encoding scheme.

In some examples of the method, apparatuses, and non-transitory computer-readable medium described herein, the subset of the corresponding set of digit values includes a least significant digit value of each pixel or audio sample value in the set of pixel or audio sample values.

In some examples of the method, apparatuses, and non-transitory computer-readable medium described herein, the alteration pattern may be based on a steganographic algorithm.

In some examples of the method, apparatuses, and non-transitory computer-readable medium described herein, the immutable ledger includes a blockchain, and the entry in the immutable ledger includes a block of the blockchain.

A method is described. The method may include receiving, at a first computer system, an altered set of media data that includes a set of media data altered according to an alteration pattern, where metadata for the set of media data is encoded into the altered set of media data based on the alteration pattern, creating a candidate cryptographic representation based on the altered set of media data, transmitting, from the first computer system to a second computer system, the candidate cryptographic representation, receiving, at the first computer system from the second computer system, an indication of whether the candidate cryptographic representation matches a trusted cryptographic representation corresponding to the altered set of media data, where the trusted cryptographic representation corresponds to an entry in an immutable ledger that is remote from the first computer system, decoding the altered set of media data based on the alteration pattern to obtain the metadata, presenting, by the first computer system, an indication of a level of validity for the altered set of media data based on least in part on the indication of whether the candidate cryptographic representation matches the trusted cryptographic representation, and presenting, by the first computer system, an indication of the metadata obtained by the decoding.

An apparatus is described. The apparatus may include a processor, memory coupled with the processor, and instructions stored in the memory. The instructions may be executable by the processor to cause the apparatus to receive, at a first computer system, an altered set of media data that includes a set of media data altered according to an alteration pattern, where metadata for the set of media data is encoded into the altered set of media data based on the alteration pattern, create a candidate cryptographic representation based on the altered set of media data, transmit, from the first computer system to a second computer system, the candidate cryptographic representation, receive, at the first computer system from the second computer system, an indication of whether the candidate cryptographic representation matches a trusted cryptographic representation corresponding to the altered set of media data, where the trusted cryptographic representation corresponds to an entry in an immutable ledger that is remote from the first computer system, decode the altered set of media data based on the alteration pattern to obtain the metadata, present, by the first computer system, an indication of a level of validity for the altered set of media data based on least in part on the indication of whether the candidate cryptographic representation matches the trusted cryptographic representation, and present, by the first computer system, an indication of the metadata obtained by the decoding.

Another apparatus is described. The apparatus may include means for receiving, at a first computer system, an altered set of media data that includes a set of media data altered according to an alteration pattern, where metadata for the set of media data is encoded into the altered set of media data based on the alteration pattern, creating a candidate cryptographic representation based on the altered set of media data, transmitting, from the first computer system to a second computer system, the candidate cryptographic representation, receiving, at the first computer system from the second computer system, an indication of whether the candidate cryptographic representation matches a trusted cryptographic representation corresponding to the altered set of media data, where the trusted cryptographic representation corresponds to an entry in an immutable ledger that is remote from the first computer system, decoding the altered set of media data based on the alteration pattern to obtain the metadata, presenting, by the first computer system, an indication of a level of validity for the altered set of media data based on least in part on the indication of whether the candidate cryptographic representation matches the trusted cryptographic representation, and presenting, by the first computer system, an indication of the metadata obtained by the decoding.

A non-transitory computer-readable medium storing code is described. The code may include instructions executable by a processor to receive, at a first computer system, an altered set of media data that includes a set of media data altered according to an alteration pattern, where metadata for the set of media data is encoded into the altered set of media data based on the alteration pattern, create a candidate cryptographic representation based on the altered set of media data, transmit, from the first computer system to a second computer system, the candidate cryptographic representation, receive, at the first computer system from the second computer system, an indication of whether the candidate cryptographic representation matches a trusted cryptographic representation corresponding to the altered set of media data, where the trusted cryptographic representation corresponds to an entry in an immutable ledger that is remote from the first computer system, decode the altered set of media data based on the alteration pattern to obtain the metadata, present, by the first computer system, an indication of a level of validity for the altered set of media data based on least in part on the indication of whether the candidate cryptographic representation matches the trusted cryptographic representation, and present, by the first computer system, an indication of the metadata obtained by the decoding.

Some examples of the method, apparatuses, and non-transitory computer-readable medium described herein may further include operations, features, means, or instructions for determining the level of validity for the altered set of media data based on the metadata, where the indication of the level of validity may be based on the metadata.

Some examples of the method, apparatuses, and non-transitory computer-readable medium described herein may further include operations, features, means, or instructions for identifying a set of altered subsets of the altered set of media data, where decoding the altered set of media data includes operations, features, means, or instructions for decoding each of the plurality of altered subsets based at least in part on the alteration pattern and an encoding scheme to obtain at least a portion of the metadata.

Some examples of the method, apparatuses, and non-transitory computer-readable medium described herein may further include operations, features, means, or instructions for creating, at the first computer system, a set of candidate cryptographic representations that includes the candidate cryptographic representation, each candidate cryptographic representation in the set of candidate cryptographic representations based on a respective altered subset in the set of altered subsets, transmitting, from the first computer system to the second computer system, the set of candidate cryptographic representations, and receiving, at the first computer system from the second computer system, an indication of whether the set of candidate cryptographic representations match a set of trusted cryptographic representations corresponding to the altered set of media data, where each of the set of trusted cryptographic representations corresponds to a respective entry in the immutable ledger.

In some examples of the method, apparatuses, and non-transitory computer-readable medium described herein, the altered set of media data may include a plurality of pixel or audio sample values, and decoding the altered set of media data may include operations, features, means, or instructions for identifying, for the set of pixel or audio sample values, a corresponding set of digit values, and determining the metadata based on a subset of the corresponding set of digit values and a character encoding scheme.

In some examples of the method, apparatuses, and non-transitory computer-readable medium described herein, the alteration pattern may be based on a steganographic algorithm.

In some examples of the method, apparatuses, and non-transitory computer-readable medium described herein, the immutable ledger includes a blockchain, and the entry in the immutable ledger includes a block of the blockchain.

A method is described. The method may include receiving, at a second computer system from a first computer system, a trusted cryptographic representation that is based on an altered set of media data, where the altered set of media data includes a set of media data altered according to an alteration pattern, and where metadata for the set of media data is encoded into the altered set of media data based on the alteration pattern and writing the trusted cryptographic representation to an immutable ledger that is remote from the first computer system, where the trusted cryptographic representation corresponds to an entry in the immutable ledger.

An apparatus is described. The apparatus may include a processor, memory coupled with the processor, and instructions stored in the memory. The instructions may be executable by the processor to cause the apparatus to receive, at a second computer system from a first computer system, a trusted cryptographic representation that is based on an altered set of media data, where the altered set of media data includes a set of media data altered according to an alteration pattern, and where metadata for the set of media data is encoded into the altered set of media data based on the alteration pattern and write the trusted cryptographic representation to an immutable ledger that is remote from the first computer system, where the trusted cryptographic representation corresponds to an entry in the immutable ledger.

Another apparatus is described. The apparatus may include means for receiving, at a second computer system from a first computer system, a trusted cryptographic representation that is based on an altered set of media data, where the altered set of media data includes a set of media data altered according to an alteration pattern, and where metadata for the set of media data is encoded into the altered set of media data based on the alteration pattern and writing the trusted cryptographic representation to an immutable ledger that is remote from the first computer system, where the trusted cryptographic representation corresponds to an entry in the immutable ledger.

A non-transitory computer-readable medium storing code is described. The code may include instructions executable by a processor to receive, at a second computer system from a first computer system, a trusted cryptographic representation that is based on an altered set of media data, where the altered set of media data includes a set of media data altered according to an alteration pattern, and where metadata for the set of media data is encoded into the altered set of media data based on the alteration pattern and write the trusted cryptographic representation to an immutable ledger that is remote from the first computer system, where the trusted cryptographic representation corresponds to an entry in the immutable ledger.

Some examples of the method, apparatuses, and non-transitory computer-readable medium described herein may further include operations, features, means, or instructions for receiving, at the second computer system from a third computer system, a candidate cryptographic representation that may be based on a candidate set of media data, comparing the candidate cryptographic representation to the trusted cryptographic representation, and transmitting, from the second computer system to the third computer system, an indication of a level of validity for the candidate set of media data based on least in part on the comparing.

Some examples of the method, apparatuses, and non-transitory computer-readable medium described herein may further include operations, features, means, or instructions for receiving, at the second computer system from a third computer system, a validation request for a candidate set of media data, and transmitting, from the second computer system to the third computer system, the trusted cryptographic representation.

Some examples of the method, apparatuses, and non-transitory computer-readable medium described herein may further include operations, features, means, or instructions for receiving a set of trusted cryptographic representations that includes the trusted cryptographic representation, where the plurality of trusted cryptographic representations correspond to a plurality of altered subsets of the set of media data, and where at least a portion of the metadata is encoded into each of the plurality of altered subsets based at least in part on the alteration pattern and an encoding scheme.

In some examples of the method, apparatuses, and non-transitory computer-readable medium described herein, the alteration pattern may be based on a steganographic algorithm, the immutable ledger includes a blockchain, and the entry in the immutable ledger includes a block of the blockchain.

DETAILED DESCRIPTION

Figure 1:
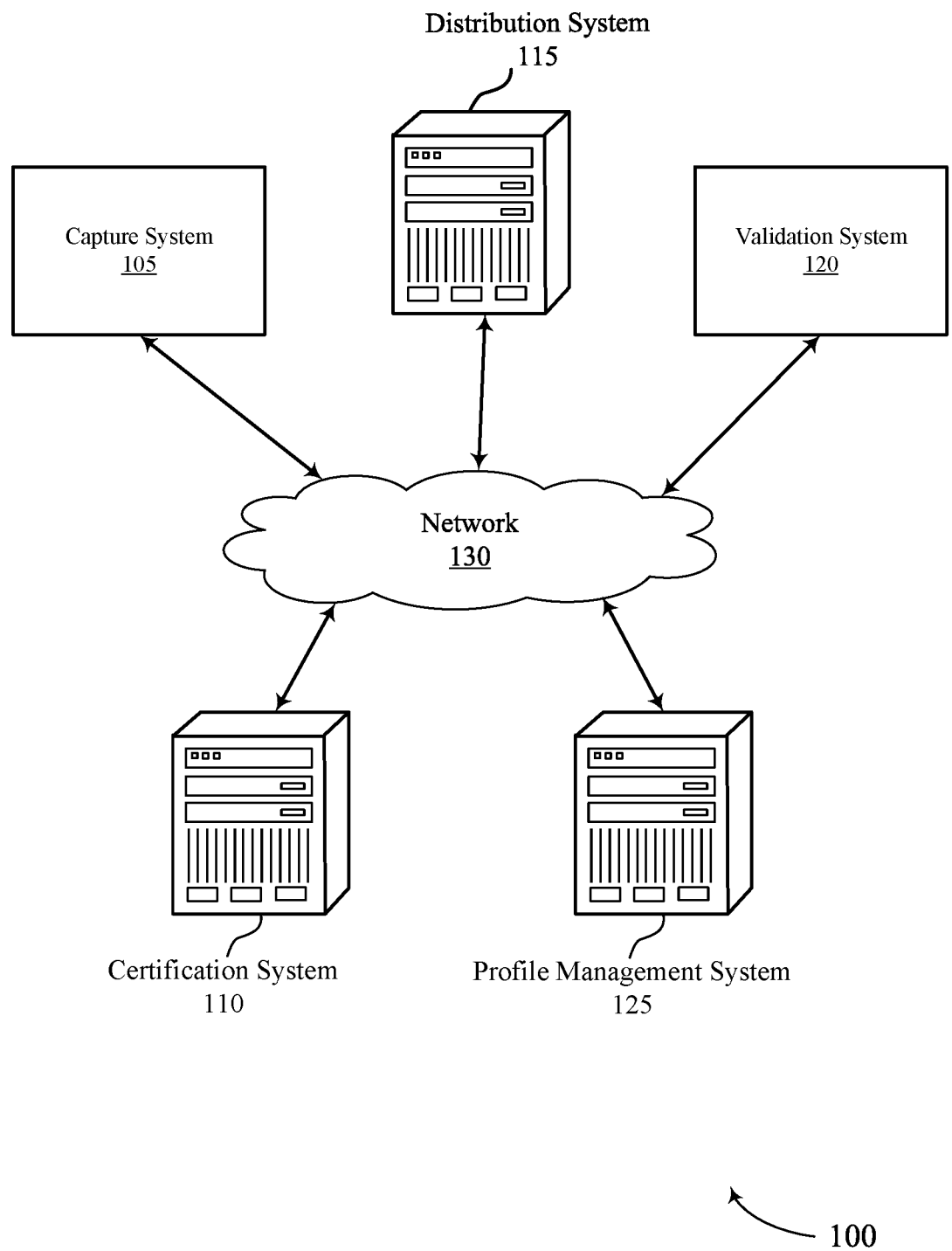
FIG. 1 illustrates an example of a computing environment that supports identifying altered media data in accordance with aspects of the present disclosure.

Media data may include audio data (including, in some cases, telephonic conversation data), image data, video data, or any combination thereof. To support subsequently identifying whether a set of media data has been altered, the set of media data may be divided into one or more segments, or subsets of media data. For each subset of media data, a cryptographic representation thereof may be created—for example, each subset of media data may be hashed, and the resulting hash may be the cryptographic representation of the subset of media data. The hash of each subset may be transmitted to a certification system, either in real time (e.g., while a video is still being recorded, or within some threshold amount of time after recording, subsets of the video are hashed and transmitted to the certification system) or in batches (e.g., a complete video is recorded, then segmented, hashed, and the hashes transmitted to the certification system with some delay or queuing of subsets of the video).

The certification system may create an immutable ledger for the set of media data. The certification system may create a new ledger entry for each subset and may write to (e.g., add to) each ledger entry the hash of the corresponding subset. The certification system may render the ledger immutable at least in part by also creating a blockchain for the set of media data, where each ledger entry includes a block of the blockchain. For example, once a ledger entry is otherwise complete, the certification system may create an additional hash—which may be referred to as a blockchain hash—by hashing the content of the ledger entry in conjunction with the blockchain hash for the preceding ledger entry. Thus, each ledger entry may include a blockchain hash that is based in part on the content of the ledger entry and in part on the content of the preceding ledger entry, such that the blockchain hash in each ledger entry comprises a block of a blockchain.

In some cases, for each subset of a set of media data, additional data may be collected or created and transmitted to the certification system. As one example, metadata for each subset may be collected and transmitted to the certification system (e.g., in un-hashed form). As another example, for each subset, the corresponding metadata may be hashed, and the resulting metadata hash may be transmitted to the certification system. In some cases, the certification system may write the un-hashed metadata and the metadata hash for each subset to the ledger entry for the subset. In such cases, the blockchain hash for a ledger entry may also be based at least in part on such additional data. The immutable ledger may subsequently be leveraged to determine whether a given set of media data is or is not identical to the set of media data originally captured, and thus whether the media data has been altered.

A validation system may receive a set of media data and validate the received set of media data based at least in part on whether the certification system includes a corresponding immutable ledger, and if so, based at least in part on validating the received media data against the contents of the corresponding immutable ledger.

The validation system may check with the certification system to determine whether an immutable ledger exists for the received set of media data. If no immutable ledger exists for the received set of media data, the validation system may notify a user that the received set of media data cannot be validated. If an immutable ledger does exist for the received set of media data, the certification system may determine whether the immutable ledger remains valid. For example, the certification system may evaluate the validity of the corresponding blockchain, and determine the validity of the immutable ledger based on the blockchain. If the immutable ledger is not valid, the certification system may notify the validation system, which in turn may notify a user that the received set of media data cannot be validated, or that the immutable ledger for the received set of media data has been compromised.

If the certification system indicates that an immutable ledger for the received set of media data is present and valid, the validation system may divide the received set of media data into one or more subsets, consistent with how media data may be segmented when initially captured or collected. For each subset of media data, the validation system may create a candidate cryptographic representation (e.g., hash), which may be compared against a trusted version thereof— the trusted version being stored in the immutable ledger. In some cases, the certification system may transmit the trusted version to the validation system, and the validation system may perform the comparison. In some cases, the validation system may transmit the candidate cryptographic representation to the certification system, and the certification system may perform the comparison and inform the validation system of the result. In some case, along with comparisons of candidate media subset hashes, similar comparisons may also be performed for metadata-based hashes.

For each set of media data, based on such candidate hash comparisons, a trust score may be determined, either by the validation system or by the certification system. In some cases, the trust score for a subset of media data may also be determined based on metadata for the set of media data, including the existence or absence of one or more types of metadata or the substance of one or more types of metadata (where substance may include a quality of a given type of metadata, such as an accuracy of GPS metadata corresponding to a set of media data 210). In some cases, a trust score may be determined for each subset of the set of media data. The validation system may present the trust score(s) to a user, and in some cases may present the trust score(s) while concurrently presenting (e.g., playing) the validated set of media to the user. For example, the validation system may present a video to the user and, for each subset of the video (e.g., each 15 seconds of the video), concurrently present a corresponding trust score, possibly along with indicia of corresponding metadata. In some cases, a set of media data may be validated in real time (e.g., while the validation system is playing the media data, it is concurrently validating at least some aspects of the media data). In some cases, a set of media data may be validated and then presented to the user.

The technological solutions described herein, including the distribution of different functionalities across different networked systems, may have many technical benefits, which may be appreciated by those of ordinary skill in the art, whether or not specifically articulated herein. For example, the certification system may use a different cryptographic algorithm to create the blockchain hashes than that used to initially hash each subset of the set of media data upon capture, or to create candidate hashes by the validation system. Further, the cryptographic algorithm used to initially hash each subset of the set of media data may vary from one set of media data to another, and it may not be known to the validation system other than via the certification system. These and the other technological solutions described herein, including the distribution of different functionalities, thus may beneficially improve the security of the certification system and the immutability of the ledger.

Further, the technological solutions described herein may have a wide variety of beneficial applications, as also may be appreciated by those of ordinary skill in the art, whether or not specifically articulated herein. For example, an individual may capture media data in accordance with the techniques described herein to ensure it won't be disparaged as "fake" later. Or an individual may validate media data in accordance with the techniques described herein to prove or disprove its legitimacy. In some cases, an individual may use a smartphone to record a video, and as the video is being recorded, the smartphone may upload related hashes to the certification system, which may create a corresponding immutable ledger that supports subsequent identification of whether a purported copy of the video includes altered media data. As another example, a police body camera or audio recorder, or a traffic or other surveillance camera, may capture video or audio in accordance with the techniques described herein to ensure its subsequent trustworthiness, either as evidence in a court of law or otherwise. As another example, a smartphone may include an application configured to capture audio data associated with a phone call (which may be referred to as telephonic conversation data) made using the smartphone, or a server may be configured to capture telephonic conversation data whenever joined to a phone call, in order to provide verifiable phone conversations. In some cases, such as where a device that records media data lacks certain processing capabilities, or lacks the capability or opportunity to communicate with the certification system in real time, the device that records the media data may subsequently transfer the media data to a second device, and the second device may process the media data (e.g., segment and hash the media data) or upload related data (e.g., hashes of the media data) to the certification system in accordance with the techniques described herein.

As can be seen from these examples and the other examples described herein, which are in no way intended to be limiting, a wide variety of scenarios exist in which capturing media data in a way that supports subsequent validation or validating media data to determine whether it has been altered may be desired, and one of ordinary skill will be able to appreciate any number of additional such scenarios.

These and other aspects of the disclosure are further described herein with reference to process diagrams, apparatus diagrams, system diagrams, and flowcharts that relate to systems and techniques that support identifying altered media data.

FIG. 1 illustrates an example of a computing environment 100 that supports systems and techniques for identifying altered media data in accordance with aspects of the present disclosure. Computing environment 100 includes a capture system 105, a certification system 110, a distribution system 115, a validation system 120, and a profile management system 125.

The capture system 105, the certification system 110, the distribution system 115, the validation system 120, and the profile management system 125 may each be communicatively coupled with a network 130 and thus, via network 130, with each other. The network 130 may include any network or communications infrastructure via which the capture system 105, the certification system 110, the distribution system 115, the validation system 120, and the profile management system 125 may exchange data. For example, network 130 may include aspects of one or more wired networks (e.g., the Internet) or one or more wireless networks (e.g., cellular networks) as well as public networks or private networks. The capture system 105, the certification system 110, the distribution system 115, the validation system 120, and the profile management system 125 may each be communicatively coupled with the network 130 via one or more communications links, which may be considered part of the network 130.

The capture system 105 may collect and process media data in accordance with the techniques described herein. For example, the capture system 105 may intake and process media data to support subsequent validation of the captured media data by the validation system 120. Media data may include image data, video data, or audio data (including but not limited to telephonic conversation data, which may refer to audio data associated with a voice call). In some cases, image or video data may be captured at least in part by a camera, microphone, an application configured to capture telephonic conversation data, or other media data capture device included in or communicatively coupled with the capture system 105. In some cases, video or audio data may be captured at least in part by a sniffer or like piece of hardware, software, or firmware included in or communicatively coupled with the capture system 105.

The capture system 105 may include one or more hardware, software, or firmware components that implement the functions ascribed herein to the capture system 105. For example the capture system 105 may in some cases include one or more components for capturing media data (e.g., a camera, a microphone, a sniffer, or another capture mechanism), or more components for capturing metadata for the media data (e.g., sensors or system clocks), one or more components for processing captured media data and metadata in accordance with the techniques described herein (e.g., processor, memory, and computer-executable instructions, which may be processor-executable and stored in memory), and one or more components for exchanging data with other aspects of computing environment 100 (e.g., a transceiver, an antenna, a modem, or like components for communicating with other aspects of computing environment 100 via one or more wired or wireless communications links). In some cases, the capture system 105 may include aspects of a smartphone, a tablet, a computer (e.g., laptop, desktop, or server-grade computer), or other like device configured to support the functions ascribed herein to the capture system 105. The capture system 105 may in some cases comprise one or more software applications hosted by such a device. In some cases, the capture system 105 may comprise one or more software applications specific to capturing a particular type of media data (e.g., a software application specific to capturing audio data, specific to capturing image data, specific to capturing video data, or specific to capturing telephonic conversation data). In some cases, the capture system 105 may comprise an application for which no media data may be imported, only directed captured using the application. Additionally or alternatively, the capture system 105 may include aspects of, be coupled with, or otherwise receive media data captured by a body camera (e.g., a police body camera or an action camera), a surveillance camera (e.g., a traffic or security camera), or some other type of camera, microphone, sniffer, or other means for capturing or intaking media data or associated metadata. In some cases, the capture system 105 may verify such a separate device (e.g., based on a private/public cryptographic key pair for a user profile associated with the separate device) prior to accepting media data from the separate device.

The capture system 105 may support either a single device implementation or a multi-device implementation. In a single device implementation, the capture system 105 may include aspects of a single host device that captures and processes media data in accordance with the techniques described herein. For example, the host device may execute one or more software applications configured to cause the host device to implement the functions ascribed herein to capture system 105. In a multi-device implementation, aspects of capture system 105 may be distributed across two or more host devices, and at least one of the host devices may execute one or more software applications configured to cause that host device to implement aspects of the functions ascribed herein to capture system 105. In some cases, a first device (e.g., an audio recorder, body camera, or surveillance camera) may capture media data and transfer the captured media data to a second device (e.g., a computer), and the second device may process the captured media data in accordance with the techniques described herein.

The certification system 110 may receive, store, and process data associated with captured media data (e.g., captured by the capture system 105) in accordance with the techniques described herein. For example, the certification system 110 may receive, process, and store metadata associated with the captured media data as well as associated cryptographic representations (e.g., hashes of the media data, hashes of related metadata, or hashes of combinations of the media data and related metadata), but not the captured media data itself. The certification system 110 may also further process data received by the certification system to create and store additional related data (e.g., to create and store additional metadata or additional hashes).

In some cases, the certification system 110 may store data associated with the captured media data as part of an immutable ledger. The immutable ledger may include a blockchain or like immutable or distributed ledger (e.g., each entry of the immutable ledger may include a block of the blockchain). For example, as described herein, at least some entries in the immutable ledger (and thus at least some blocks of the blockchain) may respectively correspond to a subset (e.g., a portion or segment) of the captured media data. In some cases, the certification system 110 may replicate the immutable ledger such that any number of copies of the immutable ledger may be created, which the certification system 110 may store across any number of logically or physically distinct devices or computer systems. The immutable ledger may support subsequent validation of the captured media data, and the certification system 110 may in some cases interact with the validation system 120 in accordance with the techniques described herein to validate media data based on the immutable ledger. For example, the certification system 110 may receive and respond to validation requests issued by the validation system 120. In some cases, the certification system 110 may include one or more computer systems (e.g., servers) for storing immutable ledgers and related data, and one or more computer systems (e.g., servers) for storing metadata for subsets of media data 210. In some cases, the certification system 110 may include one or more computer systems (e.g., servers) for storing immutable ledgers and related data along with metadata for subsets of media data 210.

The certification system 110 may include one or more components for performing the functions ascribed herein to certification system 110, such as one or more components for storing and processing data related to media data captured by the capture system 105 (e.g., processor, memory, and computer-executable instructions, which may be processor-executable and stored in memory), and one or more components for exchanging data with other aspects of computing environment 100 (e.g., a transceiver, an antenna, a modem, and like components for communicating with other aspects of computing environment 100 via one or more wired or wireless communications links). In some cases, the certification system 110 may include aspects of one or more server-class computers (which may be referred to as servers in the context of computing environment 100), one or more databases, or one or more other storage and processing components. For example, the certification system 110 may include multiple servers, and some or all of the servers included in the certification system 110 may each store a copy of an immutable ledger, where the immutable ledger includes entries (e.g., blocks of a blockchain) related to media data captured by the capture system 105. In some cases, the certification system 110 may include one or more intermediary system to enhance the efficiency with which the certification system 110 may perform any of the functionalities ascribed herein to the certification system 110 (e.g., an intermediary system to intake new data from the capture system 105, an intermediary system to facilitate lookup of ledger entries based on a validation request from the validation system 120, an intermediary system to collect or store metadata independent of an immutable ledger, etc.).

The validation system 120 may receive media data and validate received media in accordance with the techniques described herein. Validating received media may in some cases include determining whether the media data has been altered since being captured by the capture system 105. In some cases, the validation system 120 may validate received media data based on the immutable ledger and thus at least in part by interacting with the certification system 110. In some cases, validation system 120 may determine (or receive from the certification system 110) a trust score for the media data, which may be indicative of the existence of or an extent of intervening alternation of the media data between being captured by the capture system 105 and being received by the validation system 120. In some cases, the trust score may be binary (e.g., trusted (unaltered) or untrusted (altered in any way to any extent)), and in some cases, the trust score may be non-binary (e.g., reflecting degrees of alteration and thus trustworthiness with some granularity or quantization-such as an A/B/C/D/E/F scale, a ten point scale, etc.). The validation system 120 may also present (e.g., display or otherwise make visible or audible to a human viewer or listener) received media data along with (e.g., concurrently with) one or more trust scores associated with the media data (e.g., an overall trust score for the media data, or one or more trust score specific to a subset of the media data) or metadata for the media data received from the capture system 105.

The validation system 120 may include one or more components for performing the functions ascribed herein to the validation system 120, such as one or more components for receiving media data and validating received media data (e.g., processor, memory, and computer-executable instructions, which may be processor-executable and stored in memory), and one or more components for exchanging data with other aspects of the computing environment 100 (e.g., a transceiver, an antenna, a modem, and like components for communicating with other aspects of computing environment 100 via one or more wired or wireless communications links). In some cases, the validation system 120 may include aspects of a smartphone, a tablet, a computer (e.g., laptop, desktop, or server-grade computer), or other like device configured to support the functions ascribed herein to the validation system 120. In some cases, the validation system 120 may include, be integrated with, or be communicatively coupled with a media hosting service (e.g., a video hosting service) or a social media service that makes sets of media data available to users (e.g., via the internet). The validation system 120 may in some cases comprise one or more software applications hosted by a host device. In some cases, the validation system 120 may comprise one or more software applications specific to validating a particular type of media data (e.g., a software application specific to validating audio data, specific to validating image data, specific to validating video data, or specific to validating telephonic conversation data).

The distribution system 115 may support the transfer of captured media data from the capture system 105 to the validation system 120 in accordance with the techniques described herein. The distribution system 115 may facilitate the transfer of captured media data from the capture system 105 to the validation system 120 such that the media data is unaltered (e.g., not compressed or encoded according to a different codec) as a result of the transfer. For example, the distribution system 115 may support a direct (e.g., application-to-application) transfer mechanism between the capture system 105 and the validation system 120. The direct transfer mechanism may be peer-to-peer or peer-to-many (including peer-to-public, such as via social media or a media hosting service). In some cases, the distribution system 115 may include a hosting service for sets of media data (e.g., a video hosting service) or a social media service that makes sets of media data captured by the capture system 105 available to the validation system 120. In some cases, a user of the capture system 105 may configure the capture system 105 to transmit a captured set of media to the validation system 120 upon completion of the capture process. In other cases, a user of the capture system 105 may access, via the capture system 105, a listing of previously captured sets of media data, may select one or more previously captured sets of media data, and may configure the capture system 105 to transmit the selected set(s) of media data to the validation system 120. In some cases, the validation system 120 may be associated with a particular user, and the user of the capture system 105 may identify the target validation system 120 at least in part by identifying a target user. In some cases, the distribution system 115 may facilitate the transfer of captured media data from the capture system 105 to the validation system 120 along with information (e.g., header information) that the validation system 120 may use to validate the media data (e.g., information identifying a corresponding immutable ledger, ledger entries therein, or a mapping between ledger entries and subsets of media data). In some cases, the distribution system 115 may verify a capture system 105 or validation system 120 (e.g., based on a private/public cryptographic key pair for a user profile associated with the capture system 105 or validation system 120) prior to engaging in additional interactions with the capture system 105 or validation system 120. In some cases, a user may be able to configure the distribution system 115 to make a given set of media data 210 available to other users (validation systems 120) only for a limited amount of time, for a limited amount of downloads or views, or for only a limited roster (list) of other users (validation systems 120).

The distribution system 115 may include one or more components for performing the functions ascribed herein to the distribution system 115, such as one or more components for identifying the validation system 120 and routing media data captured by capture system 105 to the validation system 120 (e.g., processor, memory, and computer-executable instructions, which may be processor-executable and stored in memory), and one or more components for exchanging data with other aspects of the computing environment 100 (e.g., a transceiver, an antenna, a modem, and like components for communicating with other aspects of the computing environment 100 via one or more wired or wireless communications links). In some cases, the distribution system 115 may include aspects of one or more server-class computers (which may be referred to as servers in the context of the computing environment 100), one or more routers or network switches, or one or more other processing and routing components.

In some cases, the validation system 120 may receive media data, including media data captured by the capture system 105, via means other than those involving or supported by the distribution system 115. For example, in some cases, a user of the validation system 120 may import media data in the validation system 120, which the user of the validation system 120 may have received by any means (e.g., via email, multimedia messaging service (MMS), social media, a torrent service, etc.).

The profile management system 125 may manage user profiles associated with the capture system 105 or the validation system 120 in accordance with the techniques described herein. For example, the profile management system 125 may communicate with the capture system 105 to support the creation of a user profile for a user of the capture system 105 and may communicate with the validation system 120 to support the creation of a user profile for a user of the validation system 120. A user profile that is valid for the capture system 105 may also be valid for the validation system 120, and vice versa. A user profile may correspond to a human user, and organizational user, or in some cases to a device (e.g., a body camera or surveillance camera, or a specific smartphone, may correspond to a unique user profile). An individual may have multiple user profiles (e.g., a user profile for personal use and a user profile for professional/official use). The profile management system 125 may communicate with the capture system 105 or the validation system 120 to support the authentication (e.g., sign in or log in) of a user.

Each user profile may correspond to a public/private cryptographic key pair, which may be used by the other aspects of computing environment 100 in accordance with the techniques described herein (e.g., a capture system 105 may sign a captured set of media data using a private cryptographic key, and the validation system 120 may subsequently verify the origin of the set of media data based on the corresponding public cryptographic key).

In some cases, the profile management system 125 may maintain various types of data for each user profile, which may be referred to as user profile data. In some cases, user profile data may include a history (e.g., list) of sets of media data associated with the user profile (e.g., captured by the capture system 105 when the corresponding user is logged in). An entry in the list for a set of media data may include a date, time, or length of the set of media data. An entry in the list for a set of media data may also include a type (e.g., video, audio, image, telephonic conversation) of the set of media data. An entry in the list for a set of media data may also include additional metadata for the set of media data (e.g., a location of the capture system 105 at a time of creation or intake of the set of media data). In some cases, the history of sets of media data associated a user profile may be publicly visible, or visible to other users who successfully log in or otherwise authenticate themselves to the profile management system 125. In some cases, user profile data may include trust scores (e.g., as determined by the validation system 120 or the certification system 110) for sets of media data associated with the user profile and other reputational data. As a user creates more sets of media data, or as more sets of media data associated with the user are validated by the validation system 120, the user's reputational data may include an indication of increased trustworthiness. In some cases, the validation system 120 or the certification system 110 may determine a trust score a new set of media data based on user profile data for the associated user profile.

The profile management system 125 may include one or more components for performing the functions ascribed herein to the profile management system 125, such as one or more components for storing and processing data user profile data (e.g., processor, memory, and computer-executable instructions, which may be processor-executable and stored in memory), and one or more components for exchanging data with other aspects of computing environment 100 (e.g., a transceiver, an antenna, a modem, and like components for communicating with other aspects of computing environment 100 via one or more wired or wireless communications links). In some cases, the profile management system 125 may include aspects of one or more server-class computers (which may be referred to as servers in the context of computing environment 100), one or more databases, or one or more other storage and processing components.

Numerous variations from the system architecture of the illustrated computing environment 100 are possible. The components of the computing environment 100 and their respective functionalities can be combined or redistributed. For example, the certification system 110 and the profile management system 125 can be combined or distributed across any number of devices. Furthermore, the functionalities ascribed herein to any of the capture system 105, certification system 110, distribution system 115, validation system 120, or profile management system 125 can be implemented using a single computing device or using any number of distributed computing devices communicatively coupled (e.g., via the network 130).

For clarity and ease of description, computing environment 100 may at times be described, and is illustrated in FIG. 1, as including only one capture system 105, one certification system 110, one distribution system 115, one validation system 120, and one profile management system 125, but it is to be understood that in practice any number of each may exist. For example, a large number of capture systems 105 and validation systems 120 may exist.

It also to be understood that a single device may be included in, and may in some cases act as a host device for, both the capture system 105 and the validation systems 120. For example, a single smartphone or other computer system may be configured to implement the functionalities ascribed herein to the capture system 105 (e.g., by hosting and executing a corresponding software application) and may also be configured to implement the functionalities ascribed herein to the validation system 120 (e.g., by hosting and executing a corresponding software application). Further, in some case, a single device may be included in or act as a host device for multiple capture systems 105 (e.g., one capture system 105 for video data and one capture system 105 for audio data).

Figure 2:
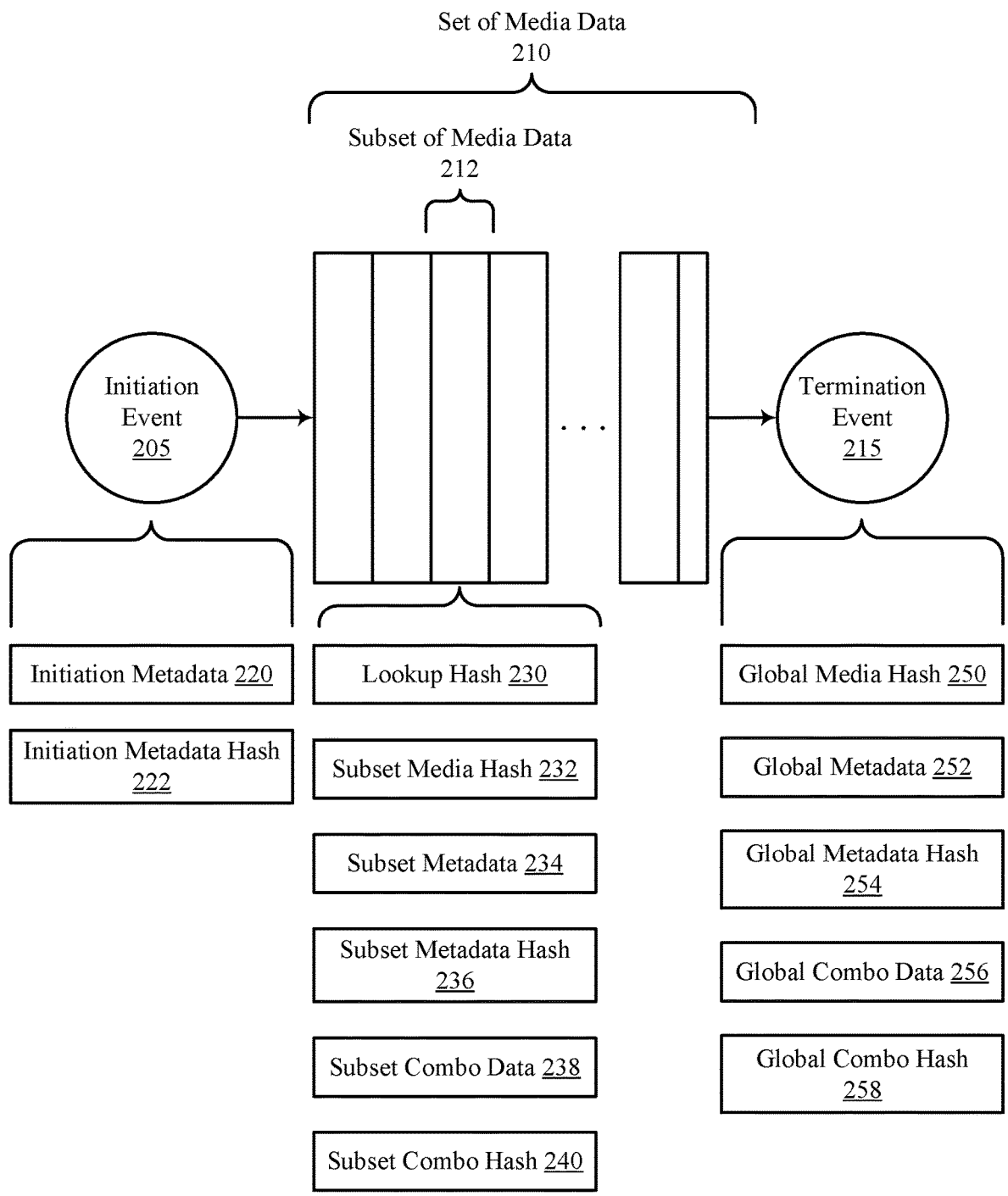
FIG. 2 illustrates an example of a process for capturing media data that supports identifying altered media data in accordance with aspects of the present disclosure.

FIG. 2 illustrates an example of a capture process 200 that supports identifying altered media data in accordance with aspects of the present disclosure. In some examples, the capture process 200 may be implemented by aspects of a capture system 105 as described with reference to FIG. 1.

The capture system 105 may identify an initiation event 205, which may be any event that initiates the recording of a corresponding set of media data 210. Thus, the initiation event 205 may be, for example, a user of the capture system 105 selecting "record" on a digital camera, a digital audio recorder, a software application executed by the capture system 105, etc. The initiation event 205 may also be, for example, a power-on event for the capture system 105, where the capture system 105 may be configured to record the set of media data 210 whenever powered on (e.g., as in some examples wherein the capture system 105 may include aspects of a body camera or surveillance camera, or a server configured to capture telephonic conversation data when joined to a call). The initiation event 205 may also be, for example, the beginning of a new periodic time period associated with the set of media data 210 (e.g., the capture system 105 may be configured to repeatedly record sets of media data 210 having a predefined duration, such as one hour, and may initiate a new set of media data and thus identify an initiation event 205 at the beginning of each new predefined duration).

In some cases, prior to initiation event 205, the capture system 105 may authenticate a user of the capture system 105. For example, the capture system 105 may require the user to provide a username and password, one or more biometric inputs (e.g., for fingerprint recognition, facial recognition, retina recognition, voice recognition, typing or other input cadence recognition, etc.), or other form of authentication credential (e.g., a dongle or digital certificate). The capture system 105 may determine whether the authentication credentials provided by the user correspond to a valid user profile, which may be associated with a public/private cryptographic key pair as assigned and managed by a profile management system 125.

In some cases, the capture system 105 may authenticate the user locally, based on user profile information stored locally at the capture system 105. In some cases, capture system 105 may transmit to a profile management system 125 one or more indications of authentication credentials provided by the user and may receive, from the profile management system 125, an authentication response indicative of whether the authentication credentials provided by the user correspond to a valid user profile. If the authentication credentials provided by the user do not correspond to a valid user profile, the capture system 105 may prompt the user to provide new or additional credentials or create a new and valid user profile. If the authentication credentials provided by the user correspond to a valid profile, the capture system 105 may thereafter identify the initiation event 205, and the capture system 105 or the profile management system 125 may associate set of media data 210 with the profile in accordance with the techniques described herein.

In some cases, prior to the initiation event 205, the capture system 105 may present (display) to the user one or more aspects of metadata (e.g., of any type described herein) that would be captured at that time, were the capture system 105 to begin recording, along with one or more indications of their impact on validity (e.g., color-coding (such as red, yellow, green) or other indicators related to whether a given aspect of metadata is favorable, disfavorable, or neutral for a subsequent validity analysis, such as whether an Internet connection is present or absent or is strong or weak, or whether a large or small amount (e.g., number of sources) of metadata is presently available). For example, the capture system 105 may display GPS- or WiFi-related metadata, indicating to the user what metadata (e.g., what types of metadata) may then be available to be captured. Additionally or alternatively, in some cases, the capture system 105 may present (display) to the user one or more aspects of metadata (e.g., of any type described herein) as captured while recording.

Subsequent to the initiation event 205, the capture system 105 may capture the corresponding set of media data 210 until identifying a termination event 215, which may be any event that terminates the recording of the corresponding set of media data 210. Thus, the set of media data 210 may include any media data captured between the initiation event 205 and the termination event 215. The termination event 215 may be, for example, a user of the capture system 105 selecting "stop recording" on a digital camera, a digital audio recorder, a software application executed by the capture system 105. etc. The termination event 215 may also be, for example, a power-off event for the capture system 105 or the end of a periodic time period associated with the set of media data 210. Where the set of media data 210 comprises data for a single image, the termination event 215 may be the completion of the capture process for the single image.

The capture system 105 may identify a plurality of subsets of media data 212, and each subset of media data 212 may be a subset of the set of media data 210. For example, a subset of media data 212 may comprise video or audio data of a predefined duration (e.g., 15 second intervals or intervals of some other duration) or of a predetermined amount (e.g., X frames, Y audio samples, Z pixels of an image, or like amount). In some cases, the duration or amount of media data in a subset of media data 212 may be configured by the certification system 110 on a periodic or ad hoc basis and may thus change over time. In some cases, as illustrated in the example of capture process 200, at least one subset of media data 212 may not correspond to the predefined duration or portion size of other subsets media data 212 (e.g., due to the set of media data 210 not having a duration or amount of media data evenly divisible by the predefined duration or amount, in which case at least one subset of media data 212 may be a remainder of the set of media data 210).

In some cases, the capture system 105 may identify subsets of media data 212 in real time (e.g., concurrently with capturing set of media data 210). For example, the capture system 105 may capture a first 15 seconds of video and identify the first 15 seconds of video as a first subset of media data 212, capture a second 15 seconds of video and identify the second 15 seconds of video as a second subset of media data 212, and so on. In some cases, the capture system 105 may capture all or some other larger portion of the set of media data 210 (e.g., at a body camera, surveillance camera, smartphone, or tablet computer lacking concurrent connectivity to network 130 or lacking sufficient processing resources to support all aspects of capture system 105), and may then at a later time identify subsets of media data 212 (e.g., by segmenting all or the some other larger portion of set of media data 210).

The capture system 105 may identify metadata for the set of media data 210, which may also include metadata specific to the initiation event 205 or the termination event 215, as well as metadata specific to a subset of media data 212 or applicable to the entirety of set of media data 210. Metadata for the set of media data 210 may include, for example, authentication credentials (e.g., user ID, biometric data, etc.), user profile data, time or calendar data (e.g., timestamps, datestamps, etc.), sensor data gathered by one or more devices included in or coupled with the capture system 105 (e.g., temperature data humidity data, other types of environmental data, accelerometer data, velocity data, triangulation data, serving cell data, geographic data (e.g., latitude or longitude or zip code or other political boundary data), the identity of available Wi-Fi networks or other networks, global positioning satellite (GPS) data, other types of location data, IDs or distances of cellular towers to which the capture system 105 is connected, or any combination thereof.

Metadata for the set of media data 210 may also include, for example, an identity of or metadata for an application (e.g., a software application) used to capture the set of media data 210 (e.g., whether the set of media data 210 was captured with a trusted application).

Metadata for the set of media data 210 may also include, for example, an identity of or other data related to a communications link used for communicating data related to the set of media data 210 to a certification system 110 (e.g., a name of the communications link, a type of the communications link, a communications protocol associated with the communications link, security data for the communications link, or any combination thereof).

Metadata for the set of media data 210 may also include, for example, an identity of, number of, or other data related to additional capture systems 105 within a threshold distance of the capture system 105 at a time associated (e.g., concurrent with) capturing the set of media data 210.

Metadata for the set of media data 210 may also include, for example, a latency between a time associated (e.g., concurrent with) capturing the set of media data 210 or a subset of media data 212 and transmitting data related to the set of media data 210 or the subset of media data 212 (e.g., other associated metadata or an associated hash) to a certification system 110.

In some cases, a user of the capture system 105 may specify one or more types of metadata for the capture system 105 to capture (or not capture) or one or more types of metadata for the capture system 105 to transmit (or not transmit), in hashed or un-hashed form, to a certification system 110.

The capture system 105 may identify metadata specific to the initiation event 205 as initiation metadata 220. Examples of initiation metadata 220 may include authentication credentials (e.g., user ID, biometric data, etc.), user profile data, or any other type of metadata specific to a time or occurrence of the initiation event 205.

The capture system 105 also may create a cryptographic representation based on the initiation metadata 220, which may be referred to as an initiation metadata hash 222. The capture system 105 may create the initiation metadata hash 222 by inputting the initiation metadata 220 into a cryptographic algorithm (e.g., a hashing algorithm), which may yield an initiation metadata hash 222. For brevity and ease of description, "hashing algorithm" and "hash" may be used herein as referring generically to a cryptographic algorithm and corresponding cryptographic representation, and "hashing" an input may refer to creating a cryptographic representation based on the input. For example, a hash as described herein may be a secure hash algorithm (SHA) hash, such as a SHA-256 hash or a SHA-512 hash. It is to be understood that one of ordinary skill in the art may recognize now or at a later time cryptographic algorithms and corresponding cryptographic representations other than hashing algorithms and hashes that are also suitable and thus equivalent for the systems and techniques described herein.

The capture system 105 may transmit, to a certification system 110, one or more of the initiation metadata 220 and the initiation metadata hash 222, and the certification system 110 may be configured to write one or more of the initiation metadata 220 and the initiation metadata hash 222 to an immutable ledger corresponding to set of media data 210 in accordance with the techniques described herein. In some cases, the capture system 105 may transmit to the certification system 110 one or more of the initiation metadata 220 and the initiation metadata hash 222 in real time (e.g., within a threshold amount of time after identifying the initiation metadata 220 or while capturing at least some portion of the set of media data 210). In some cases, for example, the capture system 105 may transmit to the certification system 110 one or more of the initiation metadata 220 and the initiation metadata hash 222 while capturing a subset of media data 212 (e.g., while capturing a first subset of media data 212), which may also correspond to a real time transfer of the initiation metadata 220 and the initiation metadata hash 222. In some cases, the capture system 105 may transmit to the certification system 110 one or more of the initiation metadata 220 and the initiation metadata hash 222 with some latency, which may be in excess of the threshold amount of time. For example, the capture system 105 may not have connectivity to the network 130 at the time of the initiation event 205 and thus may transmit to the certification system 110 one or more of the initiation metadata 220 and the initiation metadata hash 222 subsequent to establishing a communications link with the network 130.

In some cases, for each subset of media data 212 identified by the capture system 105, the capture system 105 may perform certain operations as described herein. FIG. 2 illustrates aspects of these operations with reference to a single subset of media data 212, but it is to be understood that like operations may be performed for each identified subset of media data 212.

In some cases, for each subset of media data 212 identified by the capture system 105, the capture system 105 may create a corresponding lookup hash 230. The capture system 105 may create the lookup hash 230 by hashing the corresponding subset of media data 212. In some cases, the capture system 105 may create the lookup hash 230 using an alternative hashing algorithm that is distinct from a hashing algorithm used by the capture system 105 to create other hashes based on the corresponding subset of media data 212 and other hashes related to the set of media data 210 (e.g., the initiation metadata hash 222, the global media hash 250, and the global metadata hash 254). In some cases, the lookup hash 230 may function as an identifier of an immutable ledger entry corresponding to the subset of media data 212. In some cases, a set of media data 210 or a corresponding immutable ledger may be identified based on other information included in a file that includes the set of media data 210, such as information included in a header of such a file. Such other information may be a unique identifier, metadata, or a hash (e.g., a lookup hash 230 or some other type of hash).

In the context of the systems and techniques described herein, one technical problem may relate to how to support the receipt and validation of only part of the set of media data 210 by a validation system 120, which may be desirable for any number of reasons. For example, some sets of media data 210 may be large, and transferring the entire set of media data 210 from the capture system 105 to the validation system 120 may be undesirable or impractical. As another example, only some aspects of a set of media data 210 may be relevant for a given purpose (e.g., as evidence in a court of law, or of interest to human consumers of the media data). It may also be desirable for a validation system 120 to be able to validate a set of media data 210 received exclusive of any additional information, as this may avoid the need for any special file formats or transmission protocols when sending a set of media data 210 from a capture system 105 to a validation system 120. An additional technical problem in the context of the systems and techniques described herein may relate to how a validation system 120 and a certification system 110 are to efficiently identify an immutable ledger and immutable ledger entry corresponding to a given subset of media data 212. And yet another technical problem in the context of the systems and techniques described herein may relate to how to mitigate the risk of aspect of the systems and techniques described herein being compromised (e.g., hacked), including the risk of altered media data being altered in a way that a validation system 120 may be unable to detect, and including how to maintain security of in the event that a hashing algorithm utilized by the capture system 105 or any other aspect of a computing environment 100 becomes compromised (inverted, whereby input data may be determinable based on output data).

As described herein, and as may otherwise be appreciated by those of ordinary skill in the art, technical solutions to these and other technical problems may include using a first hashing algorithm to create all hashes related to the set of media data 210 other than lookup hashes 230 (which thus may be referred to as a primary hashing algorithm) and a second, different hashing algorithm to create lookup hashes 230 (which may thus be referred to as an alternative hashing algorithm). Further, in some cases, the alternative hashing algorithm may be statically configured and globally known (e.g., known by all capture systems 105 and validation systems 120), whereas the primary hashing algorithm may be dynamically determined (e.g., selected from a set of candidate hashing algorithms) by the certification system 110. In some cases, the alternative hashing algorithm may also be dynamically determined and indicated to the capture system 105 (or, in the context of validation) to the validation system 120) by the certification system 110. The certification system 110 may dynamically determine the primary hashing algorithm, such that following the capture of the set of media data 210 by the capture system 105, a person or device in possession of the set of media data 210 may be unable to know or determine the hashing algorithm used by capture system 105 as the primary hashing algorithm without consulting the certification system 110. Additionally, the certification system 110 may select the primary hashing algorithm for a given set of media data 210 from a set of candidate hashing algorithms, each of which may be supported by capture systems 105 and validation systems 120. If one of these candidate hashing algorithms becomes compromised, the certification system 110 may be configured to cease selecting the compromised algorithm for future sets of media data 210. Thus, the capture system 105 using a primary hashing algorithm that is dynamically determined (e.g., selected) by the certification system 110 may increase the robustness and security of the systems and techniques described herein. For example, different hashing algorithms may correspond to different seeds (e.g., numerical seed values) for one or more hashing algorithms. In some cases, the certification system 110 may rotate a set of available (eligible, usable) hashing algorithms on a triggered or scheduled (e.g., periodic) basis. For example, a different set of hashing algorithms may be available each hour or other unit of time, and the certification system 110 may indicate as such to the capture system 105.

While the capture system 105 using a primary hashing algorithm that is dynamically determined (e.g., selected) by the certification system 110 may increase the robustness and security of the systems and techniques described herein, a technical problem may arise, however, as the validation system 120 may need to determine which primary hashing algorithm was used for a set of media data 210 received from a capture system 105 and identify, in coordination with the certification system 110, the immutable ledger corresponding to the set of media data 210. Configuring the capture system 105 to use an alternative hashing algorithm that is globally known a priori, and thus known to the validation system 120, to create lookup hashes 230 may support validation system 120 creating its own lookup hashes 230 for an identified subset of media data 212 without security risks that may be associated with a globally known primary hashing algorithm or with transmitting an indicator of the primary hashing algorithm along with the set of media data 210. Further, the lookup hash 230 may serve as a unique identifier of the immutable ledger entry corresponding to the subset of media data 212, which may also provide a technical solution that supports the validation system 120 being able to validate a set of media data 210 received exclusive of any additional information and via a standard transmission mechanism (e.g., email) as opposed to via some specialized transmission protocol or mechanism.

In some cases, in response to initiation event 205, capture system 105 may transmit to certification system 110 a request for a new immutable ledger (which may be referred to as a new ledger request) and may receive from certification system 110 an indication of a primary hashing algorithm selected from a set of hashing algorithms supported by capture system 105. Capture system 105 may use the indicated primary hashing algorithm to create initiation metadata hash 222 and other hashes associated with set of media data 210. Capture system 105 may use a different, alternative hashing algorithm (e.g., a hashing algorithm globally known a priori, including to capture system 105) to create lookup hash 230.

For each subset of media data 212, along with a lookup hash 230, the capture system 105 may create a corresponding subset media hash 232, which may be a hash of the corresponding subset of media data 212 and may be created using the primary hashing algorithm for the set of media data 210.

For each subset of media data 212, the capture system 105 may also identify subset metadata 234. Subset metadata 234 may include any type of metadata applicable to subset of media data 212. For example, subset metadata 234 may include any metadata collected by the capture system 105 concurrently with capturing the corresponding subset of media data 212, or any metadata identified by the capture system 105 as having been collected concurrently with the capture of the corresponding subset of media data 212 (e.g., through corresponding time stamps).

In some cases, for each subset of media data 212, the capture system 105 may create a corresponding subset metadata hash 236, which may be a hash of the corresponding subset metadata 234 and may be created using the primary hashing algorithm for the set of media data 210.

In addition or as an alternative to subset metadata hash 236, in some cases, for each subset of media data 212, the capture system 105 may combine the corresponding subset metadata 234 with the corresponding subset of media data 212 to create a combined data set, which may be referred to as subset combo data 238. In such cases, the capture system 105 may create a corresponding subset combo hash 240, which may be a hash of the corresponding subset combo data 238 and may be created using the primary hashing algorithm for the set of media data 210.

The capture system 105 may transmit, to the certification system 110, any lookup hash 230, subset media hash 232, subset metadata 234, subset metadata hash 236, or subset combo hash 240 that is created by the capture system 105, and the certification system 110 may be configured to write any lookup hash 230, subset media hash 232, subset metadata 234, subset metadata hash 236, or subset combo hash 240 received by the certification system 110 to the immutable ledger for the set of media data 210 in accordance with the techniques described herein. In some cases, the capture system 105 may transmit to the certification system 110 one or more of lookup hash 230, subset media hash 232, subset metadata 234, subset metadata hash 236, and subset combo hash 240 in real time. In some cases, real time may mean within a threshold amount of time after creating lookup hash 230, subset media hash 232, subset metadata 234, subset metadata hash 236, or subset combo hash 240 or after completing capture of the set of media data 210. In some cases, real time may mean while capturing a next subset of media data 212. In some cases, real time may mean while capturing any other portion of the set media data 210. In some cases, for example, the capture system 105 may transmit to certification system 110 one or more of lookup hash 230, subset media hash 232, subset metadata 234, subset metadata hash 236, and subset combo hash 240 while capturing another subset of media data 212 (e.g., while capturing an immediately subsequent subset of media data 212). In some cases, the capture system 105 may transmit to the certification system 110 one or more of a lookup hash 230, subset media hash 232, subset metadata 234, subset metadata hash 236, or subset combo hash 240 with some latency, which may be in excess of the threshold amount of time. For example, the capture system 105 may not have connectivity to the network 130 while capturing the corresponding subset of media data 212 and thus may transmit to the certification system 110 one or more of lookup hash 230, subset media hash 232, subset metadata 234, subset metadata hash 236, or subset combo hash 240 subsequent to establishing a communications link with network 130.

Upon identifying the termination event 215, the capture system 105 may create a global media hash 250, which may be a hash of the entirety of the set of media data 210 and may be created using the primary hashing algorithm for the set of media data 210. The capture system 105 may also identify metadata applicable to the entirety of the set of media data 210, which may be referred to as global metadata 252. Examples of global metadata 252 may include authentication credentials (e.g., user ID, biometric data, etc.), user profile data, a duration of the set of media data 210, an application used to create the set of media data 210, or any other type of metadata applicable to the entirety of the set of media data 210. For example, global metadata 252 may include some or all aspects of the initiation metadata 220. The capture system 105 may create a global metadata hash 254, which may be a hash of global metadata 252 and may be created using the primary hashing algorithm for the set of media data 210.

In addition or as an alternative to the global metadata hash 254, in some cases, the capture system 105 may combine global metadata 252 with the corresponding set of media data 210 to create a combined data set, which may be referred to as global combo data 256. In such cases, the capture system 105 may create a corresponding global combo hash 256, which may be a hash of global combo data 256 and may be created using the primary hashing algorithm for the set of media data 210.

The capture system 105 may transmit, to the certification system 110, any of a global media hash 250, global metadata 252, global metadata hash 254, or global combo hash 258 that is created by the capture system 105, and the certification system 110 may be configured to write any global media hash 250, global metadata 252, global metadata hash 254, or global combo hash 258 received by certification system 110 to the immutable ledger for the set of media data 210 in accordance with the techniques described herein. As with other types of metadata and hashes related to the set of media data 210, the capture system 105 may transmit any global media hash 250, global metadata 252, global metadata hash 254, or global combo hash 258 to the certification system 110 in real time (e.g., with a latency within the threshold amount of time) or at some later time (e.g., after establishing connectivity with network 130).

In some cases, the termination event 215 may comprise a failure of the capture system 105, such as a loss of power by (e.g., dead battery), malfunction of, or even destruction of (e.g., a dropped or smashed smartphone) the capture system 105. In some cases, the certification system 110 may thus not receive global data, such as a global media hash 250 or may otherwise determine an abrupt end to a sequence of subsets of media data 212. In some such cases, the certification system 110 may create and store a flag (e.g., include in an entry of an immutable ledger, possibly an additional entry) that indicates an abrupt termination event 215, and upon validation, the validation system 120 may present an indication of the abrupt termination event 215 to a user.

In some cases, the capture system 105 may create one or more cryptographic representations as described herein for each subset of media data 212 but may transmit one or more cryptographic representations for only a subset (e.g., some) of the subsets of media data 212. For example, the capture system 105 may create one or more cryptographic representations as described herein for N−1 consecutive subsets of media data 212, then when creating one or more cryptographic representations for the subsequent (Nth) consecutive subset of media data 212, capture system 105 may base some or all of the one or more cryptographic representations for the subsequent (Nth) consecutive subset of media data 212 on some or all of the one or more cryptographic representations created for the N−1 prior subsets of media data 212. This may reduce the amount of information exchange with the certification system 110 while retaining security and authenticity benefits. Additionally or alternatively, steganographic techniques as described herein may be applied to all or some (e.g., every Nth) subsets of media data 212 within a set of media data 210.

In some cases, the capture system 105 may create a digital signature for the set of media data 210, or each subset of media data 212 included therein, using the private cryptographic key corresponding to the user profile associated with capturing the set of media data 210. The capture system 105 may store any created digital signature in association with the set of media data 210. Additionally or alternatively, the capture system 105 may transmit to a distribution system 115 or a certification system 110 any created digital signature in association with the set of media data 210. A validation system 120 that receives the set of media data 210 may receive the corresponding digital signature(s) as well as the corresponding public cryptographic key. For example, the validation system 120 may receive the digital signature(s) as well as the corresponding public cryptographic key from the capture system 105 or from the distribution system 115 (e.g., as part of a header file associated with the set of media data) or may receive the digital signature(s) from the certification system 110 as part of a validation process. The validation system 120 may verify the origin of the set of media data 210 (e.g., verify the user profile with which the set of media data 210 is associated) based on the digital signature(s) and corresponding public cryptographic key.

In some cases, upon or after the termination event 215, the certification system 110 may transmit to the capture system 105 an indication of the strength of validity for different subsets 212 of the set of media data 210. For example, the certification system 110 may transmit to capture system 105 one or more indications (e.g., a color-coded timeline or other indicators) of whether, for a given subset 212, a corresponding aspect of associated metadata is favorable, disfavorable, or neutral for a subsequent validity analysis, such as whether associated latency of upload was fast or slow, associated GPS or other metadata was available or unavailable, consistent or inconsistent, strong or weak, whether a large or small amount (e.g., number of sources) of metadata was captured, or the like. The capture system 105 may also support viewing such indicators in a library of previously captured sets of media data 210.

Figure 3:
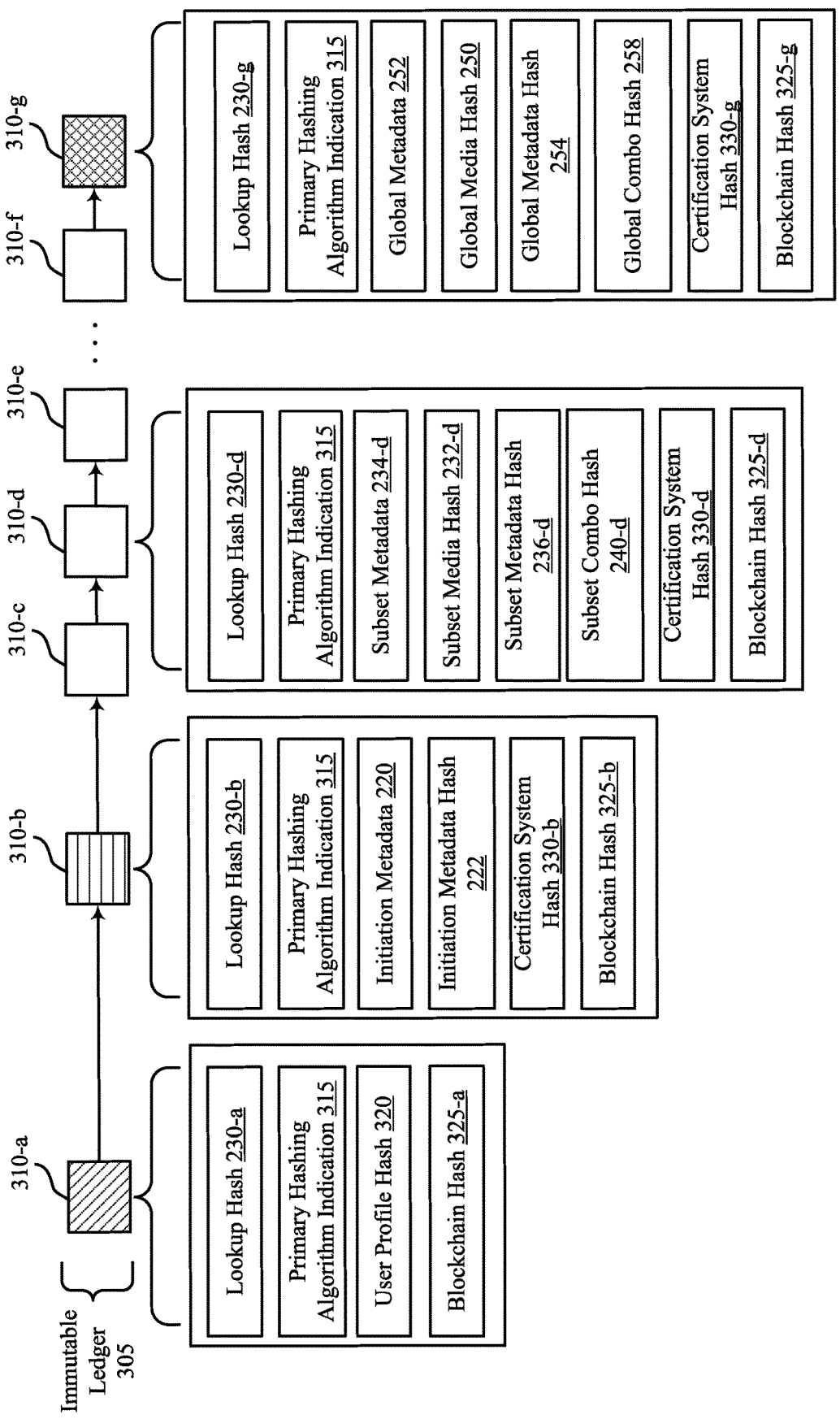
FIG. 3 illustrates an example of an immutable ledger that supports identifying altered media data in accordance with aspects of the present disclosure.

FIG. 3 illustrates aspects of an immutable ledger 305 that supports identifying altered media data in accordance with aspects of the present disclosure. In some examples, the immutable ledger 305 may be created and stored by a certification system 110 as described with reference to FIG. 1. The immutable ledger 305 may correspond to a single set of media data 210 captured by a capture system 105 and may include any number of ledger entries 310. In some cases, the certification system 110 may encrypt the immutable ledger or any other content stored by the certification system, and store such information in encrypted form, in order to further enhance security of the contents of the certification system 110.

In some cases, a first ledger entry 310-*a* may relate to user profile data associated with the capture of the corresponding set of media data 210. For example, based on receiving a new ledger request from the capture system 105, the certification system 110 may identify a user profile associated with a user of the capture system 105 or a device (e.g., a device ID) included in the capture system 105. In some cases, the certification system 110 may create a lookup hash 230-*a*, which may serve as a unique identifier of the first ledger entry 310-*a*, by hashing some or all of the user profile data for the user profile identified by the certification system 110 using an alternative hashing algorithm, as described herein. In some cases, the capture system 105 may identify the user profile data, create the lookup hash 230-*a*, and transmit the lookup hash 230-*a* to the certification system 110—the certification system 110 may then store the lookup hash 230-*a* received from the capture system 105.

As described herein, the certification system 110 may, based on receiving a new ledger request from the capture system 105, determine (e.g., select) a primary hashing algorithm for the corresponding set of media data 210. The certification system 110 may transmit to the capture system 105 an indication of the primary hashing algorithm for the corresponding set of media data 210 and also may store as part of the first ledger entry 310-*a* a primary hashing algorithm indication 315 that comprises an indicator of the primary hashing algorithm.

In some cases, either the certification system 110 or the capture system 105 may create a user profile hash 320, which may be a hash of the user profile data associated with the capture of the corresponding set of media data 210 and may be created using the primary hashing algorithm for the set of media data 210. If created by the capture system 105, the capture system 105 may transmit the user profile hash 320 to the certification system 110. The certification system 110 may store the user profile hash 320 as part of the first ledger entry 310-*a*. Thus, at least one ledger entry 310 (e.g., the first ledger entry 310-*a*) for the set of media data 210 may be based on user profile data for a user or device of the capture system 105.

The certification system 110 may also create, as part of each ledger entry 310, a blockchain hash 325. In general, the blockchain hash 325 for a given ledger entry 310 may be a hash of all other contents of the given ledger entry 310 as well as the blockchain hash 325 for a preceding ledger entry 310. In the case of the first ledger entry 310-*a*, there may not be a preceding ledger entry 310, and thus, blockchain hash 325-*a* may be a hash of all other contents of first ledger entry 310-*a*. In the case of the second ledger entry 310-*b*, blockchain hash 325-*b* may be a hash of all other contents of the second ledger entry 310-*b* plus blockchain hash 325-*a*.

The certification system 110 may create blockchain hashes 325 using a hashing algorithm that is distinct from any primary hashing algorithm (that is, not included among the set of candidate primary hashing algorithms) and also distinct from the alternative hashing algorithm used for lookup hashes 230. The hashing algorithm used to create blockchain hashes 325 may be referred to as a blockchain hashing algorithm. The certification system 110 may not share the blockchain hashing algorithm outside of the certification system 110 (e.g., may not share the blockchain hashing algorithm with the capture system 105 or the validation system 120). Creating blockchain hashes 325 using a hashing algorithm unknown outside of the certification system 110 may provide a technical solution that enhances the security of the immutable ledger 305 stored by the certification system 110. For example, even if a primary hashing algorithm is compromised, or even if a primary hashing algorithm becomes undesirably known, the contents of the immutable ledger may still be verified against altered versions thereof based on the blockchain hashing algorithm (e.g., whether relevant data, when hashed using the blockchain hashing algorithm, matches a corresponding blockchain hash 325).

In some cases, the second ledger entry 310-b may relate to an initiation event 205 for the corresponding set of media data 210. For example, the second ledger entry 310-b may include lookup hash 230-b, which may be created by the certification system 110 using the alternative hashing algorithm or created by the capture system 105 using the alternative hashing algorithm and transmitted by the capture system 105 to the certification system 110. In the case of a ledger entry 310 for an initiation event 205, the lookup hash 230 (e.g., lookup hash 230-b) may be a hash of the corresponding initiation metadata 220 that is created using the alternative hashing algorithm (and thus is distinct from the corresponding initiation metadata hash 222, which may be created using the primary hashing algorithm). The second ledger entry 310-b may also include primary hashing algorithm indication 315. Additionally, the second ledger entry 310-b may include initiation metadata 220 and an initiation metadata hash 222, which may be received by the certification system 110 from the capture system 105. In some cases, the second ledger entry 310-b may include certification system hash 330-b. In some cases, certification system hash 330-b may be a hash of initiation metadata hash 222 and may be created by the certification system 110 using the blockchain hashing algorithm. In some cases, certification system hash 330-b may be a receipt (e.g., a receipt timestamp or identifier, or a hash of a timestamp of receipt or other receipt identifier). Though not shown in the example of FIG. 2, in some cases all ledger entries 310 may include a certification system hash 330 (e.g., ledger entry 310-a may include a certification system hash 330-a, which may be based on the user profile data associated with ledger entry 310-a). The second ledger entry 310-b may further include blockchain hash 325-b, which may be a hash of all other contents of second ledger entry 310-b plus blockchain hash 325-a and may be created by the certification system 110 using the blockchain hashing algorithm. In some cases, the certification system 110 may additionally or alternatively store metadata—initiation metadata 220 or any other type of metadata described herein—in an intermediary system or otherwise independent of the immutable ledger 305, which may support enhanced efficiency in retrieving metadata and providing metadata to a validation system 120.

In some cases, the certification system 110 may include alternative or additional blockchain-type hashes in a ledger entry 310. For example, in the alternative or in addition to a blockchain hash 325, the certification system 110 may create a blockchain based on subset metadata 234 or just the subset media hash 232 for a given entry. Thus, an immutable ledger 305 may include one or more blockchains, each block of the blockchain corresponding to some or all of the of the content of a corresponding ledger entry 310. Any blockchain-type hash included in a ledger entry may be created and subsequently utilized in accordance with the teachings herein regarding blockchain hashes 325.

The ledger entries 310-c through 310-f may each respectively correspond to a subset of media data 212 for the set of media data 210. It is to be understood that a set of media data 210 may have any number of subsets of media data 212, and thus an immutable ledger 305 may include any number of corresponding ledger entries 310. The fourth ledger entry 310-d may be a representative example of ledger entries 310-c through 310-f, and thus of a ledger entry 310 corresponding to a subset of media data 212. The fourth ledger entry 310-d may include one or more of a corresponding lookup hash 230-d, which may be received from the capture system 105, and a primary hashing algorithm indication 315. The fourth ledger entry 310-d may also include subset metadata 234-d, subset media hash 232-d, and subset metadata hash 236-d, each of which may be received from the capture system 105. In some cases, the fourth ledger entry 310-d may further include subset combo hash 240-d, additionally or as an alternative to subset metadata hash 236-d, if created by and received from the capture system 105. In some cases, the fourth ledger entry 310-d may further include certification system hash 330-d, which may be a hash of subset metadata hash 236-d or subset combo hash 240-d and may be created by the certification system 110 using the blockchain hashing algorithm. The fourth ledger entry 310-d may further include blockchain hash 325-d, which may be a hash of all other contents of the fourth ledger entry 310-d plus blockchain hash 325-c (not shown, but included in third ledger entry 310-c) and may be created by the certification system 110 using the blockchain hashing algorithm.

In some cases, the immutable ledger 305 may include a final ledger entry 310-g based on a termination event 215 for the corresponding set of media data 210. In some cases, the certification system 110 may create a lookup hash 230-g, which may serve as a unique identifier of the final ledger entry 310-g, by hashing some or all of the global metadata 252 for the set of media data 210 using the alternative hashing algorithm. In some cases, the capture system 105 may create the lookup hash 230-g by hashing some or all of the global metadata 252 for the set of media data 210 and may transmit the lookup hash 230-g to the certification system 110—the certification system 110 may then store the lookup hash 230-g received from the capture system 105. The final ledger entry 310-g may also include a primary hashing algorithm indication 315. Additionally, the final ledger entry 310-g may include global metadata 252, global media hash 250, and global metadata hash 254, each of which may be received from the capture system 105. In some cases, the final ledger entry 310-g may include global combo hash 258, additionally or as an alternative to global metadata hash 254, if created by and received from the capture system 105. In some cases, the final ledger entry 310-g may further include certification system hash 330-g, which may be a hash of global metadata hash 254 or global combo hash 258 and may be created by the certification system 110 using the blockchain hashing algorithm. The final ledger entry 310-g may further include blockchain hash 325-g, which may be a hash of all other contents of the final ledger entry 310-g plus blockchain hash 325-f (not shown, but included in the penultimate ledger entry 310-f) and may be created by the certification system 110 using the blockchain hashing algorithm.

In some cases, the certification system 110 may identify (e.g., capture, determine, calculate, or otherwise create) additional metadata for the set of media data 210. The certification system 110 may add such additional metadata to (e.g., incorporate with) metadata received from the capture system 105, such that metadata included in the immutable ledger may (and corresponding hashes may also be based on) metadata identified by the certification system 110. For example, the certification system 110 may identify user profile data associated with the set of media data 210 (e.g., by exchanging one or more messages with a profile management system 125) in addition or in the alternative to the capture system 105 identifying such metadata. As another example, the certification system 110 generate one or more timestamps indicating when the certification system 110 received one or more aspects of the data received from the capture system 105. In some cases, the certification system 110 may generate one or more indications of a latency between when one or more aspects of the data related to the set of media data 210 (e.g., related to a subset of media data 212 were captured or otherwise received by the capture system 105 (e.g., based on data received from the capture system 105) and when such aspects of the data were received by the certification system 110.

While one immutable ledger 305 is illustrated in the example FIG. 3 for ease of description and clarity, it is to be understood that certification system 110 may store any number of immutable ledgers 305 respectively corresponding to any number of sets of media data 210. Further, it is to be understood that an immutable ledger 305 may, in some cases, include only a subset of the ledger entries illustrated in the example shown in FIG. 3 (e.g., may include only ledger entries 310 corresponding to subsets of media data 212, such as, for example, only ledger entries 310-*c* through 310-*f*, or may include on ledger entries 310-*b* through 310-*g*).

It is also to be understood that the certification system 110 may span any number of logically or physically distinct devices and that, in some cases, the certification system 110 may replicate a single immutable ledger 305 at each of any number of logically or physically distinct devices. Thus, the immutable ledger 305 may in some cases be a distributed ledger. Such replication may further enhance the robustness and security of the immutable ledger 305 and the certification system 110, as polling techniques may be used as described herein to confirm the validity of the contents of a given ledger entry 310. Where the certification system 110 spans multiple logically or physically distinct devices, the distinct devices may be commonly owned by a single entity (e.g., a government entity such as a police department or judicial body or a private entity such as a provider of trusted media systems or a surveillance company) or may have distinct ownership.

Figure 4A:
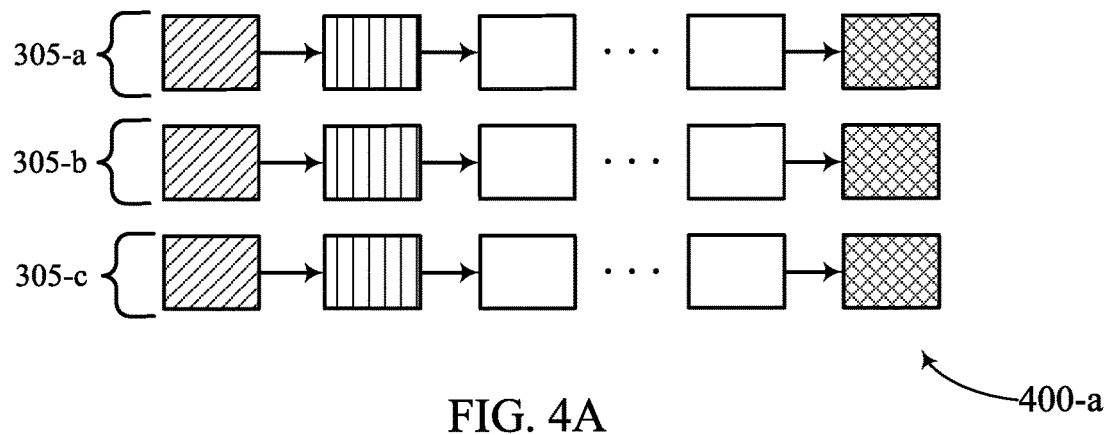
FIGS. 4A, 4B, and 4C illustrate additional examples of immutable ledgers that support identifying altered media data in accordance with aspects of the present disclosure.
Figure 4B:
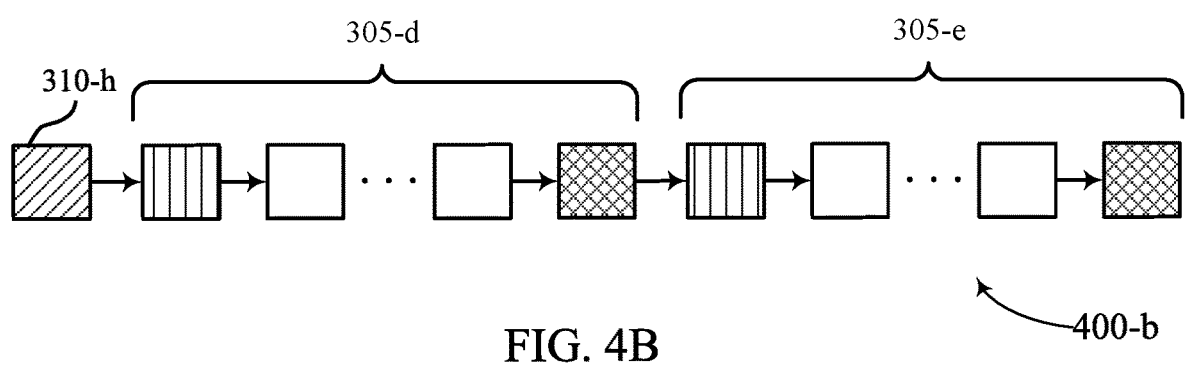
Figure 4C:
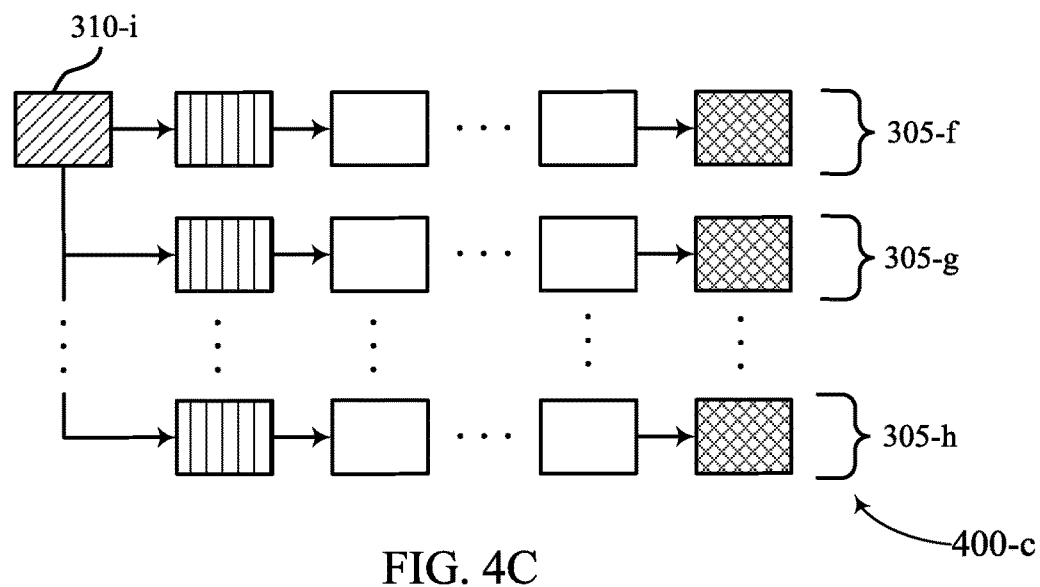

FIGS. 4A-4C illustrate various immutable ledger configurations 400 that support identifying altered media data in accordance with aspects of the present disclosure. Immutable ledger configurations 400 may be implemented by a certification system 110 as described with reference to FIG. 1.

Referring now to FIG. 4A, a certification system 110 may implement immutable ledger configuration 400-*a*. In immutable ledger configuration 400-*a*, each immutable ledger 305 may be completely independent of each other immutable ledger 305. Thus, each immutable ledger 305 in immutable ledger configuration 400-*a* may be referred to as a standalone immutable ledger 305.

In some cases, each standalone immutable ledger 305 may have a first ledger entry 310 based on a same type of data. For example, each standalone immutable ledger 305 may have a first ledger entry 310 based on user profile data associated with the corresponding set of media data 210 (e.g., as in the example of ledger entry 310-*a* described with reference to FIG. 3). As another example (not shown), each standalone immutable ledger 305 may have a first ledger entry 310 based on an initiation event 205 associated with the corresponding set of media data 210 (e.g., as in the example of ledger entry 310-*b* described with reference to FIG. 3). And as another example (not shown), each standalone immutable ledger 305 may have a first ledger entry 310 based on a first subset of media data 212 for the corresponding set of media data 210 (e.g., as in the example of ledger entry 310-*c* described with reference to FIG. 3).

In some cases, each standalone immutable ledger 305 may have a final ledger entry 310 based on a same type of data. For example, each standalone immutable ledger 305 may have a final ledger entry 310 based on a termination event 215 associated with the corresponding set of media data 210 (e.g., as in the example of ledger entry 310-*g* described with reference to FIG. 3). And as another example (not shown), each standalone immutable ledger 305 may have a first ledger entry 310 based on a final subset of media data 212 for the corresponding set of media data 210 (e.g., as in the example of ledger entry 310-*f* described with reference to FIG. 3).

Though three immutable ledgers 305 are in the example shown in FIG. 4A, it is to be understood that immutable ledger configuration 400-*a* may support any number of immutable ledgers 305. Also, though each immutable ledger 305 in the example shown in FIG. 4A is of a same length, it is to be understood that immutable ledger configuration 400-*a* may support immutable ledgers 305 having any length and any number of varying lengths.

Referring now to FIG. 4B, a certification system 110 may implement immutable ledger configuration 400-*b*. In immutable ledger configuration 400-*b*, each immutable ledger 305 associated with a common user profile (e.g., a common private/public key pair) may be linked. Thus, immutable ledgers 305 in immutable ledger configuration 400-*b* may be referred to as linked immutable ledgers 305.

Where the certification system 110 implements immutable ledger configuration 400-*b*, the certification system 110 may create a starter ledger entry 310-*h* for each user profile, and may subsequently link each new immutable ledger 305 associated with the user profile. For example, the immutable ledger 305-*d* may be for a first set of media data 210 associated with the user profile, and the certification system 110 may create a blockchain hash 325 included in the first ledger entry 310 of immutable ledger 305-*d* based at least in part on content of the starter ledger entry 310-*h* (e.g., based at least in part on a blockchain hash 325 included in starter ledger entry 310-*h*). Similarly, immutable ledger 305-*e* may be for a second set of media data 210 associated with the user profile, and the certification system 110 may create a blockchain hash 325 included in the first ledger entry 310 of immutable ledger 305-*e* based at least in part on content of the final ledger entry 310 of immutable ledger 305-*d* (e.g., based at least in part on a blockchain hash 325 included in the final ledger entry 310 of immutable ledger 305-*d*).

In some cases, each linked immutable ledger 305 may have a first ledger entry 310 based on a same type of data. For example, each linked immutable ledger 305 may have a first ledger entry 310 based on an initiation event 205 associated with the corresponding set of media data 210 (e.g., as in the example of ledger entry 310-*b* described with reference to FIG. 3). As another example (not shown), each linked immutable ledger 305 may have a first ledger entry 310 based on a first subset of media data 212 for the corresponding set of media data 210 (e.g., as in the example of ledger entry 310-*c* described with reference to FIG. 3).

In some cases, each linked immutable ledger 305 may have a final ledger entry 310 based on a same type of data. For example, each linked immutable ledger 305 may have a final ledger entry 310 based on a termination event 215 associated with the corresponding set of media data 210 (e.g., as in the example of ledger entry 310-*g* described with reference to FIG. 3). And as another example (not shown), each linked immutable ledger 305 may have a final ledger entry 310 based on a final subset of media data 212 for the corresponding set of media data 210 (e.g., as in the example of ledger entry 310-f described with reference to FIG. 3).

Though two linked immutable ledgers 305 associated with one user profile are in the example shown in FIG. 4B, it is to be understood that immutable ledger configuration 400-b may support any number of linked immutable ledgers 305, and sets of one or more linked immutable ledgers 305 for any number of user profiles. Also, though each linked immutable ledger 305 in the example shown in FIG. 4B is of a same length, it is to be understood that immutable ledger configuration 400-b may support immutable ledgers 305 having any length and any number of varying lengths.

Referring now to FIG. 4C, a certification system 110 may implement immutable ledger configuration 400-c. In immutable ledger configuration 400-c, each immutable ledger 305 associated with a common user profile (e.g., a common private/public key pair) may be linked to a starter ledger entry 310-i for the user profile. However, rather than being linked in a head-to-tail fashion as in the example of immutable ledger configuration 400-b, immutable ledgers 305 in immutable ledger configuration 400-c associated with a common user profile may be independent of one another apart from being linked to the same starter ledger entry 310-i. Immutable ledgers 305 in immutable ledger configuration 400-c may be referred to as clothesline immutable ledgers 305.

Where a certification system 110 implements immutable ledger configuration 400-c, the certification system 110 may create a starter ledger entry 310-i for each user profile, and the certification system 110 may subsequently link each new immutable ledger 305 associated with the user profile to the starter ledger entry 310-i but not to any each other. For example, immutable ledger 305-f may be for a first set of media data 210 associated with the user profile, and the certification system 110 may create a blockchain hash 325 included in the first ledger entry 310 of immutable ledger 305-f based at least in part on content of starter ledger entry 310-i (e.g., based at least in part on a blockchain hash 325 included in starter ledger entry 310-i). Similarly, immutable ledger 305-g may be for a second set of media data 210 associated with the user profile, and the certification system 110 may create a blockchain hash 325 included in the first ledger entry 310 of immutable ledger 305-g based at least in part on content of starter ledger entry 310-i (e.g., based at least in part on a blockchain hash 325 included in starter ledger entry 310-i).

In some cases, each clothesline immutable ledger 305 may have a first ledger entry 310 based on a same type of data. For example, each clothesline immutable ledger 305 may have a first ledger entry 310 based on an initiation event 205 associated with the corresponding set of media data 210 (e.g., as in the example of ledger entry 310-b described with reference to FIG. 3). And as another example (not shown), each clothesline immutable ledger 305 may have a first ledger entry 310 based on a first subset of media data 212 for the corresponding set of media data 210 (e.g., as in the example of ledger entry 310-c described with reference to FIG. 3).

In some cases, each clothesline immutable ledger 305 may have a final ledger entry 310 based on a same type of data. For example, each linked immutable ledger 305 may have a final ledger entry 310 based on a termination event 215 associated with the corresponding set of media data 210 (e.g., as in the example of ledger entry 310-g described with reference to FIG. 3). And as another example (not shown), each clothesline immutable ledger 305 may have a final ledger entry 310 based on a final subset of media data 212 for the corresponding set of media data 210 (e.g., as in the example of ledger entry 310-f described with reference to FIG. 3).

It is to be understood that immutable ledger configuration 400-c may support any number of clothesline immutable ledgers 305, and sets of one or more clothesline immutable ledgers for any number of user profiles. Also, though each linked immutable ledger 305 in the example shown in FIG. 4C is of a same length, it is to be understood that immutable ledger configuration 400-c may support immutable ledgers 305 having any length and any number of varying lengths.

It is to be understood that the certification system 110 may in some cases use one or more immutable ledger configurations other than the examples shown in FIGS. 4A-4C. For example, in some cases, the certification system 110 may create and maintain one immutable ledger 305 for all sets of media data 210 captured by all capture systems 105, regardless of the associated user profile. The certification system 110 may link all ledger entries 310 created in real time, such that ledger entries associated with different user profiles (or different capture systems 105) may be intermixed within the immutable ledger 305. In such cases, the certification system 110 may identify each ledger entry 310 independently (e.g., based on a corresponding lookup hash 230), as all ledger entries 310 may be part of the same global immutable ledger 305. In some cases, a ledger entry 310 may include a pointer to other ledger entries associated with a same set of media data 210 or with other ledger entries associated with a same user profile.

Figure 5:
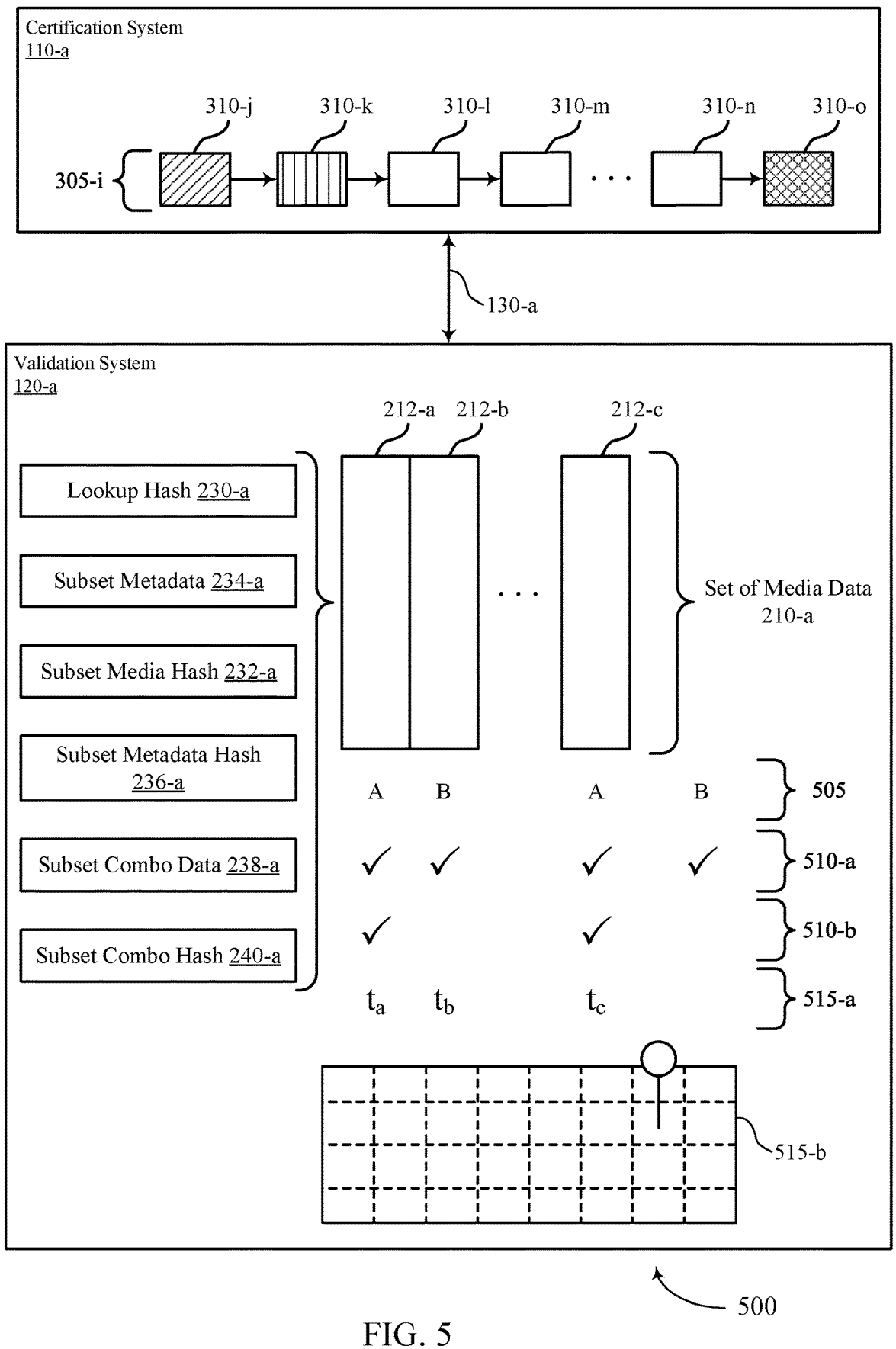
FIG. 5 illustrates an example of a process for validating media data that supports identifying altered media data in accordance with aspects of the present disclosure.

FIG. 5 illustrates an example of a validation process 500 that supports identifying altered media data in accordance with aspects of the present disclosure. In some examples, the validation process 500 may be implemented by a certification system 110-a and a validation system 120-a, which may be examples of a certification system 110 and a validation system 120 as described with reference to FIG. 1. The certification system 110-a and the validation system 120-a may be communicatively coupled by a communications link 130-a, which may comprise aspects of a network 130 as described with reference to FIG. 1.

The validation system 120-a may receive a set of media data 210-a. In some cases, a user of the validation system 120-a may upload or import the set of media data 210-a into the validation system 120-a Additionally or alternatively, the validation system 120-a may receive the set of media data 210-a from a capture system 105 via a communications link between the validation system 120-a and the capture system 105 (e.g., via a communications link included in network 130). In some cases, the validation system 120-a may receive the set of media data 210-a by way of a distribution system 115 (e.g., via a peer-to-peer or app-to-app transfer from capture system 105 to validation system 120-a that is facilitated by a distribution system 115). In some cases, the set of media data 210-a may comprise only a portion a set of media data 210 as captured by a capture system 105 (e.g., the capture system 105 may have captured a video, and the set of media data 210-a may be only an excerpt of the video).

The validation system 120-a may identify one or more subsets of media data 212 included in the set of media data 210-a. For example, the validation system 120-a may be preconfigured with information regarding the predefined duration (e.g., 15 second intervals or intervals of some other duration) or portion size (e.g., X frames, Y audio samples, Z pixels of an image, or like portion) used by capture systems 105 to segment sets of media data 210 into subsets of media data 212. In some cases, the duration or amount of media data in a subset of media data 212 may be configured by the certification system 110 on a periodic or ad hoc basis and may thus change over time. If the size of the set of media data 210-a is smaller than the predefined duration or portion size, the validation system 120-a may identify only one subset of media data 212 included in the set of media data 210-a (e.g., the only one subset of media data 212 may be coextensive with the set of media data 210-a). If the size of the set of media data 210-a is larger than the predefined duration or portion size, as in the example illustrated in FIG. 5, the validation system 120-a may identify multiple subsets of media data 212 included in the set of media data 210-a. In some cases, the validation system 120-a may identify one or more subsets of media data 212 included in set of media data 210-a based on a header file for set of media data 210-a that may be received by the validation system 120-a.

The validation system 120-a may identify a first subset of media data 212-a included in the set of media data 210-a. If the size of the set of media data 210-a is smaller than the predefined duration or portion size, validation system 120 may identify the only one subset of media data 212 as the first subset of media data 212-a. If the size of the set of media data 210-a is larger than the predefined duration or portion size, as in the example illustrated in FIG. 5, the validation system 120-a may identify the first subset of media data 212-a according to a predefined set of rules (e.g., a temporally first subset of media data 212 in the case of audio or video data, or a subset of media data 212 corresponding to a predefined position, such as a corner, in the case of image data).

Based on the first subset of media data 212-a, the validation system 120-a may create a corresponding lookup hash 230-a. For example, the validation system 120-a may create the lookup hash 230-a using an alternative, globally-known hashing algorithm as described herein. The validation system 120-a may transmit the lookup hash 230-a to the certification system 110-a, and the certification system 110-a may determine whether a ledger entry 310 corresponding to the first subset of media data 212-a exists based on the lookup hash 230-a. For example, the certification system 110-a may use lookup hashes 230 as ledger entry identifiers, and the certification system 110-a may determine whether a ledger entry 310 corresponding to the first subset of media data 212-a exists by determining whether there exists a ledger entry 310 with an identifier (e.g., a lookup hash 230 included in the ledger entry 310) identical to the lookup hash 230-a. In some cases, along with the lookup hash 230-a, the validation system 120 may transmit to the certification system 110 an indication of a number of subsets of media data 212 included in the set of media data 210—that is, an indication of how many subsets of media data 212 are included in the set of media data 210—or an indication of a duration or size of the set of media data 210, from which the certification system 110-a may determine the number of subsets of media data 212 included in the set of media data 210.

In some cases, the validation system 120-a create a corresponding lookup hash 230 for any number of subsets 212 and engage in a like routine (transmitting the lookup hash 230 to the certification system 110 for determination of whether a corresponding subset of media data 212 and ledger entry 310 (and thus ledger 305) exists) for each lookup hash 230 created. For example, as described herein, a capture system 105 may create (in conjunction with the certification system 110) a ledger entry 310 only for some subsets 212 (e.g., every eighth subset 212), and thus validation system 120 may engage in a trial and error procedure involving multiple lookup hashes to determine whether a corresponding ledger 305 exists.

In some cases, the validation system 120-a or the certification system 110-a may identify the set of media data 210-a or the corresponding immutable ledger 305-i based on other information included in a file that includes the set of media data 210-a, such as information included in a header of such a file. Such other information may be a unique identifier, metadata, or a hash (e.g., the lookup hash 230-a or some other type of hash).

If the certification system 110-a determines that no ledger entry 310 corresponding to the first subset of media data 212-a exists, the certification system 110-a may transmit to the validation system 120-a an indication that no immutable ledger 305 corresponding to the set of media data 210-a exists. Where no immutable ledger 305 corresponding to the set of media data 210-a exists, the validation system 120-a and the certification system 110-a may be unable to validate the set of media data 210-a. In such cases, based on receiving the indication that no immutable ledger 305 corresponding to the set of media data 210-a exists, the validation system 120-a may notify a user that the set of media data 210-a cannot be validated (e.g., by audibly or visibly presenting a notification to the user via display or speaker hardware included in or coupled with the validation system 120-a).

In the example illustrated in FIG. 5, the certification system 110-a may determine that a ledger entry 310-1 corresponds to the first subset of media data 212-a, and thus that immutable ledger 305-i corresponds to set of media data 210-a. Based on determining that the ledger entry 310-1 corresponding to first subset of media data 212-a exists, the certification system 110-a may evaluate a blockchain hash 325 included in the corresponding ledger entry 310-1 (e.g., determine whether the blockchain hash 325 included in the corresponding ledger entry 310-1 is valid). In some cases, the certification system 110-a may evaluate the blockchain hash 325 included in the corresponding ledger entry 310-1 at least in part by hashing the other contents of the corresponding ledger entry 310-1 plus the blockchain hash 325 included in another ledger entry 310 within the corresponding immutable ledger 305 (e.g., a blockchain hash 325 included in immediately prior ledger entry 310-k). Additionally or alternatively, in some cases the certification system 110-a may evaluate the blockchain hash 325 included in the corresponding ledger entry 310-1 at least in part by polling a plurality of replicas of immutable ledger 305-i and determining whether the plurality of replicas are unanimous with respect to the blockchain hash 325 included in corresponding ledger entry 310-1. In addition or as an alternative to evaluating the blockchain hash 325, in some cases the certification system 110-a may evaluate a certification system hash 330 included in in corresponding ledger entry 310-1, and it is to be understood that all validation techniques described herein related to a blockchain hash 325 may additionally or alternatively apply to a certification system hash 330.

If the certification system 110-a determines that the blockchain hash 325 included in the ledger entry 310-1 corresponding to first subset of media data 212-a is not valid, the certification system 110-a may transmit to the validation system 120-a an indication that the corresponding ledger entry 310-1 is not valid. In such cases, based on receiving the indication that the corresponding ledger entry 310-1 is not valid, the validation system 120-a may notify a user that the ledger entry 310-1 or the immutable ledger 305-i corresponding to the first subset of media data 212-a is not valid, and that the set of media data 210-a therefore cannot be validated (e.g., by audibly or visibly presenting a notification to the user via display or speaker hardware included in or coupled with the validation system 120-a).

If the certification system 110-a determines that the blockchain hash 325 included in the corresponding ledger entry 310-1 is valid, the certification system 110-a may transmit to the validation system 120-a an indication of the validity of the corresponding ledger entry 310-1. In some cases, the indication of the validity of the corresponding ledger entry 310-1 may be implicit. For example, the certification system 110-a may implicitly indicate to the validation system 120-a that the corresponding ledger entry 310-1 is valid by transmitting to the validation system 120-a certain data from the corresponding ledger entry 310-1. For example, the certification system 110-a may transmit to the validation system 120-a one or more of a primary hashing algorithm indication 315, subset metadata 234, subset media hash 232, subset metadata hash 236, or subset combo hash 240 included in the corresponding ledger entry 310-1. The validation system 120-a may treat any ledger entry data received from the certification system 110-a as a trusted version thereof (e.g., the validation system 120-a may treat a subset media hash 232 received from the certification system 110-a as a trusted subset media hash 232).

In some cases, validation system 120-a may receive subset metadata 234 independent of the certification system 110-a (e.g., from a capture system 105, via a distribution system 115, included in a header file associated with the set of media data 210-a, or as a separate file that may be associated with the set of media data 210-a). In such cases, validation system 120-a may not receive subset metadata 234 or a corresponding subset metadata hash 236, but may otherwise validate the subset metadata 234 in accordance with the techniques described herein (e.g., creating of a candidate subset metadata hash 236 based on the subset metadata 234 and local or remote comparison with a trusted version thereof).

In some examples, for any trusted version of a subset media hash 232, subset metadata hash 236, or subset combo hash 240 received from the certification system 110-a, the validation system 120-a may use the indicated primary hashing algorithm to create its own candidate version thereof, which the validation system 120-a may then compare with the corresponding trusted version. Such examples may be referred to as local validation examples because comparisons of candidate hashes with trusted versions thereof may be performed by the validation system 120-a.

For example, the validation system 120-a may hash the first subset of media data 212-a using the indicated primary hashing algorithm to create a candidate subset media hash 232-a, may compare the candidate subset media hash 232-a with a trusted version thereof received from the certification system 110-a, and may determine that the first subset of media data 212-a is valid only if the candidate subset media hash 232-a matches the trusted version thereof. Additionally, the validation system 120-a may hash the subset metadata 234-a using the indicated primary hashing algorithm to create a candidate subset metadata hash 236-a, may compare the candidate subset metadata hash 236-a with a trusted version thereof received from the certification system 110-a, and may determine that the first subset of media data 212-a is valid only if the candidate subset metadata hash 236-a matches the trusted version thereof. Alternatively or additionally, in some cases the validation system 120-a may combine the subset metadata 234-a with the first subset of media data 212-a to create corresponding subset combo data 238-a, may hash the subset combo data 238-a using the indicated primary hashing algorithm to create a candidate subset combo hash 240-a, may compare the candidate subset combo hash 240-a with a trusted version thereof received from the certification system 110-a, and may determine that the first subset of media data 212-a is valid only if the candidate subset combo hash 240-a matches the trusted version thereof.

In some examples, the validation system 120-a may use the indicated primary hashing algorithm to create its own version of a subset media hash 232, subset metadata hash 236, or subset combo hash 240, which the validation system 120-a may then send to the certification system 110-a in order for the certification system 110-a to compare with the corresponding trusted version. Such examples may be referred to as remote validation examples, because comparisons of hashes created by the validation system 120-a with trusted versions thereof may be performed by the certification system 110-a, and thus remotely from validation system 120. In some remote validation examples, the validation system 120-a may receive from certification system 110 only one or more of a primary hashing algorithm indication 315 or subset metadata 234, exclusive of any trusted versions of a subset media hash 232, subset metadata hash 236, or subset combo hash 240.

For example, the validation system 120-a may hash the first subset of media data 212-a using the indicated primary hashing algorithm to create a candidate subset media hash 232-a and transmit the candidate subset media hash 232-a to the certification system 110-a, which may then compare the candidate subset media hash 232-a with a trusted version thereof already stored by the certification system 110-a. The certification system 110-a may transmit to the validation system 120-a an indication of whether the candidate subset media hash 232-a matches the trusted version thereof, which may be referred to as an evaluation result. The validation system 120-a may determine that the first subset of media data 212-a is valid only if the candidate subset media hash 232-a matches the trusted version thereof. Additionally, the validation system 120-a may hash the subset metadata 234-a using the indicated primary hashing algorithm to create a candidate subset metadata hash 236-a and transmit the candidate subset metadata hash 236-a to the certification system 110-a, which may then compare the candidate subset metadata hash 236-a with a trusted version thereof already stored by the certification system 110-a. The certification system 110-a may transmit to the validation system 120-a an indication of whether the candidate subset metadata hash 236-a matches the trusted version thereof, which may be referred to as an evaluation result. In some cases, the validation system 120-a may determine that the first subset of media data 212-a is valid only if the candidate subset metadata hash 236-a matches the trusted version thereof. Additionally or alternatively, the validation system 120-a may combine the subset metadata 234-a with the first subset of media data 212-a to create subset combo data 238-a, may hash the subset combo data 238-a using the indicated primary hashing algorithm to create a candidate subset combo hash 240-a, and may transmit the candidate subset combo hash 240-a to the certification system 110-a, which may then compare the candidate subset combo hash 240-a with a trusted version thereof already stored by the certification system 110-a. The certification system 110-a may transmit to the validation system 120-a an indication of whether the candidate subset combo hash 240-*a* matches the trusted version thereof, which may be referred to as an evaluation result. The validation system 120-*a* may determine that the first subset of media data 212-*a* is valid only if the candidate subset combo hash 240-*a* matches the trusted version thereof.

The validation system 120-*a* and certification system 110 may repeat a validation process—either a local validation example or a remote validation example—for each subset of media data 212 included in set of media data 210-*a*. Thus, for each subset of media data 212, either validation system 120 or certification system 110 may compare a candidate version of one or more of a subset media hash 232, subset metadata hash 236, or subset combo hash 240 with a trusted version thereof. In some cases, some subsets of media data 212 may be determined to be valid and others may be determined to be invalid. The validation system 120-*a* may continue attempting to validate each received subset of media data 212, or in other cases, may stop attempting to validate received subsets of media data 212 after a certain number (e.g., satisfying a threshold) are determined to be invalid.

In some cases, the validation process for subsets of media data 212 may occur concurrently with the validation system 120-*a* presenting the set of media data 210-*a* (e.g., playing the video or audio data, or displaying the image data). For example, upon completion of the validation process for first subset of media data 212-*a*, the validation system 120-*a* may present to a user first subset of media data 212-*a*, and the validation process for second subset of media data 212-*b* may occur concurrently with the validation system 120-*a* presenting first subset of media data 212-*a*—thus, validation of one subset of media data 212 may occur concurrent with presentation of at least one other subset of media data 212. In other cases, the validation system 120-*a* and the certification system 110-*a* may complete the validation process for each subset of media data 212, then the validation system 120-*a* may begin presenting the set of media data 210-*a*.

In some cases, the validation system 120-*a* and the certification system 110-*a* may conduct a global validation process for set of media data 210-*a*, either as an alternative or in addition to conducting a validation process for each subset of media data 212 therein. For example, the validation system 120-*a* may hash the entire set of media data 210-*a* using the indicated primary hashing algorithm to create a candidate global media hash 250, may compare the candidate global media hash 250 with a trusted version thereof received from the certification system 110-*a*, and may determine that the set of media data 210-*a* is valid only if the candidate global media hash 250 matches the trusted version thereof. Additionally, the validation system 120-*a* may hash all received subset metadata 234 (or global metadata 252 received from certification system 110) using the indicated primary hashing algorithm to create a candidate global metadata hash 254, may compare the candidate global metadata hash 254 with a trusted version thereof received from certification system 110, and may determine that the set of media data 210-*a* is valid only if the candidate global metadata hash 254 matches the trusted version thereof. Additionally or alternatively, in some cases the validation system 120-*a* may combine the global metadata 252 with the set of media data 210-*a* to create corresponding global combo data 256, hash the global combo data 256 using the indicated primary hashing algorithm to create a candidate global combo hash 258, may compare the candidate global combo hash 258 with a trusted version thereof received from certification system 110, and may determine that the set of media data 210-*a* is valid only if the candidate subset combo hash 240-*a* matches the trusted version thereof.

As another example, the validation system 120-*a* may hash the entire set of media data 210-*a* using the indicated primary hashing algorithm to create a candidate global media hash 250 and transmit the candidate global media hash 250 to the certification system 110-*a*, which may then compare the candidate global media hash 250 with a trusted version thereof already stored by the certification system 110-*a*. The certification system 110-*a* may transmit to the validation system 120-*a* an indication of whether the candidate global media hash 250 matches the trusted version thereof, which may be referred to as an evaluation result. The validation system 120-*a* may determine that the set of media data 210-*a* is valid only if the candidate global media hash 250 matches the trusted version thereof. Additionally, the validation system 120-*a* may hash all received subset metadata 234 (or global metadata 252 received from certification system 110) using the indicated primary hashing algorithm to create a candidate global metadata hash 254 and transmit the candidate global metadata hash 254 to the certification system 110-*a*, which may then compare the candidate global metadata hash 254 with a trusted version thereof already stored by the certification system 110-*a*. The certification system 110-*a* may transmit to the validation system 120-*a* an indication of whether the candidate global metadata hash 254 matches the trusted version thereof, which may be referred to as an evaluation result. The validation system 120-*a* may determine that the set of media data 210-*a* is valid only if the candidate global metadata hash 254 matches the trusted version thereof. Additionally or alternatively, the validation system 120-*a* may combine all received subset metadata 234 (or global metadata 252 received from certification system 110) with the set of media data 210-*a* to create global combo data 256, hash the global combo data 256 using the indicated primary hashing algorithm to create a candidate global combo hash 258, and transmit the candidate global combo hash 258 to the certification system 110-*a*, which may then compare the candidate global combo hash 258 with a trusted version thereof already stored by the certification system 110-*a*. The certification system 110-*a* may transmit to the validation system 120-*a* an indication of whether the candidate global combo hash 258 matches the trusted version thereof, which may be referred to as an evaluation result. In some cases, the validation system 120-*a* may determine that the set of media data 210-*a* is valid only if the candidate global combo hash 258 matches the trusted version thereof.

The validation system 120-*a* may determine a level of validity of set of media data 210-*a* based on one or more comparisons of candidate version and trusted versions of hashes as described herein. In some cases, the validation system 120-*a* may further determine a level of validity of each subset of media data 212 within set of media data 210-*a* based on one or more comparisons of candidate version and trusted versions of hashes as described herein. In some cases, the level of validity may be binary (e.g., valid/invalid, pass/fail, etc.), with a first level of validity (e.g., valid) determined if each compared candidate version of a hash matches the trusted version thereof, and a second level of validity (e.g., invalid) determined if any compared candidate version of a hash does not match the trusted version thereof. In some cases, the level of validity of each subset of media data 212 may be binary, but the level of validity of set of media data 210-*a* as a whole may be non-binary (e.g., an A/B/C/D/F scale, a ten point scale etc.) and may, for example, be based on a weighted average or other blend of the level of validity of each subset of media data 212.

In some cases, the level of validity of each subset of media data 212 may be non-binary (and the level of validity of set of media data 210-*a* as a whole non-binary), and the level of validity of each subset of media data 212 may be based on one or more factors in addition to the hash comparisons described herein. For example, the validation system 120-*a* may also determine a level of validity of set of media data 210-*a* (or a subset of media data 212) based on associated metadata. As one example, the validation system 120-*a* may determine a level of validity of the set of media data 210-*a* (or a subset of media data 212) based on a presence or absence of one or more types of metadata. For example, the presence of a type of metadata (e.g., a presence of location data) may increase the level of validity, whereas the absence of the type of metadata may decrease the level of validity. Thus, the level of validity of each subset of media data 212 may in some cases be based on a quantity of associated metadata, as more associated metadata (e.g., more types of associated metadata), may increase the level of validity.

As another example, the validation system 120-*a* may determine a level of validity of set of media data 210-*a* (or a subset of media data 212) based on substantive content of one or more types of metadata, which may include the quality of one or more types of metadata. For example, user profile data may indicate a history of a user profile associated with the set of media data 210-*a*, and substantive aspects of such user profile data (e.g., number of associated sets of media data 210-*a*, longevity of user profile, etc.) may positively or negatively influence the determined level of validity. As another example, the validation system 120-*a* may determine a level of validity of the set of media data 210-*a* (or a subset of media data 212) based on variation or a lack thereof of one or more types of metadata across subsets of media data 212 (e.g., variation in sensor data, such as temperature data or location data), with less variation positively influencing the determined level of validity.

In some cases, determining a level of validity of set of media data 210-*a* (or a subset of media data 212) based on associated metadata may include determining the level of validity based on a latency between creation of the set of media data 210-*a* (or subset of media data 212) and creation of the corresponding immutable ledger 305 (or ledger entry 310). A lower latency may positively influence the determined level of validity, whereas a greater latency may negatively influence the determined level of validity.

In some cases, determining a level of validity of set of media data 210-*a* (or a subset of media data 212) based on associated metadata may include determining the level of validity based on a number or identity of additional devices (e.g., other capture systems 105) within a threshold distance of a capturing device (e.g., the capture system 105 for the set of media data 210-*a*) at a time associated with capturing the set of media data 210-*a*. An increased number of additional devices, or additional devices associated with user profiles having elevated trust indicia, may positively influence the determined level of validity, whereas fewer devices or additional devices associated with user profiles having low trust indicia may negatively influence the determined level of validity.

In some cases, determining a level of validity of set of media data 210-*a* (or a subset of media data 212) based on associated metadata may include determining the level of validity based on a quality of a type of metadata. For example, one type of metadata may be GPS data, and an accuracy of GPS metadata corresponding to a set of media data 210 may be determined (e.g., a certification system 110 may consult a database of GPS satellite locations at a time of capture, and may determine or otherwise ascertain a quality of the GPS data associated with the set of media data 210-*a*).

In some cases, determining a level of validity of set of media data 210-*a* (or a subset of media data 212) based on associated metadata may include determining the level of validity based on publicly available information. For example, the capture system 105 or the certification system 110-*a* may ascertain (e.g., via a network 130) the position of, speed of, distance to, or other data for GPS satellites at a time of capture, location data for the sun or moon or other celestial bodies, a world light map or related data, a time or other data for a world clock, or the address corresponding to a location indicated by location-related metadata captured by the capture system 105, or the identify of Wi-Fi networks available at a location indicated by location-related metadata captured by the capture system 105. Such publicly available information may be associated with the set of media data 210-*a* (or the subset of media data 212) as corresponding metadata. In some cases, the certification system 110-*a* may cross-check metadata received from the capture system 105 for consistency with such publicly available information and may store one or more flags indicative of any inconsistencies, which may later be used to determine the level of validity. In some cases, the certification system 110-*a* may transmit such publicly available metadata to the capture system 105 as part of a handshake procedure associated with (e.g., responsive to) an initiation event 205, and the capture system 105 may subsequently leverage such metadata in accordance with the metadata-related techniques described herein.

It is to be understood that, in some cases, the level of validity of the set of media data 210-*a* (or a subset of media data 212) may be determined by the certification system 110-*a* in accordance with the techniques described herein, and the certification system 110-*a* may transmit to the validation system 120-*a* an indication of the level of validity of the set of media data 210-*a* (or a subset of media data 212).

The validation system 120-*a* may present, to a user, via one or more of visible display or audio speaker included in the validation system 120-*a*, an indication of the level of validity of set of media data 210-*a* (or a subset of media data 212). For example, as in the example shown in FIG. 5, the validation system 120-*a* may display a trust score 505 for the set of media data 210-*a* as a whole and for each subset of media data 212 therein. In some cases, the validation system 120-*a* may present a trust score 505 for a subset of media data 212 concurrently with presenting the subset of media data 212. For example, the set of media data 210-*a* may be a video, and as the validation system 120-*a* plays each subset of media data 212 included in the received video, the validation system 120-*a* may present a corresponding trust score 505. Additionally or alternatively, the validation system 120-*a* may present a trust score 505 for the set of media data 210-*a* as a whole while presenting the set of media data 210-*a* or after having completed presenting set of media data 210-*a*.

In some cases, the validation system 120-*a* may also present, to a user, an indication of the presence or absence of metadata for the set of media data 210-*a* (or a subset of media data 212), or the substance of metadata for the set of media data 210-*a* (or a subset of media data 212). Thus, because a level of validity may be determined based on the presence or absence of metadata, or the substance of metadata, the validation system 120-*a* may in some cases present, to a user, an indication of one or more factors used in determining the level of validity (e.g., a factor in a trust score 505). For example, as in the example shown in FIG. 5, the validation system 120-*a* may display indicators of the presence or absence of different metadata types 510 for a subset of media data 212 or for the set of media data 210-*a* as a whole. Also as in the example shown in FIG. 5, the validation system 120-*a* may display the substance of metadata (e.g., latencies 515-*a* associated with a concurrently presented subset of media data 212, or location data (e.g., a map) 515-*b* corresponding to a concurrently presented subset of media data 212, which may reflect a location of a capture system 105 used to capture the operative subset of media data 212). It is to be understood that the substance of any other type of metadata may also be presented concurrently with presenting a corresponding subset of media data 212 (e.g., some the checkmark indicators in the example shown in FIG. 5 may indicate whether a latency between creating the corresponding subset of media data 212 and creating a corresponding ledger entry 310 is below a threshold latency).

Figure 6:
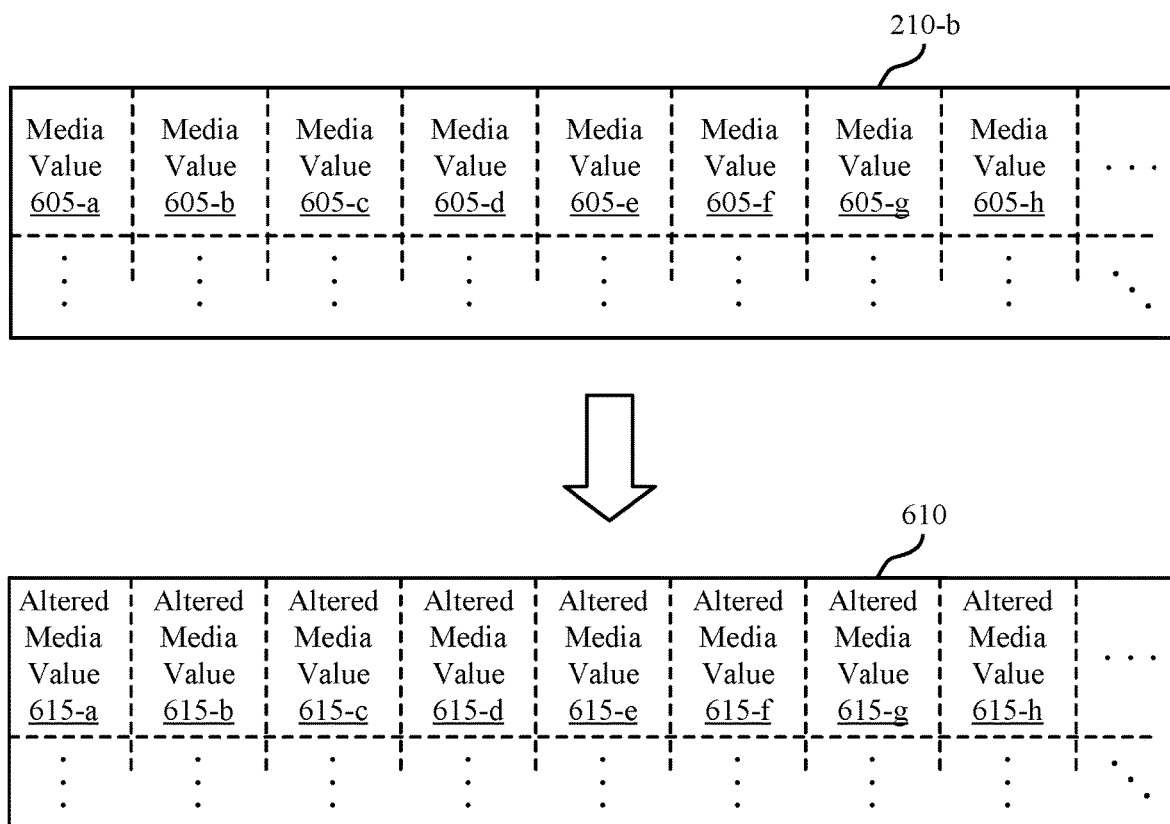
FIG. 6 illustrates an example of a steganographic process that supports identifying altered media data in accordance with aspects of the present disclosure.

FIG. 6 illustrates an example of a steganographic process 600 that supports identifying altered media data in accordance with aspects of the present disclosure. In some examples, the steganographic process 600-*a* may be implemented by a capture system 105, as described with reference to FIG. 1.

In the context of the systems and techniques described herein, one set of technical problems may relate to how to associate a set of media data 210 with corresponding metadata, including how to store the corresponding metadata and how to transmit (communicate) the corresponding metadata efficiently, reliably, and without sacrificing security (vulnerability to improper alteration). In some cases, the systems and techniques described herein may leverage one or more steganographic techniques (algorithms, processes) to provide technical solutions to such technical problems. For example, metadata may be encoded (embedded, written) into a corresponding set of media data 210 according to a steganographic algorithm and an encoding scheme, such that the steganographically altered media data may be decoded (e.g., based on the steganographic algorithm and the encoding scheme) to obtain the corresponding metadata. Thus, in essence, the set of media data 210 may itself be used to store the corresponding metadata. This may obviate any need for separate storage mechanisms or ledgers (e.g., blockchains) dedicated to metadata and thereby simplify storage of the set of media data and conserve related storage resources. This may also obviate any need to separately transmit metadata, as transmitting steganographically altered media data may simultaneously convey corresponding metadata, thereby simplifying communication and conserving communication resources with systems as described herein.

The steganographic process 600 is merely an example provided for illustrative purposes, and it is to be understood that systems in accordance with aspects of the present disclosure may utilize different steganographic processes, algorithms. and techniques of varying complexity and details.

A set of media data 210-*b*, which may be an example of a set of media data 210 as described herein (e.g., video, image, or audio data), may include any number of media values 605. A media value 605 may be a numerical representation of portion of a set of media data 210. For example, in the context of video or image data, a media value 605 may be a pixel value, where the video or image comprises any number of pixels, and thus the video or image data comprises any number of pixel values that each represent (e.g., the color of) a pixel. As another example, in the context of audio data, a media value 605 may be an audio sample value, wherein the audio comprises any number of audio samples, and thus the audio data comprises any number of audio sample values that each represent (e.g., the sound of) an audio sample. Each media value 605 may comprise, for example, a binary, hexadecimal, or other number.

An altered set of media data 610 may comprise a set of media 210 that has been altered according to a steganographic algorithm. Thus, the altered set of media data 210 may comprise any number of altered media values 615, each of which may comprise a media value 605 that has been processed (had a corresponding altered media value 615 determined) based on a steganographic algorithm. For an individual altered media value 615, the number of digits (e.g., bits, hexadecimal values, and the like) that are altered relative to (differ from) the corresponding digit of the corresponding media value 605 may be zero or any number greater than zero (that is, any non-negative number). For example, any number of media values 605 within a set of media data 210 may be processed based the steganographic algorithm, and thus corresponding altered media values 615 may be determined for each of the processed media values 605, but in some instances, the steganographic algorithm may determine one or more of the altered media values 615 as equal to the corresponding media value 605, but such one or more altered media values 615 may nevertheless be referred to herein as altered media values 615 due to the corresponding media values 605 having been subjected to (processed based on) the steganographic algorithm.

A steganographic algorithm may be used to create the altered set of media data 610 by altering media values 605 in set of media data 210-*b* such that a pattern of alteration encodes (embeds, conceals, injects, modulates) additional information (e.g., metadata for the set of media data 210-*b*) into the altered set of media data 610 (that is, such that the altered set of media data 610 is a carrier for the information encoded via the alteration pattern).

For example, as shown in FIG. 6, each media value 605 in the set of media data 210-*b* may comprise an eight-bit binary number. It is to be understood that this and any other numeric example herein is purely for the sake of illustrative clarity and is not limiting of any claim scope. A least significant bit (LSB) of eight media values 605-*a* through 605-*h* may be determined (processed, reevaluated, potentially altered, changed, or adjusted) based on a steganographic algorithm to encode additional information into corresponding altered media values 615-*a* through 615-*h*. For example, an American Standard Code for Information Interchange (ASCII) code may be encoded into corresponding altered media values 615-*a* through 615-*h*.

As one example, the ASCII code for the letter "J" may be 01001010, when expressed as an 8-bit binary number. Thus, to encode the letter "J" into the altered set of media data 610:

Media value 605-*a* may be processed based on a steganographic algorithm such that the LSB of corresponding altered media value 615-*a* is a zero (0).

Media value 605-*b* may be processed based on a steganographic algorithm such that the LSB of corresponding altered media value 615-*b* is a one (1).

Media value 605-*c* may be processed based on a steganographic algorithm such that the LSB of corresponding altered media value 615-*c* is a zero (0).

Media value 605-*d* may be processed based on a steganographic algorithm such that the LSB of corresponding altered media value 615-*d* is a zero (0).

Media value 605-*e* may be processed based on a steganographic algorithm such that the LSB of corresponding altered media value 615-*e* is a one (1).

Media value 605-*f* may be processed based on a steganographic algorithm such that the LSB of corresponding altered media value 615-*f* is a zero (0).

Media value 605-*g* may be processed based on a steganographic algorithm such that the LSB of corresponding altered media value 615-*g* is a one (1).

Media value 605-*h* may be processed based on a steganographic algorithm such that the LSB of corresponding altered media value 615-*h* is a zero (0).

Accordingly, the LSBs of altered media values 615-*a* through 615-*h* may encode (represent) the letter "J" by each corresponding to one digit of the corresponding ASCII code. Further, because the differences between the altered media values 615 and the corresponding media values 605 may be small, any changes may be imperceptible (e.g., invisible) to a user when the altered set of media data 610 is played by a media player.

Thus, as shown in the simplified example of steganographic process 600, media values 605 may be altered according to an alteration pattern (e.g., altering the LSBs of media values 605 based on an ASCII encoding scheme). Altering the media values 605 according to the alteration pattern may encode (embed) the additional information into corresponding altered media values 615 (and thus into the altered set of media data 610).

In some cases, such as for media values 605-*d* and 605-*h* and corresponding altered media values 615-*d* and 615-*h*, it may occur (e.g., by happenstance) that the LSB or other relevant digit values of an original media value 605 is equal to the appropriate LSB or other relevant digit values for the corresponding altered media value 615, and thus the corresponding altered media value 615 may be equal to (unchanged relative to) the original media value 605. Thus, altering an media value 605 according to an alteration pattern (e.g., based on a steganographic algorithm, such as altering the LSB of each of a set of altered media values 615) may include incrementing one or more digits of the media value 605 (e.g., from a zero (0) to a one (1)), decrementing one or more digits of the media value 605 (e.g., from a one (1) to a zero (0)), or leaving one or more digits of the media value 605 unchanged.

Altered media values 615 may represent additional information (information beyond the original set of media data 210) via any encoding scheme, such as an ASCII, Unicode, or other character encoding scheme. Thus, for example, one or more bits of the altered media values 615 may correspond to (e.g., encode) textual information that represents (indicates) the additional information, such as metadata for the set of media data 210. Also, any number of digits (e.g., bits) within an altered media value 615 may represent the additional information—e.g., the LSB, a group of bits that includes the LSB, the LSB of different groups (subsets) of digits within the altered media value 615, and so on. Thus, in some cases, an altered media value 615 may encode more than one bit of additional information.

In some cases, media values 605 may comprise one or more groups (subsets) of digits, as defined by a relevant media or other standard. As one example, where media values 605 are pixel values, the media values 605 may encode color information according to a red, green, blue (RGB) color model, and each media value 605 may comprise a first group of digits representing a red color value, a second group of digits representing a green color value, and a third group of digits representing a blue color value. The LSB or a subset of digits including the LSB within each of the three groups of digits may be altered according to a steganographic algorithm, and thus each altered media value 615 may encode three bits of additional information.

In some cases, such as an RGB color model, some or all of the digits in a media values 605 may be hexadecimal values each representing four bits. In such cases, incrementing or decrementing an LSB by one may be mathematically equivalent to incrementing or decrementing a hexadecimal value that includes the LSB by one. In some cases, an algorithm may specify incrementing an LSB or other digit value to obtain a desired altered media value 615 (if incrementing would obtain the desired digit value, meaning the digit value does not already equal the desired digit value by happenstance) unless incrementing the LSB or other digit value would cause the LSB or other digit value to "roll over" in accordance with a given numerical encoding scheme, in which case the algorithm my specify to decrement the LSB or other digit value. For example, in a hexadecimal scheme, the algorithm may increment as necessary unless the original media value 605 ends in an F, in which case the algorithm may decrement to obtain the desired altered media value 615.

In some cases, a set of media data 210 may be "flattened" or otherwise altered as part of a steganographic algorithm. For example, one or more (some or all) media values 605 in the set of media data 210 may be adjusted such that they each represent an even numeric value (e.g., have an LSB value of 0) or each represent an odd numeric value (e.g., have an LSB value of 1), then additional information may be encoded (written to) the altered set of media data 615 by incrementing or decrementing the media values 605 based on the steganographic algorithm and an encoding scheme (e.g., ASCII) for the additional information.

Metadata (e.g., any type of metadata as described or contemplated herein, such as initiation metadata 220, subset metadata 234, global metadata 252) for a set of media data 210 may be written into (encoded into) a corresponding altered set of media data 610 using steganographic techniques (e.g., based on a steganographic algorithm). For example, because a set of media data 210 may comprise a very large number of media values 605, a very large amount of metadata may be written into a corresponding altered set of media data 610.

In some cases, a capture system 105 may create an altered set of media data 610 that encodes metadata for a corresponding set of media data 210, then process the altered set of media data 610 in accordance with any technique it may otherwise apply to a set of media data 210. For example, the capture system 105 may hash subsets of the altered set of media data 610 and transmit the corresponding hashes to a certification system 110, which may receive the hashes and write the received hashes to an immutable ledger 305 (which may correspond to the set of media data 210, the altered set of media data 610, or both). Thus, the capture system 105 may alter the set of media data 210 according to an alteration pattern (e.g., apply a steganographic technique), and then create corresponding cryptographic representations (hashes)

after the alteration. In some cases, the capture system 105 may create the altered set of media data 610 (e.g., a subset thereof), and then hash the altered set of media data 610 (e.g., a subset thereof), and then output the hash of the altered set of media data 610 to the certification system 110. The certification system In some cases, the capture system 105 may create (generate) corresponding altered media values 615 as it creates (generates) media values 605—e.g., the capture system 105 may create corresponding altered subsets of media data as it captures subsets of media data 212. In other cases, the capture system 105 may create (generate) an altered set of media data 610 after capturing an entire set of media data 210.

A validation system 120 may receive an altered set of media data 610 and may process the altered set of media data 610 in accordance with any technique it may otherwise apply to a received set of media data 210. For example, the validation system 120 may hash subsets of the altered set of media data 610 and transmit the corresponding hashes (candidate hashes) to a certification system 110, so that the certification system 110 may compare the hashes received from the validation system 120 to corresponding hashes included in an immutable ledger 305 and transmit to the validation system 120 an indication of whether or not the compared hashes match. As another example, the validation system 120 may transmit to the certification system 110 an identifier of the altered set of media data 610 (e.g., a lookup hash 230), receive from the certification system 110 one or more trusted hashes from an immutable ledger 305, hash subsets of the altered set of media data 610, and compare the created hashes (candidate hashes) to the trusted hashes.

The validation system 120 may decode the altered set of media data 610 (or subsets thereof, which may be referred to as altered subsets), based on a corresponding alteration pattern (e.g., based on a steganographic algorithm used to alter the set of media data 210 to obtain the altered set of media data 610) to obtain metadata for the corresponding set of media data 210. For instance, in the example of FIG. 6, the validation system 120 may decode (interpret) altered media values 615-a through 615-h to obtain the encoded information "01001010" as represented by the respective LSBs of each of the altered media values 615-a through 615-h, and the validation system 120 may further decode (interpret) "01001010" as representing the letter "J" based on ASCII encoding. For example, based on the alteration pattern (e.g., altering LSBs of each of a set of altered media values 615 to encode ASCII codes), the validation system 120 may examine one or more bits of a set of altered media values 615 to decode (determine) metadata for a set of media data 210.

The validation system 120 may repeat such a process for any number of altered media values 615 included in the altered set of media data 610 to obtain any amount and type of metadata for the corresponding set of media data 210. In some cases, the validation system 120 may determine the validity (or an aspect thereof) of the altered set of media data 610 (e.g., determine that hashes of the altered set of media data 610 match trusted hashes thereof) before decoding or otherwise evaluating the altered set of media data 610 based on the alteration pattern (e.g., based on a steganographic technique used to generate to the altered set of media data 610). Further, the validation system 120 may present to a user the altered set of media data 610 (e.g., play the altered set of media data 610 using a media player application) rather than the corresponding set of media data 210.

The validation system 120 may determine the validity of an altered set of media data 610 (e.g., that the altered set of media data 610 has been unaltered since generated by a capture system 105, such as unaltered other than application of a steganographic algorithm by the capture system to encode metadata) based at least in part on the metadata decoded from the altered set of media data 610. In some cases, the validation system 120 may decode the altered set of media data 610 to obtain metadata only if the candidate hashes created by the validation system 120 match trusted hashes from the corresponding immutable ledger 305 (e.g., as determined by the validation system 120, or as indicated by the certification system 110), and thus conserve processing and other resources in the event of a mismatch or provide other benefits. In other cases, the validation system 120 may decode the altered set of media data 610 to obtain metadata independent of whether the candidate hashes created by the validation system 120 match trusted hashes from the corresponding immutable ledger 305, which may allow the decoding process to happen in parallel with the comparison process and thus provide speed or other benefits. For example, just like some subsets 212 of a set of media data 210 may match while other subsets 212 of the set of media data 210 may not match, some altered subsets of an altered set of media data 610 may match while other subsets of the altered set of media data 610 may not match. The validation system 120 may present to the user some of all of the metadata regardless of whether the comparison of candidate and trusted cryptographic representations indicates a match. For example, the validation system 120 may present to the user the metadata for altered subsets for which candidate and trusted cryptographic representations match. In some cases, the validation system 120 may also present to the user the metadata for altered subsets for which candidate and trusted cryptographic representations do not match, possibly with the results of related analysis regarding what metadata may differ or be missing from the altered subsets for which candidate and trusted cryptographic representations do not match.

In some cases, metadata or other information for a set of media data 210 may be encoded into an altered set of media data 610 more than once (e.g., repeatedly). For example, metadata or other information may be included multiple times within a single image (including an image within a video), which may support subset validation of the image even if only a portion of the image is received by the validation system. As other examples, metadata or other information may be included multiple times within a single video file (e.g., included within multiple frames) or audio file (e.g., included at multiple times within the audio file). For example, different metadata associated with different subsets 212 of a set of media data 210 (e.g., different metadata associated with different frames of a video or portions of an audio file) may each be steganographically encoded into the corresponding subset of the set of altered media data 610, which may be referred to as an altered subset.

In some cases, the location of altered media values 615 within an altered set of media data 610 (e.g., pixel indices or other suitable indices) may be preconfigured and thus known a priori to the validation system 120. In other cases, a pattern of altered media values 615 may comprise a start or stop marker for altered media values 615 within an altered set of media data 610. For example, a validation system 120 may scan an altered set of media data 610 for a particular pattern of LSBs or other relevant values, and upon detecting the pattern, identify a starting point for or otherwise identify a location of altered media values 615 containing relevant metadata for decoding. The validation system may likewise identify a particular pattern of LSBs or other relevant values as identifying a stopping point for altered media values 615 containing relevant metadata for decoding, or as identifying a range or mapping of locations of altered media values 615 containing relevant metadata for decoding.

In some cases, a steganographic algorithm may be preconfigured (e.g., statically configured) and thus known to capture systems 105 and validation systems 120. In other cases, a steganographic algorithm may be variable (rotated), dynamically-determined, and indicated to capture systems 105 and validation systems 120 by a certification system 110 (e.g., using one or more like techniques to those described herein for indicating a primary hashing (cryptographic) algorithm). Also, the encoding scheme used to encode the steganographically-written metadata (e.g., ASCII, Unicode, or another character encoding scheme) may be preconfigured (e.g., statically configured) and thus known to capture systems 105 and validation systems 120, or may be variable (rotated), dynamically-determined, and indicated to capture systems 105 and validation systems 120 by a certification system 110 using like techniques.

Steganographically altering a set of media data 210 to encode metadata for the set of media data 210 into the resulting altered set of media data 610 may beneficially support subsequent storage and communication (transmission, exchange, distribution) of the metadata in association with the set of media data 210 without the need for separate storage or transmission mechanisms or protocols dedicated to the metadata, thereby improving system efficiency and reducing system complexity, among other benefits that may be appreciated by one of ordinary skill in the art.

In some cases, a capture system 105 may use one or more steganographic techniques as described herein to write metadata for a set of media data 210 into a corresponding altered set of media data 610 in alternative or in addition to processing metadata for the set of media data 210 as otherwise described herein. For example, the capture system, along with steganographically encoding the metadata, the capture system 105 may transmit the metadata to a certification system 110 or any other computer system. Likewise, a validation system 120 may process a received set of media data 210 using one or more steganographic techniques as described herein (e.g., to decode an altered set of media data 610 to obtain metadata embedded therein), and may alternatively or additionally obtain metadata for the received set of media data 210 as otherwise described herein (e.g., from a certification system 110).

In some cases, for a set of media data 210 or one or more subsets 212 thereof, a capture system 105 may create a cryptographic representation thereof (e.g., a hash of the original subset 212 comprising original media values 605), then generate a corresponding steganographically altered version thereof (e.g., an altered subset comprising altered media values 615), and then create a cryptographic representation thereof (e.g., a hash of the altered subset). The capture system 105 may transmit both the cryptographic representation of the unaltered set of media data 210 or subset 212 thereof and the cryptographic representation of the altered set of media data 610 or altered subset thereof to the certification system 110. The certification system 110 may receive both cryptographic representations and store them in the same immutable ledgers or separate immutable ledgers (e.g., one immutable ledger as described herein for the unaltered set of media data 210, and a separate immutable ledger as described herein for the altered set of media data 610). The validation system 120 may subsequently receive a candidate set of media data and identify it as (e.g., determine whether to process it as) an unaltered set of media data 210 or an altered set of media data 610 based at least in part on an indicator, which may—for example—be steganographically encoded into an altered set of media data 610 by the capture system 105. The validation system 120 may identify the candidate set of media data as an unaltered set of media data 210 based on the absence of such an indicator or an altered set of media data 610 based on the presence of such an indicator.

In some cases, a capture system 105 may steganographically encode into an altered set of media data 610 information that allows a validation system 120 to reverse the steganographic alterations and thereby recover the corresponding unaltered set of media data 210. For example, the capture system 105 may steganographically encode into the altered set of media data 610 an indication of which media values therein are altered media values 615 and an indication of the corresponding original media values 605 or an indication of a process (e.g., series of or rules for adjustments thereto) of by which the validation system 120 may determine (recover) the corresponding original media values 605.

In some cases, a capture system 105 may encrypt a set of media data 210 and steganographically write a corresponding cryptographic key into the corresponding encrypted and altered set of media data. Upon receiving such a set of media data, a validation system 120 may use steganographic techniques (e.g., decoding) to obtain the cryptographic key, then use the cryptographic key to decrypt the set of media data, and then process the set of media data 210 as otherwise described herein.

Figure 7A:
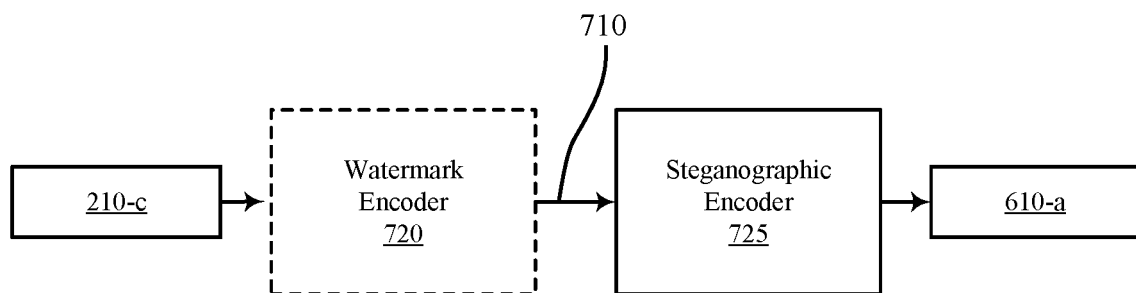
FIGS. 7A and 7B illustrate examples of steganographic systems that support identifying altered media data in accordance with aspects of the present disclosure.

FIG. 7A. shows a block diagram of a system 700-*a* that supports identifying altered media data in accordance with aspects of the present disclosure. In some cases, the system 700-*a* may include aspects of (e.g., may be included in) a capture system 105 as described herein.

Each component of the system 700-*a* may be in communication with one another (e.g., via one or more buses). Each component of the system 700-*a* may be implemented in hardware, code (e.g., software or firmware) executed by a processor, or any combination thereof. If implemented in code executed by a processor, the functions of a component, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The system 700-*a*, or its sub-components, may be physically located at various positions, including being distributed such that portions of functions are implemented at different physical locations or by one or more physical or logically distinct components. In some examples, the system 700-*a*, or its sub-components, may be a separate and distinct component in accordance with various aspects of the present disclosure. In some examples, the system 700-*a*, or its sub-components, may be combined with one or more other hardware components, including but not limited to an input/output (I/O) component, a transceiver, another computing device, one or more other components described in the present disclosure, or a combination thereof in accordance with various aspects of the present disclosure.

The system 700-*a* may include a steganographic encoder 725. The steganographic encoder 725 may be configured to receive media data (e.g., a set of media data 210-*c*, or a watermarked set of media data 710 as discussed in the context of optional watermark encoder 720) (or a subset 212 thereof) and use a steganographic algorithm to generate and output a corresponding altered set of media data 610-*a* (or a subset thereof) in accordance with the techniques described herein. In some cases, the steganographic encoder 725 may provide the altered set of media data 610-*a* to a cryptographic component (e.g., a cryptographic component 1315 as described herein), which may create one or more cryptographic representations (e.g., hashes) based at least in part on the altered set of media data 610-*a*. Thus, metadata for the set of media data 210-*c* may be encoded into (embedded in as part of creating) the altered set of media data 610-*a* based at least on an alteration pattern (e.g., an alteration pattern based on a steganographic algorithm), and then the altered set of media data 610-*a* may be processed (e.g., by a capture system 105) as a set of media data 210 may otherwise be processed (e.g., by the capture system 105) in accordance with the techniques described herein.

In some cases, the system 700-*a* may include a watermark encoder 720. The watermark encoder 720 may be configured to receive a set of media data 210-*c* (or a subset 212 thereof) and apply a watermark to the set of media data 210-*c* to generate and output a watermarked set of media data 710 (or a subset thereof). For example, the watermark encoder 720 may substitute or adjust media values 605 in the set of media 210-*c* to obtain watermark media values (e.g., watermark pixel values or audio sample values) such that the watermarked set of media data 710 includes one or more watermark media values. Whereas a watermark (e.g., as applied to image, video, or audio data) may be visible or audible to a user when the watermarked set of media data 710 is presented to the user, the steganographic alterations made by the steganographic encoder 725 is invisible or inaudible to the user. For example, the changes in media values 605 made by the steganographic encoder 725 may be smaller in magnitude (e.g., applied to less significant bits) than the changes in media values 605 made by the watermark encoder 720. In some cases, the steganographic encoder 725 may be configured to change media values 605 by no more than a threshold amount (e.g., to generate altered media values 615 that differ from corresponding media values 605 by no more than the threshold amount), and the watermark encoder 720 may be configured to change media values 605 by more than the threshold amount (e.g., to generate watermark media values that differ form corresponding media values 605 by no more than the threshold amount).

In some cases, the steganographic encoder 725 may apply a steganographic algorithm to one or more watermarked media values within a watermarked set of media data 710—that is, one or more media values 605 within a set of media data 210-*c* may be adjusted to obtain or replaced with watermark media values, and those watermark media values (e.g., same pixel locations or indices) may be altered according to a steganographic alteration pattern to obtain one or more altered media values 615 within an altered set of media data 610. In some such cases, the steganographic encoder 725 may process (alter the value of) only watermark media values and leave any other media values 605 within a watermarked set of media data 710 unchanged. Not altering any media values 605 within a watermarked set of media data 710 other than watermark media values may beneficially enhance trustworthiness as perceived by users, among other benefits that may be appreciated by one of ordinary skill in the art.

Figure 7B:
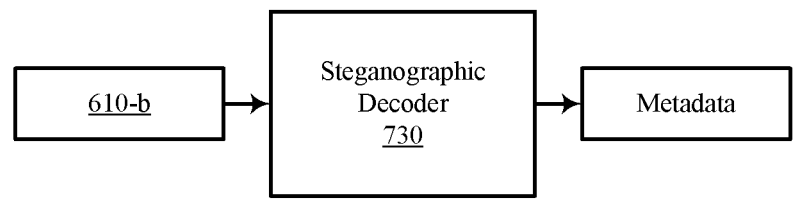

FIG. 7B. shows a block diagram of a system 700-*b* that supports identifying altered media data in accordance with aspects of the present disclosure. In some cases, the system 700-*b* may include aspects of (e.g., may be included in) a validation system 120 as described herein.

Each component of the system 700-*b* may be in communication with one another (e.g., via one or more buses). Each component of the system 700-*b* may be implemented in hardware, code (e.g., software or firmware) executed by a processor, or any combination thereof. If implemented in code executed by a processor, the functions of a component, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The system 700-*b*, or its sub-components, may be physically located at various positions, including being distributed such that portions of functions are implemented at different physical locations or by one or more physical or logically distinct components. In some examples, the system 700-*b*, or its sub-components, may be a separate and distinct component in accordance with various aspects of the present disclosure. In some examples, the system 700-*b*, or its sub-components, may be combined with one or more other hardware components, including but not limited to an input/output (I/O) component, a transceiver, another computing device, one or more other components described in the present disclosure, or a combination thereof in accordance with various aspects of the present disclosure.

The system 700-*b* may include a steganographic decoder 730. The steganographic decoder 730 may be configured to receive an altered set of media data 610-*b* and use a steganographic algorithm to decode the altered set of media data 610-*b* (or a subset thereof) and thereby obtain metadata for a corresponding set of media data 210 (or a subset 212 thereof) in accordance with the techniques described herein. For example, the steganographic decoder may identify and evaluate a subset of digits (e.g., bits) included in one or more altered media values 615 (e.g., the LSBs of the one or more altered media values 615) and decode the subset of digits to obtain corresponding metadata (e.g., decode the LSBs based on an ASCII decoding scheme to obtain textual information that represents the metadata). In some cases, the steganographic decoder 730 may provide the metadata to a metadata component (e.g., a metadata component 1735 as described herein).

Figure 8:
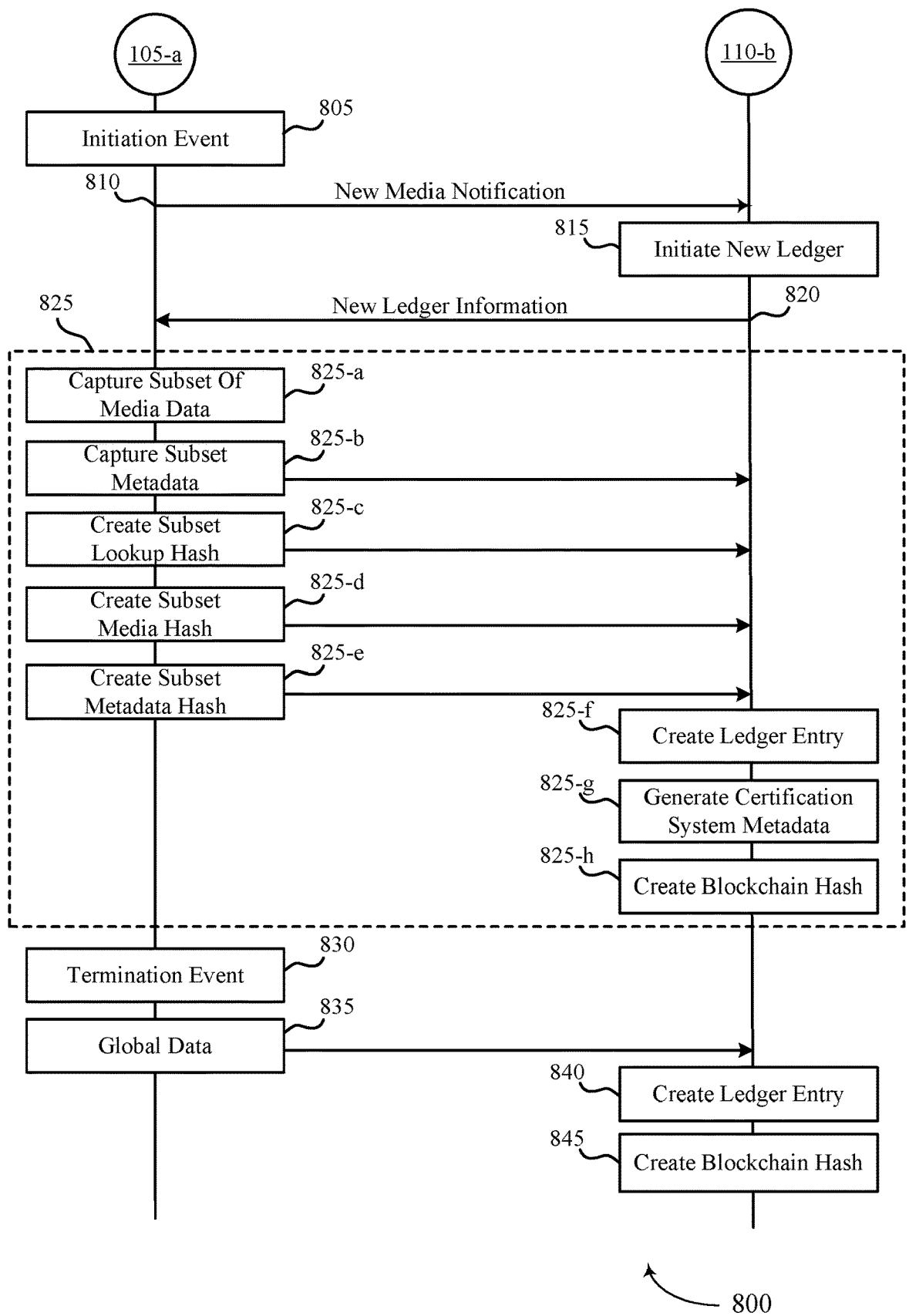
FIG. 8 illustrates an example of a process flow that supports identifying altered media data in accordance with aspects of the present disclosure.

FIG. 8 illustrates an example of a process flow 800 that supports identifying altered media data in accordance with aspects of the present disclosure. In some examples, process flow 800 may be implemented by a capture system 105-*a* and a certification system 110-*b*, which may be examples of a capture system 105 and a certification system 110 as described with reference to FIG. 1.

In some cases, the capture system 105-*a* may comprise a host device and an application for capturing trusted media (e.g., the capture system 105-*a* may comprise a smartphone or other computing device that hosts the application). Prior to 805, a user of the capture system 105-*a* may launch or otherwise engage the application. The capture system 105-*a* may request authentication credentials from the user prior to 805. For example, the capture system 105-*a* may determine whether the user is associated with a valid user profile based on authentication credentials provided by the user (e.g., by exchanging one or more messages with a profile management system 125 (not shown)) and allow the user to proceed only if the user is indeed associated with a valid user profile (otherwise, the capture system 105-*a* may request that the user create a valid user profile).

At 805, the capture system 105-*a* may identify an initiation event. The initiation event may be an initiation event 205 as described herein, for example with reference to FIG. 2.

At 810, the capture system 105-*a* may establish a communications link with certification system 110-*c* and transmit to the certification system 110-*b* anew media notification. The new media notification may indicate to the certification system 110-*b* that the capture system 105-*a* has identified an initiation event (e.g., has received a request to begin capturing a new set of media data 210). The new media notification may also indicate to the certification system 110-*b* a user profile associated with the set of new media data 210.

At 815, the certification system 110-*b* may initiate anew immutable ledger 305. In some cases, the certification system 110-*b* may verify the capture system 105-*a* prior to initiating the new immutable ledger 305 (e.g., the capture system 105-*a* may sign the new media notification using the private cryptographic key associated with the set of media data 210 and include in the new media notification the associated public cryptographic key, and the certification system 110-*b* may verify the origin of the new set of media data 210 based on the associated signature and public cryptographic key). In some cases, the certification system 110-*b* may initiate the new immutable ledger 305 only if verification of the capture system 105-*a* is successful.

In some cases, initiating a new immutable ledger 305 may comprise the certification system 110-*b* creating a header ledger entry 310 for the immutable ledger 305. The header ledger entry 310 may, for example, be based on user profile data for a user profile associated with the set of new media data 210 (e.g. for the user of the capture system 105-*a*), which may be included in the new media notification received by the certification system 110-*b* at 810 or retrieved by the certification system 110-*b* through the exchange of one or more messages with profile management system 125.

At 820, the certification system 110-*b* may transmit to the capture system 105-*a* information about the new immutable ledger 305 created at 815. For example, the certification system 110-*b* may transmit to the capture system 105-*a* an identifier of the new immutable ledger 305 created at 815. As another example, the certification system 110-*b* may transmit to the capture system 105-*a* an indication of a primary hashing algorithm that the capture system 105-*a* is to use to hash the new set of media data 210 and related data.

At 825, the capture system 105-*a* may initiate a capture loop 825, which the capture system 105-*a* may execute in coordination with the certification system 110-*b*.

At 825-*a*, the capture system 105-*a* may capture a subset of media data 212. For example, the capture system 105-*a* may capture a predefined duration or amount of media data (e.g., X seconds of video data or audio data, Y frames of video data or samples of audio data, etc.).

In some cases, the capture system 105-*a* may capture the subset of media data 212 using a microphone or a camera included in a host device or other device included in or associated with the capture system 105-*a*, or a combination thereof. As another example, the capture system 105-*a* may capture the subset of media data 212 using a data sniffer or like piece of hardware, software, or firmware included in the capture system 105-*a* or a host device or other device included in or associated with the capture system 105-*a* (e.g., the host device may be a smartphone, media data may include telephonic conversation data, and the capture system 105-*a* may capture the subset of media data 212 using an application configure to capture telephonic conversation data transmitted or received by the smartphone).

In some cases, the set of media data 210 may comprise telephonic conversation data, and the capture system 105-*a* may comprise a device (e.g., a server device) configured to capture telephonic conversation data whenever added as a party to a telephone call (e.g., a user of a phone may conference in the capture system 105-*a* as an additional party to the telephone call, and the capture system 105-*a* may record the telephonic conversation and process the captured telephonic conversation data in accordance with the techniques described herein). In some cases, the capture system 105-*a* may comprise a smartphone, and the smartphone may include an application that, when activated, captures the telephonic conversation data for any voice call conducted via the smartphone's voice call application (e.g., the application may be configured to access a stream of audio data associated with the voice call application). In some cases, the capture system 105 may comprise a smartphone, and the smartphone may include a dedicated "cryptocall" application that provides independent voice call functionality (e.g., separate and apart from a conventional voice call application that may also be included in the smartphone, which may be associated with a different phone number than the cryptocall application). For a voice call made using the cryptocall application, the application may capture the associated telephonic conversation data and process such data in accordance with the techniques described herein. For example, the cryptocall application may be configured to capture all telephonic conversation data for the entire duration of any call made thereby, or may be configured (e.g., via user inputs) to selectively capture some or all telephonic conversation data of a given call made thereby. In some cases, capturing telephonic conversation data may include capturing some or all of two different sets of data for each participant in the call: a first set of data representing speaker data (aspects of the call as heard by the participant) and a second set of data representing microphone data (aspects of the call as spoken by the participant). Any number of such sets of data may be independently processed in accordance with the techniques described herein or combined, and the combination processed in accordance with the techniques described herein. A application local to the phone that is configured to capture telephonic conversation data, such as a cryptocall application, may beneficially be well-positioned to also capture relevant metadata for the telephonic conversation data. In some cases, the telephonic conversation data may comprise Voice-Over-IP (VOIP) data (e.g., VOIP packets comprising audio data).

The capture system 105-*a* may identify the subset of media data 212 concurrently with, as part of, or subsequent to capturing the subset of media data 212. The capture system 105-*a* may store the subset of media data 212 captured at 825-*a*.

At 825-*b*, the capture system 105-*a* may identify (e.g., capture, determine, calculate, or otherwise create) subset metadata 234 for the subset of media data 212 captured at 825-*a*, and thus may identify at least a portion of metadata for the set of media data 210. The subset metadata 234 may include any type of metadata discussed herein. The capture system 105-*a* may transmit the subset metadata 234 to the certification system 110-*b*. In some cases, the capture system 105-*a* may also store the subset metadata 234.

At 825-*c*, the capture system 105-*a* may create a lookup hash 230 based on the subset of media data 212 captured at 825-*a*. The capture system 105-*a* may create the lookup hash 230 based on an alternative hashing algorithm in accordance with the techniques described herein. The capture system 105-*a* may transmit the lookup hash 230 to the certification system 110-*b*. In some cases, the capture system 105-*a* may also store the lookup hash 230.

At 825-*d*, the capture system 105-*a* may create a subset media hash 232 based on the subset of media data 212 captured at 825-*a*. The capture system 105-*a* may create the subset media hash 232 based on a primary hashing algorithm in accordance with the techniques described herein (e.g., based on the primary hashing algorithm indicated at 820). The capture system 105-*a* may transmit the subset media hash 232 to the certification system 110-*b*. In some cases, the capture system 105-*a* may also store the subset media hash 232.

At 825-*e*, the capture system 105-*a* may create a subset metadata hash 238 based on the subset metadata 234 captured at 825-*a*. The capture system 105-*a* may create the subset metadata hash 238 based on a hashing algorithm in accordance with the techniques described herein (e.g., based on the primary hashing algorithm indicated at 820). The capture system 105-*a* may transmit the subset metadata hash 238 to the certification system 110-*b*. In some cases, the capture system 105-*a* may also store the subset metadata hash 238.

In some cases, in the alternative or in addition to creating and transmitting the subset metadata hash 238, the capture system 105-*a* may create subset combo data 238 and a corresponding subset combo hash 240 based on the subset of media data 212 captured at 825-*a* and the subset metadata 234 captured at 825-*b*. In such cases, the capture system 105-*a* may create the subset combo hash 240 based on a hashing algorithm in accordance with the techniques described herein (e.g., based on the primary hashing algorithm indicated at 820). The capture system 105-*a* may transmit the subset combo hash 240 to the certification system 110-*b*. In some cases, the capture system 105-*a* may also store the subset combo data 238, subset combo hash 240, or both.

It is to be understood that operations associated with 825-*a* through 825-*e* may occur in orders other than that depicted in the example illustrated in FIG. 8, and that in some cases multiple operations associated with 825-*a* through 825-*e* may occur simultaneously. For example, it is to be understood that transmissions of data from the capture system 105-*a* to the certification system 110-*b* associated with 825-*a* through 825-*e* may occur in orders other than that depicted in the example illustrated in FIG. 8, and in some cases simultaneously. Further, it is to be understood that transmissions of data from the capture system 105-*a* to the certification system 110-*b* associated with 825-*a* through 825-*e* may occur in real time or with some delay (e.g., the transmitted data may be queued by the capture system 105-*a*, including with data for other subsets of media data 212, and transmitted to the certification system 110-*b* at a later time, including after capture of the set of media data 210 is complete).

At 825-*f*, the certification system 110-*b* may create a ledger entry 310 (e.g., add a ledger entry 310 to the immutable ledger created at 815) corresponding to the subset of media data 212 captured at 825-*a*. The immutable ledger 305 created at 815 and the ledger entry 310 may be created and configured in accordance with the techniques described herein, including in accordance with any of the immutable ledger configurations 400 described with reference to FIG. 4.

The certification system 110-*b* may write to (e.g., include in) the ledger entry 310 the lookup hash 230 created at 825-*c*, which may function as an identifier of the ledger entry 310. The certification system 110-*b* may also include in the ledger entry 310 one or more of a primary hashing algorithm indication 315 corresponding to the primary hashing algorithm indicated at 820, the subset metadata 234 captured at 825-*b*, the subset media hash created at 825-*d*, the subset metadata hash 238 created at 825-*e*, or a subset combo hash 240.

At 825-*g*, the certification system 110-*b* may generate (e.g., identify, determine, calculate, etc.) additional metadata for the subset of media data 212 captured at 825-*a*. For example, the certification system 110-*b* may generate one or more timestamps indicating when the certification system 110-*b* received one or more aspects of the data related to the subset of media data 212 captured at 825-*a*. As another example, the certification system 110-*b* may generate one or more indications of a latency between when one or more aspects of the data related to the subset of media data 212 captured at 825-*a* were captured or created (e.g., based on a timestamp provided to certification system 110-*a* as part of the transmitted subset metadata 234) and received by the certification system 110-*b*. As another example, the certification system 110-*b* may determine one or more types of publicly available data as described herein, and may in some cases cross-check other metadata against such public available data. The certification system 110-*b* may write the metadata generated at 825-*g* to the ledger entry 310 created at 825-*f* (e.g., by supplementing the subset metadata 234 with the metadata generated at 825-*g*).

At 825-*h*, the certification system 110-*b* may create a blockchain hash 325 based on the ledger entry 310 created at 825-*f* (including, if applicable, as supplemented with additional metadata generated at 825-*g*). The certification system 110-*b* may create the blockchain hash 325 in accordance with the techniques described herein. For example, the certification system 110-*b* may create the blockchain hash 325 using a blockchain hashing algorithm, which in some cases may be a hashing algorithm that the certification system 110-*b* does not share (e.g., communicate) with the capture system 105-*a* or other entities outside the certification system 110-*b*. As another example, the certification system 110-*b* may create the blockchain hash 325 based on contents of the ledger entry 310 created at 825-*f* as well as contents of another ledger entry 310 included in the immutable ledger 305 (e.g., an immediately prior ledger entry 310). In addition or as an alternative to creating the blockchain hash 325, in some cases the certification system 110-*b* may create a certification system hash 330.

The capture system 105-*a* may execute capture loop 825 any number of times. For example, if the set of media data 210 is less than the predefined duration or amount of media data for a subset of media data 212, then the capture system 105-*a* may execute capture loop 825 once. If the set of media data 210 is more than the predefined duration or amount of media data for a subset of media data 212, then the capture system 105-*a* may execute capture loop 825 multiple times until the complete set of media data 210 has been captured (e.g., until the occurrence of a termination event 215).

At 830, the capture system 105-*a* may identify a termination event. The termination event may be a termination 215 as described herein, for example with reference to FIG. 2. For example, a user of the capture system 105-*a* may select "stop recording" on a host device or application for the capture system 105-*a*.

At 835, the capture system 105-a may generate (e.g., capture, identify, or determine) global data for the set of media data 210, which may be data applicable to the entirety of the set of media data 210. For example, the capture system 105-a may create a global media hash 250, identify global metadata 252, create a global metadata hash 254, create global combo data 258, create a global combo hash 258, or any combination thereof, for the set of media data 210. The capture system 105-a may transmit one or more of the global media hash 250, global metadata 252, global metadata hash 254, or global combo hash 258 to the certification system 110-b. In some cases, the capture system 105-a may store one or more of the global media hash 250, global metadata 252, global metadata hash 254, or global combo hash 258.

At 840, the certification system 110-b may create a ledger entry 310 (e.g., add a ledger entry 310 to the immutable ledger created at 815) corresponding to the entirety of the set of media data 210 (e.g., based on data generated at 835). The certification system 110-b may create the ledger entry 310 in accordance with the techniques described herein.

At 845, the certification system 110-b may create a blockchain hash 325 for the ledger entry 310 created at 840. The certification system 110-b may create the blockchain hash 325 in accordance with the techniques described herein.

In some cases, including but not limited to cases in which the set of media data 210 comprises image data for a single image, the capture system 105-a may capture all of the set of media data 210 prior to initiating capture loop 825 and may, at 825-a, identify a subset of the previously captured media data 212. Further, the capture system 105-a may in some cases perform aspects of the operations described with reference to 825-a through 825-e, 830, and 835 for the entire set of media data 210 (that is, all subsets of media data 212), then transmit related data to the certification system 110-b, and the certification system 110-b may thereafter perform aspects of the operations described with reference to 825-f through 825-h, 840, and 845 for all subsets of media data 212. Further, in some cases, some subsets of media data 212 may be processed in real time, and others not (e.g., due to intermittent connectivity between the capture system 105-a and the certification system 110-b), and in some cases some subsets of media data 212 may be received by the certification system 110-b (and possibly also reflected in ledger entries 310) in a different order than an order of capture by the capture system 105-a.

Figure 9:
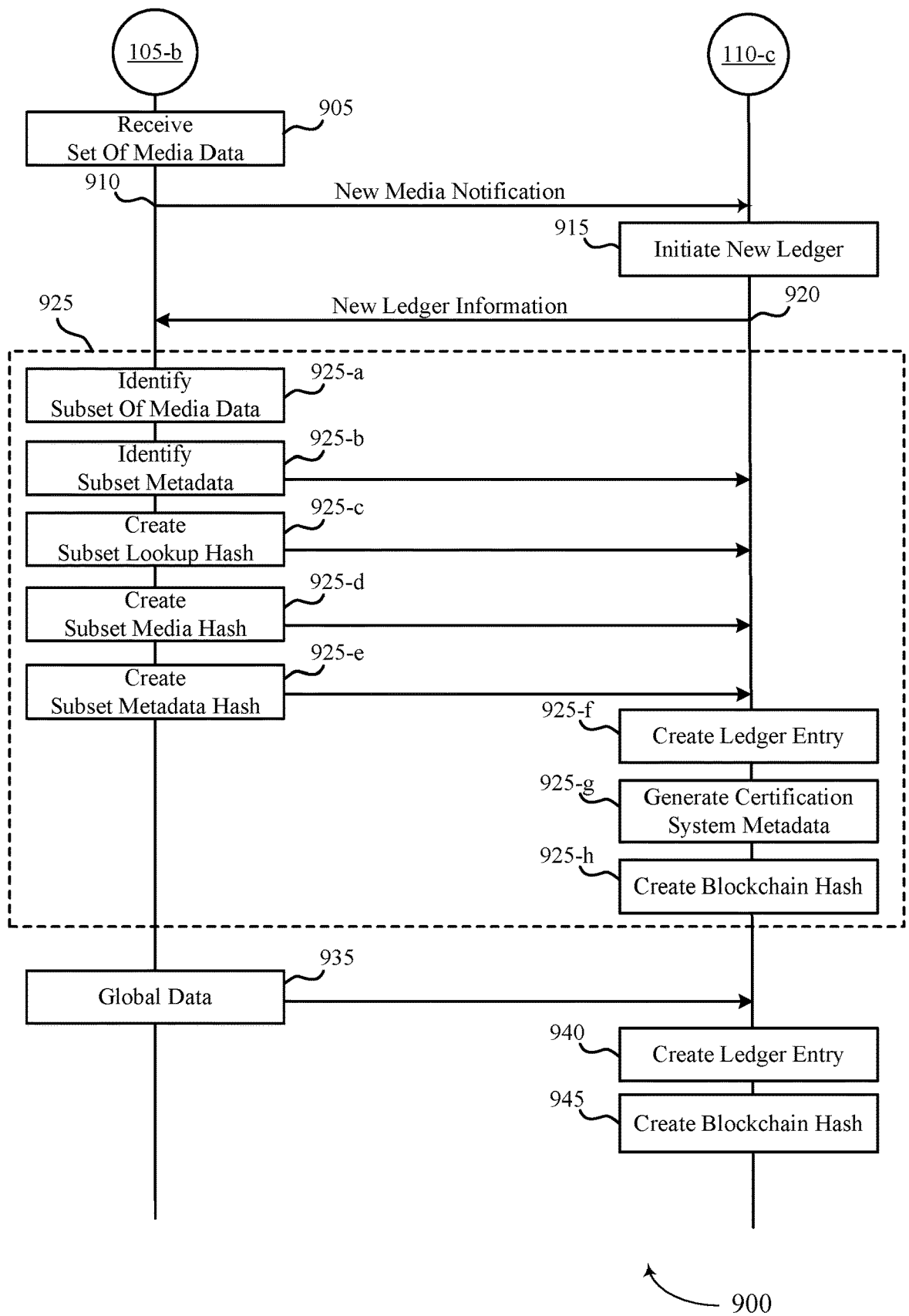
FIG. 9 illustrates an additional example of a process flow that supports identifying altered media data in accordance with aspects of the present disclosure.

FIG. 9 illustrates an example of a process flow 900 that supports identifying altered media data in accordance with aspects of the present disclosure. In some examples, process flow 900 may be implemented by a capture system 105-b and a certification system 110-c, which may be examples of a capture system 105 and a certification system 110 as described with reference to FIG. 1.

In some cases, the capture system 105-b may comprise a backend system, such as a server or other computing device. A device separate from the backend system may capture a set of media data. The separate device may, however, rely on the backend system for some or all other aspects of the techniques described herein (e.g., the separate device may lack the capability of communicating with the certification system 110-c or lack the capability of creating hashes). The separate device may, for example, comprise a body camera, an action camera, a surveillance camera, a web camera, or any other type of camera, microphone, or other device capable of capturing media data. The backend system may be operated, for example, by a police department for processing media data captured by police body cameras, a security firm or other organization for processing media data captured by surveillance cameras, or may be operated by any other type of individual or organization, including but not limited to a same individual or organization that operates the separate device.

At 905, the capture system 105-b may receive a set of media data 210 (e.g., from the separate device). The capture system 105-b may in some cases receive the set of media data 210 in real time, or in other cases may receive the set of media data 210 after some non-real time amount of delay relative to its capture. The capture system 105-b may receive the set of media data 210 as a single batch or as multiple batches. In some cases, a user of the capture system 105-b may upload the set of media data 210 to the capture system 105-b. In some cases, the capture system 105-b may receive the set of media data 210 via a communications link (which may be temporary) with the separate device. The capture system 105-b may store the set of media data 210 received at 905.

At 910, the capture system 105-b may establish a communications link with the certification system 110-c and transmit to the certification system 110-c a new media notification. The new media notification may indicate to the certification system 110-c that the capture system 105-b has received a new set of media data 210. The new media notification may also indicate to the certification system 110-c a user profile associated with the new set of media data 210.

At 915, the certification system 110-c may initiate a new immutable ledger 305. In some cases, the certification system 110-c may verify the capture system 105-b prior to initiating the new immutable ledger 305 (e.g., the capture system 105-b may sign the new media notification using the private cryptographic key associated with the set of media data 210 and include in the new media notification the associated public cryptographic key, and the certification system 110-c may verify the origin of the new set of media data 210 based on the associated signature and public cryptographic key). In some cases, the certification system 110-c may initiate the new immutable ledger 305 only if verification of the capture system 105-b is successful.

In some cases, initiating the new immutable ledger 305 may comprise the certification system 110-c creating a header ledger entry 310 for the immutable ledger 305. The header ledger entry 310 may, for example, be based on user profile data for the user profile associated with the new set of media data 210, which may be included in the new media notification received by the certification system 110-c at 910 or retrieved by the certification system 110-c through the exchange of one or more messages with a profile management system 125.

At 920, the certification system 110-c may transmit to the capture system 105-b information about the new immutable ledger 305 created at 915. For example, the certification system 110-c may transmit to the capture system 105-b an identifier of the new immutable ledger 305 created at 915. As another example, the certification system 110-c may transmit to the capture system 105-b an indication of a primary hashing algorithm that the capture system 105-b is to use to hash the new set of media data 210 and related data.

At 925, the capture system 105-b may initiate a capture loop 925, which the capture system 105-b may execute in coordination with the certification system 110-c.

At 925-a, the capture system 105-b may identify a subset of media data 212. For example, the capture system 105-b may identify a predefined duration or amount of media data (e.g., X seconds of video data or audio data, or Y frames of video data or samples of audio data, etc.) included in the set of media data 210 received at 905. The capture system 105-*b* may identify only one subset of media data 212 if the duration or amount of media data received at 905 is less than the predefined duration or amount, or may identify multiple subsets of media data 212 if the duration or amount of media data received at 905 is more than the predefined duration or amount. The capture system 105-*b* may identify all subsets of media data 212 included in the set of media data 210 receive at 905 at once, or may identify some or all subsets of media data 212 sequentially.

At 925-*b*, the capture system 105-*b* may identify (e.g., capture, determine, calculate, etc.) subset metadata 234 for the subset of media data captured 212 at 925-*a*, and thus may identify at least a portion of metadata for the set of media data 210. The subset metadata 234 may include any type of metadata discussed herein. The capture system 105-*b* may transmit the subset metadata 234 to the certification system 110-*c*. In some cases, the capture system 105-*b* may also store the subset metadata 234.

At 925-*c*, the capture system 105-*b* may create a lookup hash 230 based on the subset of media data 212 identified at 925-*a*. The capture system 105-*b* may create the lookup hash 230 based on an alternative hashing algorithm in accordance with the techniques described herein. The capture system 105-*b* may transmit the lookup hash 230 to the certification system 110-*c*. In some cases, the capture system 105-*b* may also store the lookup hash 230.

At 925-*d*, the capture system 105-*b* may create a subset media hash 232 based on the subset of media data 212 identified at 925-*a*. The capture system 105-*b* may create the subset media hash 232 based on a primary hashing algorithm in accordance with the techniques described herein (e.g., based on the primary hashing algorithm indicated at 920). The capture system 105-*b* may transmit the subset media hash 232 to the certification system 110-*c*. In some cases, the capture system 105-*b* may also store the subset media hash 232.

At 925-*e*, the capture system 105-*b* may create a subset metadata hash 236 based on the subset metadata 234 identified at 925-*b*. The capture system 105-*b* may create the subset metadata hash 236 based on a hashing algorithm in accordance with the techniques described herein (e.g., based on the primary hashing algorithm indicated at 920). The capture system 105-*b* may transmit the subset metadata hash 236 to the certification system 110-*c*. In some cases, the capture system 105-*b* may also store the subset metadata hash 236.

In some cases, in the alternative or in addition to creating and transmitting the subset metadata hash 236, the capture system 105-*b* may create subset combo data 238 and a corresponding subset combo hash 240 based on the subset of media data 212 identified at 925-*a* and the subset metadata 234 identified at 925-*b*. In such cases, the capture system 105-*b* may create the subset combo hash 240 based on a hashing algorithm in accordance with the techniques described herein (e.g., based on the primary hashing algorithm indicated at 920). The capture system 105-*b* may transmit the subset combo hash 240 to the certification system 110-*c*. In some cases, the capture system 105-*b* may also store the subset combo data 238, subset combo hash 240, or both.

It is to be understood that operations associated with 925-*a* through 925-*e* may occur in orders other than that depicted in the example illustrated in FIG. 9, and that in some cases multiple operations associated with 925-*a* through 925-*e* may occur simultaneously. Similarly, it is to be understood that transmissions of data from the capture system 105-*b* to the certification system 110-*c* associated with 925-*a* through 925-*e* may occur in orders other than that depicted in the example illustrated in FIG. 9, and in some cases simultaneously. Further, it is to be understood that transmissions of data from the capture system 105-*b* to the certification system 110-*c* associated with 925-*a* through 925-*e* may occur in real time or with some delay (e.g., the transmitted data may be queued by the capture system 105-*b*, including with data for other subsets of media data 212, and transmitted to the certification system 110-*c* at a later time, including after processing of the set of media data 210 by the capture system 105-*b* is complete).

At 925-*f*, the certification system 110-*c* may create a ledger entry 310 (e.g., add a ledger entry 310 to the immutable ledger created at 915) corresponding to the subset of media data 212 received at 905. The immutable ledger 305 created at 915 and the ledger entry 310 may be created and configured in accordance with the techniques described herein, including in accordance with any of the ledger configurations 400 described with reference to FIG. 4.

The certification system 110-*c* may write to (e.g., include in) the ledger entry 310 the lookup hash 230 created at 925-*c*, which may function as an identifier of the ledger entry 310. The certification system 110-*c* may also include in the ledger entry 310 one or more of a primary hashing algorithm indication 315 corresponding to the primary hashing algorithm indicated at 920, the subset metadata 234 identified at 925-*b*, the subset media hash created at 925-*d*, the subset metadata hash 236 created at 925-*e*, or a subset combo hash 240.

At 925-*g*, the certification system 110-*c* may generate (e.g., identify, determine, calculate, etc.) additional metadata for the subset of media data 212 identified at 925-*a* in accordance with the techniques described herein. For example, the certification system 110-*c* may generate one or more timestamps indicating when the certification system 110-*c* received one or more aspects of the data related to the subset of media data 212 identified at 925-*a*. As another example, the certification system 110-*c* may generate one or more indications of a latency between when one or more aspects of the data related to the subset of media data 212 identified at 925-*a* were captured or created (e.g., based on a timestamp provided to and relayed by the capture system 105-*b* by the separate device) or were received by the capture system 105-*b* (e.g., based on a timestamp provided to certification system 110-*a* as part of the transmitted subset metadata 234) and receipt by the certification system 110-*c*. As another example, the certification system 110-*c* may determine one or more types of publicly available data as described herein, and may in some cases cross-check other metadata against such public available data. The certification system 110-*c* may write the metadata generated at 925-*g* to the ledger entry 310 created at 925-*f* (e.g., by supplementing the subset metadata 234 with the metadata generated at 925-*g*).

At 925-*h*, the certification system 110-*c* may create a blockchain hash 325 based on the ledger entry 310 created at 925-*f* (including, if applicable, as supplemented with additional metadata generated at 925-*g*). The certification system 110-*c* may create the blockchain hash 325 in accordance with the techniques described herein. For example, the certification system 110-*c* may create the blockchain hash 325 using a blockchain hashing algorithm, which in some cases may be a hashing algorithm that the certification system 110-*c* does not share (e.g., communicate) with the capture system 105-*b* or other entities outside the certification system 110-*c*. As another example, the certification system 110-*c* may create the blockchain hash 325 based on contents of the ledger entry 310 created at 925-*f* as well as contents of another ledger entry 310 included in the immutable ledger 305 (e.g., an immediately prior ledger entry 310). In addition or as an alternative to creating the blockchain hash 325, in some cases the certification system 110-*c* may create a certification system hash 330.

The capture system 105-*b* may execute capture loop 925 any number of times. For example, if the set of media data 210 is less than the predefined duration or amount of media data for a subset of media data 212, then the capture system 105-*b* may execute capture loop 925 once. If the set of media data 210 is more than the predefined duration or amount of media data for a subset of media data 212, then the capture system 105-*b* may execute capture loop 925 multiple times until the complete set of media data 210 has been processed.

At 935, the capture system 105-*b* may generate (e.g., capture, identify, or determine) global data for the set of media data 210, which may be data applicable to the entirety of the set of media data 210. For example, the capture system 105-*b* may create a global media hash 250, identify global metadata 252, create a global metadata hash 254, create global combo data 259, or create a global combo hash 258, or any combination thereof, for the set of media data 210. The capture system 105-*b* may transmit one or more of the global media hash 250, global metadata 252, global metadata hash 254, or global combo hash 258 to the certification system 110-*c*. In some cases, the capture system 105-*b* may store one or more of the global media hash 250, global metadata 252, global metadata hash 254, or global combo hash 258.

At 940, the certification system 110-*c* may create a ledger entry 310 (e.g., add a ledger entry 310 to the immutable ledger created at 915) corresponding to the entirety of the set of media data 210 (e.g., based on data generated at 935). The certification system 110-*c* may create the ledger entry 310 in accordance with the techniques described herein.

At 945, the certification system 110-*c* may create a blockchain hash 325 for the ledger entry 310 created at 940. The certification system 110-*c* may create the blockchain hash 325 in accordance with the techniques described herein.

In some cases, the capture system 105-*b* may perform aspects of the operations described with reference to 925-*a* through 925-*e* and 935 for the entire set of media data 210 (that is, all subsets of media data 212), then transmit related data to the certification system 110-*c*, and the certification system 110-*c* may thereafter perform aspects of the operations described with reference to 925-*f* through 925-*h*, 940, and 945 for all subsets of media data 212. Further, in some cases, some subsets of media data 212 may be processed in real time, and others not (e.g., due to intermittent connectivity between the capture system 105-*b* and the certification system 110-*c*), and in some cases some subsets of media data 212 may be received by the certification system 110-*c* (and possibly also reflected in ledger entries 310) in a different order than an order of capture by the capture system 105-*b*.

Figure 10:
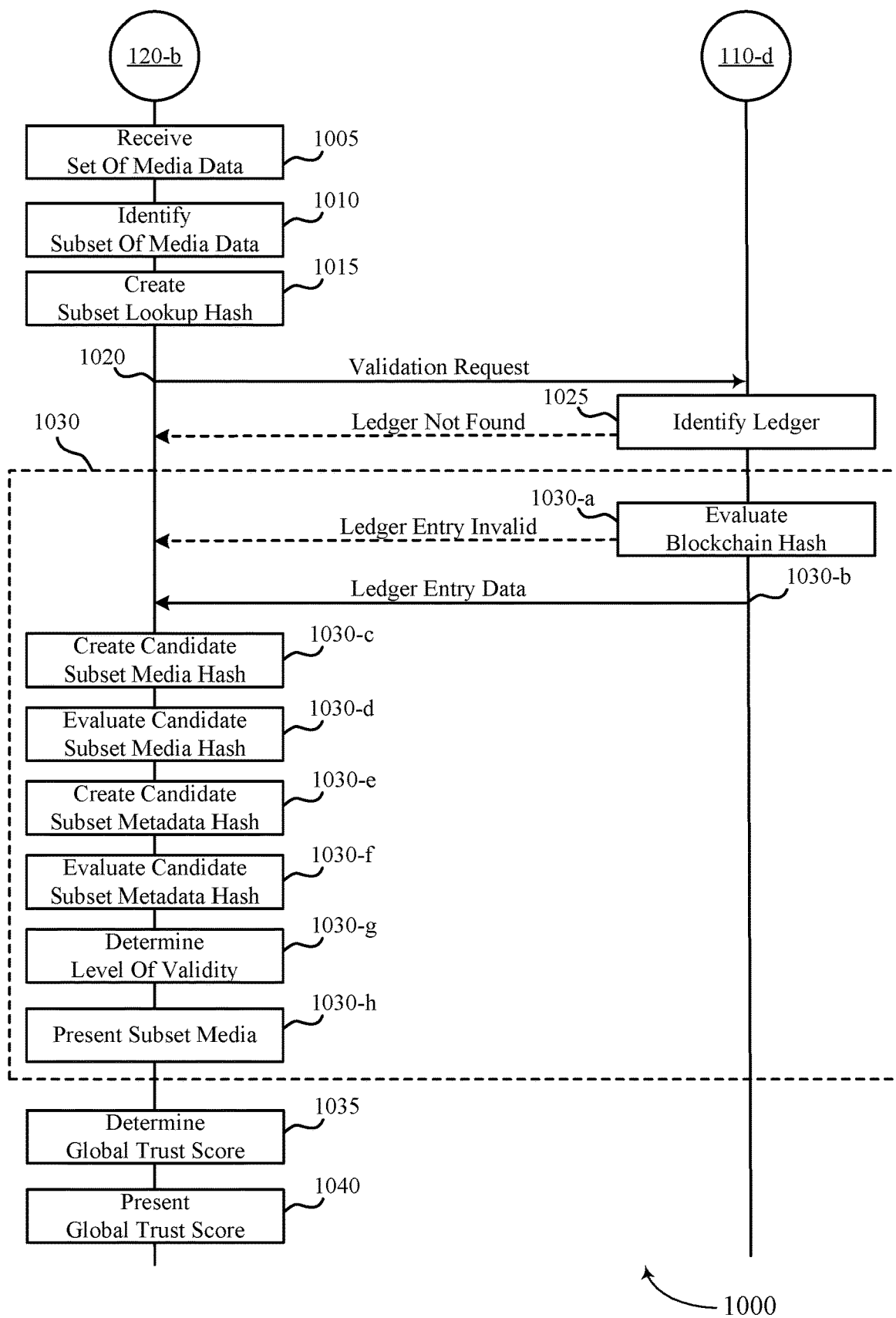
FIG. 10 illustrates an additional example of a process flow that supports identifying altered media data in accordance with aspects of the present disclosure.

FIG. 10 illustrates an example of a process flow 1000 that supports identifying altered media data in accordance with aspects of the present disclosure. In some examples, process flow 1000 may be implemented by a validation system 120-*b* and a certification system 110-*d*, which may be examples of a validation system 120 and a certification system 110 as described with reference to FIG. 1.

In some cases, the validation system 120-*b* may comprise a host device and an application for validating media data. For example, the validation system 120-*b* may comprise a smartphone or other computing device that hosts a validation application. As another example, the validation system 120-*b* may comprise a smartphone or other computing device that hosts a web browser application, and the validation application may be hosted remotely and accessible via the web browser application.

At 1005, the validation system 120-*b* may receive a set of media data 210. For example, a user of the validation system 120-*b* may upload or import the set of media data 210 to the validation system 120-*b*. In some cases, the validation system 120-*b* may receive the set of media data from a capture system 105 via a communications link (e.g., via an application-to-application transfer mechanism, which may be provided by a distribution system 115).

At 1010, the validation system 120-*b* may identify one or more subsets of media data 212. For example, the validation system 120-*b* may identify a predefined duration or amount of media data (e.g., X seconds of video data or audio data, or Y frames of video data or samples of audio data, etc.) included in the set of media data 210 received at 1005. If the duration or amount of media data received at 1005 is less than the predefined duration or amount, the validation system 120-*b* may at 1010 identify all of the media data 210 received at 1005 as the only subset of media data 212. In some cases, if the duration or amount of media data received at 1005 is more than the predefined duration or amount, the validation system 120-*b* may nevertheless identify only one subset of media data 212 at 1010 (e.g., in the case of video or audio data, a temporally first subset of media data 212; in the case of image data, a subset of media data 212 corresponding to predefined location within the image) and may identify additional subsets of media data 212 at another point during process flow 1000. In some cases, if the duration or amount of media data received at 1005 is more than the predefined duration or amount, the validation system 120-*b* may identify multiple subsets of media data 212 at 1010 (e.g., all subsets of media data 212 included in the set of media data 210).

At 1015, the validation system 120-*b* may create a lookup hash 230 based on a subset of media data 212 identified at 1010 (e.g., in the case of video or audio data, a temporally first subset of media data 212; in the case of image data, a subset of media data 212 corresponding to predefined location within the image). The validation system 120-*b* may create the lookup hash 230 based on an alternative hashing algorithm in accordance with the techniques described herein. In some cases, the validation system 120-*b* may at 1015 create only one lookup hash 230. In some cases, the validation system 120-*b* may at 1015 create a lookup hash 230 for each of multiple subsets of media data 212 identified at 1010.

At 1020, the validation system 120-*b* may establish a communications link with the certification system 110-*d* and transmit to the certification system 110-*d* a validation request for the set of media data 210 received at 1005. In some cases, transmitting the validation request may include transmitting the lookup hash 230 to the certification system 110-*d*. In some cases, transmitting the validation request may include transmitting some other identifier of an immutable ledger 305 corresponding to the set of media data 210 received at 1005. In some cases, the validation system 120-*b* may at 1020 transmit only one lookup hash 230 (e.g., if at 1015 the validation system 120-*b* created only one lookup hash 230), and may also at 1020 transmit either an indication of how many subsets of media data 212 are included in the set of media data 210, or may also at 1020 transmit an indication of the amount or duration of media data the set of media data 210 (from which the certification system 110-*d* may determine the number of subsets of media data 212 included in the set of media data 210).

At 1025, the certification system 110-*d*, based on receiving the validation request at 1020, may identify an immutable ledger 305 corresponding to the set of media data 210 received at 1005. For example, the certification system 110-*d* may search a database of immutable ledgers 305 to identify an immutable ledger 305 that includes a ledger entry 310 with an identifier that matches a lookup hash 230 created by the validation system 120-*b* at 1015 (or, in some cases, some other identifier). In some cases, the certification system 110-*d* may include an intermediary system that stores identifiers of immutable ledgers 305 or ledger entries 310 in a storage format that supports enhanced lookup speed or efficiency, and the certification system 110-*d* may use the intermediary system to identify the immutable ledger 305. In cases where the certification system 110-*d* receives (e.g., at 1020) information from which the certification system 110-*d* may know the number of subsets of media data 212 included in the set of media data 210, the certification system 110-*d* may also at 1025 identify each ledger entry 310 relevant to validating the set of media data 210.

In some cases, the certification system 110-*d* may verify the validation system 120-*b* prior to attempting to identify the immutable ledger 305 (e.g., the validation system 120-*b* may sign the validation request using a private cryptographic key associated with the validation system 120-*b*, or a user thereof, and include in the validation request the associated public cryptographic key, and the certification system 110-*d* may verify the origin of the new validation request based on the associated signature and public cryptographic key). In some cases, the certification system 110-*d* may attempt to identify the immutable ledger 305 only if verification of the validation system 120-*b* is successful.

If the certification system 110-*d* is unable to identify any immutable ledger 305 corresponding to the set of media data 210 received at 1005, the certification system may transmit to the validation system 120-*b* an indication that an immutable ledger for the set of media data 210 received at 1005 cannot be found, and thus that set of media data 210 received at 1005 may not be validated. In some cases, an indication that an immutable ledger for the set of media data 210 received at 1005 cannot be found may comprise transmitting a validation response.

If the certification system 110-*d* is able to identify an immutable ledger 305 corresponding to the set of media data 210 received at 1005, the certification system 110-*d* may initiate a validation loop 1030, which the certification system 110-*d* may execute in coordination with validation system 120-*b*. Each execution of validation loop 1030 may correspond to a subset of media data 212. For example, a first execution of validation loop 1030 may correspond to a temporally or positionally first subset of media data 212 (e.g., if only one lookup hash 230 is received at 1020, the subset of media data 212 corresponding to the lookup hash 230 received at 1020), and each subsequent execution of validation loop 1030 may corresponding to a temporally or positionally subsequent subset of media data 212

At 1030-*a*, the certification system 110-*d* may evaluate a blockchain hash 325 corresponding to the subset of media data 212. For example, the certification system 110-*d* may evaluate a blockchain hash 325 included in a ledger entry 310 corresponding to the subset of media data 212. In some cases, the certification system 110-*d* may store multiple copies of the immutable ledger 305 (e.g., across multiple logically or physically distinct devices), and evaluating the blockchain hash 325 may include determining whether each copy of the immutable ledger 305 is in agreement with respect the contents (e.g., value) of the blockchain hash. Alternatively or additionally, evaluating the blockchain hash 325 may include creating a candidate blockchain hash in accordance with the techniques described here (e.g., based on contents of the corresponding ledger entry 310 and based on a blockchain hash 325 included in an immediately prior ledger entry 310, and based on a blockchain hashing algorithm), and determining whether the candidate blockchain hash matches the evaluated blockchain hash 325. In addition or as an alternative to evaluating the blockchain hash 325, in some cases the certification system 110-*d* may evaluate a certification system hash 330.

If the certification system 110-*d* determines that the evaluated blockchain hash 325 is invalid (e.g., because copies of the immutable ledger 305 are not unanimous, or because a candidate blockchain hash does not match the evaluated blockchain hash 325), the certification system may transmit to the validation system 120-*b* an indication that the blockchain hash 325 is invalid, and thus that set of media data 210 received at 1005 may not be validated. In some cases, an indication that the blockchain hash 325 is invalid may comprise transmitting a validation response.

If the certification system 110-*d* determines that the evaluated blockchain hash 325 is valid, the certification system 110-*d* may at 1030-*b* transmit to the validation system 120-*b* selected data from the ledger entry 310 for the subset of media data 212, which validation system may thereafter use to validate the subset of media data 212. In some cases, transmitting the selected data from the ledger entry 310 may comprise transmitting a validation response. The data transmitted at 1030-*b* may include one or more of a primary hashing algorithm indication 1015, subset metadata 234, a subset media hash 232, a subset metadata hash 236, or a subset combo hash 240, each of which may comprise a trusted version thereof.

The certification system 110-*d* may determine the trusted version of subset metadata 234, a subset media hash 232, a subset metadata hash 236, or a subset combo hash 240 (which may alternatively be referred to as trusted subset metadata, a trusted subset media hash, a trusted subset metadata hash, or a trusted subset combo hash, respectively) in accordance with the techniques described herein. In some cases, the certification system 110-*d* may determine the trusted version by polling multiple copies of the immutable ledger 305, which may be distributed across multiple logically or physically distinct devices. In some cases, the certification system 110-*d* may determine that any contents of the ledger entry 310 are trusted based on the blockchain hash 325 evaluated at 1030-*a*.

At 1030-*c*, the validation system 120-*b* may create a candidate subset media hash based on the subset of media data 212. The validation system 120-*b* may create the candidate subset media hash based on a hashing algorithm in accordance with the techniques described herein (e.g., based on the primary hashing algorithm indicated at 1030-*b*).

At 1030-*d*, the validation system 120-*b* may evaluate the candidate subset media hash created at 1030-*c*. For example, the validation system 120-*b* may compare the candidate subset media hash to a trusted subset media hash 232 received at 1030-*b* and determine whether the candidate subset media hash matches trusted subset media hash 232.

At 1030-*e*, the validation system 120-*b* may create a candidate subset metadata hash based on the subset metadata 234 received at 1030-*b*. The validation system 120-*b* may create the candidate subset metadata hash based on a hashing algorithm in accordance with the techniques described herein (e.g., based on the primary hashing algorithm indicated at 1030-*b*). In some cases, providing trusted metadata to the validation system 120-*b* by the certification system 110-*d* may provide a technical solution that enhances security in the even a hacker was able to edit the subset metadata 234 stored by the certification system 110-*d*, as such a hacker may not also be able to recreate the corresponding subset metadata hash 236 (e.g., due to not knowing the primary hashing algorithm).

At 1030-*f*, the validation system 120-*b* may evaluate the candidate subset metadata hash created at 1030-*e*. For example, the validation system 120-*b* may compare the candidate subset metadata hash to a trusted subset metadata hash 236 received at 1030-*b* and determine whether the candidate subset metadata hash matches trusted subset metadata hash 236.

In some cases, in alternative or in addition to creating and evaluating a candidate subset metadata hash 236, the validation system 120-*b* may create subset combo data and a corresponding candidate subset combo hash based on the subset of media data 212 and the corresponding subset metadata 234. In such cases, the validation system 120-*b* may create the subset combo hash based on a hashing algorithm in accordance with the techniques described herein (e.g., based on the primary hashing algorithm indicated at 1030-*b*), may compare the candidate subset combo hash to a trusted subset combo hash 240 received at 1030-*b* and determine whether the candidate subset media hash matches trusted subset combo hash 240.

At 1030-*g*, the validation system 120-*b* may determine a level of validity for the subset of media data 212 in accordance with the techniques described herein. For example, the validation system 120-*b* may determine a trust score 505 based on one or more of evaluating the candidate subset media hash at 1030-*d*, evaluating the candidate subset metadata hash at 1030-*f*, evaluating a candidate combo hash 240. In some cases, if any performed hash evaluation does not check out (e.g., the candidate hash does not match the trusted version thereof), the validation system 120-*b* may skip creating and evaluating other hashes and may skip to determining a trust score of invalid, fail, etc. at 1030-*g*. In some cases, any performed hash evaluation does not check out, the validation system 120-*b* may present a special notification that he set of media data 210 has been altered. In some cases, if each performed hash evaluation does check out, (e.g., the candidate hash does match the trusted version thereof), the validation system 120-*b* may at 1030-*g* determine a binary trust score of valid, pass, etc., or may determine a non-binary trust score based on additional factors as described herein (e.g., based on metadata associated with the subset of media data 212, including user profile data associated with the subset of media data 212).

In some cases, the validation system 120-*b* may transmit to the certification system 110-*d* an indication of the evaluation results at 1030-*d* and 1030-*f* (or any other evaluations performed), and the certification system 110-*d* may determine the level of validity for the subset of media data 212.

At 1030-*h*, the validation system 120-*b* may present the subset of media data 212 in accordance with the techniques described herein. For example, the validation system 120-*b* may present the subset of media data 212 to a user via a display device or speaker device coupled with (e.g., included in a common host device) or included in the validation system 120-*b*. In some cases, the validation system 120-*b* may also (e.g., concurrently) present one or more of a subset trust score 505 determined at 1030-*g*, an indication of whether a particular type of metadata (e.g., subset metadata 234) is associated with the subset of media data 212, and the substance of metadata (e.g., subset metadata 234, such as location data) associated with the subset of media data 212.

It is to be understood that operations associated with 1030-*c* through 1030-*h* may occur in orders other than that depicted in the example illustrated in FIG. 10, and that in some cases multiple operations associated with 1030-*c* through 1030-*g* may occur simultaneously.

The validation system 120-*b* and the certification system 110-*d* may execute validation loop 1030 any number of times. For example, if the set of media data 210 is less than the predefined duration or amount of media data for a subset of media data 212, then the validation system 120-*b* may execute validation loop 1030 once. If the set of media data 210 is more than the predefined duration or amount of media data for a subset of media data 212, then the validation system 120-*b* may execute validation loop 1030 multiple times until each subset of media data 212 received at 1005 has been validated.

In some cases, after completing all executions of validation loop 1030 for the set of media data 210, the validation system 120-*b* may create one or more of a candidate global media hash, candidate global metadata hash, or candidate global combo hash and evaluate each candidate hash created based on a trusted version thereof received from the certification system 110-*d*.

At 1035, the validation system 120-*b* may determine a global trust score 505 for the set of media data 210 in accordance with the techniques described herein. For example, the validation system 120-*b* may determine the global trust score 505 based on a combination (e.g., a weighted average) of the trust scores 505 determined for each subset of media data 212 at 1030-*g*. In some cases, the validation system 120-*b* may also determine the global trust score 505 based on the evaluation of one or more of candidate global media hash, candidate global metadata hash, or candidate global combo hash. The validation system 120-*b* may also determine the global trust score 505 based on global metadata 252, which may be transmitted from the certification system 110-*d* to the validation system 120-*b* (not shown).

At 1040, the validation system 120-*b* may present the global trust score 505 determined at 1035 in accordance with the techniques described herein. For example, the validation system 120-*b* may present the global trust score 505 to a user via a display device or speaker device coupled with (e.g., included in a common host device) or included in the validation system 120-*b*. In some cases, the validation system 120-*b* may not perform operations associated with 1035 or 1040—for example, where the set of media data 210 received at 1005 is only a portion of a captured set of media data 210.

In some cases, the validation system 120-*b* may execute validation loop 1030 for each subset of media data 212 included in the set of media data 210 received at 1005 (that is, for all subsets of media data 212), save the presentation aspects described with reference to 1030-*h*, may then perform aspects of the operations described with reference to 1035 and 1040. The validation system 120-*b* may then present either the entire set of media data 210 (e.g., if the media data comprises image data for a single image), or may present subsets of media data 212 in temporal order (e.g., if the media data comprises video data or audio data) in accordance with the techniques described herein, including—concurrently with presenting a subset of media data 212—presenting a trust score 505 for the subset of media data 212, a global trust score for the set of media data 210, indications of or substantive content of subset metadata 234 for the subset of media data 212, indications of or substantive content of global metadata 252, or any combination thereof.

Figure 11:
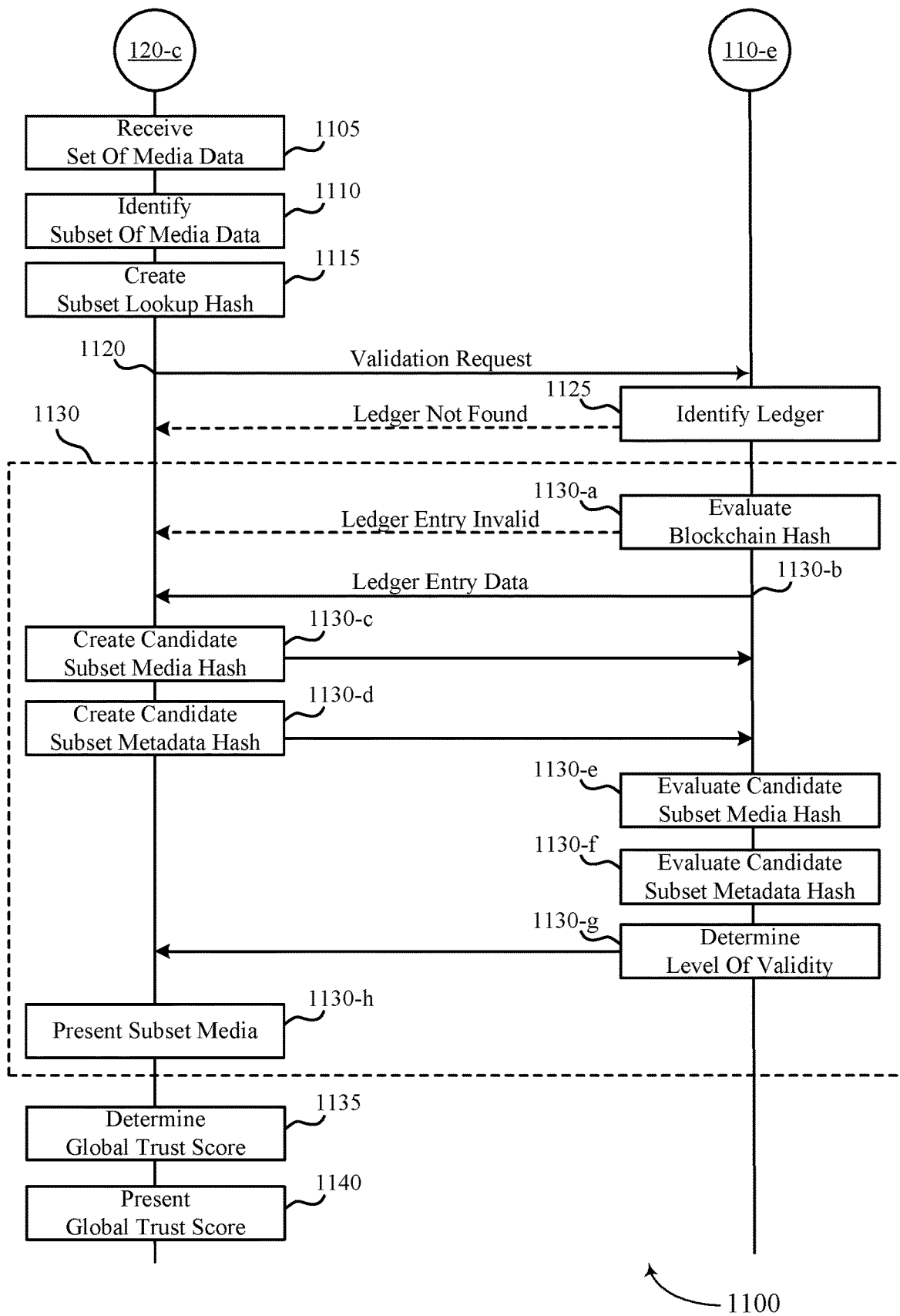
FIG. 11 illustrates an additional example of a process flow that supports identifying altered media data in accordance with aspects of the present disclosure.

FIG. 11 illustrates an example of a process flow 1100 that supports identifying altered media data in accordance with aspects of the present disclosure. In some examples, process flow 1100 may be implemented by a validation system 120-c and a certification system 110-e, which may be examples of a validation system 120 and a certification system 110 as described with reference to FIG. 1.

In some cases, the validation system 120-c may comprise a host device and an application for validating media data. For example, the validation system 120-c may comprise a smartphone or other computing device that hosts a validation application. As another example, the validation system 120-c may comprise a smartphone or other computing device that hosts a web browser application, and the validation application may be hosted remotely and accessible via the web browser application.

At 1105, the validation system 120-c may receive a set of media data 210. For example, a user of the validation system 120-c may upload or import the set of media data 210 to the validation system 120-c. In some cases, the validation system 120-c may receive the set of media data from a capture system 105 via a communications link (e.g., via an application-to-application transfer mechanism, which may be provided by a distribution system 115).

At 1110, the validation system 120-c may identify one or more subsets of media data 212. For example, the validation system 120-c may identify a predefined duration or amount of media data (e.g., X seconds of video data or audio data, or Y frames of video data or samples of audio data, etc.) included in the set of media data 210 received at 1105. If the duration or amount of media data received at 1105 is less than the predefined duration or amount, the validation system 120-c may at 1110 identify all of the media data 210 received at 1105 as the only subset of media data 212. In some cases, if the duration or amount of media data received at 1105 is more than the predefined duration or amount, the validation system 120-c may nevertheless identify only one subset of media data 212 at 1110 (e.g., in the case of video or audio data, a temporally first subset of media data 212; in the case of image data, a subset of media data 212 corresponding to predefined location within the image) and may identify additional subsets of media data 212 at another point during process flow 1100. In some cases, if the duration or amount of media data received at 1105 is more than the predefined duration or amount, the validation system 120-c may identify multiple subsets of media data 212 at 1110 (e.g., all subsets of media data 212 included in the set of media data 210).

At 1115, the validation system 120-c may create a lookup hash 230 based on a subset of media data 212 identified at 1110 (e.g., in the case of video or audio data, a temporally first subset of media data 212; in the case of image data, a subset of media data 212 corresponding to predefined location within the image). The validation system 120-c may create the lookup hash 230 based on an alternative hashing algorithm in accordance with the techniques described herein. In some cases, the validation system 120-c may at 1115 create only one lookup hash 230. In some cases, the validation system 120-c may at 1115 create a lookup hash 230 for each of multiple subsets of media data 212 identified at 1110.

At 1120, the validation system 120-c may establish a communications link with the certification system 110-e and transmit to the certification system 110-e a validation request for the set of media data 210 received at 1105. In some cases, transmitting the validation request may include transmitting one or more lookup hashes 230 to the certification system 110-e. In some cases, transmitting the validation request may include transmitting one or more other identifiers of an immutable ledger 305 corresponding to the set of media data 210 received at 1105. In some cases, the validation system 120-c may at 1120 transmit only one lookup hash 230 (e.g., if at 1115 the validation system 120-c created only one lookup hash 230), and may also at 1120 transmit either an indication of how many subsets of media data 212 are included in the set of media data 210, or may also at 1120 transmit an indication of the amount or duration of media data the set of media data 210 (from which the certification system 110-e may determine the number of subsets of media data 212 included in the set of media data 210).

At 1125, the certification system 110-e, based on receiving the validation request at 1120, may identify an immutable ledger 305 corresponding to the set of media data 210 received at 1105. For example, the certification system 110-e may search a database of immutable ledgers 305 to identify an immutable ledger 305 that includes a ledger entry 310 with an identifier that matches a lookup hash 230 created by the validation system 120-c at 1115 (or, in some cases, some other identifier). In some cases, the certification system 110-e may include an intermediary system that stores identifiers of immutable ledgers 305 or ledger entries 310 in a storage format that supports enhanced lookup speed or efficiency, and the certification system 110-e may use the intermediary system to identify the immutable ledger 305. In cases where the certification system 110-e receives (e.g., at 1120) information from which the certification system 110-e may know the number of subsets of media data 212 included in the set of media data 210, the certification system 110-e may also at 1125 identify each ledger entry 310 relevant to validating the set of media data 210.

In some cases, the certification system 110-e may verify the validation system 120-c prior to attempting to identify the immutable ledger 305 (e.g., the validation system 120-c may sign the validation request using a private cryptographic key associated with the validation system 120-c, or a user thereof, and include in the validation request the associated public cryptographic key, and the certification system 110-e may verify the origin of the new validation request based on the associated signature and public cryptographic key). In some cases, the certification system 110-e may attempt to identify the immutable ledger 305 only if verification of the validation system 120-c is successful.

If the certification system 110-e is unable to identify any immutable ledger 305 corresponding to the set of media data 210 received at 1105, the certification system may transmit to the validation system 120-c an indication that an immutable ledger for the set of media data 210 received at 1105 cannot be found, and thus that the set of media data 210 received at 1105 may not be validated. In some cases, an indication that an immutable ledger for the set of media data 210 received at 1105 cannot be found may comprise transmitting a validation response.

If the certification system 110-e is able to identify an immutable ledger 305 corresponding to the set of media data 210 received at 1105, the certification system 110-*e* may initiate a validation loop 1130, which the certification system 110-*e* may execute in coordination with validation system 120-*c*. Each execution of validation loop 1130 may correspond to a subset of media data 212. For example, a first execution of validation loop 1130 may correspond to a temporally or positionally first subset of media data 212 (e.g., if only one lookup hash 230 is received at 1120, the subset of media data 212 corresponding to the lookup hash 230 received at 1120), and each subsequent execution of validation loop 1130 may corresponding to a temporally or positionally subsequent subset of media data 212.

At 1130-*a*, the certification system 110-*e* may evaluate a blockchain hash 325 corresponding to the subset of media data 212. For example, the certification system 110-*e* may evaluate a blockchain hash 325 included in a ledger entry 310 corresponding to the subset of media data 212. In some cases, the certification system 110-*e* may store multiple copies of the immutable ledger 305 (e.g., across multiple logically or physically distinct devices), and evaluating the blockchain hash 325 may include determining whether each copy of the immutable ledger 305 is in agreement with respect the contents (e.g., value) of the blockchain hash. Alternatively or additionally, evaluating the blockchain hash 325 may include creating a candidate blockchain hash in accordance with the techniques described here (e.g., based on contents of the corresponding ledger entry 310 and based on a blockchain hash 325 included in an immediately prior ledger entry 310, and based on a blockchain hashing algorithm), and determining whether the candidate blockchain hash matches the evaluated blockchain hash 325. In addition or as an alternative to evaluating the blockchain hash 325, in some cases the certification system 110-*e* may evaluate a certification system hash 330.

If the certification system 110-*e* determines that the evaluated blockchain hash 325 is invalid (e.g., because copies of the immutable ledger 305 are not unanimous, or because a candidate blockchain hash does not match the evaluated blockchain hash 325), the certification system may transmit to the validation system 120-*c* an indication that the blockchain hash 325 is invalid, and thus that set of media data 210 received at 1105 may not be validated. In some cases, transmitting an indication that the blockchain hash 325 is invalid may comprise transmitting a validation response.

If the certification system 110-*e* determines that the evaluated blockchain hash 325 is valid, the certification system 110-*e* may at 1130-*b* transmit to the validation system 120-*c* selected data from the ledger entry 310 for the subset of media data 212, which validation system may thereafter use to validate the subset of media data 212. In some cases, transmitting the selected data from the ledger entry 310 may comprise transmitting a validation response. The data transmitted at 1130-*b* may include one or more of a primary hashing algorithm indication 1115 and subset metadata 234.

At 1130-*c*, the validation system 120-*c* may create a candidate subset media hash based on the subset of media data 212. The validation system 120-*c* may create the candidate subset media hash based on a hashing algorithm in accordance with the techniques described herein (e.g., based on the primary hashing algorithm indicated at 1130-*b*). The validation system 120-*c* may transmit the candidate subset media hash to the certification system 110-*e*.

At 1130-*d*, the validation system 120-*c* may create a candidate subset metadata hash based on the subset metadata 234 received at 1130-*b*. The validation system 120-*c* may create the candidate subset metadata hash based on a hashing algorithm in accordance with the techniques described herein (e.g., based on the primary hashing algorithm indicated at 1130-*b*). The validation system 120-*c* may transmit the candidate subset metadata hash to the certification system 110-*e*. In some cases, providing trusted metadata to the validation system 120-*b* by the certification system 110-*d* may provide a technical solution that enhances security in the even a hacker was able to edit the subset metadata 234 stored by the certification system 110-*d*, as such a hacker may not also be able to recreate the corresponding subset metadata hash 236 (e.g., due to not knowing the primary hashing algorithm).

At 1130-*e*, the certification system 110-*e* may evaluate the candidate subset media hash created at 1130-*c*. For example, the validation system 120-*c* may compare the candidate subset media hash to a trusted subset media hash 232 received at 1130-*b* and determine whether the candidate subset media hash matches the trusted subset media hash 232.

At 1130-*f*, the validation system 120-*c* may evaluate the candidate subset metadata hash created at 1130-*e*. For example, the validation system 120-*c* may compare the candidate subset metadata hash to a trusted subset metadata hash 236 received at 1130-*b* and determine whether the candidate subset metadata hash matches the trusted subset metadata hash 236.

In some cases, in the alternative or in addition to the validation system 120-*c* creating and the certification system 110-*e* evaluating a candidate subset metadata hash 236, the validation system 120-*c* may create subset combo data and a corresponding candidate subset combo hash based on the subset of media data 212 and the corresponding subset metadata 234. In such cases, the validation system 120-*c* may create the candidate subset combo hash based on a hashing algorithm in accordance with the techniques described herein (e.g., based on the primary hashing algorithm indicated at 1130-*b*) and transmit the candidate subset to combo has to the certification system 110-*e*, which may compare the candidate subset combo hash to a trusted subset combo hash 240, determine whether the candidate subset media hash matches trusted subset combo hash 240, and transmit to the validation system 120-*c* an indication of whether the candidate subset media hash matches trusted subset combo hash 240. In some cases, transmitting an indication of whether the candidate subset combo hash matches the trusted subset combo hash 240 may comprise transmitting a validation response.

The certification system 110-*e* may determine the trusted version of subset metadata 234, a subset media hash 232, a subset metadata hash 236, or a subset combo hash 240 (which may alternatively be referred to as trusted subset metadata, a trusted subset media hash, a trusted subset metadata hash, or a trusted subset combo hash, respectively) in accordance with the techniques described herein. In some cases, the certification system 110-*e* may determine the trusted version by polling multiple copies of the immutable ledger 305, which may be distributed across multiple logically or physically distinct devices. In some cases, the certification system 110-*e* may determine that any contents of the ledger entry 310 are trusted based on the evaluation of the blockchain hash 325 at 1130-*a*.

At 1130-*g*, the certification system 110-*e* may determine a level of validity for the subset of media data 212 in accordance with the techniques described herein and transmit an indication of the determined level of validity to the validation system 120-*c*. In some cases, transmitting an indication of the determined level of validity may comprise transmitting a validation response.

For example, the certification system 110-*e* may determine a trust score 505 based on one or more of evaluating the candidate subset media hash at 1130-*d*, evaluating the candidate subset metadata hash at 1130-*f*, evaluating a candidate combo hash 240. In some cases, if any performed hash evaluation does not check out (e.g., the candidate hash does not match the trusted version thereof), the certification system 110-*e* may skip evaluating other hashes and may skip to determining a trust score of invalid, fail, etc. at 1130-*g*. In some cases, any performed hash evaluation does not check out, the certification system 110-*e* may indicate as such to the validation system 120-*c*, which may present a special notification that he set of media data 210 has been altered. In some cases, if each performed hash evaluation does check out, (e.g., the candidate hash does match the trusted version thereof), the certification system 110-*e* may at 1130-*g* determine a binary trust score of valid, pass, etc., or may determine a non-binary trust score based on additional factors as described herein (e.g., based on metadata associated with the subset of media data 212, including user profile data associated with the subset of media data 212).

In some cases, the certification system 110-*e* may transmit to the validation system 120-*c* an indication of the evaluation results at 1130-*e* and 1130-*f* (or any other evaluations performed), and the validation system 120-*c* may determine the level of validity for the subset of media data 212. In some cases, transmitting an indication of whether a candidate hash matches the trusted version thereof may comprise transmitting a validation response.

At 1130-*h*, the validation system 120-*c* may present the subset of media data 212 in accordance with the techniques described herein. For example, the validation system 120-*c* may present the subset of media data 212 to a user via a display device or speaker device coupled with (e.g., included in a common host device) or included in the validation system 120-*c*. In some cases, the validation system 120-*c* may also (e.g., concurrently) present one or more of a subset trust score 505 determined at 1130-*g*, an indication of whether a particular type of metadata (e.g., subset metadata 234) is associated with the subset of media data 212, and the substance of metadata (e.g., subset metadata 234, such as location data) associated with the subset of media data 212.

It is to be understood that operations associated with 1130-*c* through 1130-*h* may occur in orders other than that depicted in the example illustrated in FIG. 11, and that in some cases multiple operations associated with 1130-*c* through 1130-*h* may occur simultaneously.

The validation system 120-*c* and the certification system 110-*e* may execute validation loop 1130 any number of times. For example, if the set of media data 210 is less than the predefined duration or amount of media data for a subset of media data 212, then the validation system 120-*c* may execute validation loop 1130 once. If the set of media data 210 is more than the predefined duration or amount of media data for a subset of media data 212, then the validation system 120-*c* may execute validation loop 1130 multiple times until each subset of media data 212 received at 1105 has been validated.

In some cases, after completing all executions of validation loop 1130 for the set of media data 210, the validation system 120-*c* may create one or more of a candidate global media hash, candidate global metadata hash, or candidate global combo hash, transmit any created candidate hash to the certification system 110-*e*. The certification system 110-*e* may evaluate each received candidate hash based on a trusted version thereof received and transmit to validation system 120-*c* a corresponding indication of whether the received candidate hash matches the trusted version thereof.

At 1135, the validation system 120-*c* may determine a global trust score 505 for the set of media data 210 in accordance with the techniques described herein. For example, the validation system 120-*c* may determine the global trust score 505 based on a combination (e.g., a weighted average) of the trust scores 505 determined for each subset of media data 212 at 1130-*g*. In some cases, the validation system 120-*c* may also determine the global trust score 505 based on the evaluation of one or more of candidate global media hash, candidate global metadata hash, or candidate global combo hash. The validation system 120-*c* may also determine the global trust score 505 based on global metadata 252, which may be transmitted from the certification system 110-*e* to the validation system 120-*c* (not shown). In some cases, the certification system 110-*e* may determine the global trust score 505 and transmit to the validation system 120-*c* an indication thereof.

At 1140, the validation system 120-*c* may present the global trust score 505 determined at 1135 in accordance with the techniques described herein. For example, the validation system 120-*c* may present the global trust score 505 to a user via a display device or speaker device coupled with (e.g., included in a common host device) or included in the validation system 120-*c*. In some cases, the validation system 120-*c* may not perform operations associated with 1135 or 1140—for example, where the set of media data 210 received at 1105 is only a portion of a captured set of media data 210.

In some cases, the validation system 120-*c* may execute validation loop 830 for each subset of media data 212 included in the set of media data 210 received at 805 (that is, for all subsets of media data 212), save the presentation aspects described with reference to 830-*h*, may then perform aspects of the operations described with reference to 835 and 840. The validation system 120-*c* may then present either the entire set of media data 210 (e.g., if the media data comprises image data for a single image), or may present subsets of media data 212 in temporal order (e.g., if the media data comprises video data or audio data) in accordance with the techniques described herein, including—concurrently with presenting a subset of media data 212—presenting a trust score 505 for the subset of media data 212, a global trust score for the set of media data 210, indications of or substantive content of subset metadata 234 for the subset of media data 212, indications of or substantive content of global metadata 252, or any combination thereof.

Figure 12:
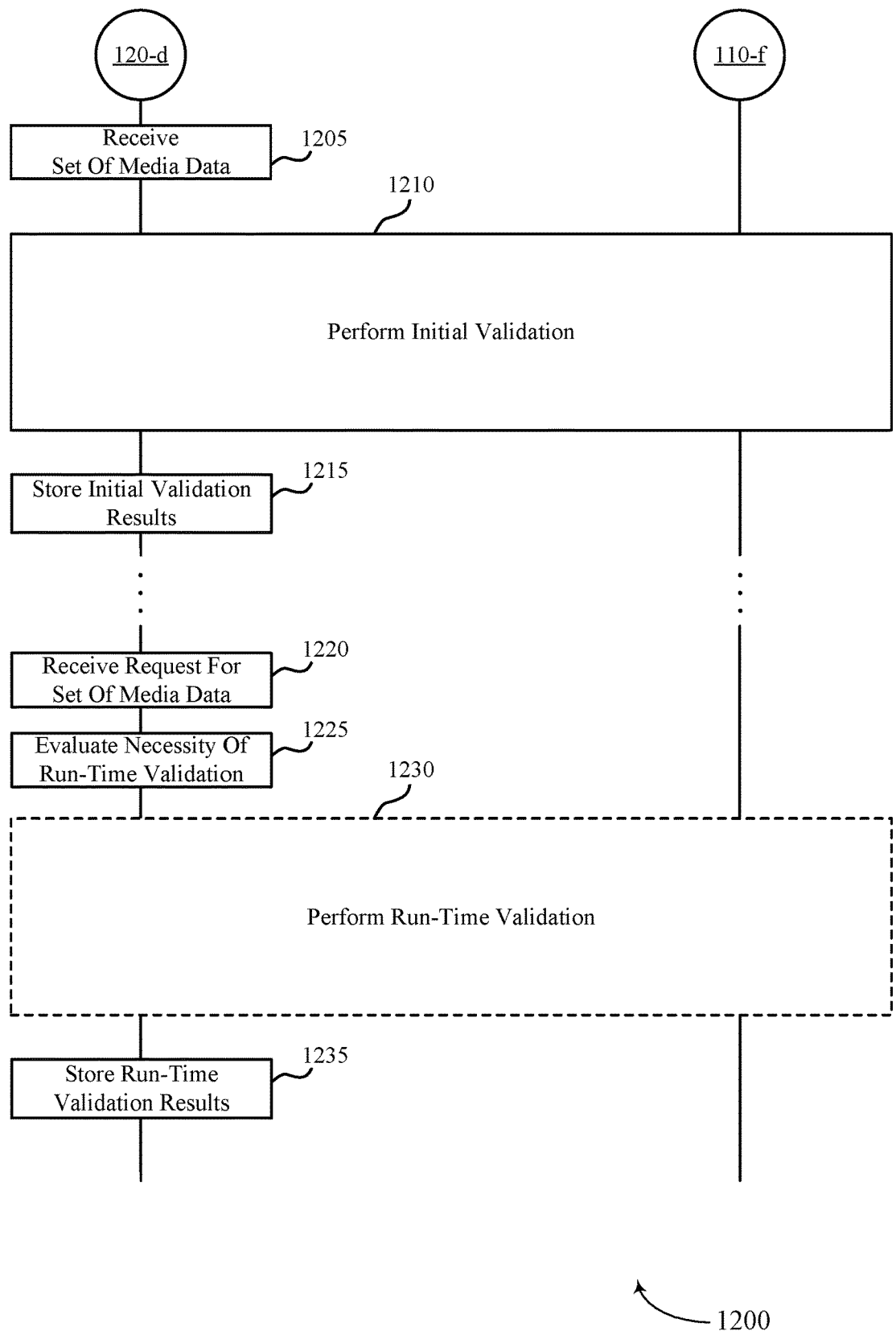
FIG. 12 illustrates an additional example of a process flow that supports identifying altered media in accordance with aspects of the present disclosure.

FIG. 12 illustrates an example of a process flow 1200 that supports identifying altered media data in accordance with aspects of the present disclosure. In some examples, process flow 1200 may be implemented by a the validation system 120-*d* and a the certification system 112-*f*, which may be examples of a validation system 120 and a certification system 112 as described with reference to FIG. 1.

In some cases, the validation system 120-*d* may comprise a server-based system that hosts (e.g., stores) sets of media data 212, and makes the hosted sets of media data 212 accessible to individual users, for example, via one or more communication links and a remote interface. For example, the validation system 120-*d* may make or be coupled with a system that makes the hosted sets of media data 212 accessible to remote users via a smartphone application, via a web browser-based application, via a social media network, via a video-hosting service, etc. The validation system 120-*d* may support searching for and playing of the hosted sets of media data 212 by remote users.

At 1205, the validation system 120-d may receive a set of media data 212. For example, a capture system 125 may transmit the set of media data 212 to the validation system 120-d on a real time, periodic, or ad hoc basis. In some cases, the validation system 120-d may receive the set of media data from a capture system 125 via a communications link (e.g., via an application-to-application transfer mechanism). In some cases, the capture system 125 may transmit the set of media data 212 to the validation system 120-d via a distribution system 115. As another example, a user of the validation system 120-d may upload or import the set of media data 212 to the validation system 120-d (e.g., via a web-based portal or interface) for hosting by the validation system 120-d.

At 1210, the validation system 120-d may perform an initial validation of the set of media data 212 in accordance with the techniques described herein. For example, at 1210, the validation system 120-d may validate the set of media data 212 in accordance with process flow 1000 or process flow 1100, as described with reference to FIGS. 10 and 11 respectively.

At 1215, the validation system 120-d may store one or more results associated with the initial validation (e.g., trust scores 505 for the set of media data 212, metadata for the set of media data 212, ledger entry data for the set of media data, etc.). For example, the validation system 120-d may store a global trust score 505 for the set of media data 212 as determined at 1210, one or more trust scores 505 for individual subsets of media data 212 as determined at 1210, or any combination thereof.

At 1220, the validation system 120-d may receive a request for (e.g., a request that the validation system 120-d play or present) the set of media data 212. For example, the validation system 120-d may receive the request from a remote application communicatively coupled with the validation system 120-d (e.g., a user of a remote smartphone or web-based application may request the set of media data 212, and the remote application may transmit a corresponding request to the validation system 120-d).

At 1225, the validation system 120-d may determine whether to perform a run-time validation of the set of media data 212. For example, the validation system 120-d may determine whether to perform a run-time validation of the set of media data 212 based on a latency between the most recent validation of the set of media data, such as how long it has been since the initial validation or the most recent run-time validation. As another example, the validation system 120-d may—in addition or in the alternative to a run-time validation—perform validations on a periodic basis (e.g., according to a periodic schedule) or according to a demand-based basis (e.g., according to an algorithm in which a set of media data 212 is validated for every X views, or with a frequency based on demand frequency for the set of media data 212 by users) and may determine whether to perform a run-time validation based on a recency of validation according to such a validation algorithm or whether such a validation algorithm would call for validation (e.g., whether the request received at 1220 is the Xth request).

If the validation system 120-d determines not to perform a run-time validation of the set of media data 212, the validation system 120-d may present the set of media data 212 to the user of the remote application in accordance with the techniques described herein. For example, the validation system 120-d may present the set of media data 212 along with one or more associated trust scores 505, indicators of the presence or absence of associated metadata, substantive content of associated metadata, or any combination thereof, which the validation system 120-d may have stored in connection with the initial validation performed at 1210.

If the validation system 120-d determines to perform a run-time validation of the set of media data 212, the validation system 120-d perform the run-time validation at 1230 in accordance with the techniques described herein. For example, at 1230, the validation system 120-d may validate the set of media data 212 in accordance with process flow 1000 or process flow 1100, as described with reference to FIGS. 10 and 11 respectively. The validation system 120-d may present the set of media data 212 to the user of the remote application in accordance with the techniques described herein, either as part of or subsequent to the run-time validation performed at 1230.

At 1235, the validation system 120-d may store one or more results associated with the run-time validation (e.g., trust scores 505 for the set of media data 212, metadata for the set of media data 212, ledger entry data for the set of media data, etc.). For example, the validation system 120-d may store a global trust score 505 for the set of media data 212 as determined at 1230, one or more trust scores 505 for individual subsets of media data 212 as determined at 1230, or any combination thereof.

In some cases, the validation system 120-d may operate in a loop that includes the operations described herein in associated with 1220, 1225, 1230, and 1235.

Figure 13:
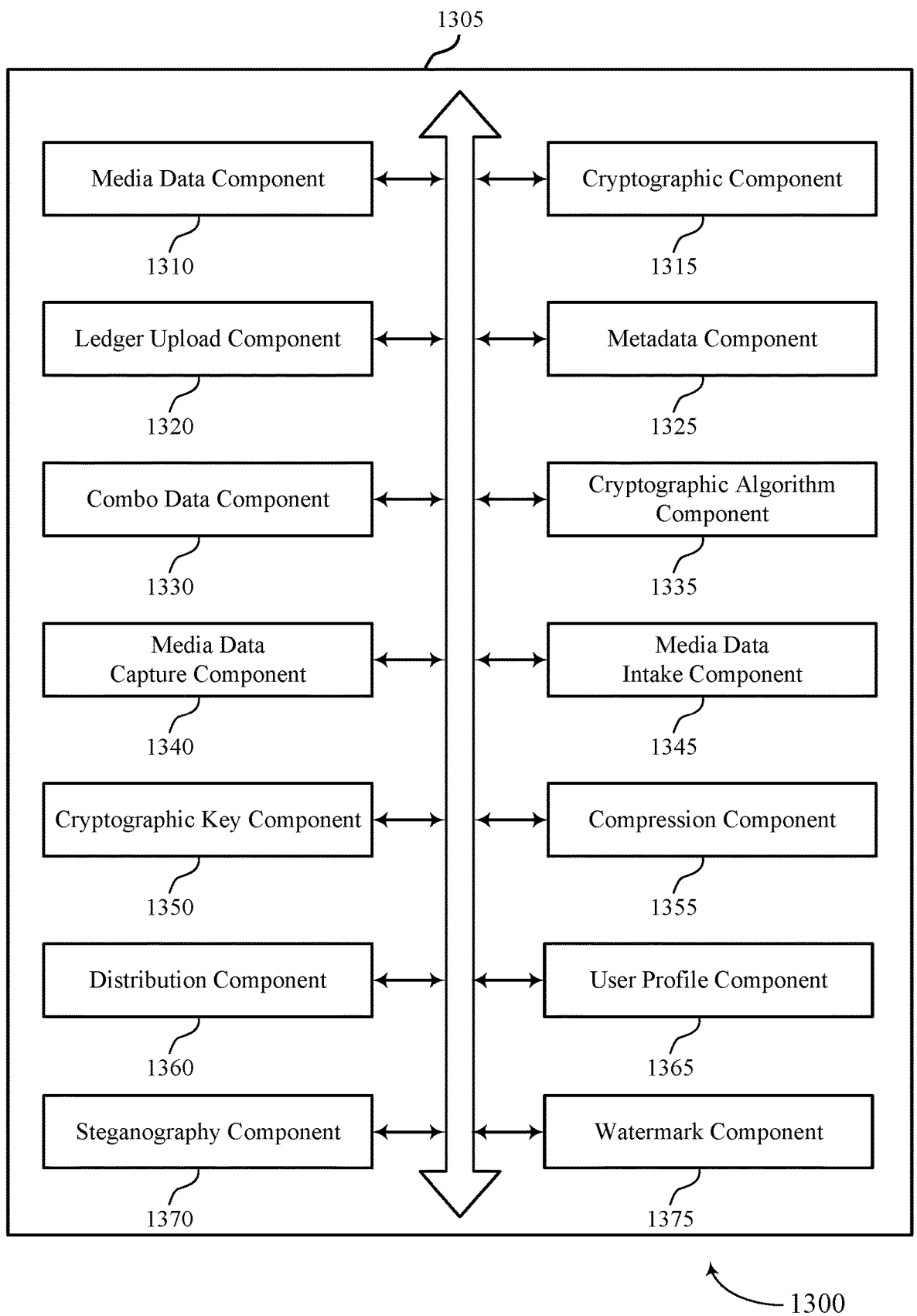
FIG. 13 shows a block diagram of a system that supports identifying altered media data in accordance with aspects of the present disclosure.

FIG. 13 shows a block diagram 1300 of a device 1305 that supports identifying altered media data in accordance with aspects of the present disclosure. The device 1305 may be an example of or include aspects of a capture system 105 as described herein. The device 1305 may include a media data component 1310, a cryptographic component 1315, a ledger upload component 1320, a metadata component 1325, a combo data component 1330, a cryptographic algorithm component 1335, a media data capture component 1340, a media data intake component 1345, a cryptographic key component 1350, a compression component 1355, a distribution component 1360, a user profile component 1365, a steganography component 1370, and a watermark component 1375.

Each component of the device 1305 may be in communication with one another (e.g., via one or more buses). Each component of the device 1305 may be implemented in hardware, code (e.g., software or firmware) executed by a processor, or any combination thereof. If implemented in code executed by a processor, the functions of a component, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The device 1305, or its sub-components, may be physically located at various positions, including being distributed such that portions of functions are implemented at different physical locations or by one or more physical or logically distinct components. In some examples, the device 1305, or its sub-components, may be a separate and distinct component in accordance with various aspects of the present disclosure. In some examples, the device 1305, or its sub-components, may be combined with one or more other hardware components, including but not limited to an input/output (I/O) component, a transceiver, another computing device, one or more other components described in the present disclosure, or a combination thereof in accordance with various aspects of the present disclosure.

Media data component 1310 may identify a set of media data or a set of subsets of a set of media data. Cryptographic component 1315 may create a set of cryptographic representations (e.g., hashes), each cryptographic representation in the set of cryptographic representations based on a respective subset in the set of subsets. Ledger upload component 1320 may transmit, to a second computer system (e.g., a certification system 110 as described herein) via a communications link, the set of cryptographic representations, where the second computer system is configured to write the set of cryptographic representations to an immutable ledger that is remote from the device 1305, each cryptographic representation corresponding to a respective entry in the immutable ledger.

The set of media data may include audio data, image data, video data, or a combination thereof. The audio data may include telephonic conversation data (e.g., captured cellular telephone conversation data). The device 1305 may comprise an application specific to capturing one of audio data, image data, video data, or telephonic conversation data. In some cases, identifying the set of subsets includes segmenting the set of media data to create the plurality of subsets. In some cases, identifying the set of subsets includes capturing the media data one segment at a time.

The immutable ledger may include a blockchain, and the respective entry in the immutable ledger may include a respective block of the blockchain. The cryptographic representations may be cryptographic hashes. In some cases, the immutable ledger may be replicated at each of a set of host devices, each host device in the set of host devices remote from device 1305.

In some case, metadata component 1325 may identify, at the first computer system, a set of portions of metadata for the set of media data, each portion of metadata for a subset in the set of subsets, and ledger upload component 1320 may transmit, to the second computer system via the communications link, the set of portions of metadata, where the second computer system may be configured to write the set of portions of metadata to the immutable ledger.

In some cases, cryptographic component 1315 may create a second set of cryptographic representations, each cryptographic representation in the second set of cryptographic representations based on a respective portion of metadata in the set of portions of metadata, and ledger upload component 1320 may transmit, to the second computer system via the communications link, the second set of cryptographic representations, where the second computer system may be configured to write the second set of cryptographic representations to the immutable ledger.

In some cases, combo data component 1330 may combine corresponding portions of metadata in the set of portions of metadata and subsets in the set of subsets to create a set of combined data sets. Cryptographic component 1315 may create a third set of cryptographic representations, each cryptographic representation in the third set of cryptographic representations based on a respective combined data set, and ledger upload component 1320 may transmit, to the second computer system via the communications link, the third set of cryptographic representations, where the second computer system may be configured to write the third set of cryptographic representations to the immutable ledger.

In some cases, ledger upload component 1320 may transmit, to the second computer system via the communications link, an indication of the set of media data. Cryptographic algorithm component 1335 may receive, from the second computer system via the communications link, an indication of a primary cryptographic algorithm. Cryptographic algorithm component 1335 may coordinate with cryptographic component 1315, and the set of cryptographic representations may be based on the primary cryptographic algorithm. The primary cryptographic algorithm may be one of a set of cryptographic algorithms supported by the first computer system.

In some cases, cryptographic component 1315 may create an alternative cryptographic representation based on a respective subset in the set of subsets and an alternative cryptographic algorithm, where the set of cryptographic representations may be based on a primary cryptographic algorithm that may be different than the alternative cryptographic algorithm. Ledger upload component 1320 may transmit, to the second computer system via the communications link, the alternative cryptographic representation, where the alternative cryptographic representation comprises (e.g., serves as) an identifier of a corresponding entry in the immutable ledger.

In some cases, cryptographic component 1315 may create an additional cryptographic representation based on an initiation event for the set of media data. Ledger upload component 1320 may transmit, to the second computer system via the communications link, the additional cryptographic representation, where the second computer system may be configured to write the additional cryptographic representation to the immutable ledger as a corresponding additional entry in the immutable ledger.

In some cases, cryptographic component 1315 may create an additional cryptographic representation based on an entirety of the set of media data. Ledger upload component 1320 may transmit, from the first computer system to the second computer system via the communications link, the additional cryptographic representation, where the second computer system may be configured to write the additional cryptographic representation to the immutable ledger as a corresponding additional entry in the immutable ledger.

In some cases, the device 1305 may include media data capture component 1340, which may capture the set of media data using a microphone included in the device 1305, a camera included in the device 1305, a telephonic conversation recording component, a data sniffer, a like component included in the device 1305, or a combination thereof. In some cases, ledger upload component 1320 may transmit the set of cryptographic representations within a threshold amount of time after media data capture component 1340 captures the set of subsets. In some cases, ledger upload component 1320 may transmit at least one cryptographic representation in the set of cryptographic representations occurs prior to media data capture component 1340 capturing at least one subset in the set of subsets.

In some cases, the device 1305 may include media data intake component 1345, which may receive the set of media data from (e.g. from another device, an import or upload by a user of the device 1305, etc.).

In some cases, ledger upload component 1320 may store the set of cryptographic representations at the first computer system and establish the communications link subsequent to storing the set of cryptographic representations.

In some cases, cryptographic key component 1350 may identify a private cryptographic key corresponding to the set of media data (e.g., corresponding to a user profile of a user of device 1305) and generate a signature for the set of media data based on the private cryptographic key.

In some cases, distribution component 1360 may interface with a distribution system 115. In some cases, distribution component 1360 may transmit, to a third computer system via a second communications link, the set of media data, the signature, and a public cryptographic key corresponding to the private cryptographic key.

In some cases, compression component 1355 may compress the set of media data prior to creation of the set of cryptographic representations by cryptographic component 1315.

In some cases, metadata component 1325 may identify, at the first computer system, a set of portions of metadata for the set of media data, each portion of metadata for a subset in the set of subsets, and ledger upload component 1320 may transmit, to the second computer system via the communications link, a representation of the metadata, where the second computer system may be configured to write the representation of the metadata to the immutable ledger. Identifying the metadata for the set of media data may include one or more identifying an initiation event for the set of media data and identifying metadata for the initiation event. In some cases, identifying a latency between capturing a subset in the set of subsets and transmitting a corresponding cryptographic representation in the set of cryptographic representations to the second computer system, identifying one or more additional computer systems within a threshold distance of the first computer system at a time associated with capturing the set of media data, identifying user profile data for a user of the first computer system, identifying location data associated with the first computer system, identifying temporal data associated with the set of media data, calendar data associated with the set of media data, or any combination thereof, identifying an application used for capturing the set of media data, identifying biometric data for a user of the first computer system, identifying sensor data associated with the device 1305 or another device communicatively coupled with the device 1305, or identifying metadata for the communications link.

In some cases, distribution component 1360 may create a header file for the set of media data, the header file including an identifier of the immutable ledger or ledger entries. In some cases, the header file further includes a mapping between subsets in the set of subsets and respective entries in the immutable ledger.

In some cases, user profile component 1365 may authenticate a user of device 1305. In some cases, user profile component 1365 may identify or store user profile data for the user. In some cases, user profile component 1365 may identify or store a public/private cryptographic key pair for the user.

In some cases, steganography component 1370 may alter a set of media data based on the metadata and according to an alteration pattern to create an altered set of media data, where altering the set of media data according to the alteration pattern encodes the metadata into the altered set of media data. For example, steganography component 1370 may include one or more aspects of a steganographic encoder 725. In some cases, altering the set of media data to create the altered set of media data may include altering subsets in the set of subsets according to the alteration pattern to create a set of altered subsets, where the altering according to the alteration pattern at least a portion of the metadata into each altered subset in the set of altered subsets. In some cases, the set of media data may include a plurality of pixel or audio sample values, and altering the set of media data according to the alteration pattern may include incrementing or decrementing one or more of the set of pixel or audio sample values according the alteration pattern to create one or more altered pixel or audio sample values, where the one or more altered pixel or audio sample values indicate the metadata based on an encoding scheme. In some cases, the encoding scheme may be a character encoding scheme, and a subset of digit values included in the one or more altered pixel or audio sample values may correspond to textual information that represents the metadata. In some cases, the alteration pattern may be based on a steganographic algorithm. In some cases, steganography component 1370 may identify the steganographic algorithm based on an indication received from a certification system 110 or other computer system described herein.

In some cases, watermark component 1375 may apply a watermark to the set of media data to create a watermarked set of media data that includes a set of watermark pixel values. For example, watermark component 1375 may include one or more aspects of a watermark encoder 720. Steganography component 1370 may alter the watermarked set of media data according to the alteration pattern, which may include incrementing or decrementing one or more of the plurality of watermark pixel values according the alteration pattern to create one or more altered watermark pixel values, wherein the one or more altered watermark pixel values indicate the metadata based at least in part on an encoding scheme.

Figure 14:
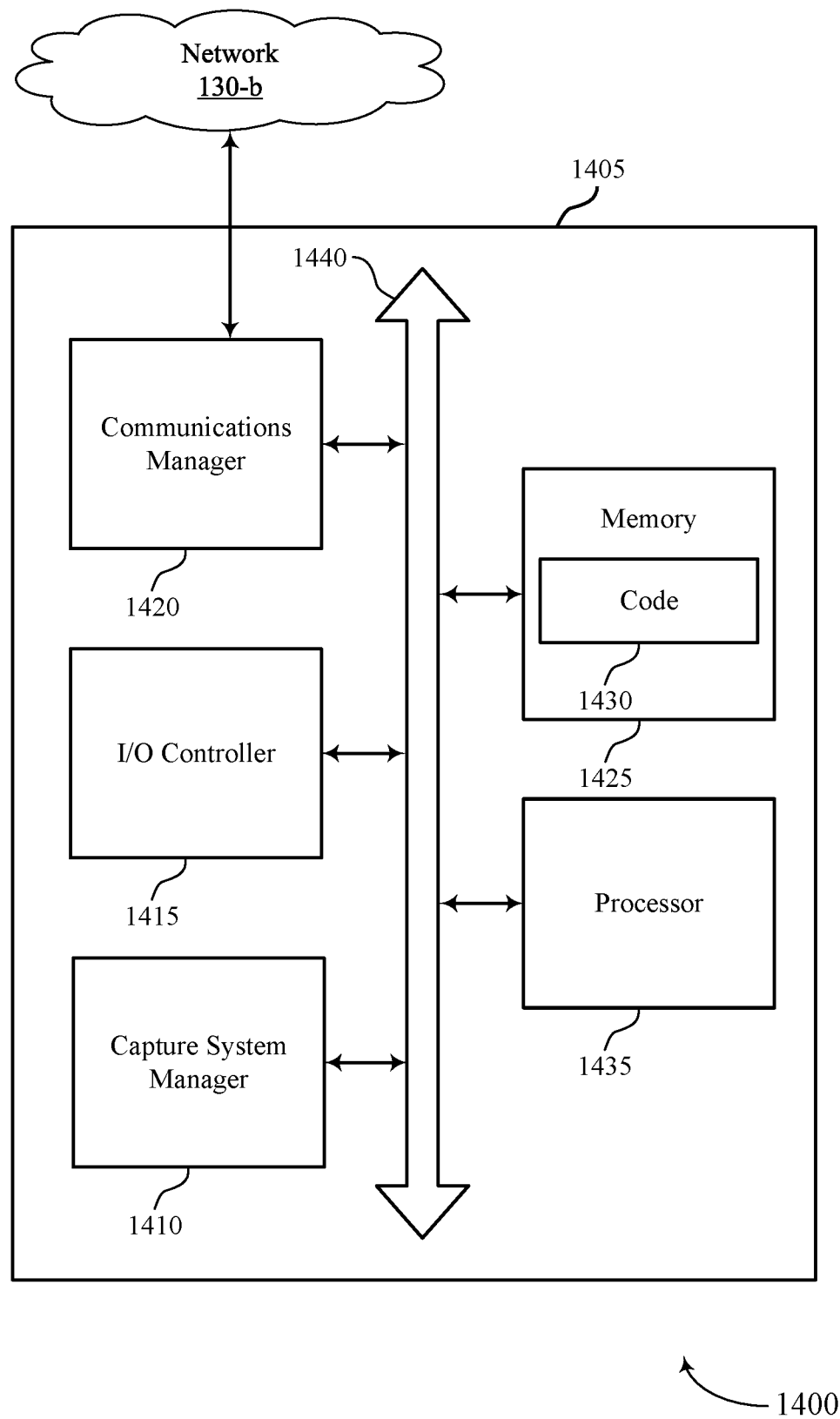
FIG. 14 shows a block diagram of a device that supports identifying altered media data in accordance with aspects of the present disclosure.

FIG. 14 shows a diagram of a system 1400 including a device 1405 that supports identifying altered media data in accordance with aspects of the present disclosure. The device 1405 may be an example of or include aspects of a capture system 105 as described herein. The device 1405 may include a capture system manager 1410, which may include aspects of a device 1305. The device 1405 may also include components for bi-directional communications with user as well as with other devices or computer systems, such as the various devices and computer systems described herein. Along with a capture system manager 1410, the device 1405 may include an I/O controller 1415, a communications manager 1420, memory 1425, and a processor 1435. These components may be in electronic communication via one or more buses (e.g., bus 1440).

The capture system manager 1410 may identify a set of subsets of a set of media data and may create a set of cryptographic representations, each cryptographic representation in the set of cryptographic representations based on a respective subset in the set of subsets. The capture system manager 1410 may also transmit, to a second computer system via a communications link, the set of cryptographic representations, where the second computer system is configured to write the set of cryptographic representations to an immutable ledger that is remote from the first computer system, each cryptographic representation corresponding to a respective entry in the immutable ledger.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The communications manager 1420 may manage communications between the device 1405 and one or more other devices or computer systems (e.g., via one or more wired or wireless links). For example, communications manager 1420 may manage communications with a certification system 110, distribution system 115, validation system 120, or profile management system 125 as described herein (e.g., via a network 130-*b*). In some cases, communications manager 1420 may manage a transceiver. The transceiver may communicate bi-directionally over wired or wireless links. The transceiver may also include a modem to modulate packets for transmission and to demodulate received packets.

The memory 1425 may include RAM and ROM. The memory 1425 may store computer-readable, computer-executable code 1430 including instructions that, when executed by a processor, cause the device 1405 to perform various functions described herein. In some cases, the memory 1425 may contain, among other things, a BIOS which may control basic hardware or software operation such as the interaction with peripheral components or devices.

The processor 1435 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1435 may be configured to operate a memory array using a memory controller. In other cases, a memory controller may be integrated into the processor 1435. The processor 1435 may be configured to execute computer-readable instructions stored in a memory (e.g., the memory 1425) to cause the device 1405 to perform various functions (e.g., functions or tasks as described herein).

The code 1430 may include instructions to implement aspects of the present disclosure, including instructions to support the operations described herein. The code 1430 may be stored in a non-transitory computer-readable medium such as system memory or other type of memory. In some cases, the code 1430 may not be directly executable by the processor 1435 but may cause a computer (e.g., when compiled and executed) to perform functions described herein.

Figure 15:
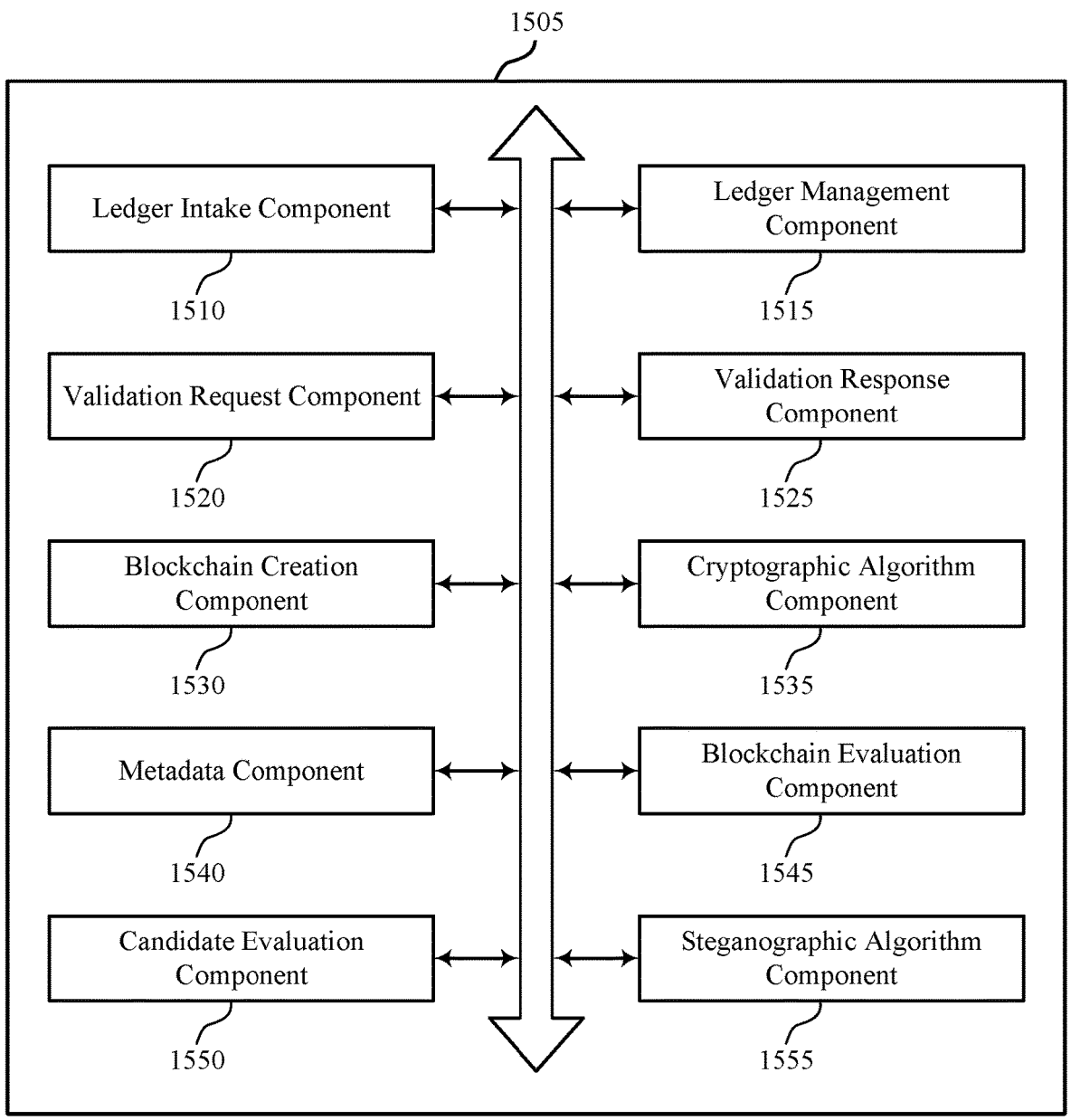
FIG. 15 shows a block diagram of a system that supports identifying altered media data in accordance with aspects of the present disclosure.

FIG. 15 shows a block diagram 1500 of a device 1505 that supports identifying altered media data in accordance with aspects of the present disclosure. The device 1505 may be an example of or include aspects of a certification system 110 as described herein. The device 1505 may include a ledger intake component 1510, a ledger management component 1515, a validation request component 1520, validation response component 1525, blockchain creation component 1530, cryptographic algorithm component 1535, metadata component 1540, blockchain evaluation component 1545, candidate evaluation component 1550, and steganographic algorithm component.

Each component of the device 1505 may be in communication with one another (e.g., via one or more buses). Each component of the device 1505 may be implemented in hardware, code (e.g., software or firmware) executed by a processor, or any combination thereof. If implemented in code executed by a processor, the functions of a component, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The device 1505, or its sub-components, may be physically located at various positions, including being distributed such that portions of functions are implemented at different physical locations or by one or more physical or logically distinct components. In some examples, the device 1505, or its sub-components, may be a separate and distinct component in accordance with various aspects of the present disclosure. In some examples, the device 1505, or its sub-components, may be combined with one or more other hardware components, including but not limited to an input/output (I/O) component, a transceiver, another computing device, one or more other components described in the present disclosure, or a combination thereof in accordance with various aspects of the present disclosure.

Ledger intake component 1510 may receive (e.g., from a capture system 105), from a first computer system via a first communications link, a set of cryptographic representations, where each cryptographic representation in the set of cryptographic representations is based on a respective subset of a set of media data. Ledger management component 1515 may write the set of cryptographic representations to an immutable ledger, where each cryptographic representation in the set of cryptographic representations corresponds to a respective entry in the immutable ledger. Validation request component 1520 may receive, from a third computer system via a second communications link, a validation request for the set of media data. Validation response component 1525 may transmit, to the third computer system via the second communications link, a validation response for the set of media data based on the immutable ledger.

The immutable ledger may include a blockchain, and the respective entry in the immutable ledger may include a block of the blockchain. In some cases, ledger management component 1515 may create a set of copies of the immutable ledger and store a copy of the immutable ledger at each of a set of host devices included in a certification system 110.

In some cases, ledger intake component 1510 may receive, from the first computer system via the first communications link, a set of portions of metadata for the set of media data, where each portion of metadata in the set of portions of metadata corresponds to a subset of the set of media data, and ledger management component 1515 may write the set of portions of metadata to the immutable ledger.

In some cases, ledger intake component 1510 may receive, from the first computer system via the first communications link, a second set of cryptographic representations, where each cryptographic representation in the second set of cryptographic representations may be based on a respective portion of the metadata in the set of portions of metadata, and ledger management component 1515 may write the second set of cryptographic representations to the immutable ledger.

In some cases, ledger intake component 1510 may receive, from the first computer system via the first communications link, a third set of cryptographic representations, where each cryptographic representation in the third set of cryptographic representations may be based on a respective combined data set, the respective combined data set including a corresponding subset of the set of media data and a corresponding portion of the metadata in the set of portions of metadata, and ledger management component 1515 may write the third set of cryptographic representations to the immutable ledger.

In some cases, blockchain creation component 1530 may create a fourth set of cryptographic representations, where each cryptographic representation in the fourth set of cryptographic representations may be based on a respective cryptographic representation in the set of cryptographic representations. Each cryptographic representation in the set of cryptographic representations may be based on a first cryptographic algorithm and each cryptographic representation in the fourth set of cryptographic representations may be based on a second cryptographic algorithm. A cryptographic representation in the fourth set of cryptographic representations may be based on an additional cryptographic representation in the fourth set of cryptographic representations. The fourth set of cryptographic representations may include blocks of a blockchain.

In some case, creating the fourth set of cryptographic representations may include creating at least one of the fourth set of cryptographic representations based on a cryptographic representation associated with a prior set of media data. The set of media data and the prior set of media data may be associated with a common private cryptographic key (e.g., may be associated with a common user profile). The cryptographic representation associated with the prior set of media data may be a final entry in a second immutable ledger that corresponds to the prior set of media data. The cryptographic representation associated with the prior set of media data may be based on user profile data common to the set of media data and the prior set of media data.

In some cases, ledger intake component 1510 may receive, from the first computer system via the first communications link, an indication of the set of media data, and cryptographic algorithm component 1535 may transmit, to the first computer system via the first communications link, an indication of a primary cryptographic algorithm, where the set of cryptographic representations may be based on the primary cryptographic algorithm. In some cases, cryptographic algorithm component 1535 may select the primary cryptographic algorithm from a set of cryptographic algorithms supported by the first computer system.

In some cases, ledger intake component 1510 may receive, from the first computer system via the first communications link, an additional cryptographic representation based on an entirety of the set of media data, and ledger management component 1515 may write the additional cryptographic representation to the immutable ledger as a corresponding additional entry in the immutable ledger.

In some cases, metadata component 1540 may identify metadata (e.g., in addition to metadata that may be received by ledger intake component 1510) for the set of media data. For example, metadata component 1540 may identify metadata based on a clock for the device 1505. In some cases, ledger intake component 1510 may receive, from the first computer system via the first communications link, a timestamp for a subset of the set of media data, and metadata component 1540 may determine a latency between the timestamp and a time of receipt of the subset at the device 1505, and the metadata based on the clock for the device 1505 may include an indication of the latency.

In some cases, ledger management component 1515 may transmit, to the first computer system via the first communications link, an identifier of the immutable ledger. In some cases, ledger management component 1515 may transmit, to the first computer system via the first communications link, for each respective entry in the immutable ledger, an identifier of the respective entry.

In some cases, receiving the validation request for the set of media data by ledger intake component 1510 may include receiving an identifier of an entry in the immutable ledger, and ledger management component 1515 may identify the immutable ledger based on the identifier of the entry. In some cases, the identifier of the entry in the immutable ledger may be an alternative cryptographic representation corresponding to a respective subset in the set of subsets, where the alternative cryptographic representation may be based on the respective subset and an alternative cryptographic algorithm and the set of cryptographic representations may be based on a primary cryptographic algorithm that may be different than the alternative cryptographic algorithm.

In some cases, ledger management component 1515 may identify an entry in the immutable ledger based on the validation request, and blockchain evaluation component 1545 may determining whether a second cryptographic representation included in the entry may be valid, where the second cryptographic representation may be based on an additional entry in the immutable ledger. Each cryptographic representation in the set of cryptographic representations may be based on a first cryptographic algorithm and the second cryptographic representation may be based on a second cryptographic algorithm. The second cryptographic representation may comprise a block of a blockchain (e.g., may be a blockchain hash 325 included in the entry). In some cases, determining whether the second cryptographic representation included in the entry is valid may include polling a plurality of host devices each configured to host a copy of the immutable ledger. In some cases, determining whether the second cryptographic representation included in the entry is valid may include for creating a candidate second cryptographic representation based on content of the entry and based on content of the additional entry and determining whether the candidate second cryptographic representation matches the second cryptographic representation.

In some examples, transmitting the validation response by validation response component 1525 may include transmitting an indication of whether content of the immutable ledger may be valid. In some examples, transmitting the validation response by validation response component 1525 may include transmitting an indication of a primary cryptographic algorithm, where the set of cryptographic representations may be based on the primary cryptographic algorithm. In some examples, transmitting the validation response by validation response component 1525 may include transmitting a portion of metadata for the set of media data, where the portion of metadata corresponds to a subset of the set of media data.

In some examples, transmitting the validation response by validation response component 1525 may include transmitting a trusted cryptographic representation that corresponds to a cryptographic representation in the set of cryptographic representations. In some examples, transmitting the validation response by validation response component 1525 may include transmitting a second trusted cryptographic representation, where the second trusted cryptographic representation may be based on a portion of metadata for the set of media data. In some examples, transmitting the validation response by validation response component 1525 may include transmitting a third trusted cryptographic representation, where the third trusted cryptographic representation may be based on a portion of metadata for the set of media data and a corresponding subset of the set of media data. Ledger management component 1515 may determine the first, second, or third trusted cryptographic representation or any the trusted version of a cryptographic representation based on polling a set of host devices each configured to host a copy of the immutable ledger.

In some cases, candidate evaluation component 1550 may receive, from the third computer system via the second communications link, a candidate cryptographic representation that corresponds to a cryptographic representation in the set of cryptographic representations, and ledger management component 1515 may identify a trusted cryptographic representation that corresponds to the cryptographic representation. Candidate evaluation component 1550 may determine whether the candidate cryptographic representation matches the trusted cryptographic representation and transmit, to the third computer system via the second communications link, an indication of whether the candidate cryptographic representation matches the trusted cryptographic representation.

In some cases, candidate evaluation component 1550 may receive, from the third computer system via the second communications link, a second candidate cryptographic representation that corresponds to a portion of metadata for the set of media data, and ledger management component 1515 may identify a second trusted cryptographic representation that corresponds to the second cryptographic representation. Candidate evaluation component 1550 may determine whether the second candidate cryptographic representation matches the second trusted cryptographic representation and transmit, to the third computer system via the second communications link, an indication of whether the candidate cryptographic representation matches the trusted cryptographic representation. Candidate evaluation component 1550 may and ledger management component 1515 may also provide similarly functionality for any other type of candidate cryptographic representation.

In some cases, steganographic algorithm component 1555 may transmit, to the first computer system via the first communications link, an indication of a steganographic algorithm. The received set of media data may be an altered set of media data, where the altered set of media data includes a set of media data altered according to an alteration pattern, and where metadata for the set of media data is encoded into the altered set of media data based on the alteration pattern. In some cases, the plurality of trusted cryptographic representations correspond to a plurality of altered subsets of the set of media data, and where at least a portion of the metadata is encoded into each of the plurality of altered subsets based at least in part on the alteration pattern and an encoding scheme. In some cases, the alteration pattern may be based on a steganographic algorithm (e.g., as determined and indicated or otherwise known by the device 1505).

Figure 16:
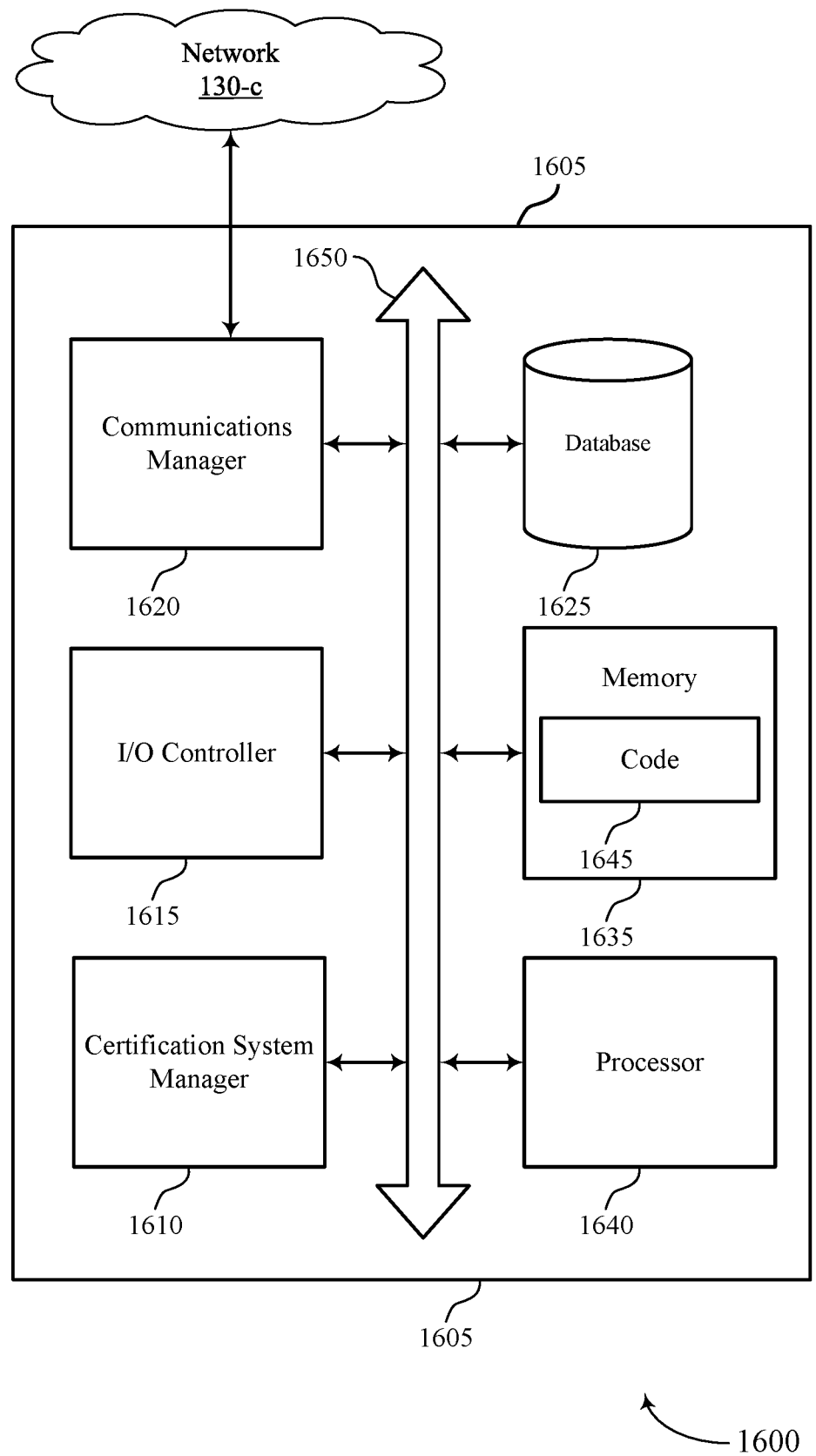
FIG. 16 shows a block diagram of a device that supports identifying altered media data in accordance with aspects of the present disclosure.

FIG. 16 shows a diagram of a system 1600 including a device 1605 that supports identifying altered media data in accordance with aspects of the present disclosure. The device 1605 may be an example of or include aspects of a certification system 110 as described herein. In some cases, a certification system 110 may include multiple devices 1605 communicatively coupled to one another (e.g., via a network 130-c). The device 1605 may include a certification system manager 1610, which may include aspects of a device 1305. The device 1605 may also include components for bi-directional communications with a user as well as with other devices or computer systems, such as the various devices and computer systems described herein. The device 1605 may include a certification system manager 1610, an I/O controller 1615, a communications manager 1620, a database 1625, memory 1635, and a processor 1640. These components may be in electronic communication via one or more buses (e.g., bus 1650).

The certification system manager 1610 may receive a set of cryptographic representations, where each cryptographic representation in the set of cryptographic representations is based on a respective subset of a set of media data, and may write the set of cryptographic representations to an immutable ledger, where each cryptographic representation in the set of cryptographic representations corresponds to a respective entry in the immutable ledger. The certification system manager 1610 may also receive a validation request for the set of media data and transmit a validation response for the set of media data based on the immutable ledger.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The communications manager 1620 may manage communications between the device 1605 and one or more other devices or computer systems (e.g., via one or more wired or wireless links). For example, communications manager 1620 may manage communications with a capture system 105, distribution system 115, validation system 120, or profile management system 125 as described herein (e.g., via a network 130-c). In some cases, communications manager 1620 may manage a transceiver. The transceiver may communicate bi-directionally over wired or wireless links. The transceiver may also include a modem to modulate packets for transmission and to demodulate received packets.

The database 1625 may store one or more immutable ledgers, each corresponding to a set of media data.

The memory 1635 may include RAM and ROM. The memory 1635 may store computer-readable, computer-executable code 1645 including instructions that, when executed by a processor, cause the device 1605 to perform various functions described herein. In some cases, the memory 1635 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1635) to cause the device 1605 to perform various functions (e.g., functions or tasks as described herein).

The code 1645 may include instructions to implement aspects of the present disclosure, including instructions to support the operations described herein. The code 1645 may be stored in a non-transitory computer-readable medium such as system memory or other type of memory. In some cases, the code 1645 may not be directly executable by the processor 1640 but may cause a computer (e.g., when compiled and executed) to perform functions described herein.

Figure 17:
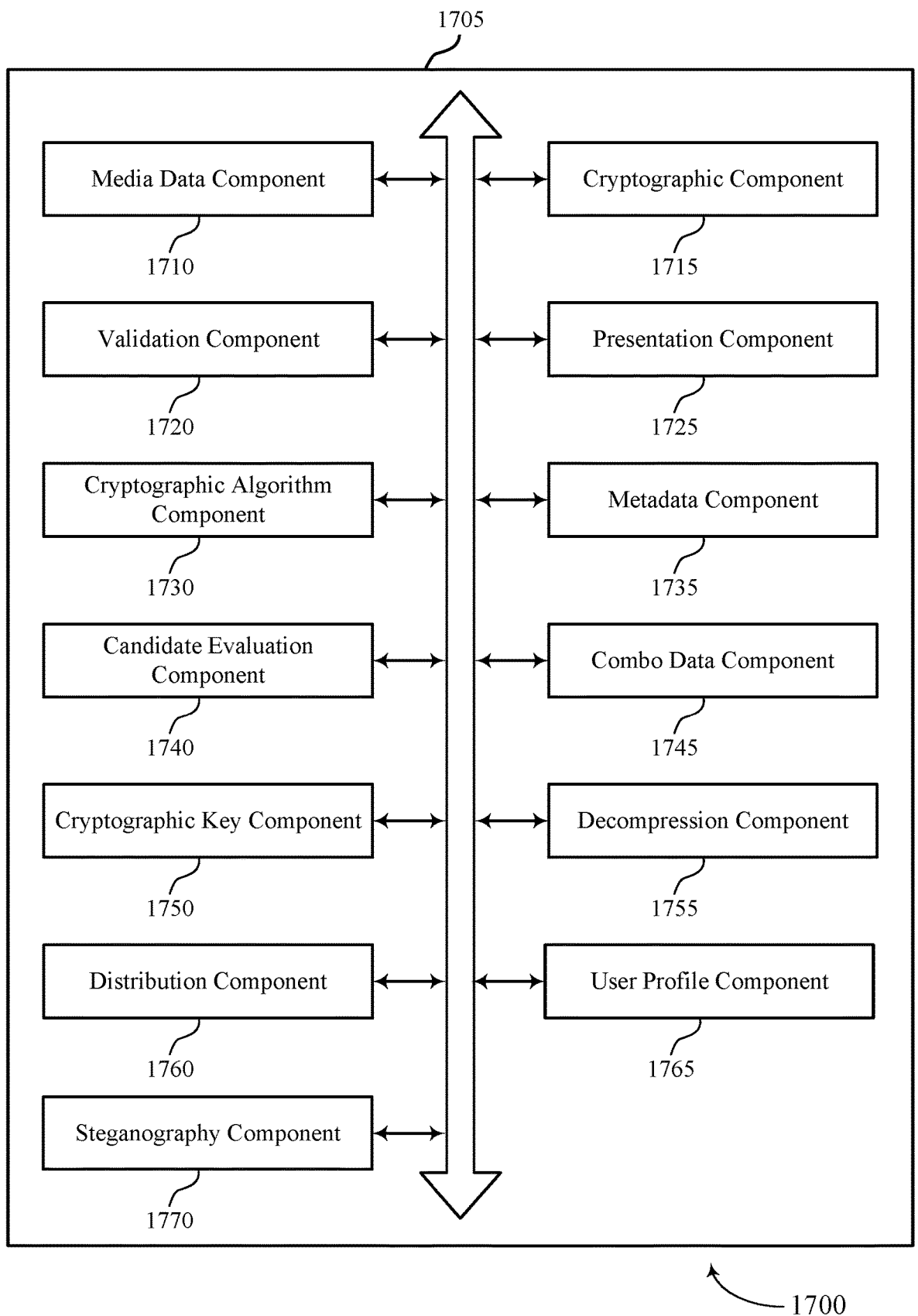
FIG. 17 shows a block diagram of a system that supports identifying altered media data in accordance with aspects of the present disclosure.

FIG. 17 shows a block diagram 1700 of a device 1705 that supports that supports identifying altered media data in accordance with aspects of the present disclosure. The device 1705 may be an example of or include aspects of a validation system 120 as described herein. The device 1705 may include a media data component 1710, a cryptographic component 1715, a validation component 1720, a presentation component 1725, a cryptographic algorithm component 1730, a metadata component 1735, a candidate evaluation component 1740, a combo data component 1745, a cryptographic key component 1750, a decompression component 1755, a distribution component 1760, a user profile component 1765, and a steganography component 1770.

Each component of the device 1705 may be in communication with one another (e.g., via one or more buses). Each component of the device 1705 may be implemented in hardware, code (e.g., software or firmware) executed by a processor, or any combination thereof. If implemented in code executed by a processor, the functions of a component, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The device 1705, or its sub-components, may be physically located at various positions, including being distributed such that portions of functions are implemented at different physical locations or by one or more physically or logically distinct components. In some examples, the device 1705, or its sub-components, may be a separate and distinct component in accordance with various aspects of the present disclosure. In some examples, the device 1705, or its sub-components, may be combined with one or more other hardware components, including but not limited to an input/output (I/O) component, a transceiver, another computing device, one or more other components described in the present disclosure, or a combination thereof in accordance with various aspects of the present disclosure.

Media data component 1710 may receive a set of media data and identify a set of subsets of the set of media data. Cryptographic component 1715 may create a set of cryptographic representations, each cryptographic representation in the set of cryptographic representations based on a respective subset in the set of subsets. Validation component 1720 may determine a level of validity (e.g., a trust score 505) for the set of media data based on the set of cryptographic representations and corresponding entries in an immutable ledger that is remote from the device 1705. Presentation component 1725 may present (e.g., to a user of the device 1705) an indication of the level of validity for the set of media data.

The set of media data may include audio data, image data, video data, or a combination thereof. The audio data may include telephonic conversation data (e.g., captured cellular telephone conversation data). The device 1705 may comprise an application specific to validating one of audio data, image data, video data, or telephonic conversation data. In some cases, identifying the set of subsets includes segmenting the set of media data to create the plurality of subsets.

The immutable ledger may include a blockchain, and the corresponding entries in the immutable ledger may each include a respective block of the blockchain. The cryptographic representations may be cryptographic hashes, and the set of cryptographic representations may comprise a cryptographic hash of each subset. In some cases, the immutable ledger may be replicated at each of a set of host devices, each host device in the set of host devices remote from the device 1705.

In some cases, the determined level of validity for the set of media data may be binary. In some cases, the determined level of validity for the set of media data may be non-binary.

In some case, cryptographic component 1715 may create an alternative cryptographic representation based on a subset in the set of subsets and an alternative cryptographic algorithm, where the set of cryptographic representations may be based on a primary cryptographic algorithm that may be different than the alternative cryptographic algorithm. Validation component 1720 may transmit, to a second computer system via a communications link, the alternative cryptographic representation, where the alternative cryptographic representation includes an identifier of a corresponding entry in the immutable ledger. Cryptographic algorithm component 1730 may receive, from the second computer system via the communications link, an indication of the primary cryptographic algorithm. The primary cryptographic algorithm may be one of a set of cryptographic algorithms supported by the first computer system.

In some cases, metadata component 1735 may receive, from the second computer system via a communications link, a portion of metadata for the set of media data, where the portion of metadata corresponds to a subset in the set of subsets.

In some cases, as part of determining the level of validity for the set of media data, cryptographic component 1715 may create a second cryptographic representation, the second cryptographic representation based on the portion of the metadata. In some cases, candidate evaluation component 1740 may receive, from the second computer system via the communications link, a trusted version of the second cryptographic representation, the trusted version included in the immutable ledger, and determine whether the second cryptographic representation matches the trusted version. In some cases, candidate evaluation component 1740 may transmit, to the second computer system via the communications link, the second cryptographic representation and receive, from the second computer system via the communications link, an indication of whether the second cryptographic representation matches a trusted version of the second cryptographic representation, the trusted version included in the immutable ledger.

In some cases, as part of determining the level of validity for the set of media data, candidate evaluation component 1740 may receive from a second computer system via a communications link, a trusted version of a cryptographic representation in the plurality of cryptographic representations, the trusted version included in the immutable ledger, and determine whether the cryptographic representation matches the trusted version. In some cases, as part of determining the level of validity for the set of media data, candidate evaluation component 1740 may transmit, to a second computer system via a communications link, a cryptographic representation in the set of cryptographic representations and receive, from the second computer system via the communications link, an indication of whether the cryptographic representation matches a trusted version of the cryptographic representation, the trusted version included in the immutable ledger In some cases, as part of determining the level of validity for the set of media data, combo data component 1745 may combine a subset in the set of subsets and metadata for the subset to create a combined data set, and cryptographic component 1715 may create a third cryptographic representation, the third cryptographic representation based on the combined data set. In some cases, candidate evaluation component 1740 may receive, from a second computer system via a communications link, a trusted version of the third cryptographic representation, the trusted version included in the immutable ledger, and determine whether the third cryptographic representation matches the trusted version. In some cases, candidate evaluation component 1740 may transmit, to the second computer system via the communications link, the third cryptographic representation and receive, from the second computer system via the communications link, an indication of whether the third cryptographic representation matches a trusted version of the third cryptographic representation, the trusted version included in the immutable ledger.

In some case, cryptographic key component 1750 may receive a public cryptographic key and a cryptographic signature associated with the set of media data and verify, based on the public cryptographic key and the cryptographic signature, an origin of the set of media data.

In some cases, cryptographic component 1715 may create an additional cryptographic representation based on an entirety of the set of media data, and validation component 1720 may determine the level of validity for the set of media data based on the additional cryptographic representation and a corresponding additional entry in the immutable ledger.

In some cases, validation component 1720 may receive (e.g., from a capture system 105, distribution system 117, or otherwise in connection with the set of media) an identifier of the immutable ledger or ledger entries and transmit, to a second computer system via a communications link, the identifier of the immutable ledger or ledger entries. In some cases, validation component 1720 may receive a mapping between the set of subsets of the set of media data and the corresponding entries in the immutable ledger and transmit, to the second computer system via the communications link, an indication of the corresponding entries in the immutable ledger based on the mapping.

In some cases, presentation component 1725 may present, to the user, concurrently with presenting the indication of the level of validity for the set of media data, media data included in the set of media data. In some cases, presentation component 1725 may present, to the user, an indication of one or more factors used in determining the level of validity for the set of media data.

In some cases, validation component 1720 may determine, for a subset in the set of subsets of the set of media data, a respective level of validity (e.g., a trust score 505 specific to the subset), and presentation component 1725 may present, to the user, the respective level of validity. In some cases, presentation component 1725 may present, to the user, concurrently with presenting the respective level of validity, media data included in the subset.

In some cases, presentation component 1725 may present, to the user, concurrently with presenting the indication of the level of validity for the set of media data and media data included in the set of media data, metadata associated with the set of media data.

In some cases, validation component 1720 may determine the level of validity for the set of media data based on corresponding metadata. Determining the level of validity based on corresponding metadata may include determining the level of validity based on any type of metadata described herein, including an existence or an absence of a type of metadata for the set of media data, a level of metadata variation across the set of subsets of the set of media data, user profile data associated with a cryptographic key for the set of media data, biometric data associated with the set of media data, sensor data associated with the set of media data, location data associated with the set of media data, or any combination thereof. In some cases, determining the level of validity based on corresponding metadata may include determining the level of validity based on a latency between capturing the set of media data and creation of the corresponding entries in the immutable ledger. In some cases, determining the level of validity based on corresponding metadata may include determining the level of validity based on a number or identity of additional computer systems within a threshold distance of a capturing computer system for the set of media data at a time associated with capturing the set of media data.

In some cases, decompression component 1755 may decompress the set of media data prior after creation of the set of cryptographic representations by cryptographic component 1715.

In some cases, distribution component 1760 may interface with a distribution system 117.

In some cases, user profile component 1765 may authenticate a user of device 1305. In some cases, user profile component 1765 may identify or store user profile data for the user. In some cases, user profile component 1765 may identify or store a public/private cryptographic key pair for the user.

In some cases, the received set of media data may be an altered set of media data, where the altered set of media data includes a set of media data altered according to an alteration pattern, and where metadata for the set of media data is encoded into the altered set of media data based on the alteration pattern. Steganography component 1770 may decode the altered set of media data based on the alteration pattern to obtain the metadata. For example, steganography component 1770 may include one or more aspects of a steganographic decoder 730. In some cases, the altered set of media data may include a set of altered subsets, and decoding the altered set of media data may include decoding each of the plurality of altered subsets based at least in part on the alteration pattern and an encoding scheme to obtain at least a portion of the metadata. In some cases, the altered set of media data may include a plurality of pixel or audio sample values, and decoding the altered set of media data may include identifying, for the set of pixel or audio sample values, a corresponding set of digit values, and determining the metadata based on a subset of the corresponding set of digit values and a character encoding scheme. In some cases, the subset of the corresponding set of digit values may include a least significant digit value of each pixel or audio sample value in the set of pixel or audio sample values. In some cases, the alteration pattern may be based on a steganographic algorithm. In some cases, steganography component 1770 may identify the steganographic algorithm based on an indication received from a certification system 110 or other computer system described herein.

Figure 18:
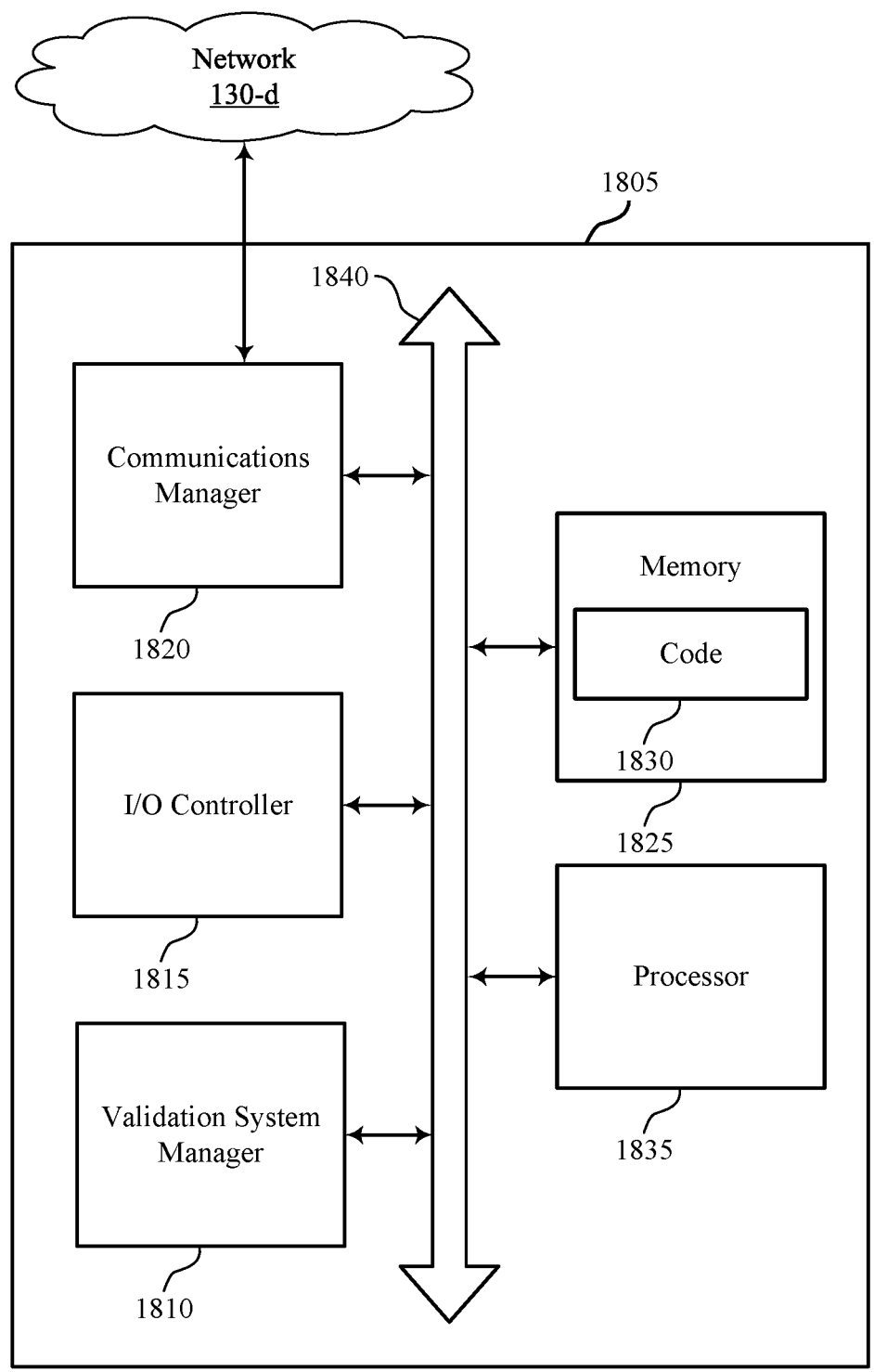
FIG. 18 shows a block diagram of a device that supports identifying altered media data in accordance with aspects of the present disclosure.

FIG. 18 shows a diagram of a system 1800 including a device 1805 that supports identifying altered media data in accordance with aspects of the present disclosure. The device 1805 may be an example of or include aspects of a validation system 120 as described herein. The device 1805 may include a validation system manager 1810, which may include aspects of a device 1705. The device 1805 may also include components for bi-directional communications with user as well as with other devices or computer systems, such as the various devices and computer systems described herein. Along with a validation system manager 1810, the device 1805 may include an I/O controller 1815, a communications manager 1820, memory 1825, and a processor 1835. These components may be in electronic communication via one or more buses (e.g., bus 1840)

The validation system manager 1810 may receive a set of media data, identify a set of subsets of the set of media data, and create a set of cryptographic representations, each cryptographic representation in the set of cryptographic representations based on a respective subset in the set of subsets. The validation system manager 1810 may also determine a level of validity for the set of media data based on the set of cryptographic representations and corresponding entries in an immutable ledger that is remote from device 1805, and present, to a user of device 1805, an indication of the level of validity for the set of media data.

The I/O controller 1815 may manage input and output signals for the device 1805. The I/O controller 1815 may also manage peripherals not integrated into the device 1805. In some cases, the I/O controller 1815 may represent a physical connection or port to an external peripheral. In some cases, the I/O controller 1815 may utilize an operating system such as iOS®, ANDROID®, MS-DOS®, MS-WINDOWS®, OS/2®, UNIX®, LINUX®, or another known operating system. In other cases, the I/O controller 1815 may represent or interact with a modem, a keyboard, a mouse, a touchscreen, or a similar device. In some cases, the I/O controller 1815 may be implemented as part of a processor. In some cases, a user may interact with the device 1805 via the I/O controller 1815 or via hardware components controlled by the I/O controller 1815.

The communications manager 1820 may manage communications between the device 1805 and one or more other devices or computer systems (e.g., via one or more wired or wireless links). For example, communications manager 1820 may manage communications with a capture system 105, certification system 110, distribution system 115, or profile management system 125 as described herein (e.g., via a network 130-*d*). In some cases, communications manager 1820 may manage a transceiver. The transceiver may communicate bi-directionally via one or more wired or wireless links. The transceiver may also include a modem to modulate packets for transmission and to demodulate received packets.

The memory 1825 may include RAM and ROM. The memory 1825 may store computer-readable, computer-executable code 1830 including instructions that, when executed by a processor, cause the device 1805 to perform various functions described herein. In some cases, the memory 1825 may contain, among other things, a BIOS which may control basic hardware or software operation such as the interaction with peripheral components or devices.

The processor 1835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1835 may be configured to operate a memory array using a memory controller. In other cases, a memory controller may be integrated into the processor 1835. The processor 1835 may be configured to execute computer-readable instructions stored in a memory (e.g., the memory 1825) to cause the device 1805 to perform various functions (e.g., functions or tasks as described herein).

The code 1830 may include instructions to implement aspects of the present disclosure, including instructions to support the operations described herein. The code 1830 may be stored in a non-transitory computer-readable medium such as system memory or other type of memory. In some cases, the code 1830 may not be directly executable by the processor 1835 but may cause a computer (e.g., when compiled and executed) to perform functions described herein.

Figure 19:
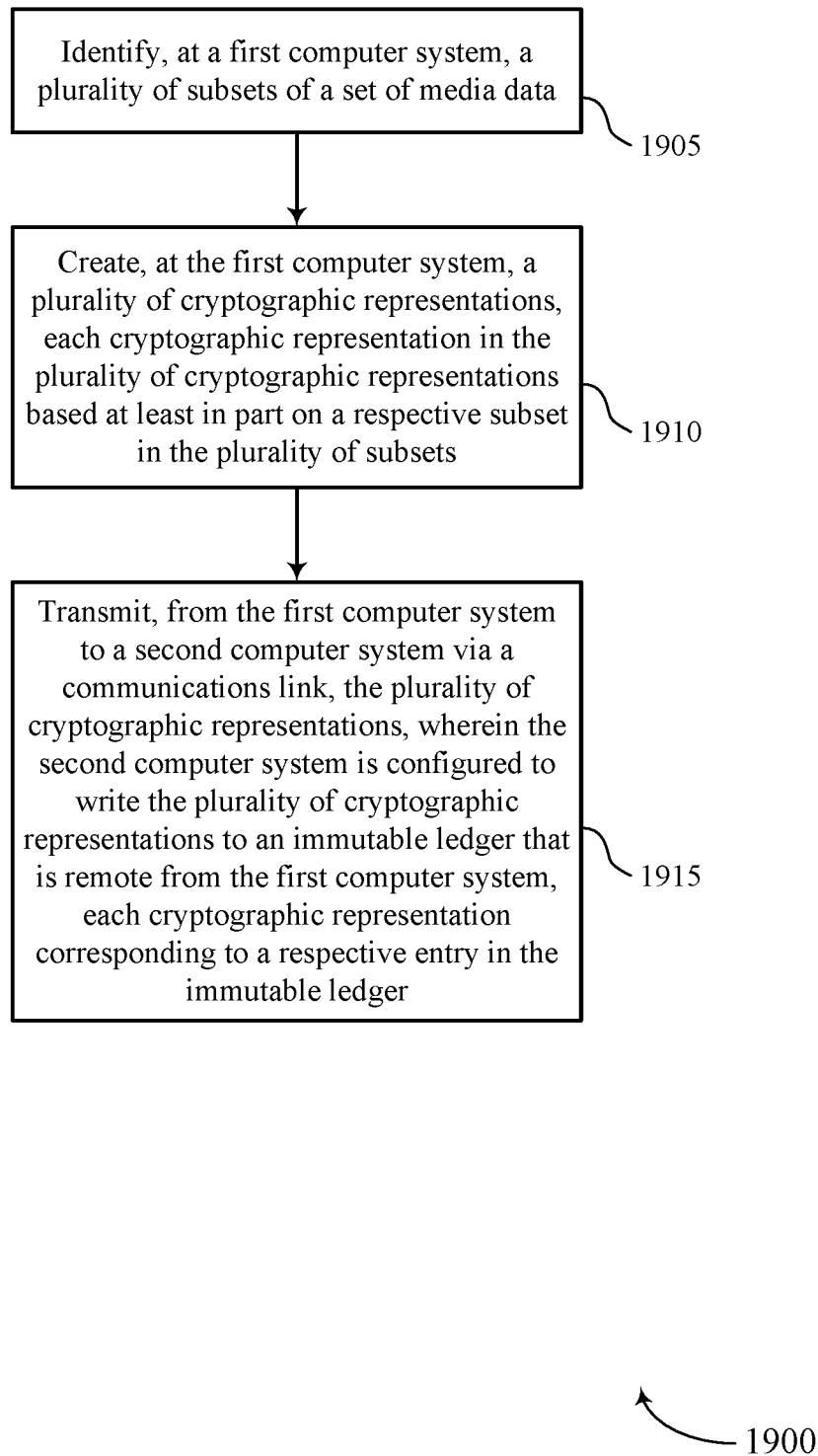
FIGS. 19 through 32 show flowcharts illustrating methods that support identifying altered media data in accordance with aspects of the present disclosure.

FIG. 19 shows a flowchart illustrating a method 1900 that supports identifying altered media data in accordance with aspects of the present disclosure. The operations of method 1900 may be implemented by a capture system 105 or its components as described herein. For example, the operations of method 1900 may be performed by a capture system manager as described with reference to FIGS. 13 to 14. In some examples, a capture system 105 may execute a set of instructions to control the functional elements of the capture system 105 or a host device thereof or a device coupled thereto to perform the functions described below. Additionally or alternatively, a capture system 105 may perform aspects of the functions described below using special-purpose hardware.

At 1905, the capture system 105 may identify, at a first computer system, a plurality of subsets of a set of media data. The operations of 1905 may be performed according to the methods described herein. In some examples, aspects of the operations of 1905 may be performed by a media data component as described with reference to FIGS. 13 to 14.

At 1910, the capture system 105 may create, at the first computer system, a plurality of cryptographic representations, each cryptographic representation in the plurality of cryptographic representations based at least in part on a respective subset in the plurality of subsets. The operations of 1910 may be performed according to the methods described herein. In some examples, aspects of the operations of 1910 may be performed by a cryptographic component as described with reference to FIGS. 13 to 14.

At 1915, the capture system 105 may transmit, from the first computer system to a second computer system via a communications link, the plurality of cryptographic representations, wherein the second computer system is configured to write the plurality of cryptographic representations to an immutable ledger that is remote from the first computer system, each cryptographic representation corresponding to a respective entry in the immutable ledger. The operations of 1915 may be performed according to the methods described herein. In some examples, aspects of the operations of 1915 may be performed by a ledger upload component as described with reference to FIGS. 13 to 14.

Figure 20:
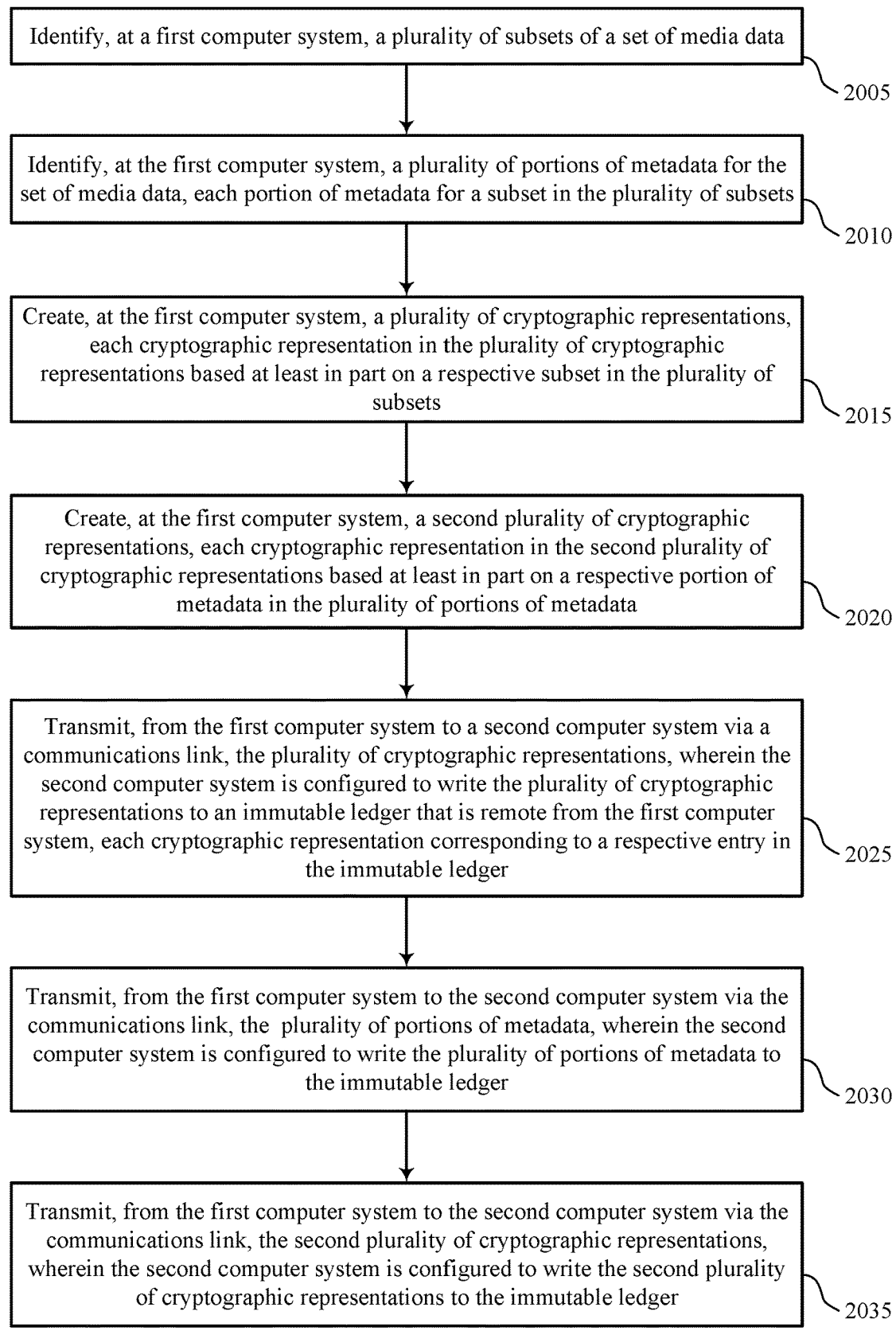

FIG. 20 shows a flowchart illustrating a method 2000 that supports identifying altered media data in accordance with aspects of the present disclosure. The operations of method 2000 may be implemented by a capture system 105 or its components as described herein. For example, the operations of method 2000 may be performed by a capture system manager as described with reference to FIGS. 13 to 14. In some examples, a capture system 105 may execute a set of instructions to control the functional elements of the capture system 105 or a host device thereof or a device coupled thereto to perform the functions described below. Additionally or alternatively, a capture system 105 may perform aspects of the functions described below using special-purpose hardware.

At 2005, the capture system 105 may identify, at a first computer system, a plurality of subsets of a set of media data. The operations of 2005 may be performed according to the methods described herein. In some examples, aspects of the operations of 2005 may be performed by a media data component as described with reference to FIGS. 13 to 14.

At 2010, the capture system 105 may identify, at the first computer system, a plurality of portions of metadata for the set of media data, each portion of metadata for a subset in the plurality of subsets. In some examples, aspects of the operations of 2005 may be performed by a metadata component as described with reference to FIGS. 13 to 14.

At 2015, the capture system 105 may create, at the first computer system, a plurality of cryptographic representations, each cryptographic representation in the plurality of cryptographic representations based at least in part on a respective subset in the plurality of subsets. The operations of 2015 may be performed according to the methods described herein. In some examples, aspects of the operations of 2015 may be performed by a cryptographic component as described with reference to FIGS. 13 to 14.

At 2020, the capture system 105 may create, at the first computer system, a second plurality of cryptographic representations, each cryptographic representation in the second plurality of cryptographic representations based at least in part on a respective portion of metadata in the plurality of portions of metadata. The operations of 2020 may be performed according to the methods described herein. In some examples, aspects of the operations of 2020 may be performed by a cryptographic component as described with reference to FIGS. 13 to 14.

At 2025, the capture system 105 may transmit, from the first computer system to a second computer system via a communications link, the plurality of cryptographic representations, wherein the second computer system is configured to write the plurality of cryptographic representations to an immutable ledger that is remote from the first computer system, each cryptographic representation corresponding to a respective entry in the immutable ledger. The operations of 2025 may be performed according to the methods described herein. In some examples, aspects of the operations of 2025 may be performed by a ledger upload component as described with reference to FIGS. 13 to 14.

At 2030, the capture system 105 may transmit, from the first computer system to the second computer system via the communications link, the plurality of portions of metadata, wherein the second computer system is configured to write the plurality of portions of metadata to the immutable ledger. The operations of 2030 may be performed according to the methods described herein. In some examples, aspects of the operations of 2030 may be performed by a ledger upload component as described with reference to FIGS. 13 to 14.

At 2035, the capture system 105 may transmit, from the first computer system to the second computer system via the communications link, the second plurality of cryptographic representations, wherein the second computer system is configured to write the second plurality of cryptographic representations to the immutable ledger. The operations of 2035 may be performed according to the methods described herein. In some examples, aspects of the operations of 2035 may be performed by a ledger upload component as described with reference to FIGS. 13 to 14.

Figure 21:
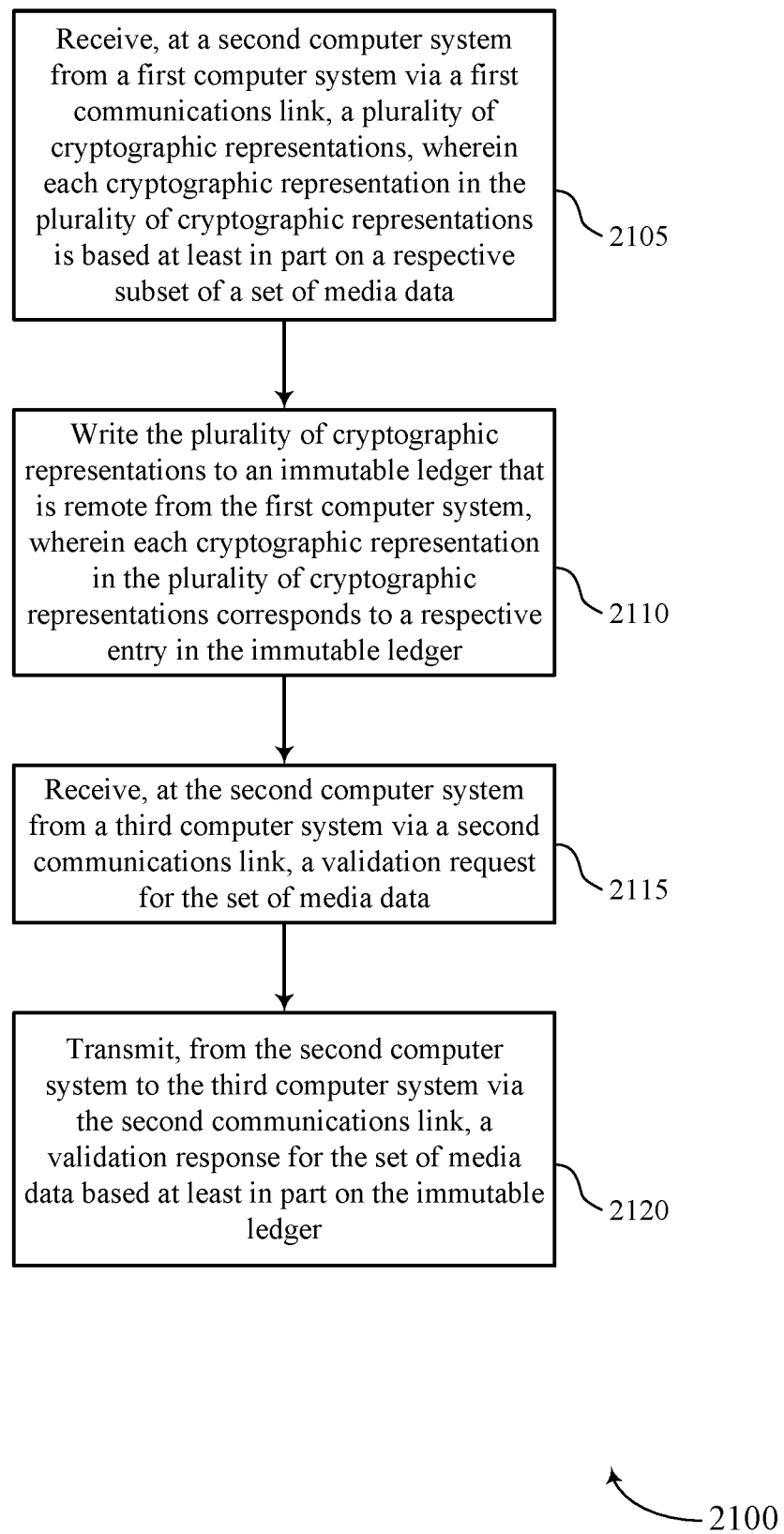

FIG. 21 shows a flowchart illustrating a method 2100 that supports identifying altered media data in accordance with aspects of the present disclosure. The operations of method 2100 may be implemented by a certification system 110 or its components as described herein. For example, the operations of method 2100 may be performed by a certification system manager as described with reference to FIGS. 15 to 16. In some examples, a certification system 110 may execute a set of instructions to control the functional elements of the certification system 110 or a host device thereof or a device coupled thereto to perform the functions described below. Additionally or alternatively, a certification system 110 may perform aspects of the functions described below using special-purpose hardware.

At 2105, the certification system 110 may receive, at a second computer system from a first computer system via a first communications link, a plurality of cryptographic representations, wherein each cryptographic representation in the plurality of cryptographic representations is based at least in part on a respective subset of a set of media data. The operations of 2105 may be performed according to the methods described herein. In some examples, aspects of the operations of 2105 may be performed by a ledger intake component as described with reference to FIGS. 15 to 16.

At 2110, the certification system 110 may write the plurality of cryptographic representations to an immutable ledger that is remote from the first computer system, wherein each cryptographic representation in the plurality of cryptographic representations corresponds to a respective entry in the immutable ledger. The operations of 2110 may be performed according to the methods described herein. In some examples, aspects of the operations of 2110 may be performed by a ledger management component as described with reference to FIGS. 15 to 16.

At 2115, the certification system 110 may receive, at the second computer system from a third computer system via a second communications link, a validation request for the set of media data. The operations of 2115 may be performed according to the methods described herein. In some examples, aspects of the operations of 2115 may be performed by a validation request component as described with reference to FIGS. 15 to 16.

At 2120, the certification system 110 may transmit, from the second computer system to the third computer system via the second communications link, a validation response for the set of media data based at least in part on the immutable ledger. In some cases, transmitting the validation response may comprise transmitting an indication of whether content of the immutable ledger is valid. In some cases, transmitting the validation response may comprise transmitting an indication of a primary cryptographic algorithm, wherein the plurality of cryptographic representations are based at least in part on the primary cryptographic algorithm. In some cases, transmitting the validation response may comprise transmitting a portion of metadata for the set of media data, wherein the portion of metadata corresponds to a subset of the set of media data. In some cases, transmitting the validation response may comprise transmitting a trusted cryptographic representation that corresponds to a cryptographic representation in the plurality of cryptographic representations. In some cases, transmitting the validation response may comprise transmitting a second trusted cryptographic representation, wherein the second trusted cryptographic representation is based at least in part on a portion of metadata for the set of media data. In some cases, transmitting the validation response may comprise transmitting an indication of whether the candidate cryptographic representation matches the trusted cryptographic representation. In some cases, transmitting the validation response may comprise transmitting an indication of whether the candidate cryptographic representation matches the trusted cryptographic representation. The operations of 2120 may be performed according to the methods described herein. In some examples, aspects of the operations of 2120 may be performed by a validation response component as described with reference to FIGS. 15 to 16.

Figure 22:
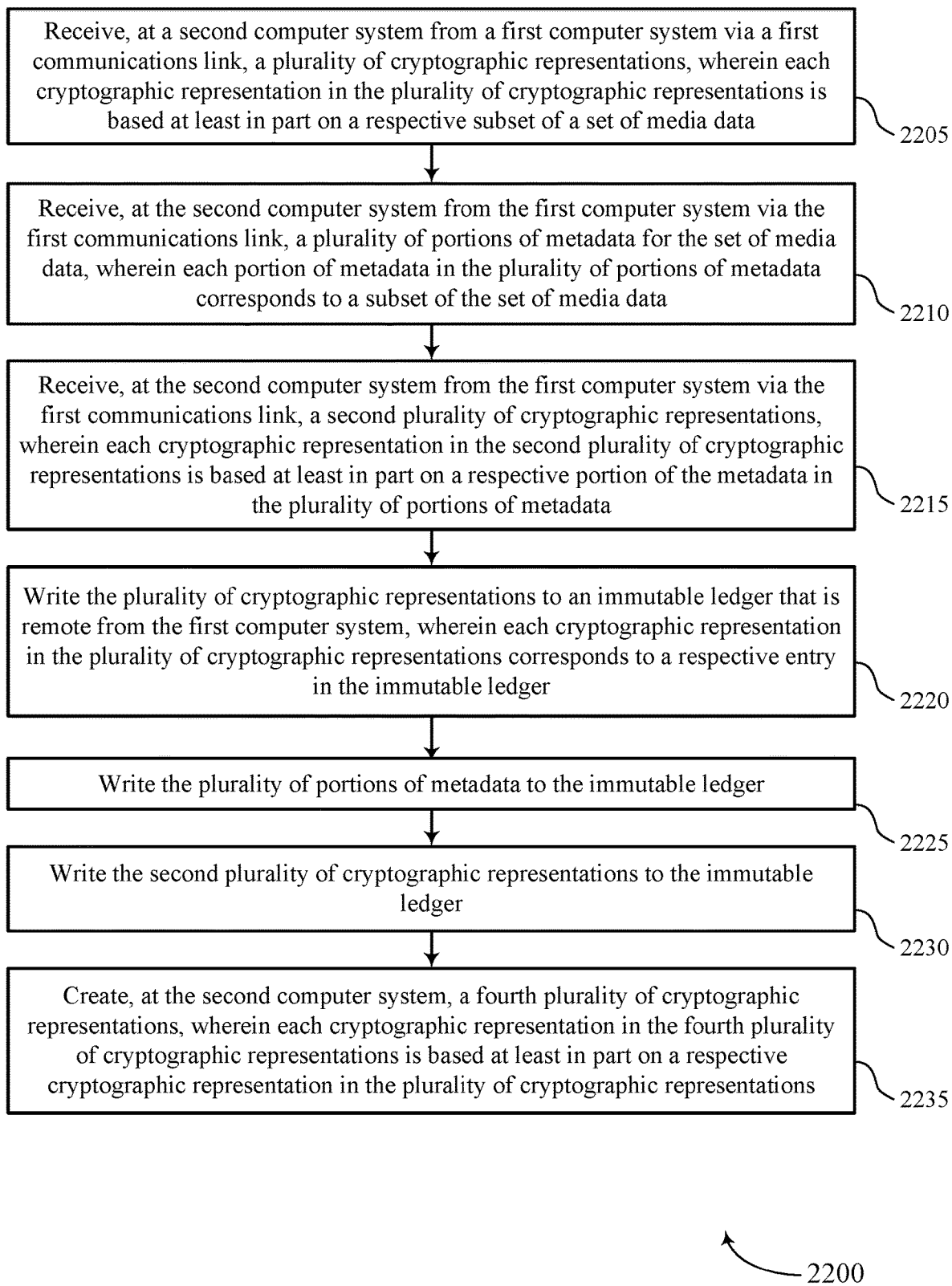

FIG. 22 shows a flowchart illustrating a method 2200 that supports identifying altered media data in accordance with aspects of the present disclosure. The operations of method 2200 may be implemented by a certification system 110 or its components as described herein. For example, the operations of method 2200 may be performed by a certification system manager as described with reference to FIGS. 15 to 16. In some examples, a certification system 110 may execute a set of instructions to control the functional elements of the certification system 110 or a host device thereof or a device coupled thereto to perform the functions described below. Additionally or alternatively, a certification system 110 may perform aspects of the functions described below using special-purpose hardware.

At 2205, the certification system 110 may receive, at a second computer system from a first computer system via a first communications link, a plurality of cryptographic representations, wherein each cryptographic representation in the plurality of cryptographic representations is based at least in part on a respective subset of a set of media data. The operations of 2205 may be performed according to the methods described herein. In some examples, aspects of the operations of 2205 may be performed by a ledger intake component as described with reference to FIGS. 15 to 16.

At 2210, the certification system 110 may receive, at the second computer system from the first computer system via the first communications link, a plurality of portions of metadata for the set of media data, wherein each portion of metadata in the plurality of portions of metadata corresponds to a subset of the set of media data. The operations of 2210 may be performed according to the methods described herein. In some examples, aspects of the operations of 2210 may be performed by a ledger intake component as described with reference to FIGS. 15 to 16.

At 2215, the certification system 110 may receive, at the second computer system from the first computer system via the first communications link, a second plurality of cryptographic representations, wherein each cryptographic representation in the second plurality of cryptographic representations is based at least in part on a respective portion of the metadata in the plurality of portions of metadata. The operations of 2215 may be performed according to the methods described herein. In some examples, aspects of the operations of 2215 may be performed by a ledger intake component as described with reference to FIGS. 15 to 16.

At 2220, the certification system 110 may write the plurality of cryptographic representations to an immutable ledger that is remote from the first computer system, wherein each cryptographic representation in the plurality of cryptographic representations corresponds to a respective entry in the immutable ledger. The operations of 2220 may be performed according to the methods described herein. In some examples, aspects of the operations of 2220 may be performed by a ledger management component as described with reference to FIGS. 15 to 16.

At 2225, the certification system 110 may write the plurality of portions of metadata to the immutable ledger. The operations of 2225 may be performed according to the methods described herein. In some examples, aspects of the operations of 2225 may be performed by a ledger management component as described with reference to FIGS. 15 to 16.

At 2230, the certification system 110 may write the second plurality of cryptographic representations to the immutable ledger. The operations of 2230 may be performed according to the methods described herein. In some examples, aspects of the operations of 2230 may be performed by a ledger management component as described with reference to FIGS. 15 to 16.

At 2235, the certification system 110 may create, at the second computer system, a fourth plurality of cryptographic representations, wherein each cryptographic representation in the fourth plurality of cryptographic representations is based at least in part on a respective cryptographic representation in the plurality of cryptographic representations. Each cryptographic representation in the plurality of cryptographic representations may be based at least in part on a first cryptographic algorithm, and each cryptographic representation in the fourth plurality of cryptographic representations may be based at least in part on a second cryptographic algorithm. A cryptographic representation in the fourth plurality of cryptographic representations may be based at least in part on an additional cryptographic representation in the fourth plurality of cryptographic representations. For example, the fourth plurality of cryptographic representations may comprise blocks of a blockchain. The operations of 2235 may be performed according to the methods described herein. In some examples, aspects of the operations of 2235 may be performed by a blockchain creation component as described with reference to FIGS. 15 to 16.

Figure 23:
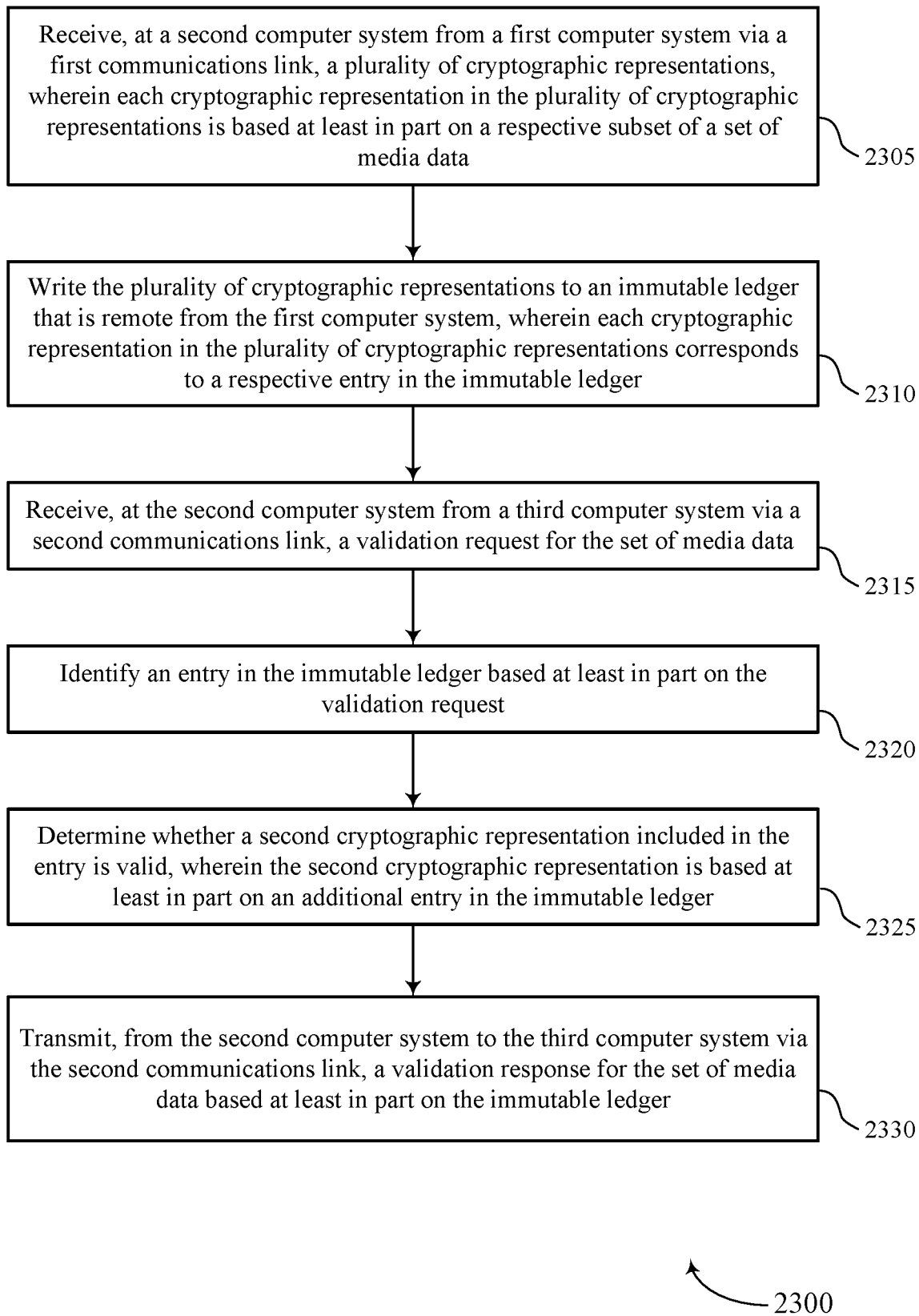

FIG. 23 shows a flowchart illustrating a method 2300 that supports identifying altered media data in accordance with aspects of the present disclosure. The operations of method 2300 may be implemented by a certification system 110 or its components as described herein. For example, the operations of method 2300 may be performed by a certification system manager as described with reference to FIGS. 15 to 16. In some examples, a certification system 110 may execute a set of instructions to control the functional elements of the certification system 110 or a host device thereof or a device coupled thereto to perform the functions described below. Additionally or alternatively, a certification system 110 may perform aspects of the functions described below using special-purpose hardware.

At 2305, the certification system 110 may receive, at a second computer system from a first computer system via a first communications link, a plurality of cryptographic representations, wherein each cryptographic representation in the plurality of cryptographic representations is based at least in part on a respective subset of a set of media data. The operations of 2305 may be performed according to the methods described herein. In some examples, aspects of the operations of 2305 may be performed by a ledger intake component as described with reference to FIGS. 15 to 16.

At 2310, the certification system 110 may write the plurality of cryptographic representations to an immutable ledger that is remote from the first computer system, wherein each cryptographic representation in the plurality of cryptographic representations corresponds to a respective entry in the immutable ledger. The operations of 2310 may be performed according to the methods described herein. In some examples, aspects of the operations of 2310 may be performed by a ledger management component as described with reference to FIGS. 15 to 16.

At 2315, the certification system 110 may receive, at the second computer system from a third computer system via a second communications link, a validation request for the set of media data. The operations of 2315 may be performed according to the methods described herein. In some examples, aspects of the operations of 2315 may be performed by a validation request component as described with reference to FIGS. 15 to 16.

At 2320, the certification system 110 may identify an entry in the immutable ledger based at least in part on the validation request. The operations of 2320 may be performed according to the methods described herein. In some examples, aspects of the operations of 2320 may be performed by a ledger management component as described with reference to FIGS. 15 to 16.

At 2325, the certification system 110 may determine whether a second cryptographic representation included in the entry is valid, wherein the second cryptographic representation is based at least in part on an additional entry in the immutable ledger. The operations of 2325 may be performed according to the methods described herein. In some examples, aspects of the operations of 2325 may be performed by a blockchain evaluation component as described with reference to FIGS. 15 to 16.

At 2330, the certification system 110 may transmit, from the second computer system to the third computer system via the second communications link, a validation response for the set of media data based at least in part on the immutable ledger. The operations of 2330 may be performed according to the methods described herein. In some examples, aspects of the operations of 2330 may be performed by a validation response component as described with reference to FIGS. 15 to 16.

Figure 24:
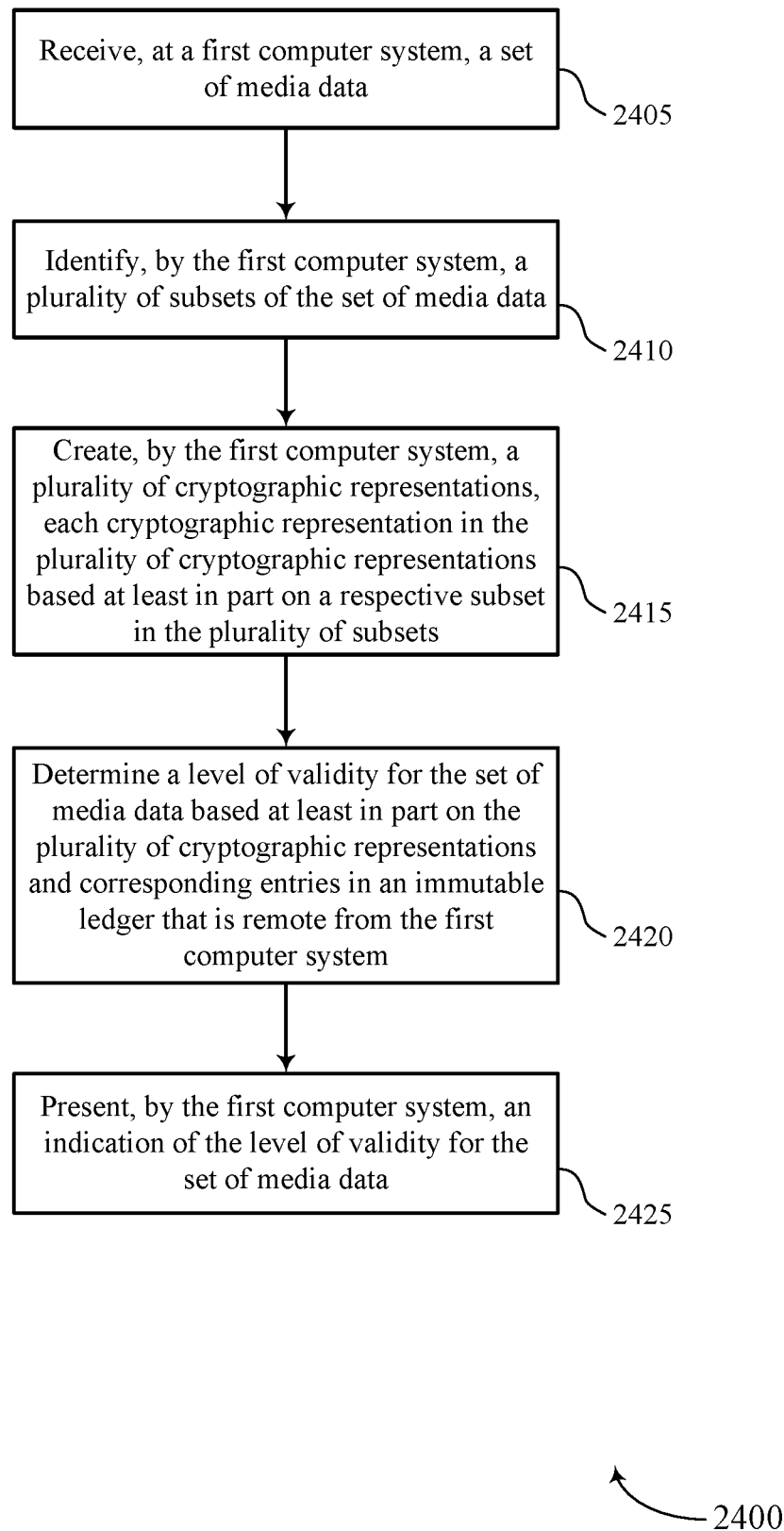

FIG. 24 shows a flowchart illustrating a method 2400 that supports identifying altered media data in accordance with aspects of the present disclosure. The operations of method 2400 may be implemented by a validation system 120 or its components as described herein. For example, the operations of method 2400 may be performed by a validation system manager as described with reference to FIGS. 17-18. In some examples, a validation system 120 may execute a set of instructions to control the functional elements of the a validation system 120 or a host device thereof or a device coupled thereto to perform the functions described below. Additionally or alternatively, a validation system 120 may perform aspects of the functions described below using special-purpose hardware.

At 2405, the validation system 120 may receive, at a first computer system, a set of media data. The operations of 2405 may be performed according to the methods described herein. In some examples, aspects of the operations of 2405 may be performed by a media data component as described with reference to FIGS. 17 to 18.

At 2410, the validation system 120 may identify, by the first computer system, a plurality of subsets of the set of media data. The operations of 2410 may be performed according to the methods described herein. In some examples, aspects of the operations of 2410 may be performed by a media data component as described with reference to FIGS. 17 to 18.

At 2415, the validation system 120 may create, by the first computer system, a plurality of cryptographic representations, each cryptographic representation in the plurality of cryptographic representations based at least in part on a respective subset in the plurality of subsets. The operations of 2415 may be performed according to the methods described herein. In some examples, aspects of the operations of 2415 may be performed by a cryptographic component as described with reference to FIGS. 17 to 18.

At 2420, the validation system 120 may determine a level of validity for the set of media data based at least in part on the plurality of cryptographic representations and corresponding entries in an immutable ledger that is remote from the first computer system. The operations of 2420 may be performed according to the methods described herein. In some examples, aspects of the operations of 2420 may be performed by a candidate evaluation component as described with reference to FIGS. 17 to 18.

At 2425, the validation system 120 may present, by the first computer system, an indication of the level of validity for the set of media data. The operations of 2425 may be performed according to the methods described herein. In some examples, aspects of the operations of 2425 may be performed by a cryptographic component as described with reference to FIGS. 17 to 18.

Figure 25:
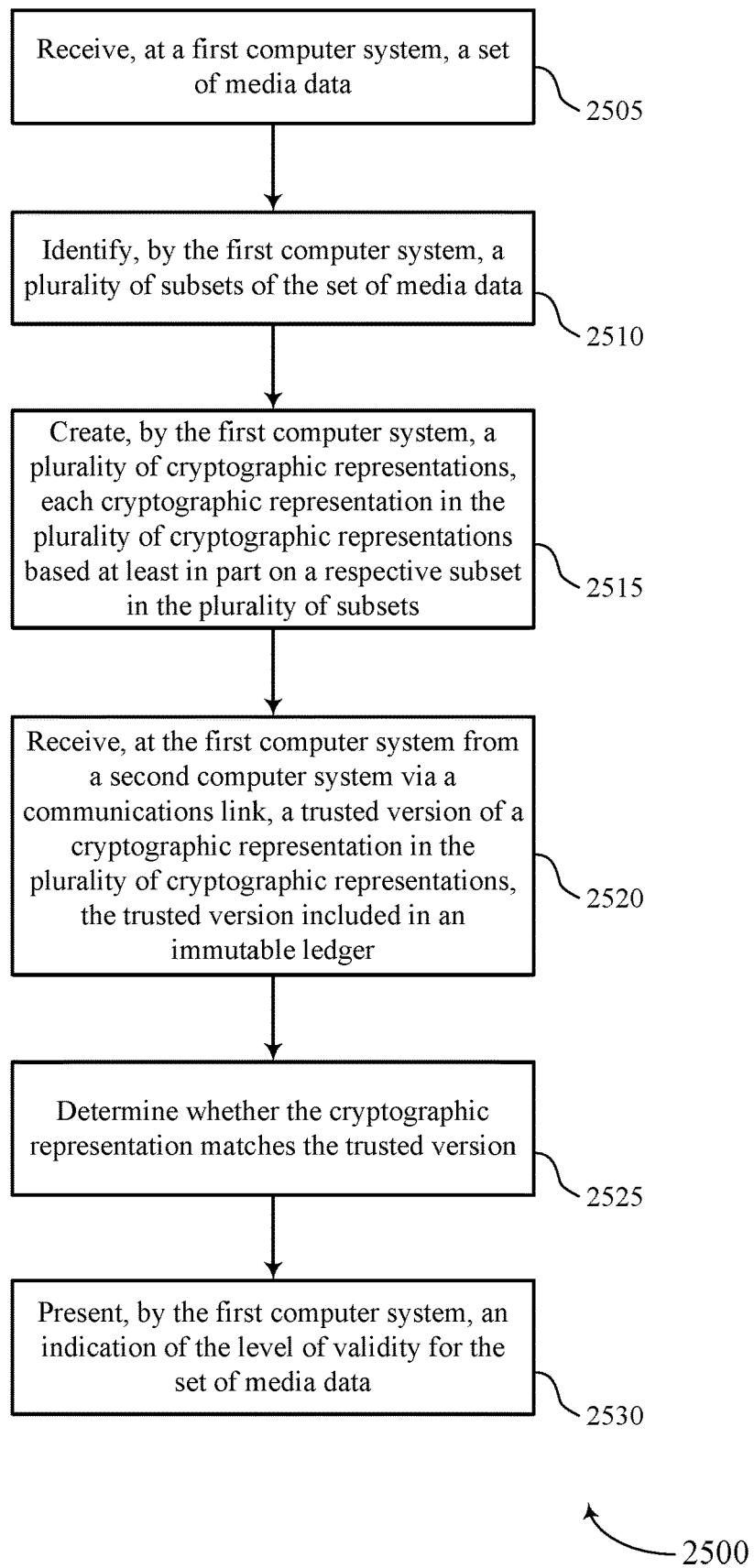

FIG. 25 shows a flowchart illustrating a method 2500 that supports identifying altered media data in accordance with aspects of the present disclosure. The operations of method 2500 may be implemented by a validation system 120 or its components as described herein. For example, the operations of method 2500 may be performed by a validation system manager as described with reference to FIGS. 17-18. In some examples, a validation system 120 may execute a set of instructions to control the functional elements of the a validation system 120 or a host device thereof or a device coupled thereto to perform the functions described below. Additionally or alternatively, a validation system 120 may perform aspects of the functions described below using special-purpose hardware.

At 2505, the validation system 120 may receive, at a first computer system, a set of media data. The operations of 2505 may be performed according to the methods described herein. In some examples, aspects of the operations of 2505 may be performed by a media data component as described with reference to FIGS. 17 to 18.

At 2510, the validation system 120 may identify, by the first computer system, a plurality of subsets of the set of media data. The operations of 2510 may be performed according to the methods described herein. In some examples, aspects of the operations of 2510 may be performed by a media data component as described with reference to FIGS. 17 to 18.

At 2515, the validation system 120 may create, by the first computer system, a plurality of cryptographic representations, each cryptographic representation in the plurality of cryptographic representations based at least in part on a respective subset in the plurality of subsets. The operations of 2515 may be performed according to the methods described herein. In some examples, aspects of the operations of 2515 may be performed by a cryptographic component as described with reference to FIGS. 17 to 18.

At 2520, the validation system 120 may receive, at the first computer system from a second computer system via a communications link, a trusted version of a cryptographic representation in the plurality of cryptographic representations, the trusted version included in an immutable ledger. The operations of 2520 may be performed according to the methods described herein. In some examples, the operations of 2520 may be performed as part of determining a level of validity for the set of media data based at least in part on the plurality of cryptographic representations and corresponding entries in an immutable ledger that is remote from the first computer system. In some examples, aspects of the operations of 2520 may be performed by a candidate evaluation component 1740 as described with reference to FIGS. 17 to 18.

At 2525, the validation system 120 may determine whether the cryptographic representation matches the trusted version. The operations of 2525 may be performed according to the methods described herein. In some examples, the operations of 2525 may be performed as part of determining a level of validity for the set of media data based at least in part on the plurality of cryptographic representations and corresponding entries in an immutable ledger that is remote from the first computer system. In some examples, aspects of the operations of 2525 may be performed by a candidate evaluation component 1740 as described with reference to FIGS. 17 to 18.

At 2530, the validation system 120 may present, by the first computer system, an indication of the level of validity for the set of media data. The operations of 2530 may be performed according to the methods described herein. In some examples, aspects of the operations of 2530 may be performed by a cryptographic component as described with reference to FIGS. 17 to 18.

Figure 26:
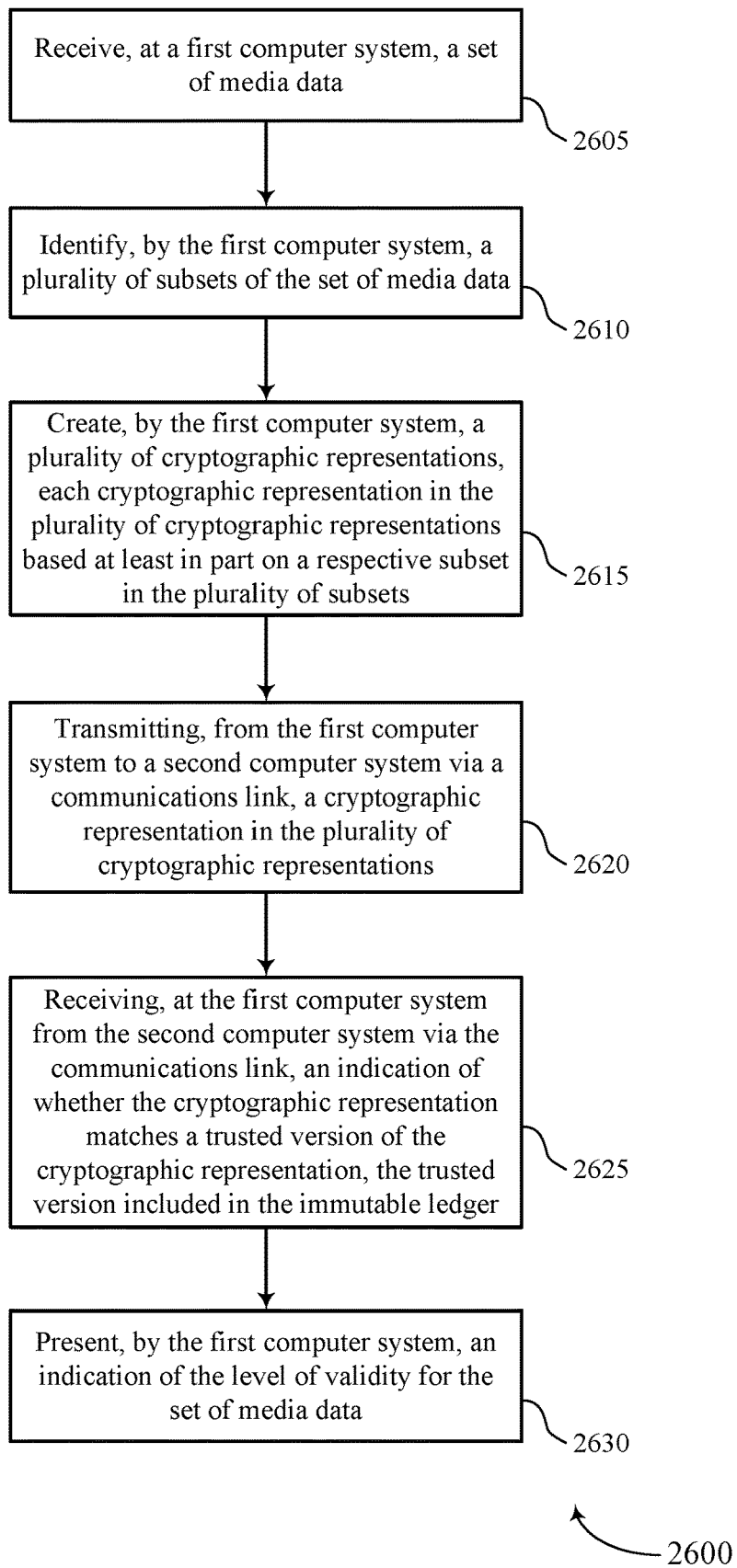

FIG. 26 shows a flowchart illustrating a method 2600 that supports identifying altered media data in accordance with aspects of the present disclosure. The operations of method 2600 may be implemented by a validation system 120 or its components as described herein. For example, the operations of method 2600 may be performed by a validation system manager as described with reference to FIGS. 17-18. In some examples, a validation system 120 may execute a set of instructions to control the functional elements of the a validation system 120 or a host device thereof or a device coupled thereto to perform the functions described below. Additionally or alternatively, a validation system 120 may perform aspects of the functions described below using special-purpose hardware.

At 2605, the validation system 120 may receive, at a first computer system, a set of media data. The operations of 2605 may be performed according to the methods described herein. In some examples, aspects of the operations of 2605 may be performed by a media data component as described with reference to FIGS. 17 to 18.

At 2610, the validation system 120 may identify, by the first computer system, a plurality of subsets of the set of media data. The operations of 2610 may be performed according to the methods described herein. In some examples, aspects of the operations of 2610 may be performed by a media data component as described with reference to FIGS. 17 to 18.

At 2615, the validation system 120 may create, by the first computer system, a plurality of cryptographic representations, each cryptographic representation in the plurality of cryptographic representations based at least in part on a respective subset in the plurality of subsets. The operations of 2615 may be performed according to the methods described herein. In some examples, aspects of the operations of 2615 may be performed by a cryptographic component as described with reference to FIGS. 17 to 18.

At 2620, the validation system 120 may transmit, from the first computer system to a second computer system via a communications link, a cryptographic representation in the plurality of cryptographic representations. The operations of 2620 may be performed according to the methods described herein. In some examples, the operations of 2620 may be performed as part of determining a level of validity for the set of media data based at least in part on the plurality of cryptographic representations and corresponding entries in an immutable ledger that is remote from the first computer system. In some examples, aspects of the operations of 2620 may be performed by a candidate evaluation component 1740 as described with reference to FIGS. 17 to 18.

At 2625, the validation system 120 may receive, at the first computer system from the second computer system via the communications link, an indication of whether the cryptographic representation matches a trusted version of the cryptographic representation, the trusted version included in the immutable ledger. The operations of 2625 may be performed according to the methods described herein. In some examples, the operations of 2625 may be performed as part of determining a level of validity for the set of media data based at least in part on the plurality of cryptographic representations and corresponding entries in an immutable ledger that is remote from the first computer system. In some examples, aspects of the operations of 2625 may be performed by a candidate evaluation component 1740 as described with reference to FIGS. 17 to 18.

At 2630, the validation system 120 may present, by the first computer system, an indication of the level of validity for the set of media data. The operations of 2630 may be performed according to the methods described herein. In some examples, aspects of the operations of 2630 may be performed by a cryptographic component as described with reference to FIGS. 17 to 18.

Figure 27:
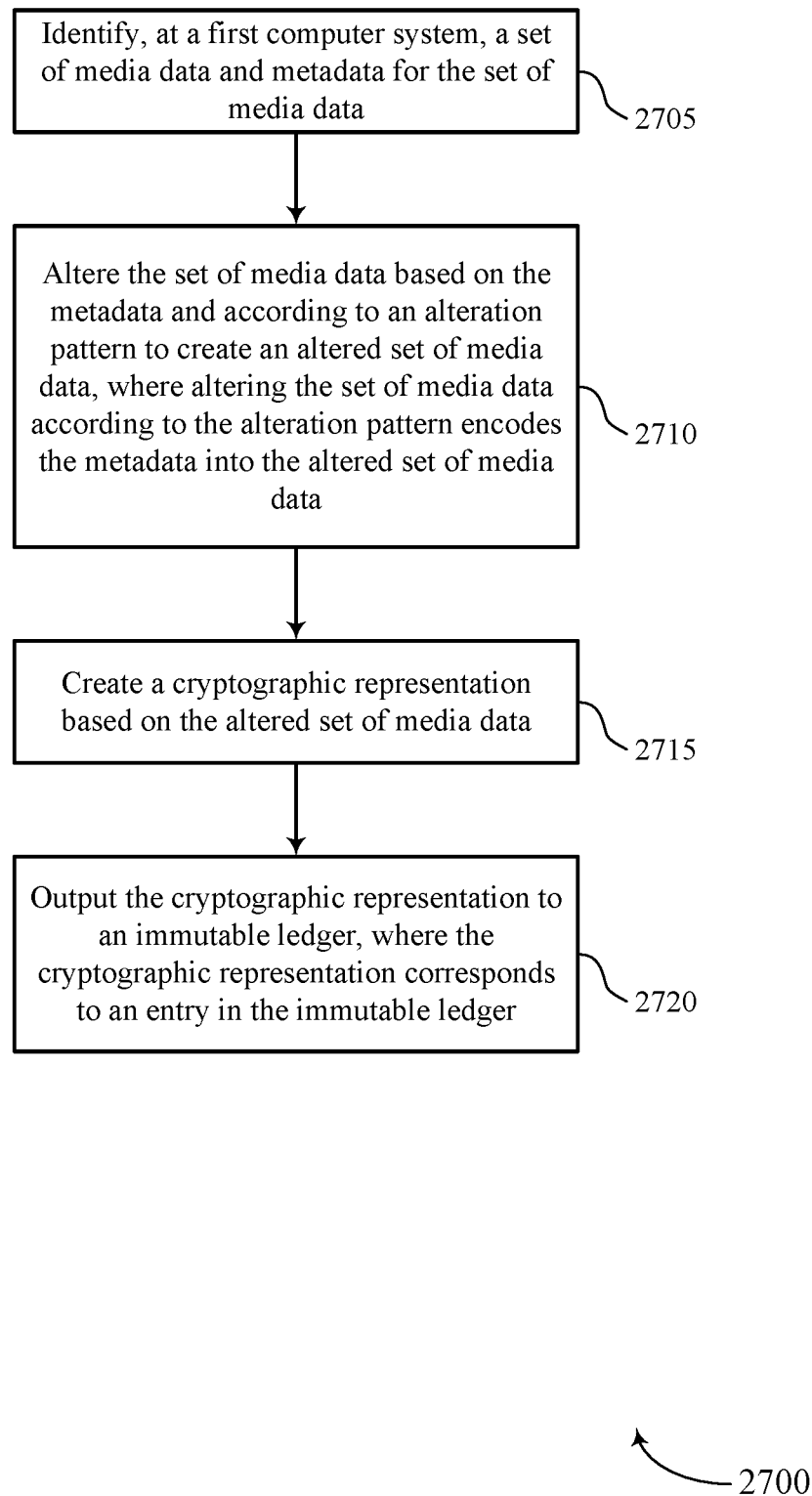

FIG. 27 shows a flowchart illustrating a method 2700 that supports identifying altered media data in accordance with aspects of the present disclosure. The operations of method 2700 may be implemented by a capture system 105 or its components as described herein. For example, the operations of method 2700 may be performed by a capture system manager as described with reference to FIGS. 13 to 14. In some examples, a capture system 105 may execute a set of instructions to control the functional elements of the capture system 105 or a host device thereof or a device coupled thereto to perform the functions described below. Additionally or alternatively, a capture system 105 may perform aspects of the functions described below using special-purpose hardware.

At 2705, the computer device may identify, at a first computer system, a set of media data and metadata for the set of media data. The operations of 2705 may be performed according to the methods described herein. In some examples, aspects of the operations of 2705 may be performed by a media data component as described with reference to FIGS. 13 through 14.

At 2710, the computer device may alter the set of media data based on the metadata and according to an alteration pattern to create an altered set of media data, where altering the set of media data according to the alteration pattern encodes the metadata into the altered set of media data. The operations of 2710 may be performed according to the methods described herein. In some examples, aspects of the operations of 2710 may be performed by a steganography component as described with reference to FIGS. 13 through 14.

At 2715, the computer device may create a cryptographic representation based on the altered set of media data. The operations of 2715 may be performed according to the methods described herein. In some examples, aspects of the operations of 2715 may be performed by a cryptographic component as described with reference to FIGS. 13 through 14.

At 2720, the computer device may output the cryptographic representation to an immutable ledger, where the cryptographic representation corresponds to an entry in the immutable ledger. The operations of 2720 may be performed according to the methods described herein. In some examples, aspects of the operations of 2720 may be performed by a ledger upload component as described with reference to FIGS. 13 through 14.

Figure 28:
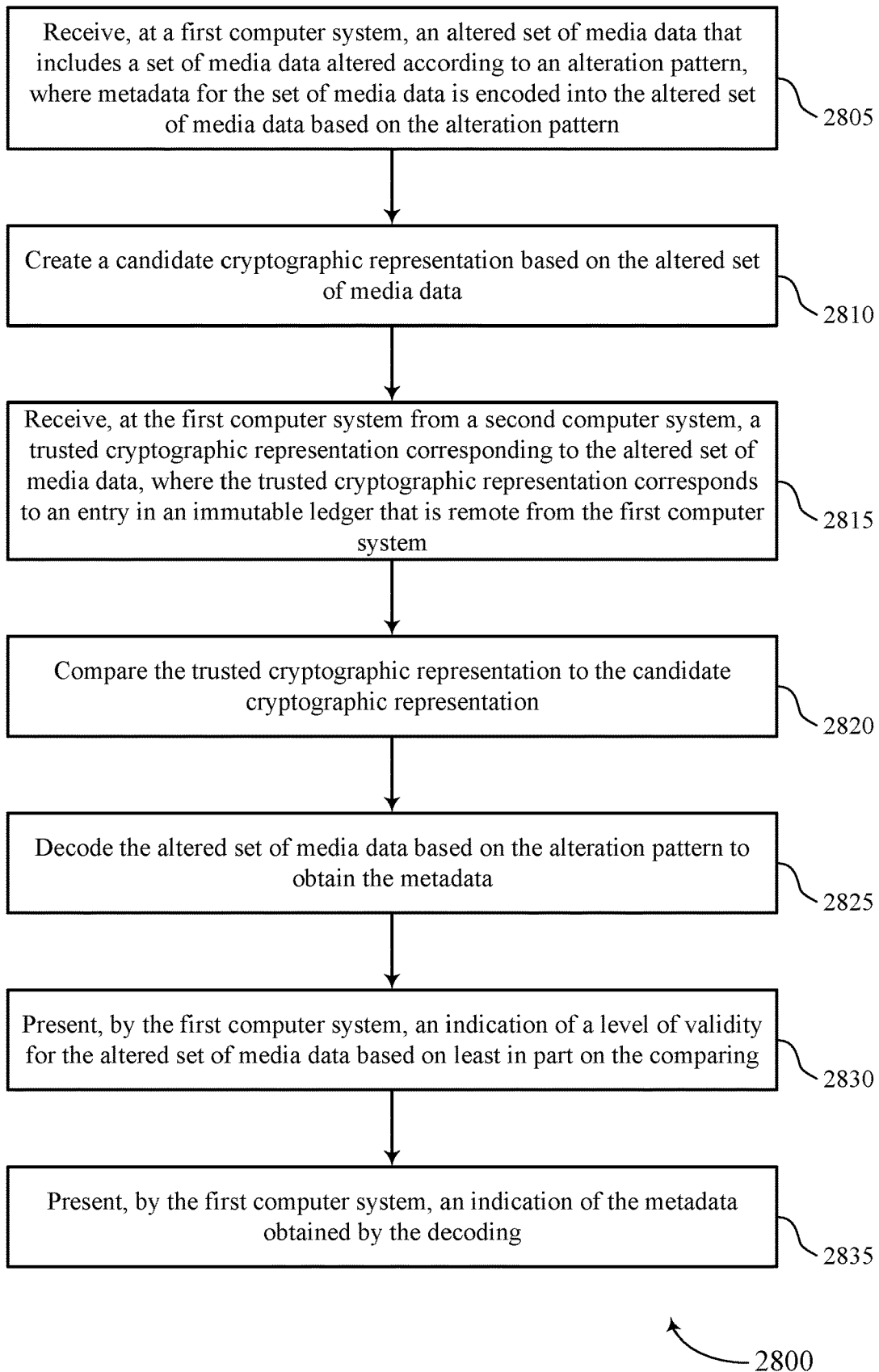

FIG. 28 shows a flowchart illustrating a method 2800 that supports identifying altered media data in accordance with aspects of the present disclosure. The operations of method 2800 may be implemented by a validation system 120 or its components as described herein. For example, the operations of method 2800 may be performed by a validation system manager as described with reference to FIGS. 17-18. In some examples, a validation system 120 may execute a set of instructions to control the functional elements of the a validation system 120 or a host device thereof or a device coupled thereto to perform the functions described below. Additionally or alternatively, a validation system 120 may perform aspects of the functions described below using special-purpose hardware.

At 2805, the computer device may receive, at a first computer system, an altered set of media data that includes a set of media data altered according to an alteration pattern, where metadata for the set of media data is encoded into the altered set of media data based on the alteration pattern. The operations of 2805 may be performed according to the methods described herein. In some examples, aspects of the operations of 2805 may be performed by a media data component as described with reference to FIGS. 17 through 18.

At 2810, the computer device may create a candidate cryptographic representation based on the altered set of media data. The operations of 2810 may be performed according to the methods described herein. In some examples, aspects of the operations of 2810 may be performed by a cryptographic component as described with reference to FIGS. 17 through 18.

At 2815, the computer device may receive, at the first computer system from a second computer system, a trusted cryptographic representation corresponding to the altered set of media data, where the trusted cryptographic representation corresponds to an entry in an immutable ledger that is remote from the first computer system. The operations of 2815 may be performed according to the methods described herein. In some examples, aspects of the operations of 2815 may be performed by a candidate evaluation component as described with reference to FIGS. 17 through 18.

At 2820, the computer device may compare the trusted cryptographic representation to the candidate cryptographic representation. The operations of 2820 may be performed according to the methods described herein. In some examples, aspects of the operations of 2820 may be performed by a candidate evaluation component as described with reference to FIGS. 17 through 18.

At 2825, the computer device may decode the altered set of media data based on the alteration pattern to obtain the metadata. The operations of 2825 may be performed according to the methods described herein. In some examples, aspects of the operations of 2825 may be performed by a steganography component as described with reference to FIGS. 17 through 18.

At 2830, the computer device may present, by the first computer system, an indication of a level of validity for the altered set of media data based on least in part on the comparing. The operations of 2830 may be performed according to the methods described herein. In some examples, aspects of the operations of 2830 may be performed by a presentation component as described with reference to FIGS. 17 through 18.

At 2835, the computer device may present, by the first computer system, an indication of the metadata obtained by the decoding. The operations of 2835 may be performed according to the methods described herein. In some examples, aspects of the operations of 2835 may be performed by a presentation component as described with reference to FIGS. 17 through 18.

Figure 29:
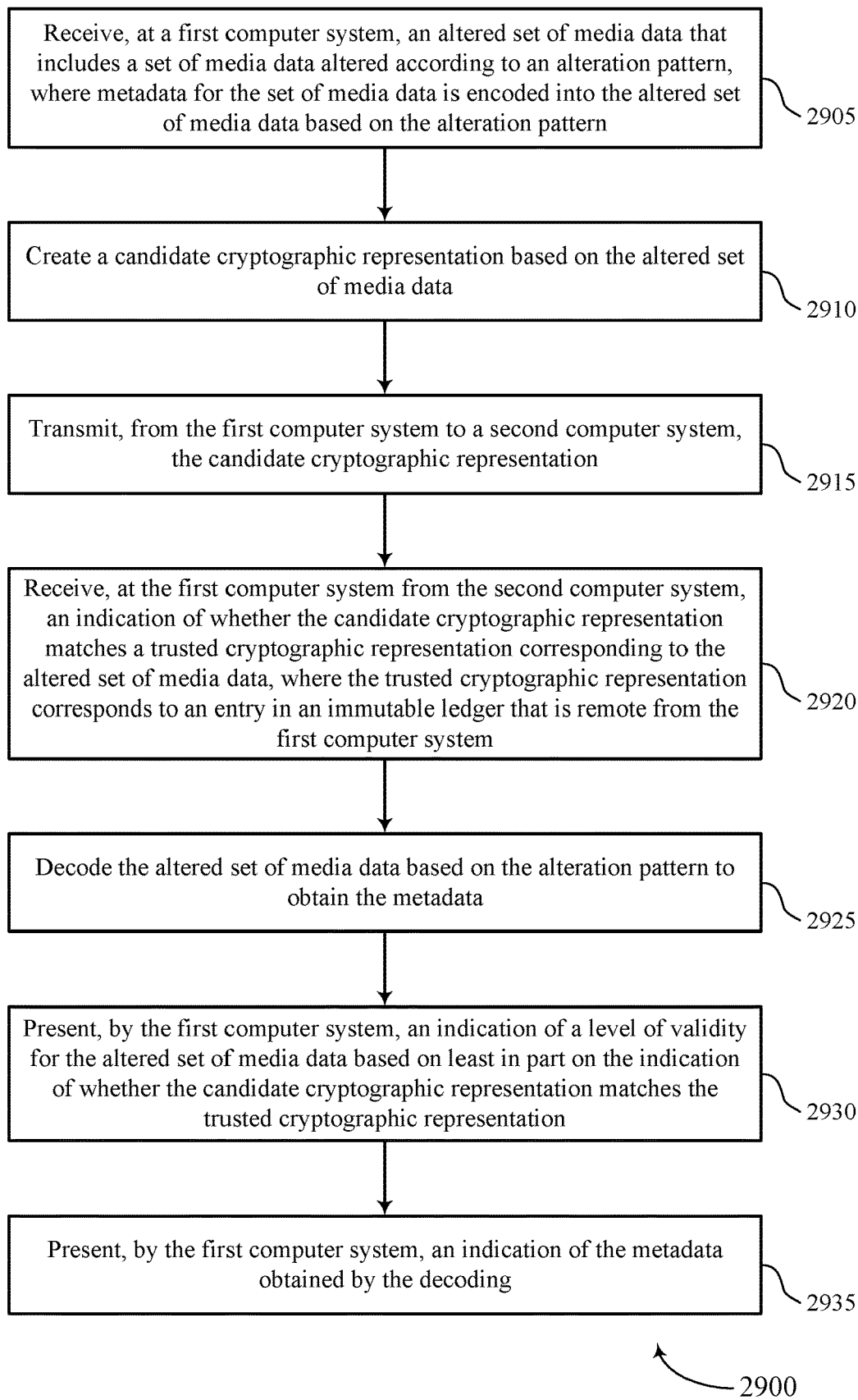

FIG. 29 shows a flowchart illustrating a method 2900 that supports identifying altered media data in accordance with aspects of the present disclosure. The operations of method 2900 may be implemented by a validation system 120 or its components as described herein. For example, the operations of method 2900 may be performed by a validation system manager as described with reference to FIGS. 17-18. In some examples, a validation system 120 may execute a set of instructions to control the functional elements of the a validation system 120 or a host device thereof or a device coupled thereto to perform the functions described below. Additionally or alternatively, a validation system 120 may perform aspects of the functions described below using special-purpose hardware.

At 2905, the computer device may receive, at a first computer system, an altered set of media data that includes a set of media data altered according to an alteration pattern, where metadata for the set of media data is encoded into the altered set of media data based on the alteration pattern. The operations of 2905 may be performed according to the methods described herein. In some examples, aspects of the operations of 2905 may be performed by a media data component as described with reference to FIGS. 17 through 18.

At 2910, the computer device may create a candidate cryptographic representation based on the altered set of media data. The operations of 2910 may be performed according to the methods described herein. In some examples, aspects of the operations of 2910 may be performed by a cryptographic component as described with reference to FIGS. 17 through 18.

At 2915, the computer device may transmit, from the first computer system to a second computer system, the candidate cryptographic representation. The operations of 2915 may be performed according to the methods described herein. In some examples, aspects of the operations of 2915 may be performed by a candidate evaluation component as described with reference to FIGS. 17 through 18.

At 2920, the computer device may receive, at the first computer system from the second computer system, an indication of whether the candidate cryptographic representation matches a trusted cryptographic representation corresponding to the altered set of media data, where the trusted cryptographic representation corresponds to an entry in an immutable ledger that is remote from the first computer system. The operations of 2920 may be performed according to the methods described herein. In some examples, aspects of the operations of 2920 may be performed by a candidate evaluation component as described with reference to FIGS. 17 through 18.

At 2925, the computer device may decode the altered set of media data based on the alteration pattern to obtain the metadata. The operations of 2925 may be performed according to the methods described herein. In some examples, aspects of the operations of 2925 may be performed by a steganography component as described with reference to FIGS. 17 through 18.

At 2930, the computer device may present, by the first computer system, an indication of a level of validity for the altered set of media data based on least in part on the indication of whether the candidate cryptographic representation matches the trusted cryptographic representation. The operations of 2930 may be performed according to the methods described herein. In some examples, aspects of the operations of 2930 may be performed by a presentation component as described with reference to FIGS. 17 through 18.

At 2935, the computer device may present, by the first computer system, an indication of the metadata obtained by the decoding. The operations of 2935 may be performed according to the methods described herein. In some examples, aspects of the operations of 2935 may be performed by a presentation component as described with reference to FIGS. 17 through 18.

Figure 30:
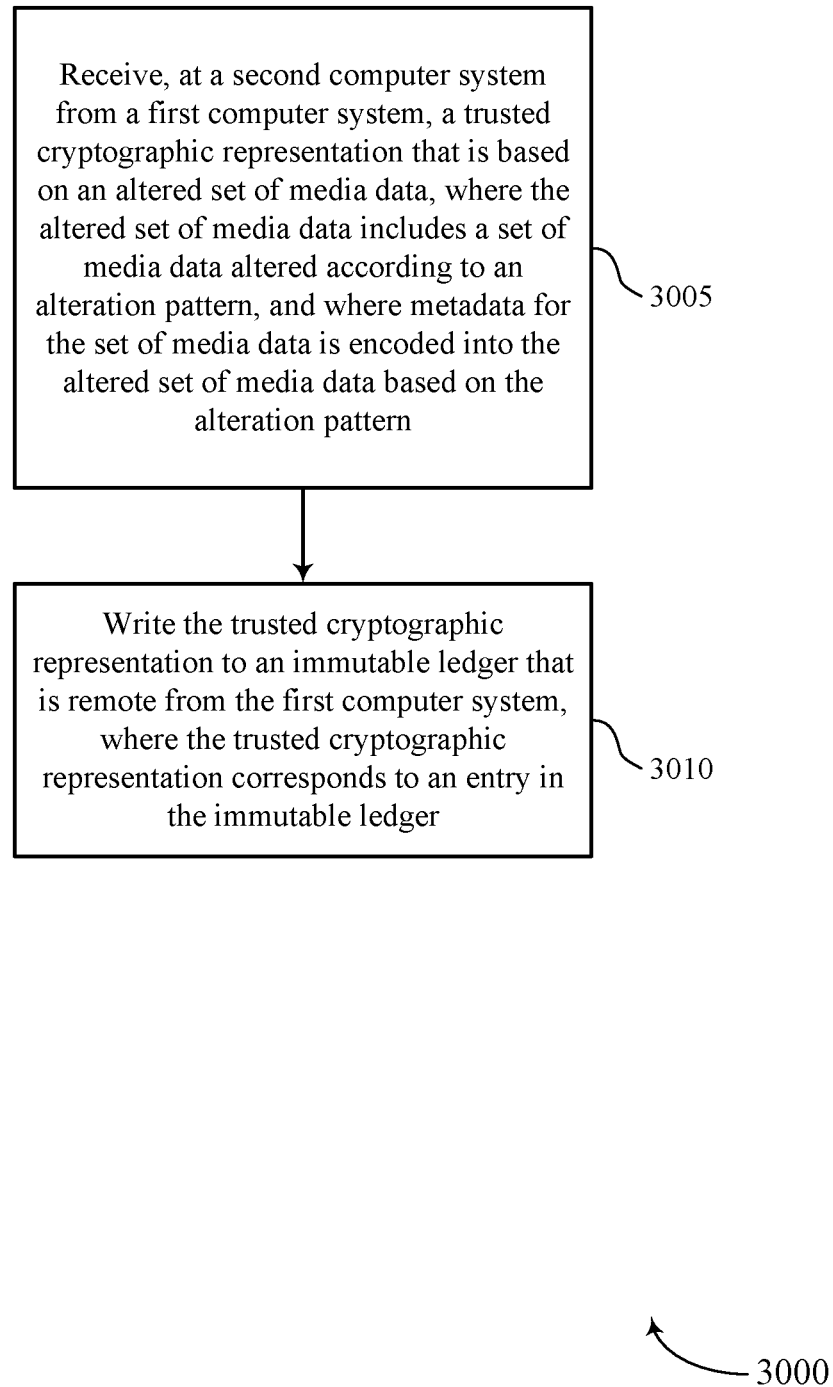

FIG. 30 shows a flowchart illustrating a method 3000 that supports identifying altered media data in accordance with aspects of the present disclosure. The operations of method 3000 may be implemented by a certification system 110 or its components as described herein. For example, the operations of method 3000 may be performed by a certification system manager as described with reference to FIGS. 15 to 16. In some examples, a certification system 110 may execute a set of instructions to control the functional elements of the certification system 110 or a host device thereof or a device coupled thereto to perform the functions described below. Additionally or alternatively, a certification system 110 may perform aspects of the functions described below using special-purpose hardware.

At 3005, the computer device may receive, at a second computer system from a first computer system, a trusted cryptographic representation that is based on an altered set of media data, where the altered set of media data includes a set of media data altered according to an alteration pattern, and where metadata for the set of media data is encoded into the altered set of media data based on the alteration pattern. The operations of 3005 may be performed according to the methods described herein. In some examples, aspects of the operations of 3005 may be performed by a ledger intake component as described with reference to FIGS. 15 through 16.

At 3010, the computer device may write the trusted cryptographic representation to an immutable ledger that is remote from the first computer system, where the trusted cryptographic representation corresponds to an entry in the immutable ledger. The operations of 3010 may be performed according to the methods described herein. In some examples, aspects of the operations of 3010 may be performed by a ledger management component as described with reference to FIGS. 15 through 16.

Figure 31:
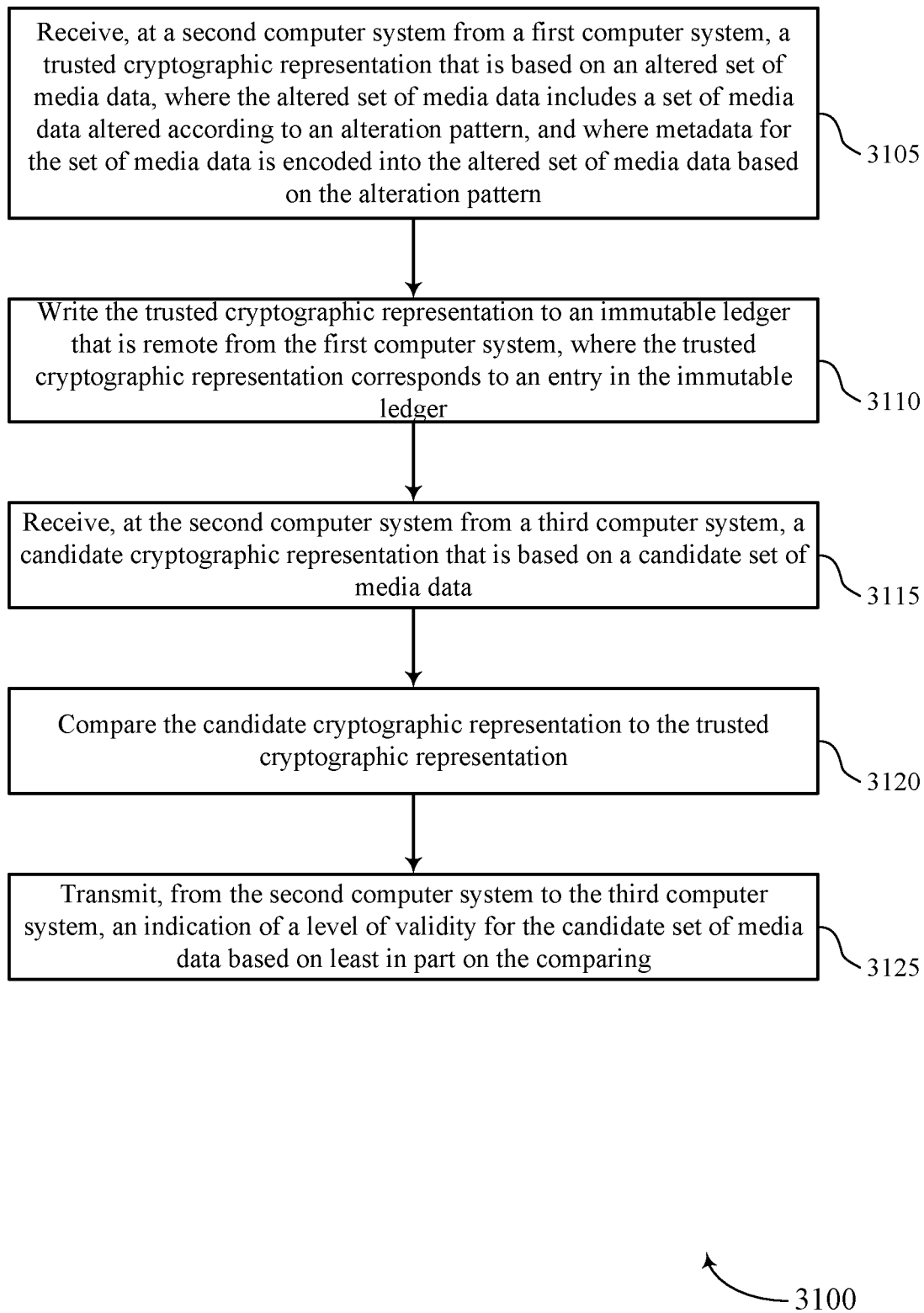

FIG. 31 shows a flowchart illustrating a method 3100 that supports identifying altered media data in accordance with aspects of the present disclosure. The operations of method 3100 may be implemented by a certification system 110 or its components as described herein. For example, the operations of method 3100 may be performed by a certification system manager as described with reference to FIGS. 15 to 16. In some examples, a certification system 110 may execute a set of instructions to control the functional elements of the certification system 110 or a host device thereof or a device coupled thereto to perform the functions described below. Additionally or alternatively, a certification system 110 may perform aspects of the functions described below using special-purpose hardware.

At 3105, the computer device may receive, at a second computer system from a first computer system, a trusted cryptographic representation that is based on an altered set of media data, where the altered set of media data includes a set of media data altered according to an alteration pattern, and where metadata for the set of media data is encoded into the altered set of media data based on the alteration pattern. The operations of 3105 may be performed according to the methods described herein. In some examples, aspects of the operations of 3105 may be performed by a ledger intake component as described with reference to FIGS. 15 through 16.

At 3110, the computer device may write the trusted cryptographic representation to an immutable ledger that is remote from the first computer system, where the trusted cryptographic representation corresponds to an entry in the immutable ledger. The operations of 3110 may be performed according to the methods described herein. In some examples, aspects of the operations of 3110 may be performed by a ledger management component as described with reference to FIGS. 15 through 16.

At 3115, the computer device may receive, at the second computer system from a third computer system, a candidate cryptographic representation that is based on a candidate set of media data. The operations of 3115 may be performed according to the methods described herein. In some examples, aspects of the operations of 3115 may be performed by a validation request component as described with reference to FIGS. 15 through 16.

At 3120, the computer device may compare the candidate cryptographic representation to the trusted cryptographic representation. The operations of 3120 may be performed according to the methods described herein. In some examples, aspects of the operations of 3120 may be performed by a candidate evaluation component as described with reference to FIGS. 15 through 16.

At 3125, the computer device may transmit, from the second computer system to the third computer system, an indication of a level of validity for the candidate set of media data based on least in part on the comparing. The operations of 3125 may be performed according to the methods described herein. In some examples, aspects of the operations of 3125 may be performed by a validation response component as described with reference to FIGS. 15 through 16.

Figure 32:
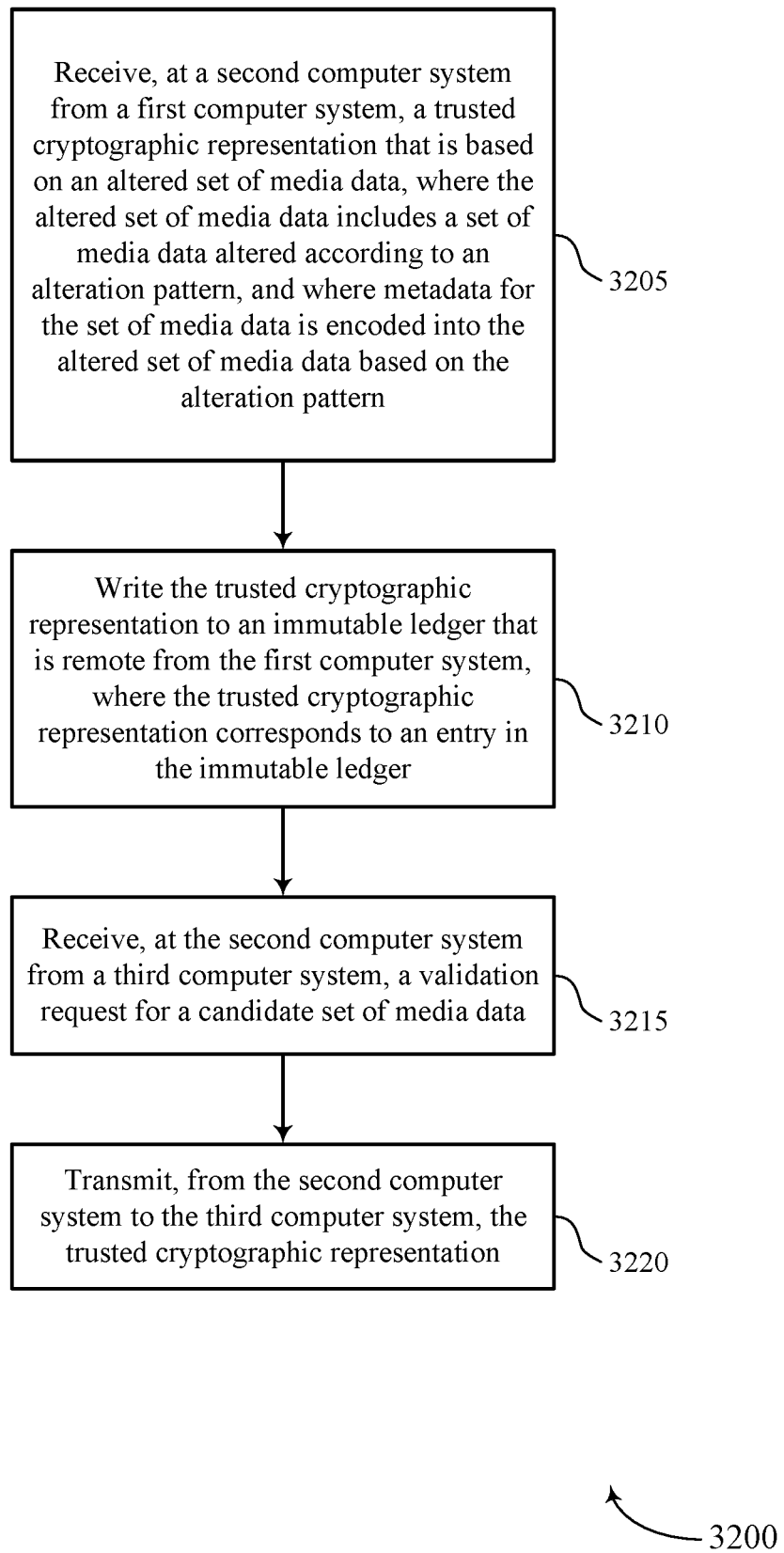

FIG. 32 shows a flowchart illustrating a method 3200 that supports identifying altered media data in accordance with aspects of the present disclosure. The operations of method 3200 may be implemented by a certification system 110 or its components as described herein. For example, the operations of method 3200 may be performed by a certification system manager as described with reference to FIGS. 15 to 16. In some examples, a certification system 110 may execute a set of instructions to control the functional elements of the certification system 110 or a host device thereof or a device coupled thereto to perform the functions described below. Additionally or alternatively, a certification system 110 may perform aspects of the functions described below using special-purpose hardware.

At 3205, the computer device may receive, at a second computer system from a first computer system, a trusted cryptographic representation that is based on an altered set of media data, where the altered set of media data includes a set of media data altered according to an alteration pattern, and where metadata for the set of media data is encoded into the altered set of media data based on the alteration pattern. The operations of 3205 may be performed according to the methods described herein. In some examples, aspects of the operations of 3205 may be performed by a ledger intake component as described with reference to FIGS. 15 through 16.

At 3210, the computer device may write the trusted cryptographic representation to an immutable ledger that is remote from the first computer system, where the trusted cryptographic representation corresponds to an entry in the immutable ledger. The operations of 3210 may be performed according to the methods described herein. In some examples, aspects of the operations of 3210 may be performed by a ledger management component as described with reference to FIGS. 15 through 16.

At 3215, the computer device may receive, at the second computer system from a third computer system, a validation request for a candidate set of media data. The operations of 3215 may be performed according to the methods described herein. In some examples, aspects of the operations of 3215 may be performed by a validation request component as described with reference to FIGS. 15 through 16.

At 3220, the computer device may transmit, from the second computer system to the third computer system, the trusted cryptographic representation. The operations of 3220 may be performed according to the methods described herein. In some examples, aspects of the operations of 3220 may be performed by a validation response component as described with reference to FIGS. 15 through 16.

It should be noted that the methods described above describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a first computer system, an altered set of media data that comprises a set of media data altered according to an alteration pattern, wherein metadata for the set of media data is encoded into the altered set of media data based at least in part on the alteration pattern;
   creating a candidate cryptographic representation based at least in part on the altered set of media data;
   receiving, at the first computer system, a trusted cryptographic representation of the altered set of media data, wherein the trusted cryptographic representation corresponds to an entry in an immutable ledger that is remote from the first computer system;
   comparing the trusted cryptographic representation to the candidate cryptographic representation;
   decoding the altered set of media data to obtain the metadata, the decoding based at least in part on the alteration pattern; and
   presenting, by the first computer system, an indication of a level of validity for the altered set of media data based on least in part on the comparing.

2. The method of claim 1, further comprising:
   presenting, by the first computer system, an indication of the metadata obtained by the decoding.

3. The method of claim 1, further comprising:
   determining the level of validity for the altered set of media data based at least in part on the metadata.

4. The method of claim 1, further comprising:
   identifying a plurality of altered subsets of the altered set of media data, wherein decoding the altered set of media data comprises:
      decoding each of the plurality of altered subsets based at least in part on the alteration pattern and an encoding scheme to obtain at least a portion of the metadata.

5. The method of claim 4, further comprising:
   creating, at the first computer system, a plurality of candidate cryptographic representations that includes the candidate cryptographic representation, each candidate cryptographic representation in the plurality of candidate cryptographic representations based at least in part on a respective altered subset in the plurality of altered subsets;
   receiving, at the first computer system, a plurality of trusted cryptographic representations that includes the trusted cryptographic representation, the plurality of trusted cryptographic representations corresponding to the plurality of altered subsets; and
   comparing the plurality of trusted cryptographic representations to the plurality of candidate cryptographic representations.

6. The method of claim 1, wherein the altered set of media data comprises a plurality of pixel or audio sample values, and wherein decoding the altered set of media data comprises:
   identifying, for the plurality of pixel or audio sample values, a corresponding set of digit values; and
   determining the metadata based at least in part on a subset of the corresponding set of digit values and a character encoding scheme.

7. The method of claim 6, wherein the subset of the corresponding set of digit values comprises a least significant digit value of each pixel or audio sample value in the plurality of pixel or audio sample values.

8. The method of claim 1, wherein the alteration pattern is based at least in part on a steganographic algorithm.

9. The method of claim 1, wherein:
   the immutable ledger comprises a blockchain; and
   the entry in the immutable ledger comprises a block of the blockchain.

10. A method, comprising:
   receiving, at a first computer system, an altered set of media data that comprises a set of media data altered according to an alteration pattern, wherein metadata for the set of media data is encoded into the altered set of media data based at least in part on the alteration pattern;
   creating a candidate cryptographic representation based at least in part on the altered set of media data;
   transmitting, from the first computer system to a second computer system, the candidate cryptographic representation;
   receiving, at the first computer system from the second computer system, an indication of whether the candidate cryptographic representation matches a trusted cryptographic representation of the altered set of media data, wherein the trusted cryptographic representation corresponds to an entry in an immutable ledger that is remote from the first computer system;
   decoding the altered set of media data to obtain the metadata, the decoding based at least in part on the alteration pattern; and
   presenting, by the first computer system, an indication of a level of validity for the altered set of media data based on least in part on the indication of whether the candidate cryptographic representation matches the trusted cryptographic representation.

11. The method of claim 10, further comprising:
   presenting, by the first computer system, an indication of the metadata obtained by the decoding.

12. The method of claim 10, further comprising:
   determining the level of validity for the altered set of media data based at least in part on the metadata.

13. The method of claim 10, further comprising:
   identifying a plurality of altered subsets of the altered set of media data, wherein decoding the altered set of media data comprises:
      decoding each of the plurality of altered subsets based at least in part on the alteration pattern and an encoding scheme to obtain at least a portion of the metadata.

14. The method of claim 13, further comprising:
   creating, at the first computer system, a plurality of candidate cryptographic representations that includes the candidate cryptographic representation, each candidate cryptographic representation in the plurality of candidate cryptographic representations based at least in part on a respective altered subset in the plurality of altered subsets;
   transmitting, from the first computer system to the second computer system, the plurality of candidate cryptographic representations; and
   receiving, at the first computer system from the second computer system, an indication of whether the plurality of candidate cryptographic representations match a plurality of trusted cryptographic representations corresponding to the altered set of media data, wherein each of the plurality of trusted cryptographic representations corresponds to a respective entry in the immutable ledger.

15. The method of claim 10, wherein the altered set of media data comprises a plurality of pixel or audio sample values, and wherein decoding the altered set of media data comprises:
  identifying, for the plurality of pixel or audio sample values, a corresponding set of digit values; and
  determining the metadata based at least in part on a subset of the corresponding set of digit values and a character encoding scheme.

16. The method of claim 15, wherein the subset of the corresponding set of digit values comprises a least significant digit value of each pixel or audio sample value in the plurality of pixel or audio sample values.

17. The method of claim 10, wherein the alteration pattern is based at least in part on a steganographic algorithm.

18. The method of claim 10, wherein:
  the immutable ledger comprises a blockchain; and
  the entry in the immutable ledger comprises a block of the blockchain.

19. An apparatus, comprising:
  a processor,
  memory coupled with the processor; and
  instructions stored in the memory and executable by the processor to cause the apparatus to:
    receive, at a first computer system, an altered set of media data that comprises a set of media data altered according to an alteration pattern, wherein metadata for the set of media data is encoded into the altered set of media data based at least in part on the alteration pattern;
    create a candidate cryptographic representation based at least in part on the altered set of media data;
    receive, at the first computer system, a trusted cryptographic representation of the altered set of media data, wherein the trusted cryptographic representation corresponds to an entry in an immutable ledger that is remote from the first computer system;
    compare the trusted cryptographic representation to the candidate cryptographic representation;
    decode the altered set of media data to obtain the metadata, the decoding based at least in part on the alteration pattern; and
    present, by the first computer system, an indication of a level of validity for the altered set of media data based on least in part on the comparing.

20. The apparatus of claim 19, wherein the instructions are further executable by the processor to cause the apparatus to:
  present, by the first computer system, an indication of the metadata obtained by the decoding.

21. The apparatus of claim 19, wherein the instructions are further executable by the processor to cause the apparatus to:
  determine the level of validity for the altered set of media data based at least in part on the metadata.

22. The apparatus of claim 19, wherein the instructions are further executable by the processor to cause the apparatus to:
  identify a plurality of altered subsets of the altered set of media data, wherein, to decode the altered set of media data, the instructions are executable by the processor to cause the apparatus to:
    decode each of the plurality of altered subsets based at least in part on the alteration pattern and an encoding scheme to obtain at least a portion of the metadata.

23. The apparatus of claim 22, wherein the instructions are further executable by the processor to cause the apparatus to:
  create, at the first computer system, a plurality of candidate cryptographic representations that includes the candidate cryptographic representation, each candidate cryptographic representation in the plurality of candidate cryptographic representations based at least in part on a respective altered subset in the plurality of altered subsets;
  receive, at the first computer system, a plurality of trusted cryptographic representations that includes the trusted cryptographic representation, the plurality of trusted cryptographic representations corresponding to the plurality of altered subsets; and
  compare the plurality of trusted cryptographic representations to the plurality of candidate cryptographic representations.

24. The apparatus of claim 19, wherein the alteration pattern is based at least in part on a steganographic algorithm.

25. An apparatus, comprising:
  a processor,
  memory coupled with the processor; and
  instructions stored in the memory and executable by the processor to cause the apparatus to:
    receive, at a first computer system, an altered set of media data that comprises a set of media data altered according to an alteration pattern, wherein metadata for the set of media data is encoded into the altered set of media data based at least in part on the alteration pattern;
    create a candidate cryptographic representation based at least in part on the altered set of media data;
    transmit, from the first computer system to a second computer system, the candidate cryptographic representation;
    receive, at the first computer system from the second computer system, an indication of whether the candidate cryptographic representation matches a trusted cryptographic representation of the altered set of media data, wherein the trusted cryptographic representation corresponds to an entry in an immutable ledger that is remote from the first computer system;
    decode the altered set of media data to obtain the metadata, the decoding based at least in part on the alteration pattern; and
    present, by the first computer system, an indication of a level of validity for the altered set of media data based on least in part on the indication of whether the candidate cryptographic representation matches the trusted cryptographic representation.

26. The apparatus of claim 25, wherein the instructions are further executable by the processor to cause the apparatus to:
  present, by the first computer system, an indication of the metadata obtained by the decoding.

27. The apparatus of claim 25, wherein the instructions are further executable by the processor to cause the apparatus to:
  determine the level of validity for the altered set of media data based at least in part on the metadata.

28. The apparatus of claim 25, wherein the instructions are further executable by the processor to cause the apparatus to:

identify a plurality of altered subsets of the altered set of media data, wherein to decode the altered set of media data, wherein, to decode the altered set of media data, the instructions are executable by the processor to cause the apparatus to:
  decode each of the plurality of altered subsets based at least in part on the alteration pattern and an encoding scheme to obtain at least a portion of the metadata.

29. The apparatus of claim 28, wherein the instructions are further executable by the processor to cause the apparatus to:
  create, at the first computer system, a plurality of candidate cryptographic representations that includes the candidate cryptographic representation, each candidate cryptographic representation in the plurality of candidate cryptographic representations based at least in part on a respective altered subset in the plurality of altered subsets;
  transmit, from the first computer system to the second computer system, the plurality of candidate cryptographic representations; and
  receive, at the first computer system from the second computer system, an indication of whether the plurality of candidate cryptographic representations match a plurality of trusted cryptographic representations corresponding to the altered set of media data, wherein each of the plurality of trusted cryptographic representations corresponds to a respective entry in the immutable ledger.

30. The apparatus of claim 25, wherein the alteration pattern is based at least in part on a steganographic algorithm.

* * * * *